United States Patent
Hu et al.

(10) Patent No.: US 11,144,754 B2
(45) Date of Patent: Oct. 12, 2021

(54) GAZE DETECTION USING ONE OR MORE NEURAL NETWORKS

(71) Applicant: Nvidia Corporation, Santa Clara, CA (US)

(72) Inventors: Feng Hu, Santa Clara, CA (US); Niranjan Avadhanam, Saratoga, CA (US); Yuzhuo Ren, San Jose, CA (US); Sujay Yadawadkar, Santa Clara, CA (US); Sakthivel Sivaraman, Santa Clara, CA (US); Hairong Jiang, Campbell, CA (US); Siyue Wu, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 67 days.

(21) Appl. No.: 16/544,442

(22) Filed: Aug. 19, 2019

(65) Prior Publication Data
US 2021/0056306 A1  Feb. 25, 2021

(51) Int. Cl.
*G06K 9/00* (2006.01)
*G06N 3/08* (2006.01)
*G06F 3/01* (2006.01)
*G06K 9/62* (2006.01)

(52) U.S. Cl.
CPC ......... *G06K 9/00604* (2013.01); *G06F 3/013* (2013.01); *G06K 9/00832* (2013.01); *G06K 9/6262* (2013.01); *G06N 3/08* (2013.01)

(58) Field of Classification Search
CPC .......... G06K 9/00604; G06K 9/00832; G06K 9/6262; G06F 3/013; G06N 3/08
USPC ....................................... 382/103
See application file for complete search history.

(56) References Cited

U.S. PATENT DOCUMENTS

2020/0207358 A1* 7/2020 Katz .................. G06K 9/00845

* cited by examiner

*Primary Examiner* — Michael R Neff
(74) *Attorney, Agent, or Firm* — Hogan Lovells US LLP

(57) ABSTRACT

Apparatuses, systems, and techniques are described to determine locations of objects using images including digital representations of those objects. In at least one embodiment, a gaze of one or more occupants of a vehicle is determined independently of a location of one or more sensors used to detect those occupants.

20 Claims, 56 Drawing Sheets

GAZE DETECTION USING ONE OR MORE NEURAL NETWORKS

BACKGROUND

Advances in computer technology have resulted in improved capabilities in object identification and analysis. Machine learning has been used as a tool for detecting objects in image data for purposes of such analysis. In order to train machine learning models to perform object identification, however, conventional approaches require a significant amount of labeled training data, where supervised training data includes ground truth data. Creating this training data can be a long and complicated process, which may be too expensive for various uses and may result in an insufficient amount of training data.

BRIEF DESCRIPTION OF THE DRAWINGS

Various embodiments in accordance with the present disclosure will be described with reference to the drawings, in which.

DETAILED DESCRIPTION

Figure 1A:
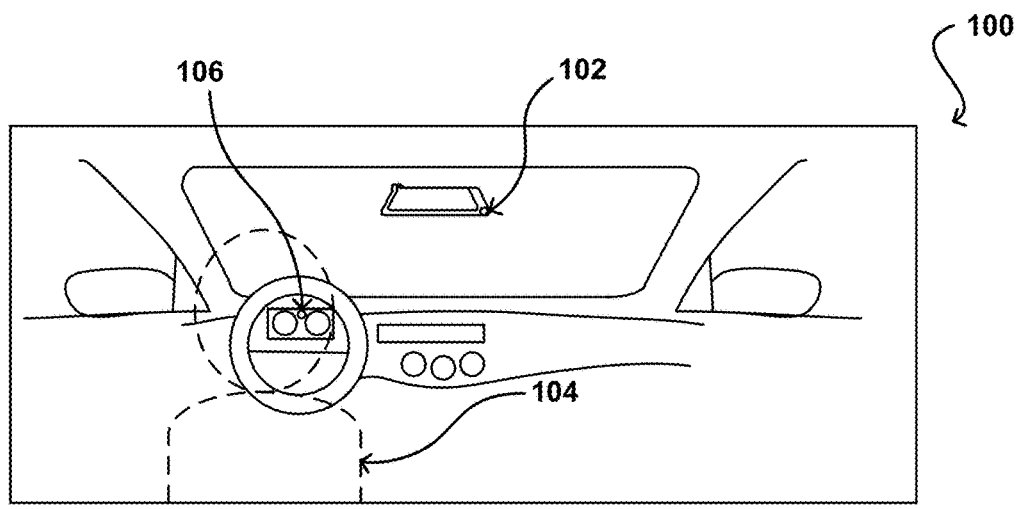
FIGS. 1A, 1B, 1C, and 1D illustrate views of a vehicle environment, according to at least one embodiment.

In at least one embodiment, object location can be performed in a space such as an interior cabin of a vehicle, as illustrated in a view 100 of FIG. 1A. In at least one embodiment a vehicle can include various components, such as a steering wheel, instrument panel, windshield, and mirrors, at which a driver 104 or other passenger may gaze while in this vehicle. In at least one embodiment, a determination about a location of driver 104 can be made using image or video data captured using at least one camera. In at least one embodiment, cameras may be placed at various locations in a vehicle, such as a camera 102 attached to a rear view mirror or a camera 106 positioned in an instrument panel. In at least one embodiment, these cameras can capture image data that includes a representation of a driver, or other occupant of this vehicle, and this image data can be analyzed to determine information about a driver. In at least one embodiment, this information can include a position, pose, head position, and gaze direction of a driver or other occupant.

In at least one embodiment, gaze direction information can be used to determine what an occupant of a vehicle is viewing at a given point in time. In at least one embodiment, this can include determining whether a driver is looking out a windshield while driving, or is looking away from a windshield, such as to a rear view mirror, instrument panel, or elsewhere in a vehicle. In at least one embodiment, such information can be useful in determining whether a driver is distracted or otherwise unable to see an action happening around a vehicle, such as a pedestrian walking in front of a vehicle. In at least one embodiment, if a vehicle monitoring system is able to determine that a driver is not looking away from a windshield and may not see this pedestrian with enough time to stop a vehicle, a vehicle monitoring system may make a determination to stop this vehicle automatically, or autonomously, in order to avoid striking a pedestrian.

In at least one embodiment, however, a location to which an occupant is looking requires knowledge about relative locations of objects in a vehicle. In at least one embodiment, a monitoring system would need to have information regarding locations of objects such as a windshield or mirror to be able to determine whether an occupant is gazing at a particular object, or whether this gaze direction would intersect that object. In at least one embodiment where a vehicle has a fixed camera and set of objects, a model can be generated and trained based on these known positions, which can provide a ground truth for training. In at least one embodiment, however, a camera or sensor used to capture such information can be located at various places in, or proximate to, a vehicle. In at least one embodiment, these cameras can be moved or selectable within this vehicle. In at least one embodiment, mobility of devices can be problematic as there will be no fixed relationship to objects or locations within a vehicle or other such area.

Figures 1B, 1C:
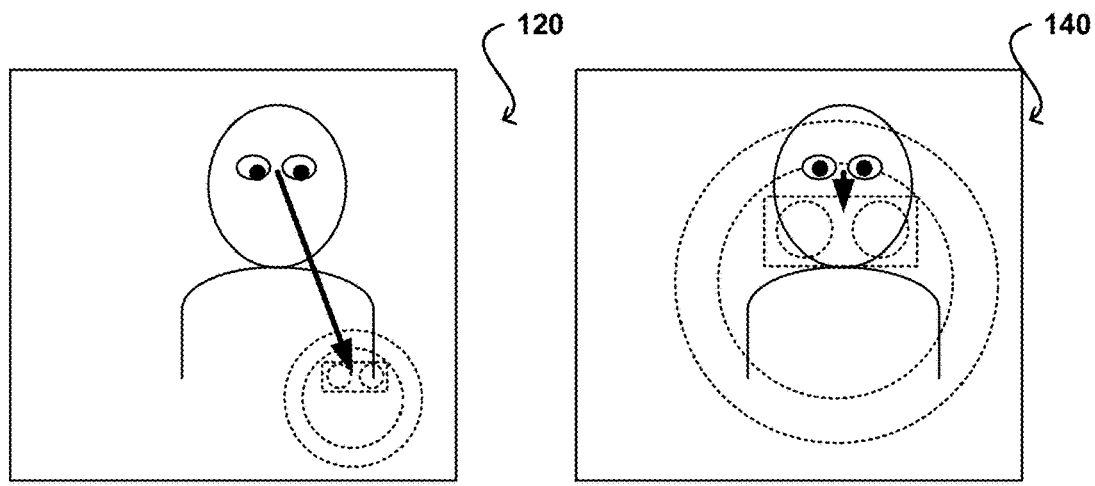

In at least one embodiment, a neural network or machine learning can be trained to infer information such as gaze direction or location based at least in part upon captured image or video data from one or more of these cameras or sensors. In at least one embodiment, since a camera can be placed at any location within a vehicle then a neural network needs to be trained using training data for various locations within a vehicle. In at least one embodiment, it will not be practical to obtain training data for all possible locations and orientations of a camera. In at least one embodiment, placing a camera at an arbitrary location within a vehicle can result in a lack of ground truth data, which can cause problems with training. In at least one embodiment, points or locations within a vehicle may be fixed and known, but position and orientation of a camera within that vehicle may not be known, such that relative positions of these points or objects to a camera will be uncertain and will not have ground truth available. In at least one embodiment, as illustrated in FIGS. 1B and 1C, image data captured from different cameras will include representations of objects in different locations. In at least one embodiment, an image 120 illustrated in FIG. 1B includes a representation of a driver from a point of view of a first camera 102 on a rear view mirror, and an image 140 illustrated in FIG. 1C includes a representation of this driver from a point of view of a second camera 106 on an instrument panel. In at least one embodiment, a driver is looking at an instrument panel in both images. In at least one embodiment, however, without ground truth data and known position and orientation of a given camera to this vehicle it cannot be determined with certainty what this driver is looking at.

Figure 1D:
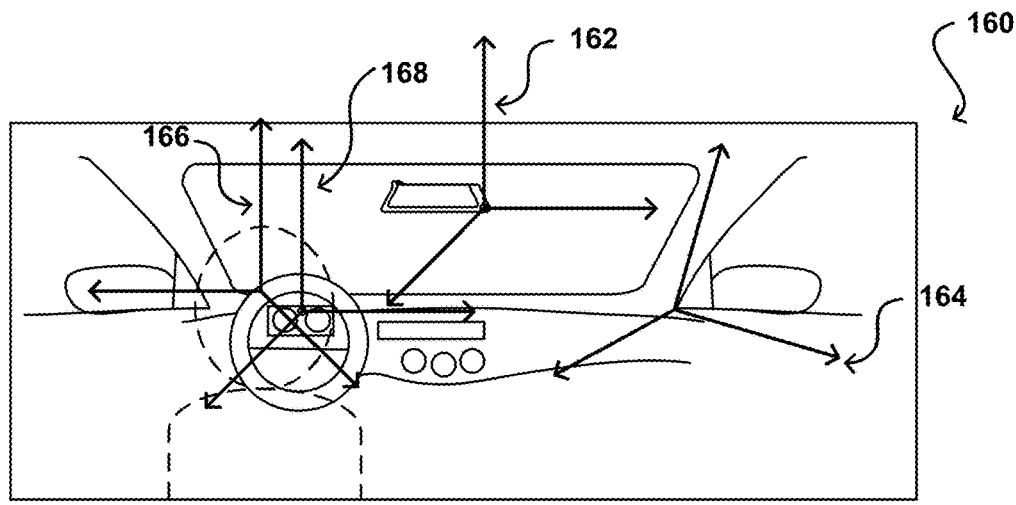

In at least one embodiment, coordinate systems for various objects in a vehicle can be considered. In at least one embodiment, as illustrated in a view 160 of FIG. 1D, there can be a coordinate system 162 associated with a first camera, with an origin and orientation of this coordinate system based on a position and orientation of a camera sensor. In at least one embodiment, there will similarly be a vehicle coordinate system 164 for this vehicle, wherein points inside this vehicle will be fixed with respect to vehicle coordinate system 164. In at least one embodiment, different camera placements will result in different relative distances and orientations between these coordinate systems 164, 164. In at least one embodiment, there can be additional coordinate systems as well, such as a coordinate system 166 for a driver or occupant that may change over time based upon factors such as a position, orientation, and pose of that person. In at least one embodiment, another coordinate system 168 can be considered that corresponds to another camera or sensor in this vehicle. In at least one embodiment, there may be additional cameras, sensors, or objects that may each have one or more respective coordinate systems.

Figure 2:
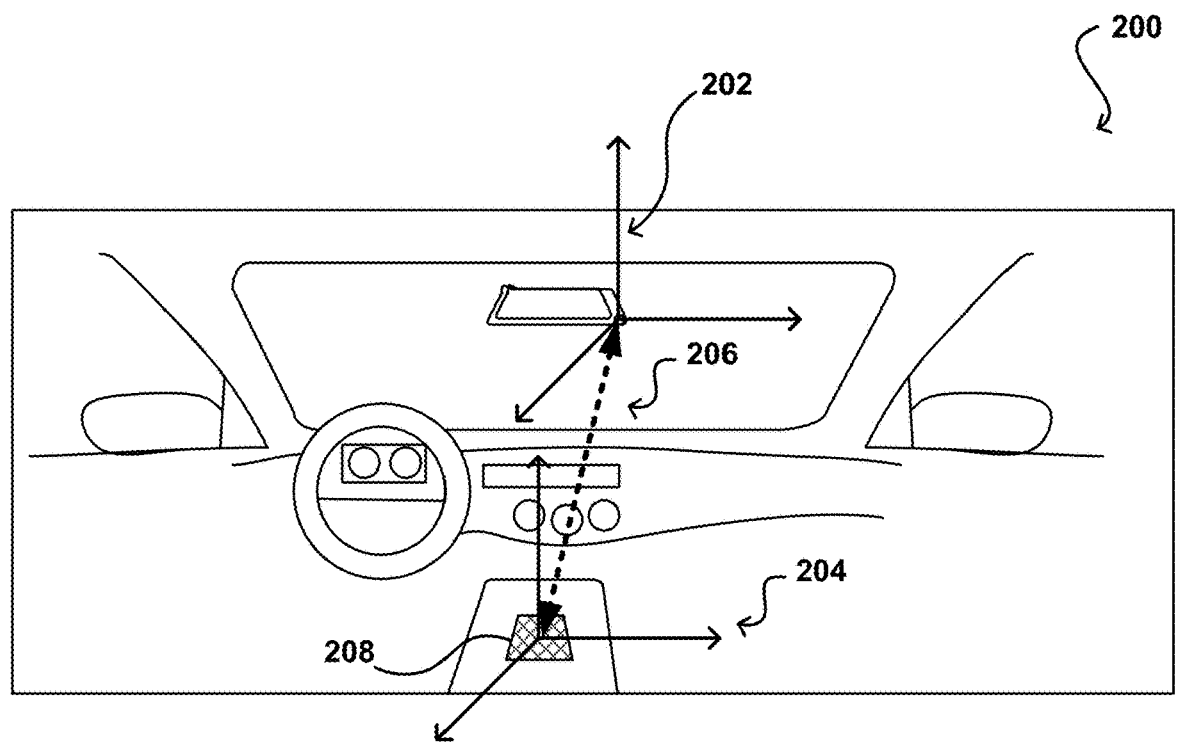
FIG. 2 illustrates vehicle and camera coordinate systems that can be bridged, according to at least one embodiment.

In at least one embodiment, an attempt can be made to correlate or bridge at least some of these coordinate systems. In at least one embodiment, corresponding to a vehicle orientation as illustrated in a view 200 of FIG. 2, a camera may be located proximate a rear-view mirror, and that camera may be a main cabin camera that continuously captures image data for an interior of this vehicle, at least during operation or when an occupant is detected. In at least one embodiment, a camera coordinate system 202 can be considered that is determined relative to this camera, as image data captured using this camera will include representations of objects relative to this camera. In at least one embodiment, representing locations of these objects relative to this camera can be simplified by determining their positions in a camera coordinate system. In at least one embodiment, however, locations in this camera coordinate system may have no ground truth data for training, as camera position may be arbitrary or one of a number of possible positions in, or proximate, a vehicle.

In at least one embodiment, a vehicle coordinate system 204 can be considered for a cabin of this vehicle. In at least one embodiment, this coordinate system 204 can be centered at a specific location, such as where an origin point is defined in this vehicle. In at least one embodiment, this origin point may correspond to a calibration mount 208, or other such object, that can be placed at a determined point in a vehicle to be used for modeling. In at least one embodiment, calibration mount 208 can include information that can be used to determine a relative position 206 and orientation of calibration mount 208 to a camera. In at least one embodiment, calibration mount 208 can include an asymmetric checkerboard pattern, or other asymmetric pattern, that can be used to determine an orientation of this pattern. In at least one embodiment, a planar pattern can further provide information about a relative orientation of this calibration mount in three dimensions. In at least one embodiment, image data captured by a camera can include a representation of this calibration mount 208. In at least one embodiment, image data can be analyzed to determine a relative position and orientation of this calibration mount 204 to this camera in a camera coordinate system. In at least one embodiment, ground truth data for points in this vehicle are known in this vehicle coordinate system. In at least one embodiment, determining relative position and orientation of vehicle coordinate system 204 to camera coordinate system 202 provides ground truth data that can be used to train a model or neural network for this configuration, as points in vehicle coordinate system 204 can be mapped to corresponding points in camera coordinate system 202.

In at least one embodiment, a set of objects or regions of interest in a vehicle can be determined. In at least one embodiment, these objects can include things that a driver or occupant of a vehicle might view, such as a windshield region to view objects in front of a vehicle, a rear-view or side-view mirror to view objects beside or behind a vehicle, an instrument panel to get information about operation of a vehicle, or a display screen to get other types of content or information. In at least one embodiment, for these and other potential objects of interest, it can be desirable to determine positions in a vehicle that correspond to these objects.

In at least one embodiment, markers can be used to designate an object or region in a vehicle. In at least one embodiment, a fiducial marker such as an Apriltag can be used. In at least one embodiment, an Apriltag provides a visual fiducial element 306 that can be used to determine location and orientation of a point in an image, which would correspond to a relative position in a camera coordinate system, or virtual camera space. In at least one embodiment, a QR code or other fiducial element can be utilized. In at least one embodiment, a set of four fiducial elements 306 can be used to mark a region, where that region can be approximated by a box, trapezoid, or other four-sided geometric shape. In at least one embodiment, two or more fiducial elements can be used to represent an area, depending in part upon a shape of that area. In at least one embodiment, image data can be captured by a camera 302 that includes representations of at least a subset of fiducial elements 306. In at least one embodiment, positions and orientations of these fiducial elements 306 can be determined from this image data, but within virtual camera space. In at least one embodiment, this can include a relative position and orientation of objects such as a windshield region 310, side mirror region 308, or steering wheel region 312. In at least one embodiment, when a gaze direction of an occupant is determined to intersect with one of these regions, a determination can be made that this occupant is looking at that region, and a determination can be made as to whether any action should be taken based on that information. In at least one embodiment, such an action can include selecting information to display at a location where an occupant is looking, taking a driving action due to a driver looking away from a certain region, or adjusting an operation or configuration of a vehicle, and so on.

Figure 3:
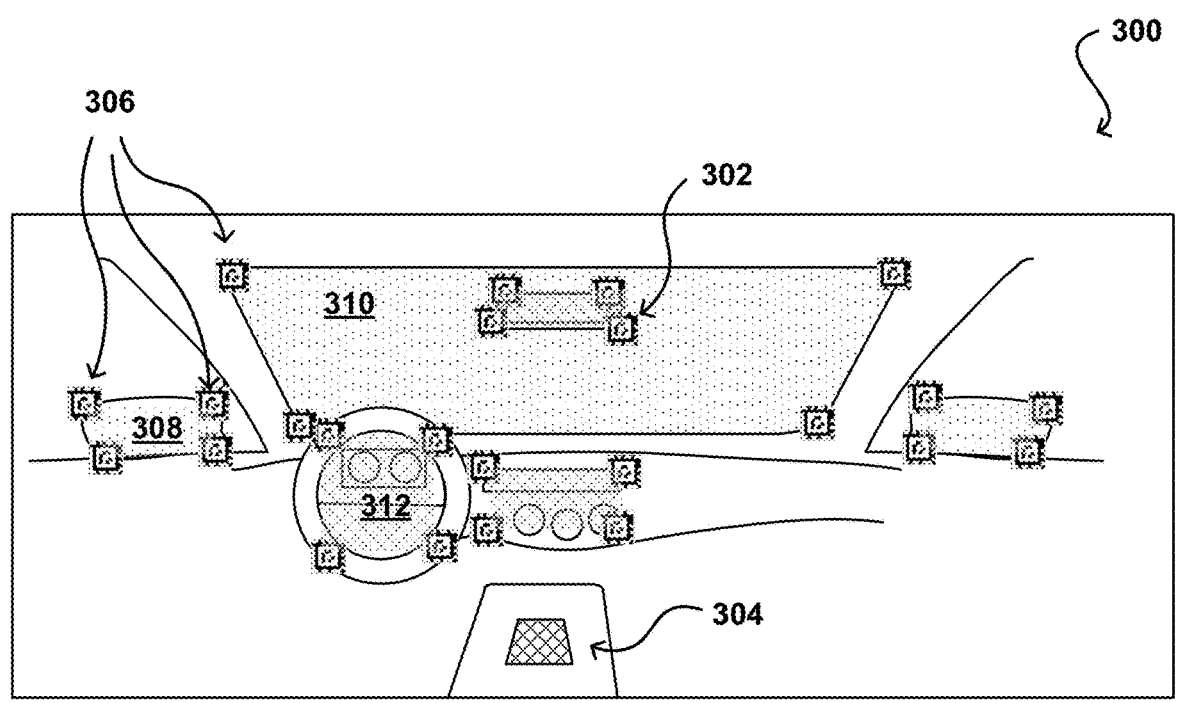
FIG. 3 illustrates placement of fiducial markers for regions of interest, according to at least one embodiment.

In at least one embodiment, there may not be ground truth data available for a configuration of FIG. 3 to provide for accurate training of at least one neural network, such as a neural network for a specific type of vehicle corresponding to this configuration. In at least one embodiment, however, ground truth data may be available for locations of these fiducial markers 306 in a vehicle coordinate system, or vehicle space, relative to an origin of that coordinate system, which may correspond to a calibration mount 304. In at least one embodiment, points in virtual camera space can be mapped to points in vehicle coordinate space, which can provide ground truth data for these fiducial markers 306 represented in image data captured by camera 302. In at least one embodiment, ground truth data can then be provided for any arbitrary camera position as long as this vehicle space can be mapped to a corresponding virtual camera space. In at least one embodiment, a calibration mount 304 has an asymmetric pattern, such as a colored checkerboard pattern, that can be used to determine position, distance, and orientation of this calibration mount based on an appearance of this pattern in captured image data.

In at least one embodiment, a virtual camera space is created and used as a bridge to a data collection system and real-car environment. In at least one embodiment, this bridging enables a vehicle monitoring system to be able to deploy any trained deep neural network (DNN) models to any model of vehicle. In at least one embodiment, a coordinate propagation mechanism is utilized that can transform each physical world point into a point in virtual camera space. In at least one embodiment, a propagation mechanism can find a relationship between a determined coordinate system, such as a camera coordinate system and that of one or more adjacent coordinate systems, such as vehicle or occupant coordinate systems. In at least one embodiment, these coordinate systems can be chained together or otherwise correlated, such that a coordinate for any point can be determined in virtual camera space.

In at least one embodiment, a virtual camera space and coordinate propagation mechanism can be applied to training of multiple vehicle models, generating ground truth for all locations, or fixations, at which an occupant is requested to look. In at least one embodiment, this can include looking at a light, such as a light emitting diode (LED), proximate a fiducial marker for an object in a vehicle. In at least one embodiment, a path of propagation starts from LED space, goes to a physical LED board space, followed by a fiducial marker space, a real world space, a calibration mount space, and finally arrives in a virtual camera space. In at least one embodiment, data points corresponding to a vehicle, fiducial markers, and other fixed locations can be determined, such that a single path of propagation can be determined that goes from a vehicle space to a virtual camera space. In at least one embodiment, this propagation path corresponds to a vector from this point to an origin in virtual camera space, which enables determination of a coordinate of this point in a camera coordinate system, which can function as ground truth data. In at least one embodiment, this ground truth data can be used to enable user-specific training of a deep neural network model. In at least one embodiment, this ground truth data can be used to empower projection-based DNN gaze modeling. In at least one embodiment, a mirror-based occlusion invariant camera localization approach is utilized, which provides for correct camera localization even when a portion of a geometrical pattern board is occluded, such as by a steering wheel. In at least one embodiment, a procedure is utilized that can determine an optimal pose set for optimized calibration and localization by narrowing down pose search space using constraints, such as DMS environment constraints.

In at least one embodiment, an object detection model can be trained to determine locations of objects in any definable three-dimensional (3D) environment. In at least one embodiment, ground truth data can be determined for a camera or sensor relative to this environment to allow for constructing and/or training a model. In at least one embodiment, a object with a determinable orientation is placed in this 3D environment to function as a bridge to a virtual camera space with a camera coordinate system. In at least one embodiment, points known in an environmental coordinate system can then be converted to ground truth points in this camera coordinate system. In at least one embodiment, this ground truth data is used to train a vision-based deep learning system to be able to infer certain output. In at least one embodiment, this output is a gaze direction or location of an occupant of a vehicle.

In at least one embodiment, a gaze estimation network uses a camera in front of a driver or passenger in a vehicle. In at least one embodiment, image data is captured by this camera to attempt to determine where that person is looking. In at least one embodiment, during a training portion a substantial amount of data is needed that includes representations of people looking in various directions at various points of interest, such as points in, or proximate, a vehicle. In at least one embodiment, once such a network is trained then that network can be deployed in a vehicle of that type, which can enable that vehicle, or a system in communication with that vehicle, to infer where a person is looking. In at least one embodiment, applications can be built that take advantage of availability of this gaze information. In at least one embodiment, gaze determination information can be used to determine whether a driver is being attentive and watching a road, or is distracted and looking elsewhere. In at least one embodiment, gaze information can be used to modify operation of a vehicle, such as by modifying car controls, changing displayed information, or modifying a driving pattern of a vehicle.

In at least one embodiment, ground truth data is obtained that can be used to describe three dimensional points in an arbitrary coordinate system, such as may correspond to a camera or sensor. In at least one embodiment, this ground truth data can then be correlated with objects represented in images captured by a camera with at least a partial view of a three-dimensional space, such as an interior cabin of a vehicle. In at least one embodiment, position determination can be used for applications that are not related to gaze or vision. In at least one embodiment, an object determination system can determine a location of an object in an environment, such as a vehicle.

In at least one embodiment, a pre-trained gaze model can be deployed to any type of vehicle. In at least one embodiment, an LED-based detection system in a vehicle can be utilized that can be mapped into a three dimensional space. In at least one embodiment, a detection system can be used to determine a position where a driver is looking, and to be able to repeat this for multiple locations. In at least one embodiment, a set of LED boards can be used that each include a fiducial marker, such as an Apriltag. In at least one embodiment, a position of each LED board can then be determined in vehicle space. In at least one embodiment, each fiducial marker provides for an image-based determination of three-dimensional position, orientation, and identity relative to a camera or sensor. In at least one embodiment, one or more fiducial markers are positioned proximate each object of interest, such as one fiducial marker on each corner of an object of interest. Image data including representations of these fiducial markers can be captured, and corresponding three-dimensional position reconstructed in vehicle space. In at least one embodiment, these coordinates in vehicle space can be mapped into a camera coordinate system, or virtual camera space. In at least one embodiment, a transport mechanism can be used to propagate LED board coordinates in a vehicle coordinate system into a camera coordinate system. In at least one embodiment, differences between different coordinate systems, or virtual spaces, include an origin point and six degrees of freedom. In at least one embodiment, a single coordinate system may be useful for an environment such as a vehicle, while multiple coordinate systems might be useful for environments with objects that may change orientation or position, such as when multiple occupants are in a vehicle. In at least one embodiment, for environments with multiple coordinate systems these systems can be concatenated together to provide ground truth data in any of those relational coordinate systems.

In at least one embodiment, a detection process includes an initial training stage or data collection stage that can be performed in a controlled environment. In at least one embodiment, a detection process further includes a second, inferencing stage in which a trained model is utilized, such as in a vehicle or other such environment. In at least one embodiment, an environment for which a model is utilized can have one or more variable aspects, such as camera position. In at least one embodiment, a variable nature of a camera can create uncertainty for data collection, as cameras are not fixed in a consistent location in a common coordinate system, such that a model can have difficulty inferring information such as driver gaze position based on image data captured using such a camera. In at least one embodiment, even if a camera is fixed in an environment a second camera in a second, similar environment might be fixed at a different location. In at least one embodiment, differences in position can make it difficult to deploy a model that was trained on, at most, one of these positions for use with a camera placed at a different position.

In at least one embodiment, a virtual camera space is extracted. In at least one embodiment, this space is referred to as virtual because it is not dependent on any physical space. In at least one embodiment, this virtual camera space can be used to help bridge data collection stage and in-car inferencing. In at least one embodiment, camera position is fixed but unknown in a given vehicle or environment. In at least one embodiment, an occupant position may also vary by occupant, as well as over time. In at least one embodiment, a position where a driver is asked to look can be fixed, such as a top-left corner of a windshield, a top left corner of a left mirror, or corner of a right mirror. In at least one embodiment, data is collected using cameras or sensors placed in a subset of possible locations in a closed environment. In at least one embodiment, a generalized gaze network would be able to determine every possible position an occupant can look in a vehicle, and identify a current gaze position with high precision.

In at least one embodiment, training and ground truth data is obtained using image data captured using at least one camera or sensor. In at least one embodiment, this image data is processed using a computer vision algorithm to determine relative position of, for example, a set of fiducial markers. In at least one embodiment, this position information can be correlated with known ground truth data in an environment space, such as a vehicle space, using a bridging mechanism. In at least one embodiment, a ground truth collection process thus involves at least one localization and reconstruction algorithm. In at least one embodiment, these and other components can be offered as part of a calibration suite. In at least one embodiment, a calibration suite includes a camera calibration component that can determine imaging characteristics of a camera in order to account for any particularities of that camera. In at least one embodiment, a calibration suite includes a localization component that can localize a global monitoring camera within any vehicle or enclosed area. In at least one embodiment, a calibration suite also includes a video reconstruction component that can reconstruct geometry of a vehicle. In at least one embodiment, a calibration suite can concatenate this information through a coordinate propagation process that can be used to obtain ground truth data for each relevant point in an environment, which can be used to train and deploy a neural network model in a vehicle having this specific geometry.

In at least one embodiment, a trained model can be used to generate a gaze vector corresponding to where a person is looking. In at least one embodiment, trained models can also be verified. In at least one embodiment, there is a vector with an origin between two eyes of a person, and a ray of a gaze direction from that point can be traced or determined. In at least one embodiment, this ray will intersect a specific point in vehicle geometry for a certain vehicle region. In at least one embodiment, this determined region can be compared against ground truth data to determine whether a correct inference was generated. In at least one embodiment, such a process can be used to validate a trained model. In at least one embodiment, this trained model could then be deployed for inferencing, and can infer where a person is looking. In at least one embodiment, this inference can be for any position in a vehicle cabin, or can be for specific positions, based in part upon how this model was trained. In at least one embodiment, training for specific positions or regions can result in more accurate inferences for those specific positions or regions.

In at least one embodiment, data capture is performed with a single camera and ambient light. In at least one embodiment, data capture is performed using at least one camera or sensor and at least two sources of illumination, such as two infrared (IR) LEDs. In at least one embodiment, use of two light sources enables gaze detection to account for glare or obstructions. In at least one embodiment, data capture is performed with fiducials applied to specific objects of interest, such as a windshield, instrument cluster, left mirror, right mirror, and rear-view mirror. In at least one embodiment, another data capture process can be used as may involve ultrasonic or laser scanning data capture. In at least one embodiment, data captured for a specific type and model of vehicle can be used to train a model, and that model can then be used with any vehicle of that type and model. In at least one embodiment, different models can be trained for individual variations of vehicles or environments.

In at least one embodiment, gaze data can be used with other data to determine ways in which to modify or control operational aspects of a vehicle. In at least one embodiment, a driver can speak a phrase such as "lower that window" or "lower my window." In at least one embodiment, a microphone can capture a voice utterance and speech-to-text analysis can be performed to determine an instruction. In at least one embodiment, gaze information can be used to help determine a window to which this driver is referring. In at least one embodiment, a vehicle can then automatically lower a determined window based in part upon inferred gaze data. In at least one embodiment, models can also be personalized for individual users or persons in order to account for individual characteristics or particularities.

Figure 4A:
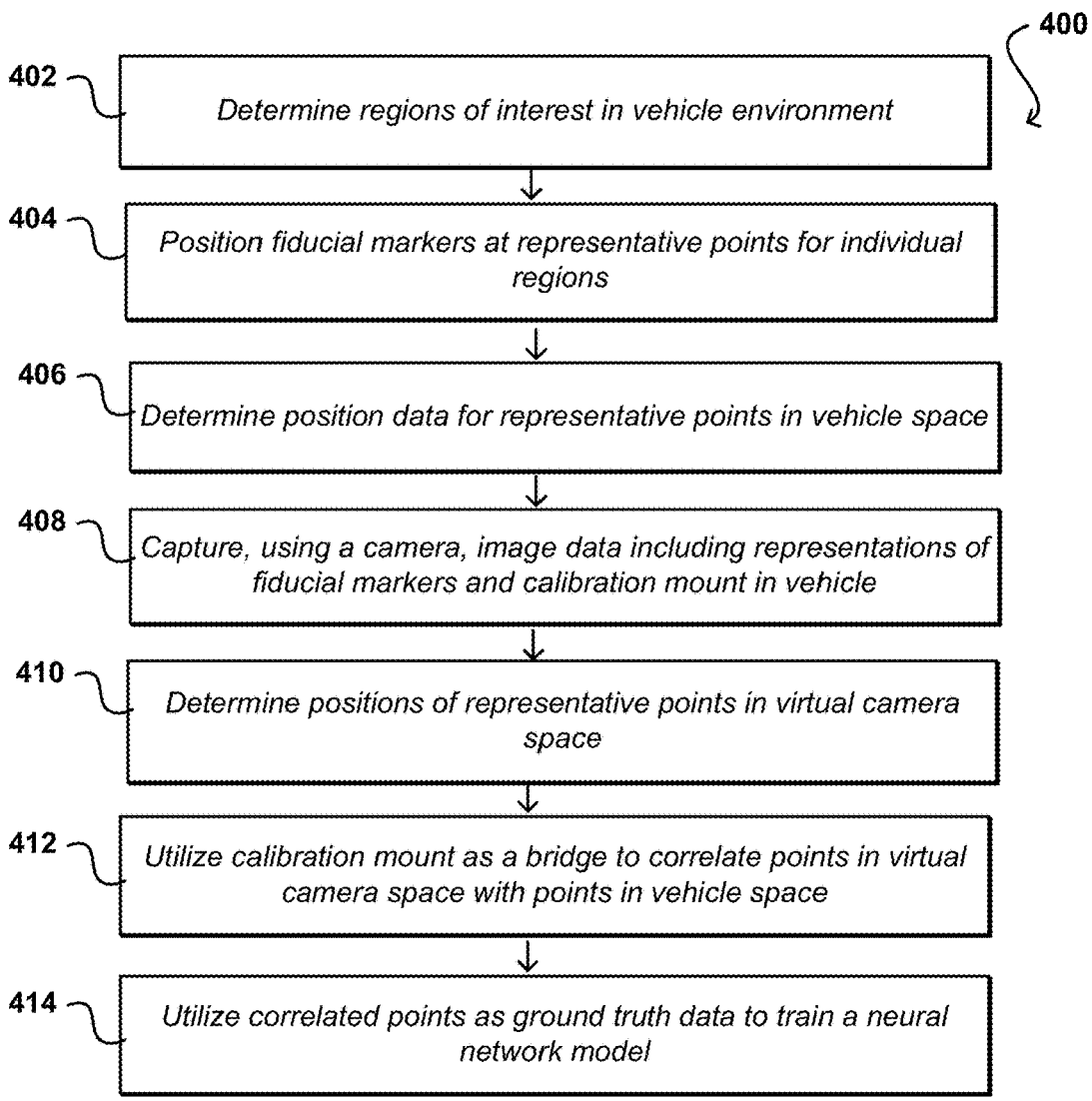
FIGS. 4A and 4B illustrate portions of an example process for determining position of an object, according to at least one embodiment.

In at least one embodiment, ground truth data can be generated for training one or more neural networks as illustrated in process 400 of FIG. 4A. In at least one embodiment, one or more regions of interest in a vehicle are determined 402. In at least one embodiment, these regions can include regions at which an occupant might gaze, or for which there might be value in determining that a user is gazing, such as a window, mirror, or display panel in, or proximate, a vehicle. In at least one embodiment, fiducial markers can be positioned 404 at representative points for those regions, such as at corners of those regions. In at least one embodiment, these fiducial markers can include an asymmetric visual aspect that enables information such as a position, distance, orientation, and identity of a fiducial marker to be determined. In at least one embodiment, these fiducial markers can include Apriltags or QR codes, and may have one or more associated LEDs as discussed herein. In at least one embodiment, position data for these representative points can be determined 406 in vehicle space, such as by determining absolute positions relative to an origin point that will remain fixed over time. In at least one embodiment, image data can be captured 408 using a camera, where that image data includes representations of fiducial markers and a calibration mount in a vehicle interior. In at least one embodiment, a calibration mount is used to designate an origin point and an orientation of a vehicle coordinate system defining a virtual vehicle space. In at least one embodiment, a calibration mount can include a checkerboard and at least one asymmetric aspect enabling a camera to determine at least position, orientation, and scale of a calibration board as represented in captured image data. In at least one embodiment, captured image data is analyzed to determine 410 positions of representative points in virtual camera space, or according to a camera coordinate system. In at least one embodiment, point positions are determined by analyzing representations of fiducial markers in image data. In at least one embodiment, a calibration mount in a vehicle and represented in captured image data can be utilized 412 as a bridging mechanism to correlate a vehicle coordinate system and a camera coordinate system, whereby points in this camera space are correlated with absolute position data known for corresponding points in this vehicle coordinate system. In at least one embodiment, these known relative positions of these correlated points can be utilized 412 as ground truth data to train one or more neural networks.

Figure 4B:
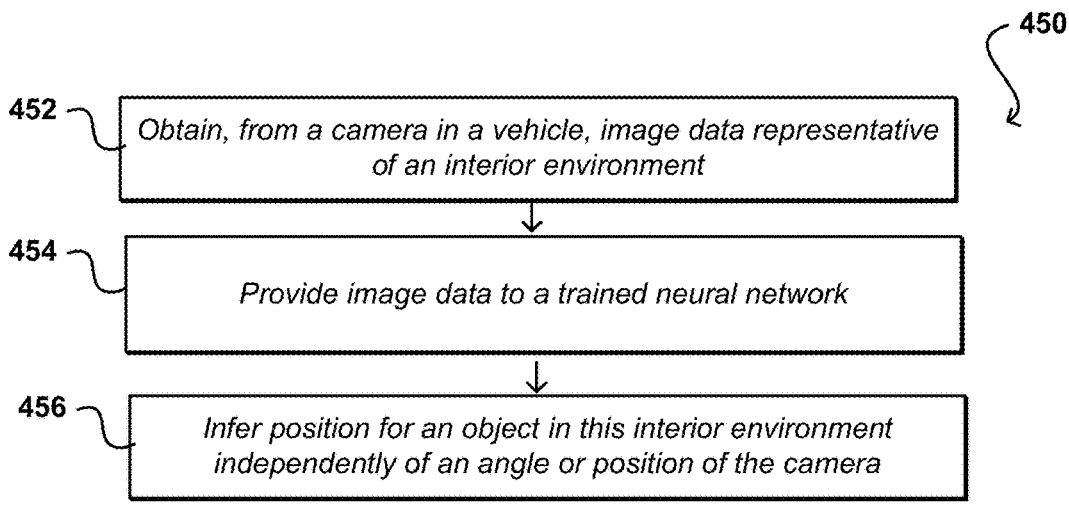

In at least one embodiment, a process 450 illustrated in FIG. 4B can determine a position in an environment, such as a vehicle, using such a trained model. In at least one embodiment, an image or video frame is obtained 452 that is to be used for inferencing. In at least one embodiment, an image can be provided 454 as input to a trained model or neural network. In at least one embodiment this trained model can process data, including at least image data, and infer 456 a position of an object in a vehicle, such as may correspond to a region or object at which an occupant is gazing.

Figure 5:
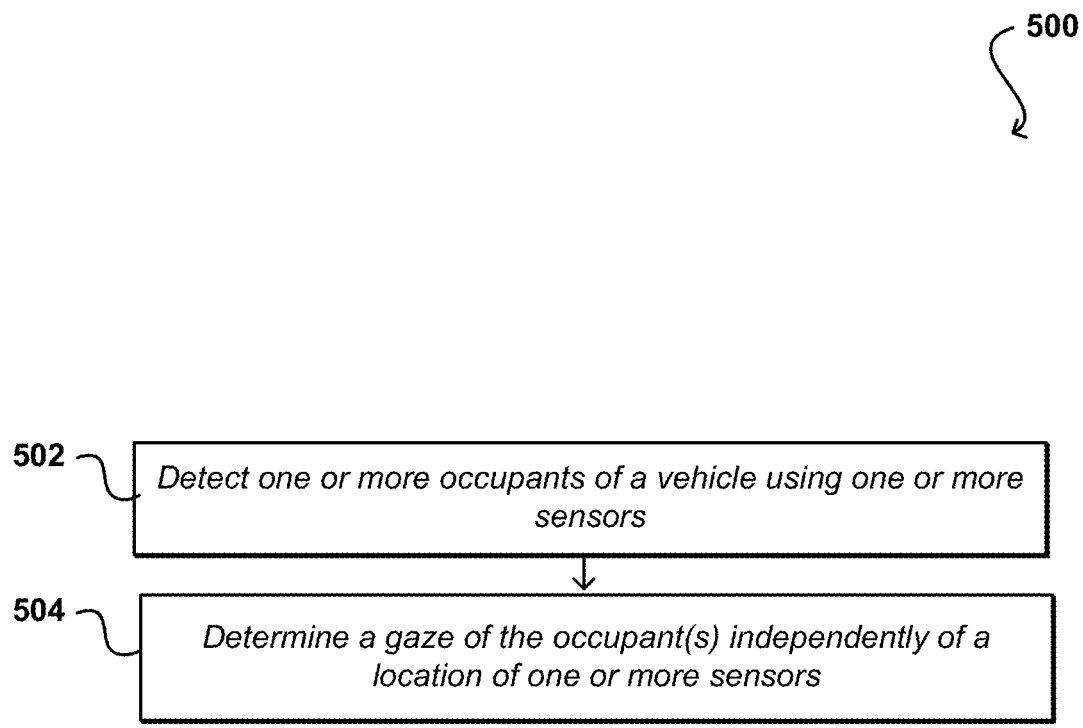
FIG. 5 illustrates a process for determining gaze, according to at least one embodiment.

In at least one embodiment, a process 500 illustrated in FIG. 5 can be used to determine gaze data. In at least one embodiment, one or more occupants of a vehicle are detected 502 using one or more sensors. In at least one embodiment, these sensors can include imaging, distance, or position sensors, such as cameras, ultrasonic sensors, radar scanning, and LIDAR. In at least one embodiment, a gaze of one or more occupants of this vehicle can be determined 504 independently of a location of these one or more sensors.

Figure 6:
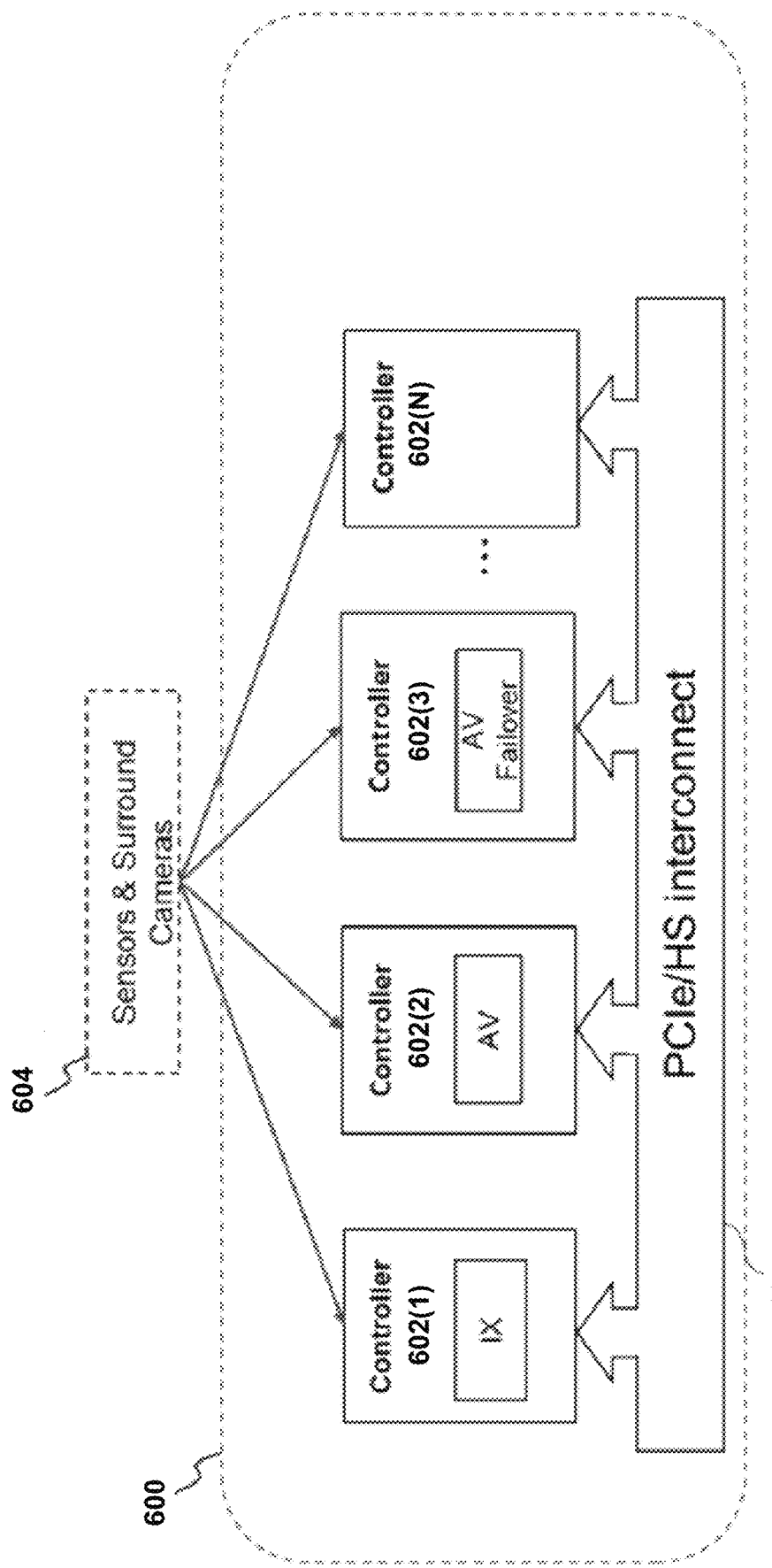
FIG. 6 illustrates a high-level system architecture, according to at least one embodiment.

FIG. 6 illustrates a high-level system architecture according to one embodiment of the invention. The system 600 preferably includes a plurality of controllers 602(1)-602(N), including a controller and system for autonomous or semi-autonomous driving. One or more of the controllers 602 may include an Advanced SoC or platform used to execute an intelligent assistant software stack (IX) that conducts risk assessments and provides the notifications, warnings, and autonomously control the vehicle, in whole or in part, executing the risk assessment and advanced driver assistance functions described herein. Two or more of the controllers are used to provide for autonomous driving functionality, executing an autonomous vehicle (AV) software stack to perform autonomous or semi-autonomous driving functionality.

An Advanced Platform and SoC for performing the invention preferably has multiple types of processors, providing the "right tool for the job" as well as processing diversity for functional safety. For example, GPUs are well-suited to higher precision tasks. Hardware accelerators, on the other hand, can be optimized to perform a more specific set of functions. By providing a blend of multiple processors, an Advanced Platform and SoC includes a complete set of tools able to perform the complex functions associated with Advanced AI-Assisted Vehicles quickly, reliably, and efficiently.

Figure 7:
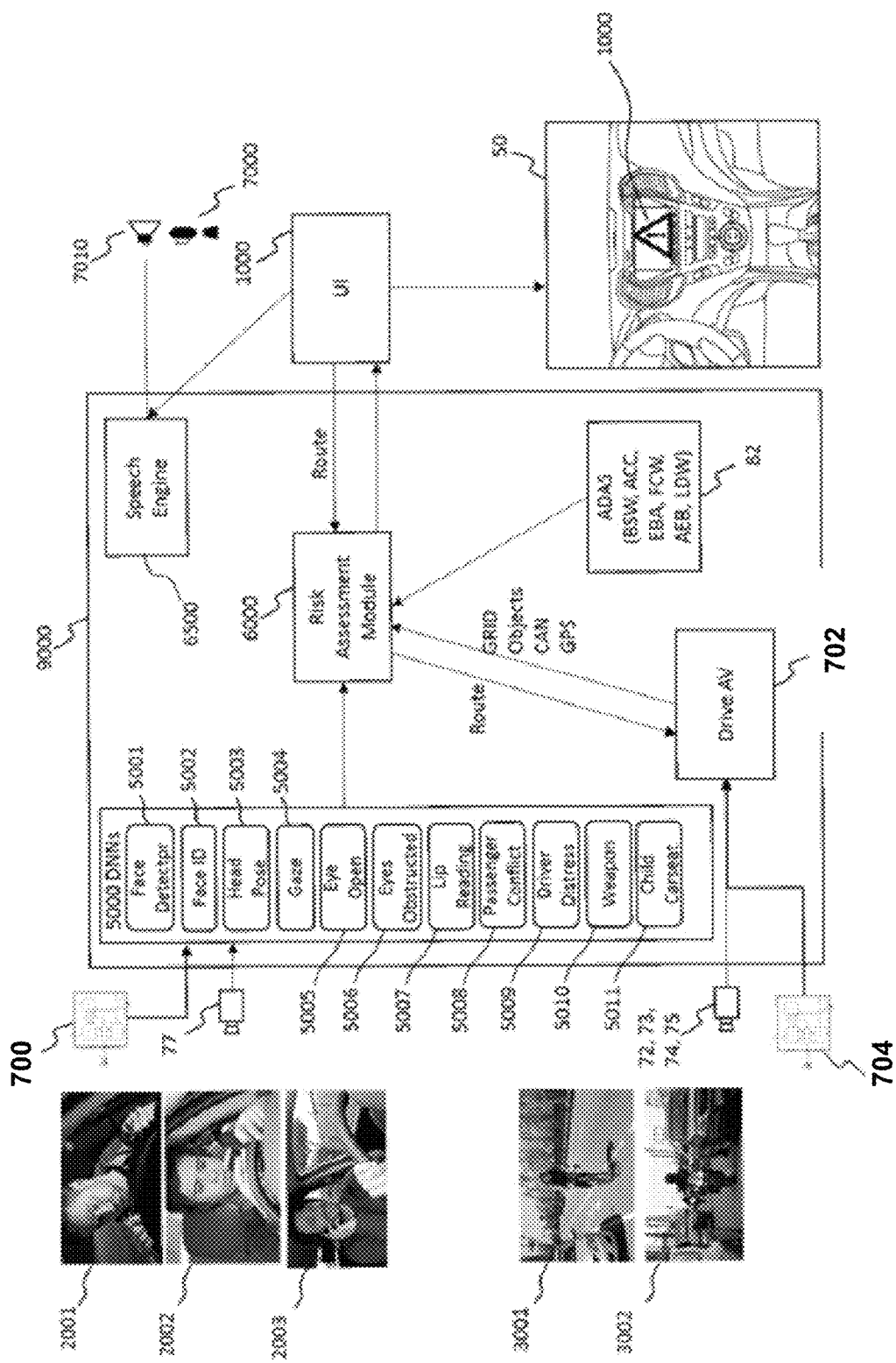
FIG. 7 illustrates a system architecture, according to at least one embodiment.
Figure 8:
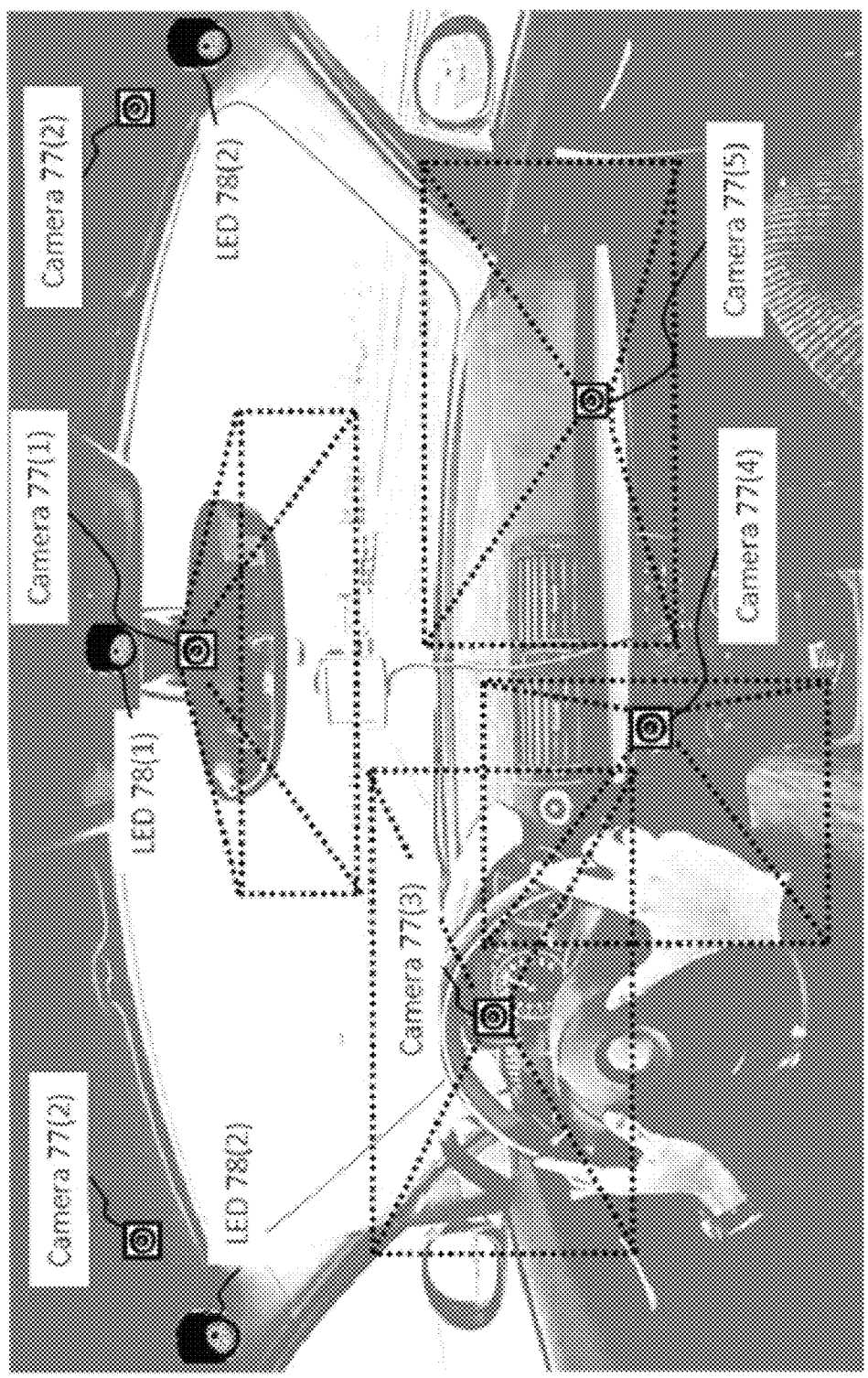
FIG. 8 illustrates a front of a cabin, according to at least one embodiment.

FIG. 7 illustrates a system architecture according to one embodiment. This system includes a controller and system for autonomous or semi-autonomous driving. Controller (100) receives input from one or more cameras (72, 73, 74, 75) deployed around the vehicle. Controller (100) detects objects and provides information regarding the object's presence and trajectory to the risk assessment module (6000). System includes a plurality of cameras (77) located inside the vehicle. Cameras (77) may be arranged as illustrated in FIG. 8, or in any other manner to provide coverage of the driver and other occupants. Cameras (77) provide input to a plurality of deep neural networks (5000) for monitoring the driver, other occupants, and/or conditions in the vehicle. Alternatively, multi-sensor camera modules (500), (600(1)-(N)), and/or (700) may be used to view either the inside of the vehicle or the outside environment.

The neural networks preferably are trained to detect a number of different features and events, including: the presence of a face (5001), the identity of a person in the driver's seat or one or more passenger seats (5002), the driver's head pose (5003), the direction of the driver's gaze (5004), whether the driver's eyes are open (5005), whether the driver's eyes are closed or otherwise obstructed (5006), whether the driver is speaking, and, if so, what the driver is saying (by audio input or lip-reading) (5007), whether the passengers are in conflict or otherwise compromising the driver's ability to control the vehicle (5008), and whether the driver is in distress (5009). In additional embodiments, the networks are trained to identify driver actions including (without limitation): checking a cell phone, drinking, smoking, and driver intention, based on head and body pose and motion. In one embodiment, the AV stack and the IX stack may both execute on the same platform or SoC (9000).

Figure 9:
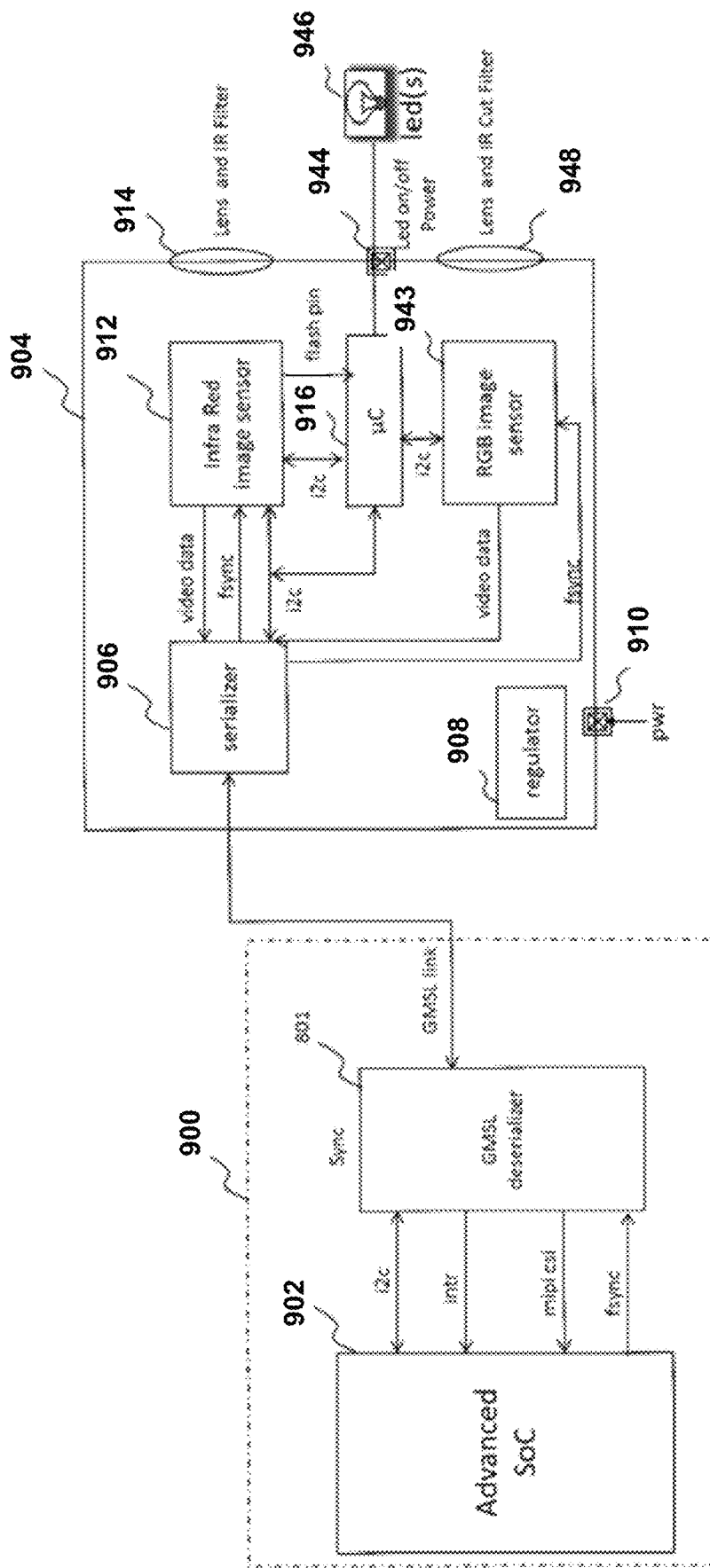
FIG. 9 illustrates an MSCM, according to at least one embodiment.

An exemplary camera layout of the cabin is illustrated in FIG. 8. FIG. 9 illustrates the front of the cabin according to one embodiment. The cabin preferably includes at least two cameras directed to the driver. In one embodiment, driver primary camera (77(3)) detects IR light at a 940 nm wavelength, 60 degree field of view, and takes images at 60 fps. Driver primary camera (77(3)) is preferably used to determine for Face ID and to determine the driver's gaze, head pose, and detect drowsiness. In at least one embodiment, driver primary camera may be replaced with a multi-sensor camera module, providing both IR and RGB camera functionality.

In one embodiment, Driver Secondary camera (77(4)) is an infrared (IR) at a 940 nm wavelength, with a 60 degree field of view, taking images at 60 frames per second. Driver Secondary camera (77(4)) is preferably used together with Driver primary camera (77(3)) to determine the driver's gaze, head pose, and detect drowsiness. Alternatively, driver secondary camera may be replaced with a multi-sensor camera module, providing both IR and RGB camera functionality.

The cabin preferably includes at least one Cabin Primary Camera (77(1)), typically mounted overhead. In one embodiment, Cabin Primary Camera (77(1)) is an IR at a 940 nm wavelength camera with Time of Flight (ToF) Depth, 90 degree field of view, and taking images at 30 fps. Cabin Primary Camera (77(1)) is preferably used to determine gestures and cabin occupancy. The cabin preferably includes at least one passenger camera 77(5), typically mounted near the passenger glove compartment or passenger-side dash. In one embodiment, Passenger Camera (77 (5)) is an IR at a 940 nanometer wavelength, 60 degree field of view, taking images at 30 fps. Alternatively, driver primary camera may be replaced with a multi-sensor camera module (500), (600(1)-(N)), and/or (700), providing both IR and RGB camera functionality.

The front of the cabin preferably includes a plurality of LED illuminators, (78(1)-(2)). The illuminators preferably cast IR light at 940 nm, and are synced with the cameras, and are eye safe. The front of the vehicle also preferably includes a low angle camera, to determine when the driver is looking down (as compared to when the driver's eyes are closed).

The cabin also preferably has a "cabin secondary" camera (not shown), which provides a view of the whole cabin. The cabin secondary camera is preferably mounted in the center of the roof and has wide angle lenses, providing a view of the full cabin. This allows the system to determine occupancy count, estimate an age of the occupants, and perform object detection functions. In other embodiments, the system includes dedicated cameras for front and rear passengers (not shown). Such dedicated cameras allow the system to perform video conferences with occupants in the front or the rear of the vehicle.

In at least one embodiment, an autonomous vehicle may include one or more multi-sensor camera modules (MSCM) that provide for multiple sensors in a single housing and allow for interchangeable sensors as well. An MSCM according to various embodiments can be used in various configurations: (1) IR+IR (IR stereo vision), (2) IR+RGB (Stereo vision and pairing frames), (3) RGB+RGB (RGB stereo vision). The RGB sensor can be replaced with RCCB (or some other color sensor) depending on color and low light performance required. The MSCM may be used for cameras covering the environment outside the vehicle, cameras covering the inside of the vehicle, or both.

FIG. 9 illustrates an embodiment of an MSCM. In this embodiment, MSCM (900) is coupled to one or more AI Supercomputers suitable for controlling an autonomous or semi-autonomous vehicle. In this embodiment, AI Supercomputers (800), (900) include one or more Advanced SoCs, as described in U.S. Provisional Application Nos. 62/584, 549, filed Nov. 10, 2017.

Multiple sensor camera module 904 comprises serializer (906), IR Image Sensor (912), RGB Image Sensor (918), lens and IR filters (914), and microcontroller (916). Many camera sensors may be used, including the OnSemi AR 0144 (1.0 Megapixel (1280 H×800V), 60 fps, Global Shutter, CMOS). The AR 0144 reduces artifacts in both bright and low-light conditions and is designed for high shutter efficiency and signal-to-noise ratio to minimize ghosting and noise effects. The AR 0144 may be used both for the Color Sensor (1006) and Mono Sensor (1007).

Many different camera lenses (914, 924) may be used. In one embodiment, the camera lenses are LCE-0001 (55 HFoV) with 940 nm band pass. The LED lens is preferably a Ledi1 Lisa2 FP13026. In one embodiment, each lens is mounted in a molded polycarbonate (PC) housing designed for alignment to a specific LED, providing precise location of the lens at the ideal focal point for each qualified brand or style of LED. Other LED lenses may be used.

In the embodiment illustrated in FIG. 9, an MSCM controls one or more LEDs (922). These LED are automotive qualified and provide infrared illumination for cameras, in the form of highly-concentrated non-visible infrared light. In one embodiment, LED is an Osram Opto SFH4725S IR LED (940 nm). The LEDs (922) are controlled by switch (920), which flashes the LEDs. The LED lens is preferably a Ledi1 Lisa2 FP13026. Other LEDs and lenses may be used.

The Serializer is preferably a MAX9295A GMSL2 SER, though other Serializers may be used. Suitable microcontrollers (MCUs) include the Atmel SAMD21. The SAM D21 is a series of low-power microcontrollers using the 32-bit ARM Cortex processor and ranging from 32- to 64-pins with up to 256 KB Flash and 32 KB of SRAM. The SAM D21 devices operate at a maximum frequency of 48 MHz and reach 2.46 CoreMark/MHz. Other MCUs may be used as well. The LED Driver (922) is preferably an ON-Semi NCV7691-D or equivalent, though other LED drivers may be used.

Figure 10:
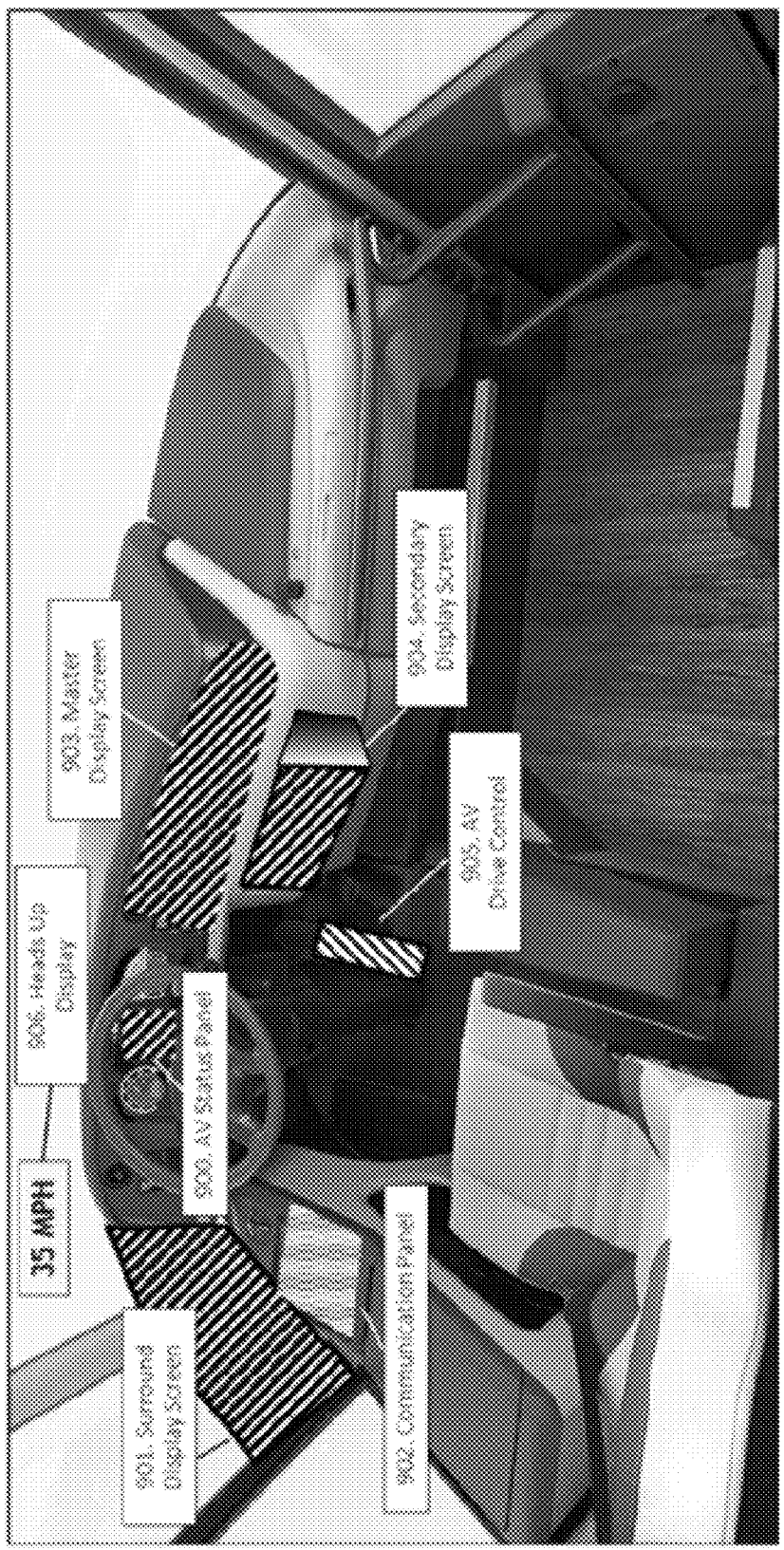
FIG. 10 illustrates a driver user interface and configuration, according to at least one embodiment.

FIG. 10 illustrates one embodiment of the Driver UX input/output and configuration. Driver UX includes one or more display screens, including AV Status Panel (900), Master Display Screen (903), Secondary Display Screen (904), Surround Display Screen (901), and Communication Panel (902). AV Status Panel (900) preferably is a small (3.5", 4", or 5") display showing only key information for the safety driver to operate the vehicle.

Figure 23:
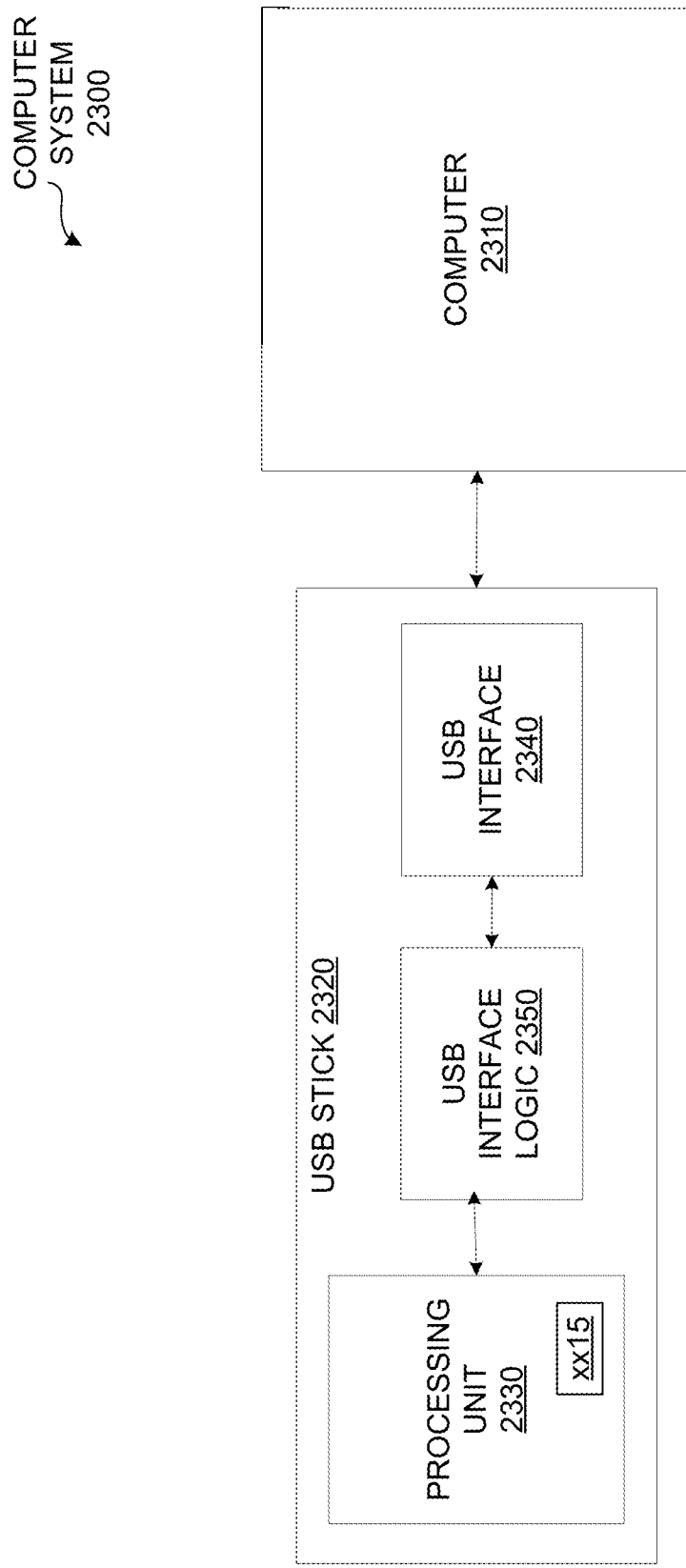
FIG. 23 illustrates a computer system, according at least one embodiment.

Surround Display Screen (901) and Secondary Display Screen (904) preferably display information from cross-traffic cameras (505), blind spot cameras (506), and rear cameras (507) and (508). In one embodiment, Surround Display Screen (901) and Secondary Display Screen (904) are arranged to wrap around the safety driver as illustrated in FIG. 23. In alternative embodiments, the display screens may be combined or arranged differently than the embodiment shown in in FIG. 23. For example, AV Status Panel (900) and Master Display Screen (903) may be consolidated in a single forward-facing panel. Alternatively, a part of Master Display Screen (903) may be used to show a split-screen view, or an overhead view of the advanced AI-assisted vehicle, with objects around it. Alternatively, Driver UX input/output may include a heads-up display ("HUD") (906) of vehicle parameters such as speed, destination, ETA, and number of passengers, or simply the status of the AV system (activated or disabled).

The driver interface and displays may provide information from the autonomous driving stack to assist the driver. For example, the driver interface and displays may highlight lanes, cars, signs, pedestrians in either the master screen (903) or in HUD (906) on the windshield. The driver interface and displays may provide a recommended path that the autonomous driving stack proposes, as well as suggestions to cease accelerating or begin braking as the vehicle nears a light or traffic sign. The driver interface and displays may highlight points of interest, expand the view around the car when driving (wide FOV) or assist in parking (e.g., provide a top view—if the vehicle has a surround camera).

The driver interface and display preferably provide alerts including: (1) wait conditions ahead including intersections, construction zones, and toll booths, (2) objects in the driving path like a pedestrian moving much slower than the Advanced AI-Assisted Vehicle, (3) stalled vehicle ahead, (4) school zone ahead, (5) kids playing on the roadside, (6) animals (eg., deer or dogs) on roadside, (7) emergency vehicles (e.g., police, fire, medical van, or other vehicles with a siren), (8) vehicle likely to cut in front of driving path, (9) cross traffic, especially if likely to violate traffic lights or signs, (10) approaching cyclists, (11) unexpected objects on the road (e.g., tires and debris), and (12) poor-quality road ahead (e.g., icy road and potholes).

Embodiments can be suitable for any type of vehicle, including without limitation, coupes, sedans, buses, taxis, and shuttles. In one embodiment, the advanced AI-assisted vehicle includes a passenger interface for communicating with passengers, including map information, route information, text-to-speech interface, speech recognition, and external app integration (including integration with calendar applications such as Microsoft Outlook).

Figure 11:
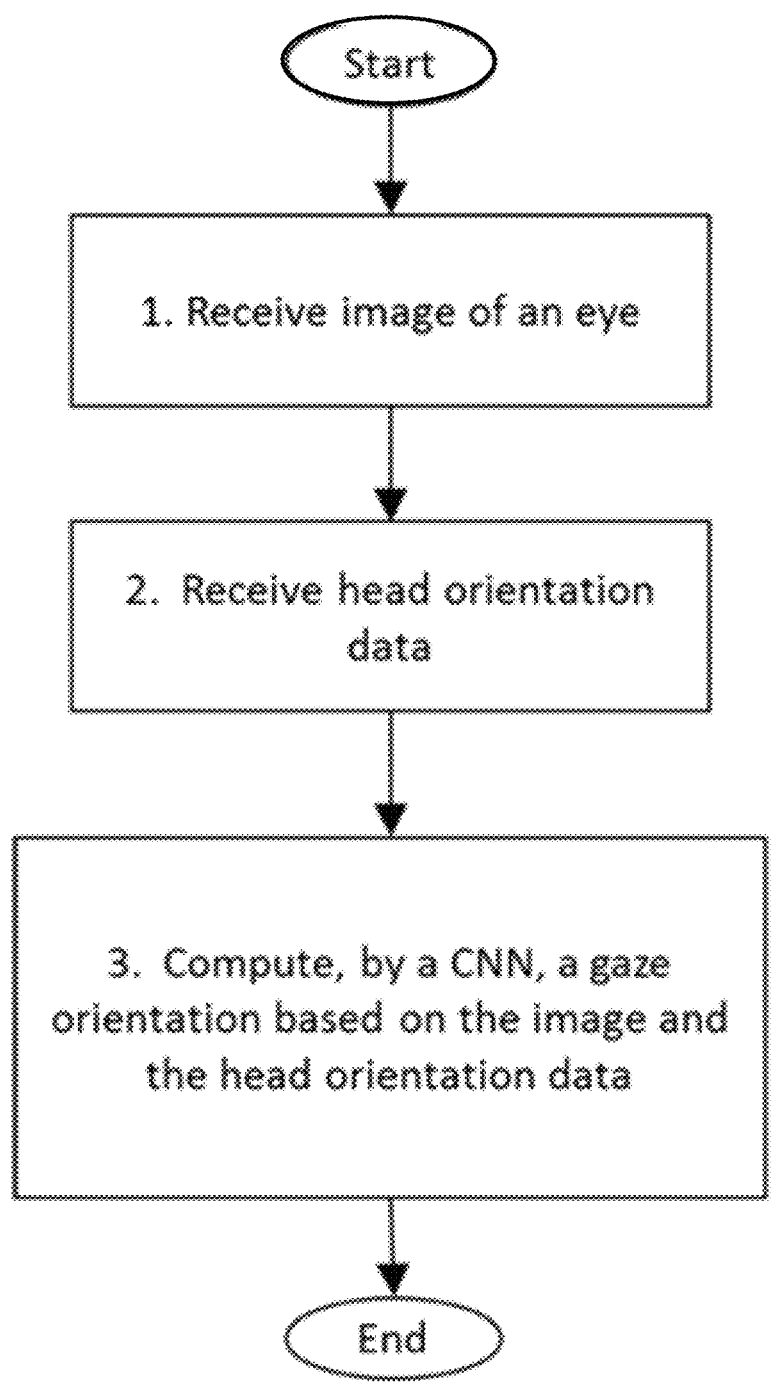
FIG. 11 illustrates a flowchart of a method for gaze estimation, according to at least one embodiment.

FIG. 11 illustrates a flowchart of a method for gaze estimation, in accordance with one embodiment. At step 1, an image of an eye is received. At step 2, head orientation is received. In one embodiment, the head orientation data is pre-computed and may include azimuth and elevation angles. In another embodiment, the head orientation data is an image of a subject's face and the head orientation is determined based on the image. At step 3, a gaze position is computed by a CNN based on the image and the head orientation data.

Figure 12:
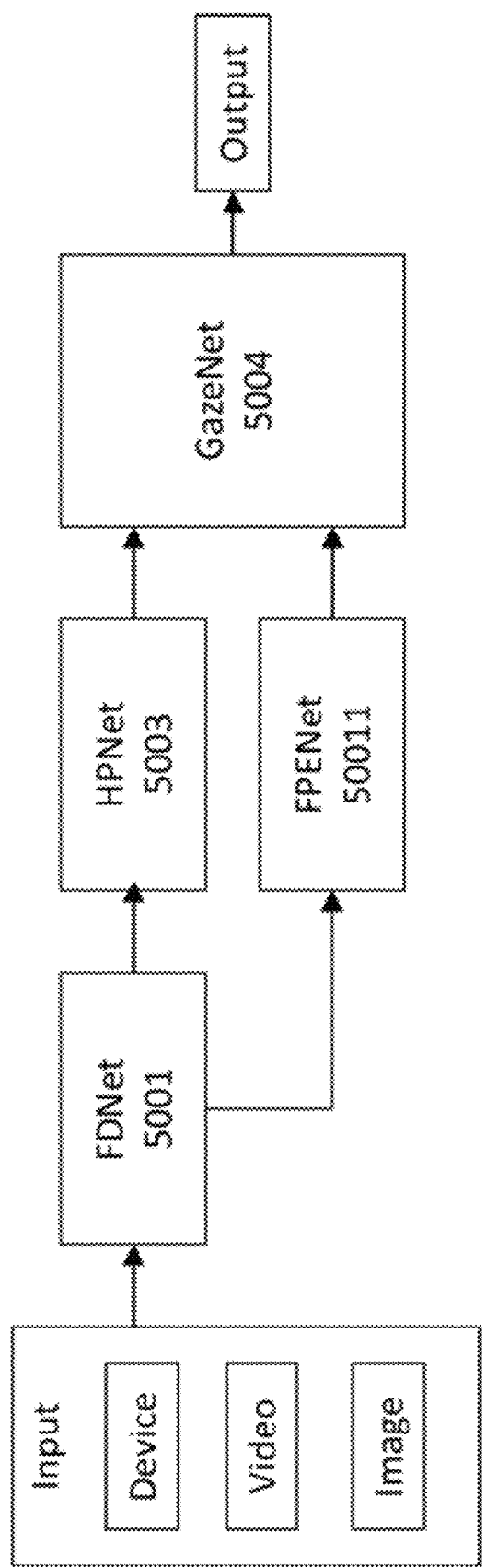
FIG. 12 illustrates a pipeline of neural networks, according to at least one embodiment.

FIG. 12 illustrates a pipeline of neural networks suitable for determining Gaze Detection according to one embodiment. FDNet (5001) is trained to detect the presence of a face. HPNet (5003) determines the pose of the person's head. FPENet (50011) detects the fiducial points. In this embodiment, GazeNet (5004) is a neural network is trained using inputs comprising both head position data (x. y, z) and the fiducial points associated with the head. Using these inputs, GazeNet detects the gaze of the driver.

Figure 13:
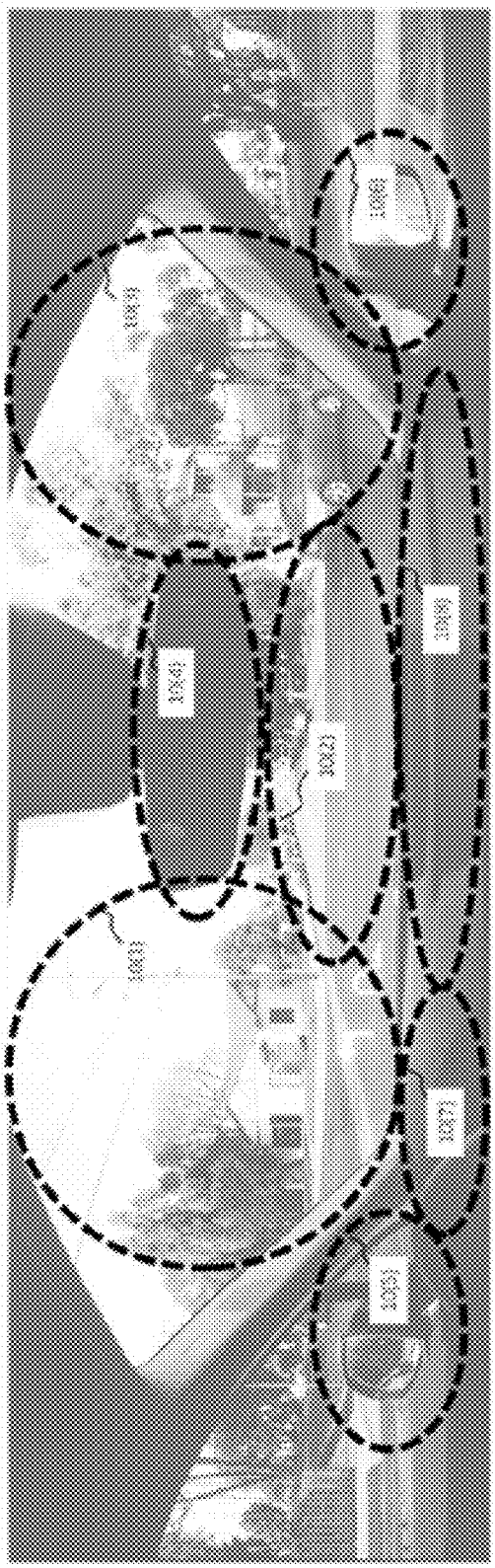
FIG. 13 illustrates a gaze detection DNN useful to classify driver gaze, according to at least one embodiment.

In one embodiment, risk assessment module determines whether cross-traffic is out of the driver's field of view and provides appropriate warnings. FIG. 13 illustrates one scenario in which the risk assessment module uses information from a DNN for gaze detection (5004) and information from Controller to alert driver.

A gaze detection DNN classifies the driver's gaze as falling into a region, as illustrated in FIG. 13. In one example, the regions include left cross traffic (10(1)), center traffic (10(2)), right traffic (10(3)), rear-view mirror (10(4)), left side mirror (10(5)), right-side mirror (10(5)), instrument panel (10(7)), and center console (10(8)).

While gaze detection DNN classifies the region of the driver's gaze, controller (100 (2)) uses DNNs executing on an Advanced SoC to detect cross-traffic outside the driver's field of view.

Neural Network Training and Development

In at least one embodiment, untrained neural network is trained using a training dataset. In at least one embodiment, training framework is a PyTorch framework, whereas in other embodiments, training framework is a Tensorflow, Boost, Caffe, Microsoft Cognitive Toolkit/CNTK, MXNet, Chainer, Keras, Deeplearning 4j, or other training framework. In at least one embodiment training framework trains an untrained neural network and enables it to be trained using processing resources described herein to generate a trained neural network. In at least one embodiment, weights may be chosen randomly or by pre-training using a deep belief network. In at least one embodiment, training may be performed in either a supervised, partially supervised, or unsupervised manner.

In at least one embodiment, untrained neural network is trained using supervised learning, wherein training dataset includes an input paired with a desired output for an input, or where training dataset includes input having a known output and an output of neural network is manually graded. In at least one embodiment, untrained neural network is trained in a supervised manner processes inputs from training dataset and compares resulting outputs against a set of expected or desired outputs. In at least one embodiment, errors are then propagated back through untrained neural network. In at least one embodiment, training framework adjusts weights that control untrained neural network. In at least one embodiment, training framework includes tools to monitor how well untrained neural network is converging towards a model, such as trained neural network, suitable to generating correct answers, such as in result, based on known input data, such as new data. In at least one embodiment, training framework trains untrained neural network repeatedly while adjust weights to refine an output of untrained neural network using a loss function and adjustment algorithm, such as stochastic gradient descent. In at least one embodiment, training framework trains untrained neural network until untrained neural network achieves a desired accuracy. In at least one embodiment, trained neural network can then be deployed to implement any number of machine learning operations.

In at least one embodiment, untrained neural network is trained using unsupervised learning, wherein untrained neural network attempts to train itself using unlabeled data. In at least one embodiment, unsupervised learning training dataset will include input data without any associated output data or "ground truth" data. In at least one embodiment, untrained neural network 1106 can learn groupings within training dataset and can determine how individual inputs are related to untrained dataset. In at least one embodiment, unsupervised training can be used to generate a self-organizing map, which is a type of trained neural network capable of performing operations useful in reducing dimensionality of new data. In at least one embodiment, unsupervised training can also be used to perform anomaly detection, which allows identification of data points in a new dataset that deviate from normal patterns of new dataset.

In at least one embodiment, semi-supervised learning may be used, which is a technique in which in training dataset includes a mix of labeled and unlabeled data. In at least one embodiment, training framework may be used to perform incremental learning, such as through transferred learning techniques. In at least one embodiment, incremental learning enables trained neural network to adapt to new data without forgetting knowledge instilled within network during initial training.

As mentioned, an increasing variety of industries and applications are taking advantage of machine learning. As an example, deep neural networks (DNNs) developed on processors have been used for diverse use cases, from self-driving cars to faster drug development, from automatic image analysis for security systems to smart real-time language translation in video chat applications. Deep learning is a technique that models a neural learning process of a human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system designed to accomplish a similar task would need to be trained for it to get smarter and more efficient at identifying basic objects, occluded objects, etc., while also assigning context to those objects.

At a simplest level, neurons in a human brain look at various inputs that are received, importance levels are assigned to each of these inputs, and output is passed on to other neurons to act upon. An artificial neuron or perceptron is a most basic model of a neural network. In one example, a perceptron may receive one or more inputs that represent various features of an object that a perceptron is being trained to recognize and classify, and each of these features is assigned a certain weight based on importance of that feature in defining a shape of an object.

A deep neural network (DNN) model includes multiple layers of many connected perceptrons (e.g., nodes) that can be trained with enormous amounts of input data to quickly solve complex problems with high accuracy. In one example, a first layer of a DNN model breaks down an input image of an automobile into various sections and looks for basic patterns such as lines and angles. Second layer assembles lines to look for higher-level patterns such as wheels, windshields, and minors. A next layer identifies a type of vehicle, and a final few layers generate a label for an input image, identifying a model of a specific automobile brand. Once a DNN is trained, this DNN can be deployed and used to identify and classify objects or patterns in a process known as inference. Examples of inference (a process through which a DNN extracts useful information from a given input) include identifying handwritten numbers on checks deposited into ATM machines, identifying images of friends in photos, delivering movie recommendations, identifying and classifying different types of automobiles, pedestrians, and road hazards in driverless cars, or translating human speech in near real-time.

During training, data flows through a DNN in a forward propagation phase until a prediction is produced that indicates a label corresponding to input. If a neural network does not correctly label input, then errors between a correct label and a predicted label are analyzed, and weights are adjusted for each feature during a backward propagation phase until a DNN correctly labels input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 14:
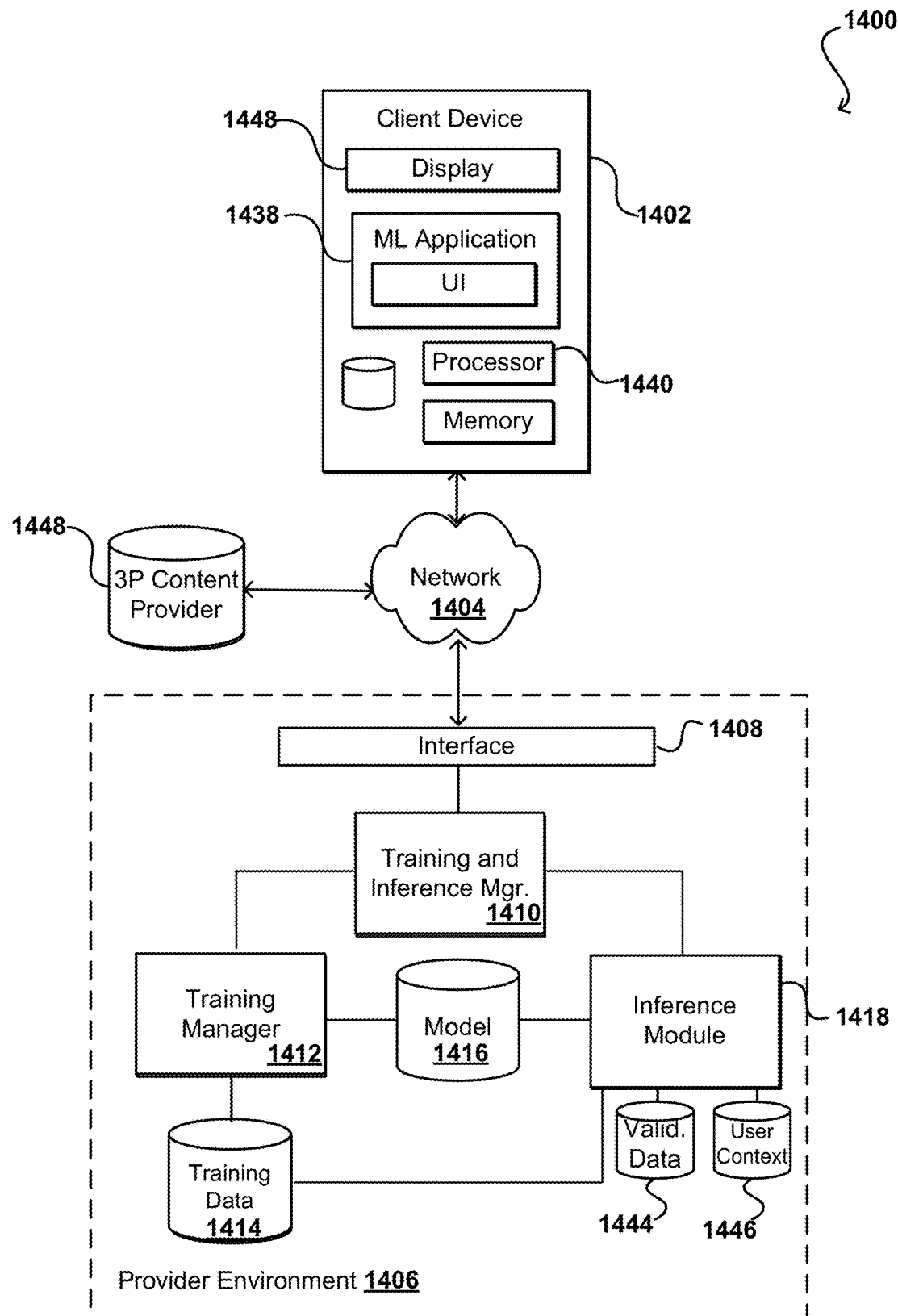
FIG. 14 illustrates an example environment, according to at least one embodiment.

FIG. 14 illustrates components of an example system 1400 that can be used to train and utilize machine learning. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 1406, while in at least one embodiment training might be requested by a customer or other user having access to a provider environment through a client device 1402 or other such resource. Training data (or data to be analyzed by a trained neural network) can be provided by a provider, a user, or a third party content provider 1424. In at least one embodiment, client device 1402 may be a vehicle or object that is to be navigated on behalf of a user, for example, which can submit requests and/or receive instructions that assist in navigation of a device.

In this example, requests are able to be submitted across at least one network 1404 to be received to a provider environment 1406. A client device may be any appropriate electronic and/or computing devices enabling a user to generate and send such requests, as may include desktop computers, notebook computers, computer servers, smart-phones, tablet computers, gaming consoles (portable or otherwise), computer processors, computing logic, and set-top boxes. Network(s) 1404 can include any appropriate network for transmitting a request or other such data, as may include Internet, an intranet, an Ethernet, a cellular network, a local area network (LAN), a network of direct wireless connections among peers, and so on.

Requests can be received to an interface layer 1408, which can forward data to a training and inference manager 1410 in this example. This manager can be a system or service including hardware and software for managing requests and service corresponding data or content. This manager can receive a request to train a neural network, and can provide data for a request to a training manger 1412. Training manager 1412 can select an appropriate model or network to be used, if not specified by a request, and can train a model using relevant training data. In at least one embodiment training data can be a batch of data stored to a training data repository 1414, received from client device 1402 or obtained from a third party provider 1424. Training manager 1412 can be responsible for training data, such as by using a LARC-based approach as discussed herein. A network can be any appropriate network, such as a recurrent neural network (RNN) or convolutional neural network (CNN). Once a network is trained and successfully evaluated, a trained network can be stored to a model repository 1416, for example, that may store different models or networks for users, applications, or services, etc. As mentioned, in at least one embodiment there may be multiple models for a single application or entity, as may be utilized based on a number of different factors.

At a subsequent point in time, a request may be received from client device 1402 (or another such device) for content (e.g., path determinations) or data that is at least partially determined or impacted by a trained neural network. This request can include, for example, input data to be processed using a neural network to obtain one or more inferences or other output values, classifications, or predictions. Input data can be received to interface layer 1408 and directed to inference module 1418, although a different system or service can be used as well. Inference module 1418 can obtain an appropriate trained network, such as a trained deep neural network (DNN) as discussed herein, from model repository 1416 if not already stored locally to inference module 1418. Inference module 1418 can provide data as input to a trained network, which can then generate one or more inferences as output. This may include, for example, a classification of an instance of input data. Inferences can then be transmitted to client device 1402 for display or other communication to a user. Context data for a user may also be stored to a user context data repository 1422, which may include data about a user which may be useful as input to a network in generating inferences, or determining data to return to a user after obtaining instances. Relevant data, which may include at least some of input or inference data, may also be stored to a local database 1420 for processing future requests. In at least one embodiment, a user can use account or other information to access resources or functionality of a provider environment. If permitted and available, user data may also be collected and used to further train models, in order to provide more accurate inferences for future requests. Requests may be received through a user interface to a machine learning application 1426 executing on client device 1402, and results displayed through a same interface. A client device can include resources such as a processor 1428 and memory 1430 for generating a request and processing results or a response, as well as at least one data storage element 1432 for storing data for machine learning application 1426.

In at least one embodiment a processor 1428 (or a processor of training manager 1412 or inference module 1418) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

Figure 15:
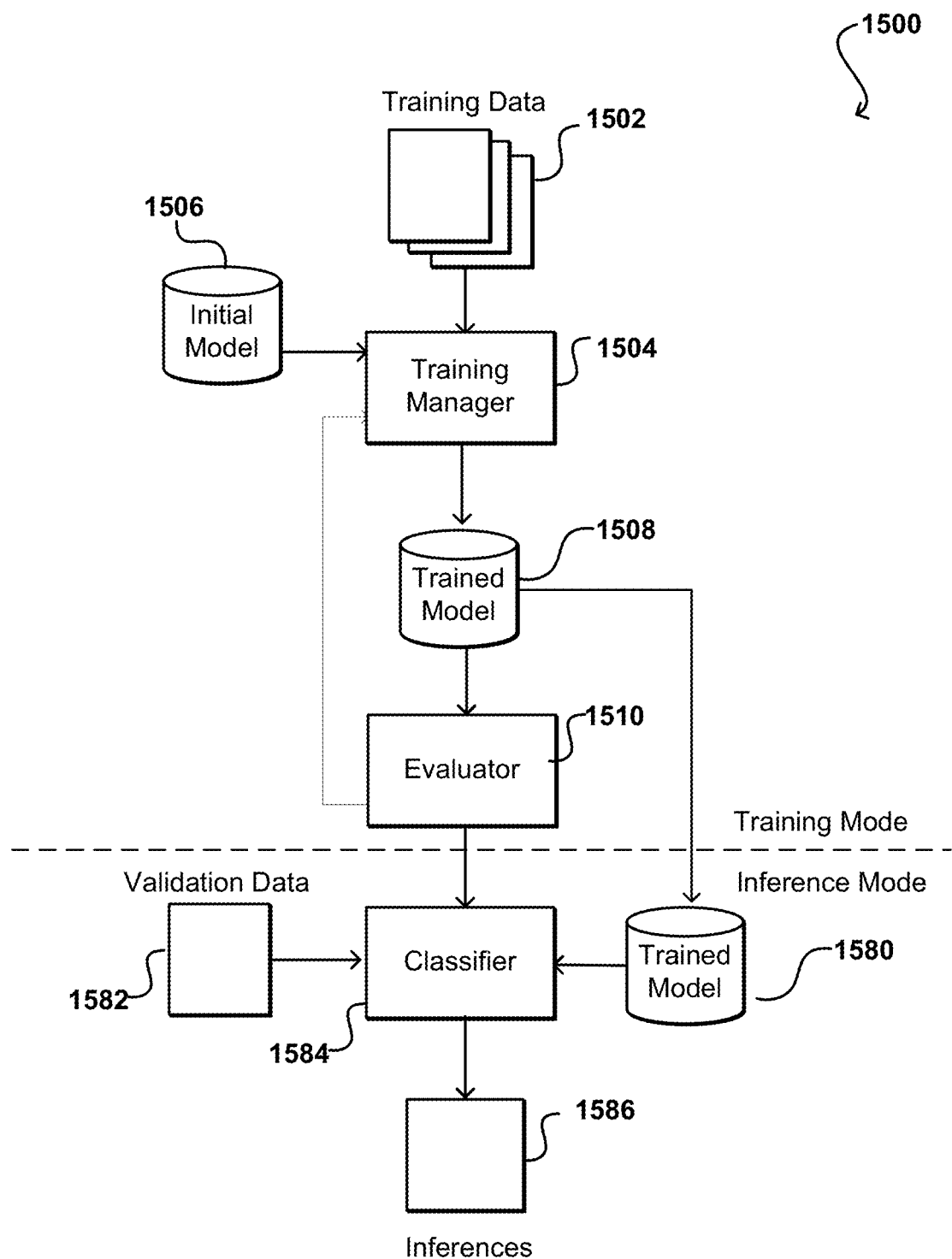
FIG. 15 illustrates an example system for training an image synthesis network that can be utilized, according to at least one embodiment.

FIG. 15 illustrates an example system 1500 that can be used to classify data, or generate inferences, in at least one embodiment. Various types of predictions, labels, or other outputs can be generated for input data as well, as should be apparent in light of teachings and suggestions contained herein. Further, both supervised and unsupervised training can be used in at least one embodiment discussed herein. In this example, a set of training data 1502 (e.g., classified or labeled data) is provided as input to function as training data. Training data can include instances of at least one type of object for which a neural network is to be trained, as well as information that identifies that type of object. For example, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. Training data 1502 in this example is provided as training input to a training manager 1504. Training manager 1504 can be a system or service that includes hardware and software, such as one or more computing devices executing a training application, for training a neural network (or other model or algorithm, etc.). In this example, training manager 1504 receives an instruction or request indicating a type of model to be used for training. A model can be any appropriate statistical model, network, or algorithm useful for such purposes, as may include an artificial neural network, deep learning algorithm, learning classifier, Bayesian network, and so on. Training manager 1504 can select an initial model, or other untrained model, from an appropriate repository 1506 and utilize training data 1502 to train a model, generating a trained model 1508 (e.g., trained deep neural network) that can be used to classify similar types of data, or generate other such inferences. In at least one embodiment where training data is not used, an appropriate initial model can still be selected for training on input data per training manager 1504.

A model can be trained in a number of different ways, as may depend in part upon a type of model selected. For example, in one embodiment a machine learning algorithm can be provided with a set of training data, where a model is a model artifact created by a training process. Each instance of training data contains a correct answer (e.g., classification), which can be referred to as a target or target attribute. A learning algorithm finds patterns in training data that map input data attributes to a target, an answer to be predicted, and a machine learning model is output that captures these patterns. A machine learning model can then be used to obtain predictions on new data for which a target is not specified.

In one example, a training manager 1504 can select from a set of machine learning models including binary classification, multiclass classification, and regression models. A type of model to be used can depend at least in part upon a type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, a training manager must determine an input training data source, as well as other information such as a name of a data attribute that contains a target to be predicted, required data transformation instructions, and training parameters to control a learning algorithm. During a training process, a training manager 1504 may automatically select an appropriate learning algorithm based on a type of target specified in a training data source. Machine learning algorithms can accept parameters used to control certain properties of a training process and of a resulting machine learning model. These are referred to herein as training parameters. If no training parameters are specified, a training manager can utilize default values that are known to work well for a large range of machine learning tasks.

Examples of training parameters for which values can be specified include a maximum model size, maximum number of passes over training data, shuffle type, regularization type, learning rate, and regularization amount. Default settings may be specified, with options to adjust values to fine-tune performance.

A maximum model size is a total size, in units of bytes, of patterns that are created during a training of a model. A model may be created of a specified size by default, such as a model of 100 MB. If a training manager is unable to determine enough patterns to fill a model size, a smaller model may be created. If a training manager finds more patterns than will fit into a specified size, a maximum cut-off may be enforced by trimming patterns that least affect a quality of a learned model. Choosing a model size provides for control of a trade-off between a predictive quality of a model and a cost of use. Smaller models can cause a training manager to remove many patterns to fit within a maximum size limit, affecting a quality of predictions. Larger models may cost more to query for real-time predictions. Larger input data sets do not necessarily result in larger models because models store patterns, not input data. If patterns are few and simple, a resulting model will be small. Input data that has a large number of raw attributes (input columns) or derived features (outputs of data transformations) will likely have more patterns found and stored during a training process.

In at least one embodiment, training manager 1504 can make multiple passes or iterations over training data to attempt to discover patterns. There may be a default number of passes, such as ten passes, while in at least one embodiment up to a maximum number of passes may be set, such as up to one hundred passes. In at least one embodiment there may be no maximum set, or there may be a convergence criterion or other factor set that will trigger an end to a training process. In at least one embodiment training manager 1504 can monitor a quality of patterns (such as for model convergence) during training, and can automatically stop training when there are no more data points or patterns to discover. Data sets with only a few observations may require more passes over data to obtain sufficiently high model quality. Larger data sets may contain many similar data points, which can reduce a need for a large number of passes. A potential impact of choosing more data passes over data is that model training can takes longer and cost more in terms of resources and system utilization.

In at least one embodiment training data is shuffled before training, or between passes of training. Shuffling is a random or pseudo-random shuffling to generate a truly random ordering, although there may be some constraints in place to ensure that there is no grouping of certain types of data, or shuffled data may be reshuffled if such grouping exists, etc. Shuffling changes an order or arrangement in which data is utilized for training so that a training algorithm does not encounter groupings of similar types of data, or a single type of data for too many observations in succession. For example, a model might be trained to predict an object. Data might be sorted by object type before uploading. An algorithm can then process data alphabetically by object type, encountering only data for a certain object type first. A model will begin to learn patterns for that type of object. A model will then encounter only data for a second object type, and will try to adjust a model to fit that object type, which can degrade patterns that fit that a first object type. This sudden switch from between object types can produce a model that does not learn how to predict object types accurately. Shuffling can be performed in at least one embodiment before a training data set is split into training and evaluation subsets, such that a relatively even distribution of data types is utilized for both stages. In at least one embodiment training manager 1504 can automatically shuffle data using, for example, a pseudo-random shuffling technique.

When creating a machine learning model in at least one embodiment, training manager 1504 can enable a user to specify settings or apply custom options. For example, a user may specify one or more evaluation settings, indicating a portion of input data to be reserved for evaluating a predictive quality of a machine learning model. A user may specify a policy that indicates which attributes and attribute transformations are available for model training. A user may also specify various training parameters that control certain properties of a training process and of a resulting model.

Once a training manager has determined that training of a model is complete, such as by using at least one end criterion discussed herein, trained model 1508 can be provided for use by a classifier 1514 in classifying (or otherwise generating inferences for) validation data 1512. As illustrated, this involves a logical transition between a training mode for a model and an inference mode for a model. In at least one embodiment, however, trained model 1508 will first be passed to an evaluator 1510, which may include an application, process, or service executing on at least one computing resource (e.g., a CPU or GPU of at least one server) for evaluating a quality (or another such aspect) of a trained model. A model is evaluated to determine whether this model will provide at least a minimum acceptable or threshold level of performance in predicting a target on new and future data. If not, training manager 1504 can continue to train this model. Since future data instances will often have unknown target values, it can be desirable to check an accuracy metric of machine learning on data for which a target answer is known, and use this assessment as a proxy for predictive accuracy on future data.

In at least one embodiment, a model is evaluated using a subset of training data 1502 that was provided for training. This subset can be determined using a shuffle and split approach as discussed above. This evaluation data subset will be labeled with a target, and thus can act as a source of ground truth for evaluation. Evaluating a predictive accuracy of a machine learning model with same data that was used for training is not useful, as positive evaluations might be generated for models that remember training data instead of generalizing from it. Once training has completed, evaluation data subset is processed using trained model 1508 and evaluator 1510 can determine accuracy of this model by comparing ground truth data against corresponding output (or predictions/observations) of this model. Evaluator 1510 in at least one embodiment can provide a summary or performance metric indicating how well predicted and true values match. If a trained model does not satisfy at least a minimum performance criterion, or other such accuracy threshold, then training manager 1504 can be instructed to perform further training, or in some instances try training a new or different model. If trained model 1508 satisfies relevant criteria, then a trained model can be provided for use by classifier 1514.

When creating and training a machine learning model, it can be desirable in at least one embodiment to specify model settings or training parameters that will result in a model capable of making accurate predictions. Example parameters include a number of passes to be performed (forward and/or backward), regularization or refinement, model size, and shuffle type. As mentioned, however, selecting model parameter settings that produce a best predictive performance on evaluation data might result in an overfitting of a model. Overfitting occurs when a model has memorized patterns that occur in training and evaluation data sources, but has failed to generalize patterns in data. Overfitting often occurs when training data includes all data used in an evaluation. A model that has been over fit may perform well during evaluation, but may fail to make accurate predictions on new or otherwise validation data. To avoid selecting an over fitted model as a best model, a training manager can reserve additional data to validate a performance of a model. For example, training data set might be divided into 60 percent for training, and 40 percent for evaluation or validation, which may be divided into two or more stages. After selecting model parameters that work well for evaluation data, leading to convergence on a subset of validation data, such as half this validation data, a second validation may be executed with a remainder of this validation data to ensure performance of this model. If this model meets expectations on validation data, then this model is not overfitting data. Alternatively, a test set or held-out set may be used for testing parameters. Using a second validation or testing step helps to select appropriate model parameters to prevent overfitting. However, holding out more data from a training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate a predictive accuracy of a given model. One example evaluation outcome contains a prediction accuracy metric to report on an overall success of a model, as well as visualizations to help explore accuracy of a model beyond a prediction accuracy metric. An outcome can also provide an ability to review impact of setting a score threshold, such as for binary classification, and can generate alerts on criteria to check a validity of an evaluation. A choice of a metric and visualization can depend at least in part upon a type of model being evaluated.

Once trained and evaluated satisfactorily, a trained machine learning model can be used to build or support a machine learning application. In one embodiment building a machine learning application is an iterative process that involves a sequence of steps. A core machine learning problem(s) can be framed in terms of what is observed and what answer a model is to predict. Data can then be collected, cleaned, and prepared to make data suitable for consumption by machine learning model training algorithms. This data can be visualized and analyzed to run sanity checks to validate a quality of data and to understand data. It might be that raw data (e.g., input variables) and answer data (e.g., a target) are not represented in a way that can be used to train a highly predictive model. Therefore, it may be desirable to construct more predictive input representations or features from raw variables. Resulting features can be fed to a learning algorithm to build models and evaluate a quality of models on data that was held out from model building. A model can then be used to generate predictions of a target answer for new data instances.

In example system 1500 of FIG. 15, a trained model 1510 after evaluation is provided, or made available, to a classifier 1514 that is able to use a trained model to process validation data. This may include, for example, data received from users or third parties that are not classified, such as query images that are looking for information about what is represented in those images. Validation data can be processed by a classifier using a trained model, and results 1516 (such as classifications or predictions) that are produced can be sent back to respective sources or otherwise processed or stored. In at least one embodiment, and where such usage is permitted, these now-classified data instances can be stored to a training data repository, which can be used for further training of trained model 1508 by a training manager. In at least one embodiment a model will be continually trained as new data is available, but in at least one embodiment these models will be retrained periodically, such as once a day or week, depending upon factors such as a size of a data set or complexity of a model.

Classifier 1514 can include appropriate hardware and software for processing validation data 1512 using a trained model. In some instances a classifier will include one or more computer servers each having one or more graphics processing units (GPUs) that are able to process data. A configuration and design of GPUs can make them more desirable to use in processing machine learning data than CPUs or other such components. A trained model in at least one embodiment can be loaded into GPU memory and a received data instance provided to a GPU for processing. GPUs can have a much larger number of cores than CPUs, and GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as training of a model or classification of data using such a model, such tasks can still require significant time, resource allocation, and cost. For example, if a machine learning model is to be trained using 800 passes, and a data set includes 1,000,000 data instances to be used for training, then all million instances would need to be processed for each pass. Different portions of an architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by a same entity or multiple entities.

Figure 16:
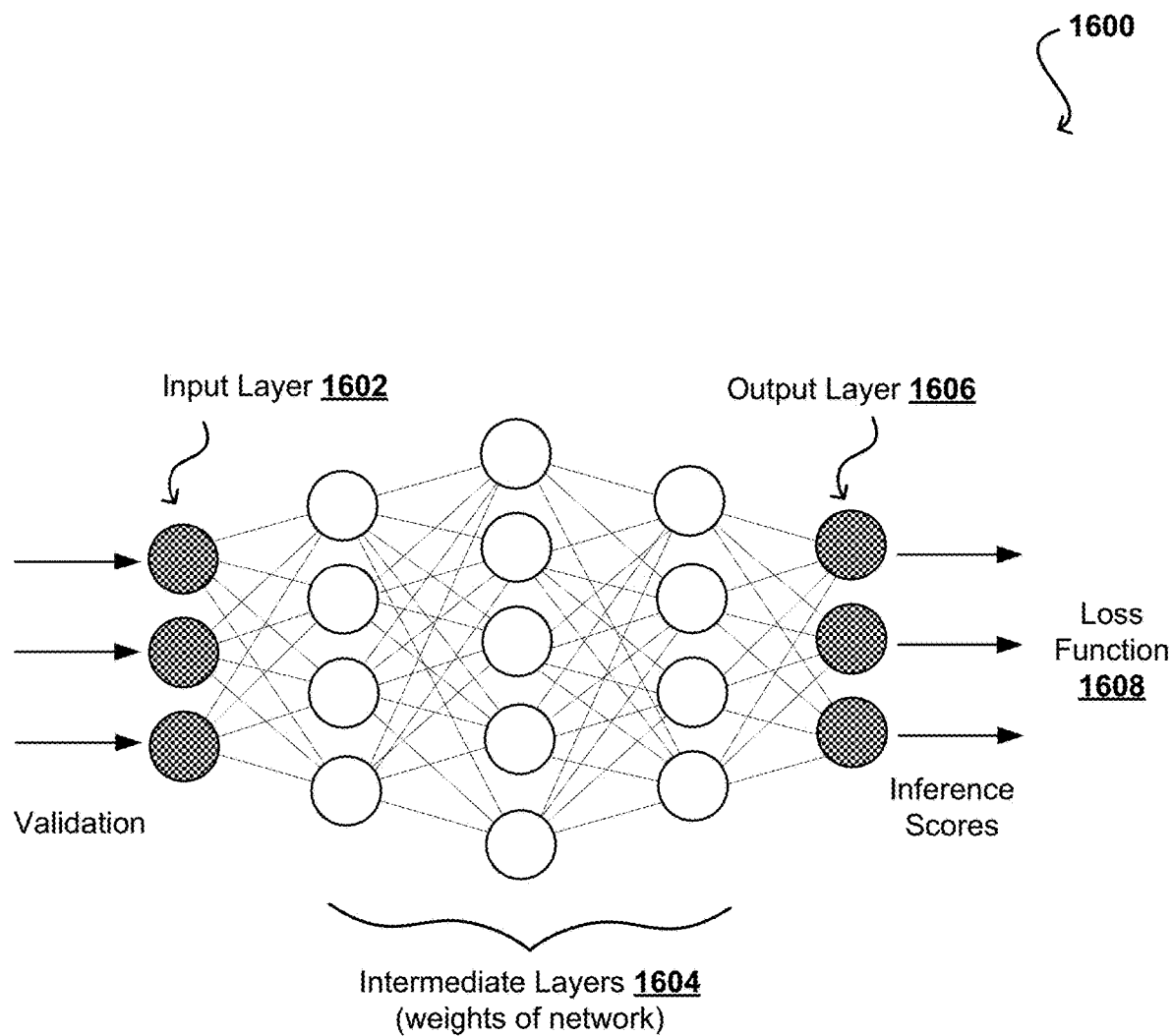
FIG. 16 illustrates layers of an example statistical model that can be utilized, according to at least one embodiment.

FIG. 16 illustrates an example neural network 1600 that can be trained or otherwise utilized in at least one embodiment. In this example a statistical model is an artificial neural network (ANN) that includes a multiple layers of nodes, including an input layer 1602, an output layer 1606, and multiple layers 1604 of intermediate nodes, often referred to as "hidden" layers, as internal layers and nodes are typically not visible or accessible in conventional neural networks. Although only a few intermediate layers are illustrated for purposes of explanation, it should be understood that there is no limit to a number of intermediate layers that can be utilized, and any limit on layers will often be a factor of resources or time required for processed using a model. As discussed elsewhere herein, there can be additional types of models, networks, algorithms, or processes used as well, as may include other numbers or selections of nodes and layers, among other such options. Validation data can be processed by layers of a network to generate a set of inferences, or inference scores, which can then be fed to a loss function 1608.

In this example network 1600, all nodes of a given layer are interconnected to all nodes of an adjacent layer. As illustrated, nodes of an intermediate layer will then each be connected to nodes of two adjacent layers. Nodes are also referred to as neurons or connected units in some models, and connections between nodes are referred to as edges. Each node can perform a function for inputs received, such as by using a specified function. Nodes and edges can obtain different weightings during training, and individual layers of nodes can perform specific types of transformations on received input, where those transformations can also be learned or adjusted during training. Learning can be supervised or unsupervised learning, as may depend at least in part upon a type of information contained in a training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In at least one embodiment, such a complex machine learning model can be trained using various tuning parameters. Choosing parameters, fitting a model, and evaluating a model are parts of a model tuning process, often referred to as hyperparameter optimization. Such tuning can involve introspecting an underlying model or data in at least one embodiment. In a training or production setting, a robust workflow can be important to avoid overfitting of hyperparameters as discussed elsewhere herein. Cross-validation and adding Gaussian noise to a training dataset are techniques that can be useful for avoiding overfitting to any one dataset. For hyperparameter optimization it may be desirable to keep training and validation sets fixed. In at least one embodiment, hyperparameters can be tuned in certain categories, as may include data preprocessing (such as translating words to vectors), CNN architecture definition (for example, filter sizes, number of filters), stochastic gradient descent (SGD) parameters (for example, learning rate), and regularization or refinement (for example, dropout probability), among other such options.

In an example pre-processing step, instances of a dataset can be embedded into a lower dimensional space of a certain size. A size of this space is a parameter to be tuned. An architecture of a CNN contains many tunable parameters. A parameter for filter sizes can represent an interpretation of information that corresponds to a size of an instance that will be analyzed. In computational linguistics, this is known as an n-gram size. An example CNN uses three different filter sizes, which represent potentially different n-gram sizes. A number of filters per filter size can correspond to a depth of a filter. Each filter attempts to learn something different from a structure of an instance, such as a sentence structure for textual data. In a convolutional layer, an activation function can be a rectified linear unit and a pooling type set as max pooling. Results can then be concatenated into a single dimensional vector, and a last layer is fully connected onto a two-dimensional output. This corresponds to a binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. In at least one embodiment input data may be relatively sparse. A main hyperparameter in such a situation can be a dropout at a penultimate layer, which represents a proportion of nodes that will not "fire" at each training cycle. An example training process can suggest different hyperparameter configurations based on feedback for a performance of previous configurations. This model can be trained with a proposed configuration, evaluated on a designated validation set, and performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning model architecture and preprocessing and stochastic gradient descent parameters. This expands a model configuration space. In a basic scenario, only preprocessing and stochastic gradient descent parameters are tuned. There can be a greater number of configuration parameters in a complex scenario than in a basic scenario. Tuning in a joint space can be performed using a linear or exponential number of steps, iteration through an optimization loop for models. A cost for such a tuning process can be significantly less than for tuning processes such as random search and grid search, without any significant performance loss.

In at least one embodiment backpropagation can be utilized to calculate a gradient used for determining weights for a neural network. Backpropagation is a form of differentiation, and can be used by a gradient descent optimization algorithm to adjust weights applied to various nodes or neurons as discussed above. Weights can be determined using a gradient of a relevant loss function. Backpropagation can utilize a derivative of a loss function with respect to output generated by a statistical model. As mentioned, various nodes can have associated activation functions that define output of respective nodes. Various activation functions can be used as appropriate, as may include radial basis functions (RBFs) and sigmoids, which can be utilized by various support vector machines (SVMs) for transformation of data. An activation function of an intermediate layer of nodes is referred to herein as an inner product kernel. These functions can include, for example, identity functions, step functions, sigmoidal functions, ramp functions, and so on. Activation functions can also be linear or non-linear, among other such options.

Inference and Training Logic

Figure 17A:
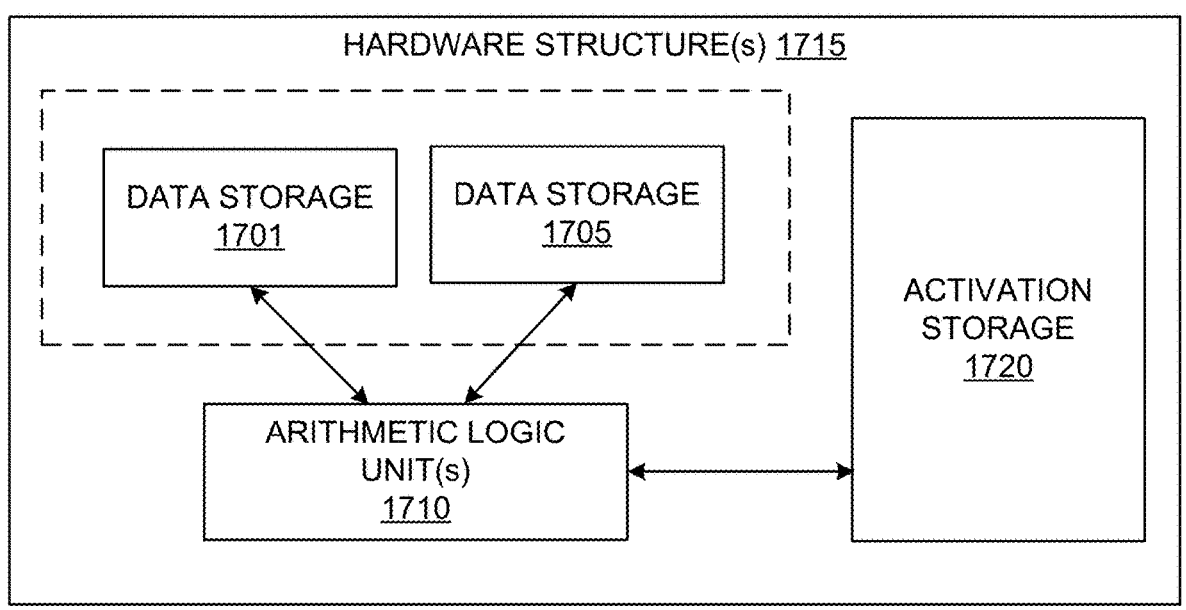
FIG. 17A illustrates inference and/or training logic, according to at least one embodiment.

FIG. 17A illustrates inference and/or training logic 1715 used to perform inferencing and/or training operations associated with one or more embodiments. Details regarding inference and/or training logic 1715 are provided below in conjunction with FIGS. 17A and/or 17B.

In at least one embodiment, inference and/or training logic 1715 may include, without limitation, code and/or data storage 1701 to store forward and/or output weight and/or input/output data, and/or other parameters to configure neurons or layers of a neural network trained and/or used for inferencing in aspects of one or more embodiments. In at least one embodiment, training logic 1715 may include, or be coupled to code and/or data storage 1701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1701 may be included with other on-chip or off-chip data storage, including a processor's L1, L2, or L3 cache or system memory.

In at least one embodiment, any portion of code and/or data storage 1701 may be internal or external to one or more processors or other hardware logic devices or circuits. In at least one embodiment, code and/or code and/or data storage 1701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1715 may include, without limitation, a code and/or data storage 1705 to store backward and/or output weight and/or input/output data corresponding to neurons or layers of a neural network trained and/or used for inferencing in aspects of one or more embodiments. In at least one embodiment, code and/or data storage 1705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1715 may include, or be coupled to code and/or data storage 1705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1705 may be included with other on-chip or off-chip data storage, including a processor's L1, L2, or L3 cache or system memory. In at least one embodiment, any portion of code and/or data storage 1705 may be internal or external to on one or more processors or other hardware logic devices or circuits. In at least one embodiment, code and/or data storage 1705 may be cache memory, DRAM, SRAM, non-volatile memory (e.g., Flash memory), or other storage. In at least one embodiment, choice of whether code and/or data storage 1705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1701 and code and/or data storage 1705 may be separate storage structures. In at least one embodiment, code and/or data storage 1701 and code and/or data storage 1705 may be same storage structure. In at least one embodiment, code and/or data storage 1701 and code and/or data storage 1705 may be partially same storage structure and partially separate storage structures. In at least one embodiment, any portion of code and/or data storage 1701 and code and/or data storage 1705 may be included with other on-chip or off-chip data storage, including a processor's L1, L2, or L3 cache or system memory.

In at least one embodiment, inference and/or training logic 1715 may include, without limitation, one or more arithmetic logic unit(s) ("ALU(s)") 1710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1720 that are functions of input/output and/or weight parameter data stored in code and/or data storage 1701 and/or code and/or data storage 1705. In at least one embodiment, activations stored in activation storage 1720 are generated according to linear algebraic and or matrix-based mathematics performed by ALU(s) 1710 in response to performing instructions or other code, wherein weight values stored in code and/or data storage 1705 and/or code and/or data storage 1701 are used as operands along with other values, such as bias values, gradient information, momentum values, or other parameters or hyperparameters, any or all of which may be stored in code and/or data storage 1705 or code and/or data storage 1701 or another storage on or off-chip.

In at least one embodiment, ALU(s) 1710 are included within one or more processors or other hardware logic devices or circuits, whereas in another embodiment, ALU(s) 1710 may be external to a processor or other hardware logic device or circuit that uses them (e.g., a co-processor). In at least one embodiment, ALUs 1710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1701, code and/or data storage 1705, and activation storage 1720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1720 may be cache memory, DRAM, SRAM, non-volatile memory (e.g., Flash memory), or other storage. In at least one embodiment, activation storage 1720 may be completely or partially within or external to one or more processors or other logical circuits. In at least one embodiment, choice of whether activation storage 1720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1715 illustrated in FIG. 17A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1715 illustrated in FIG. 17A may be used in conjunction with central processing unit ("CPU") hardware, graphics processing unit ("GPU") hardware or other hardware, such as field programmable gate arrays ("FPGAs").

Figure 17B:
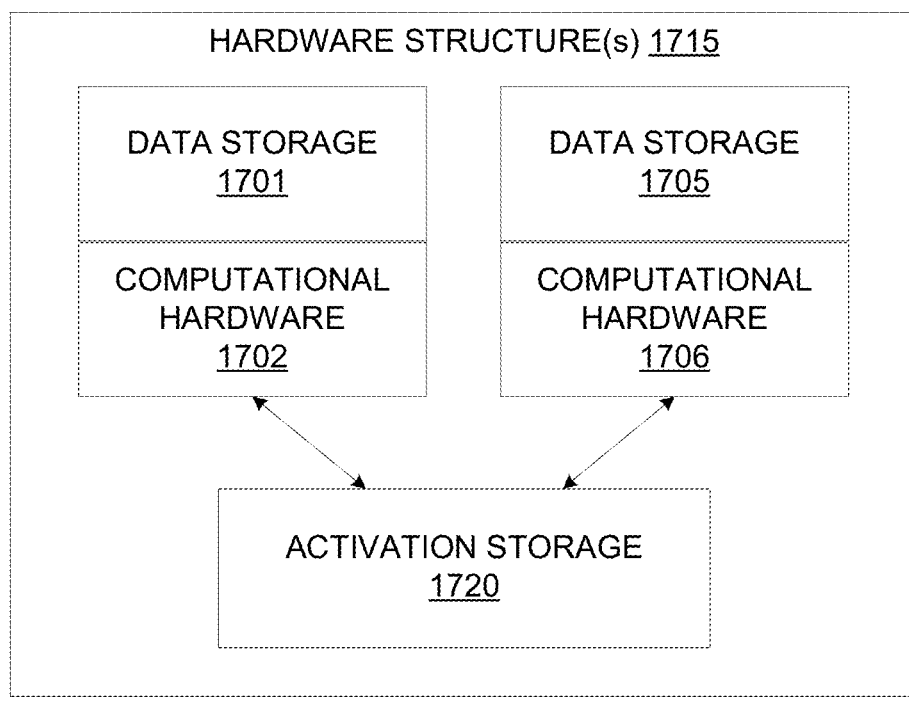
FIG. 17B illustrates inference and/or training logic, according to at least one embodiment.

FIG. 17B illustrates inference and/or training logic 1715, according to at least one or more embodiments. In at least one embodiment, inference and/or training logic 1715 may include, without limitation, hardware logic in which computational resources are dedicated or otherwise exclusively used in conjunction with weight values or other information corresponding to one or more layers of neurons within a neural network. In at least one embodiment, inference and/or training logic 1715 illustrated in FIG. 17B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1715 illustrated in FIG. 17B may be used in conjunction with central processing unit (CPU) hardware, graphics processing unit (GPU) hardware or other hardware, such as field programmable gate arrays (FPGAs). In at least one embodiment, inference and/or training logic 1715 includes, without limitation, code and/or data storage 1701 and code and/or data storage 1705, which may be used to store code (e.g., graph code), weight values and/or other information, including bias values, gradient information, momentum values, and/or other parameter or hyperparameter information. In at least one embodiment illustrated in FIG. 17B, each of code and/or data storage 1701 and code and/or data storage 1705 is associated with a dedicated computational resource, such as computational hardware 1702 and computational hardware 1706, respectively. In at least one embodiment, each of computational hardware 1702 and computational hardware 1706 comprises one or more ALUs that perform mathematical functions, such as linear algebraic functions, only on information stored in code and/or data storage 1701 and code and/or data storage 1705, respectively, result of which is stored in activation storage 1720.

In at least one embodiment, each of code and/or data storage 1701 and 1705 and corresponding computational hardware 1702 and 1706, respectively, correspond to different layers of a neural network, such that resulting activation from one "storage/computational pair 1701/1702" of code and/or data storage 1701 and computational hardware 1702 is provided as an input to "storage/computational pair 1705/1706" of code and/or data storage 1705 and computational hardware 1706, in order to mirror conceptual organization of a neural network. In at least one embodiment, each of storage/computational pairs 1701/1702 and 1705/1706 may correspond to more than one neural network layer. In at least one embodiment, additional storage/computation pairs (not shown) subsequent to or in parallel with storage computation pairs 1701/1702 and 1705/1706 may be included in inference and/or training logic 1715.

Data Center

Figure 18:
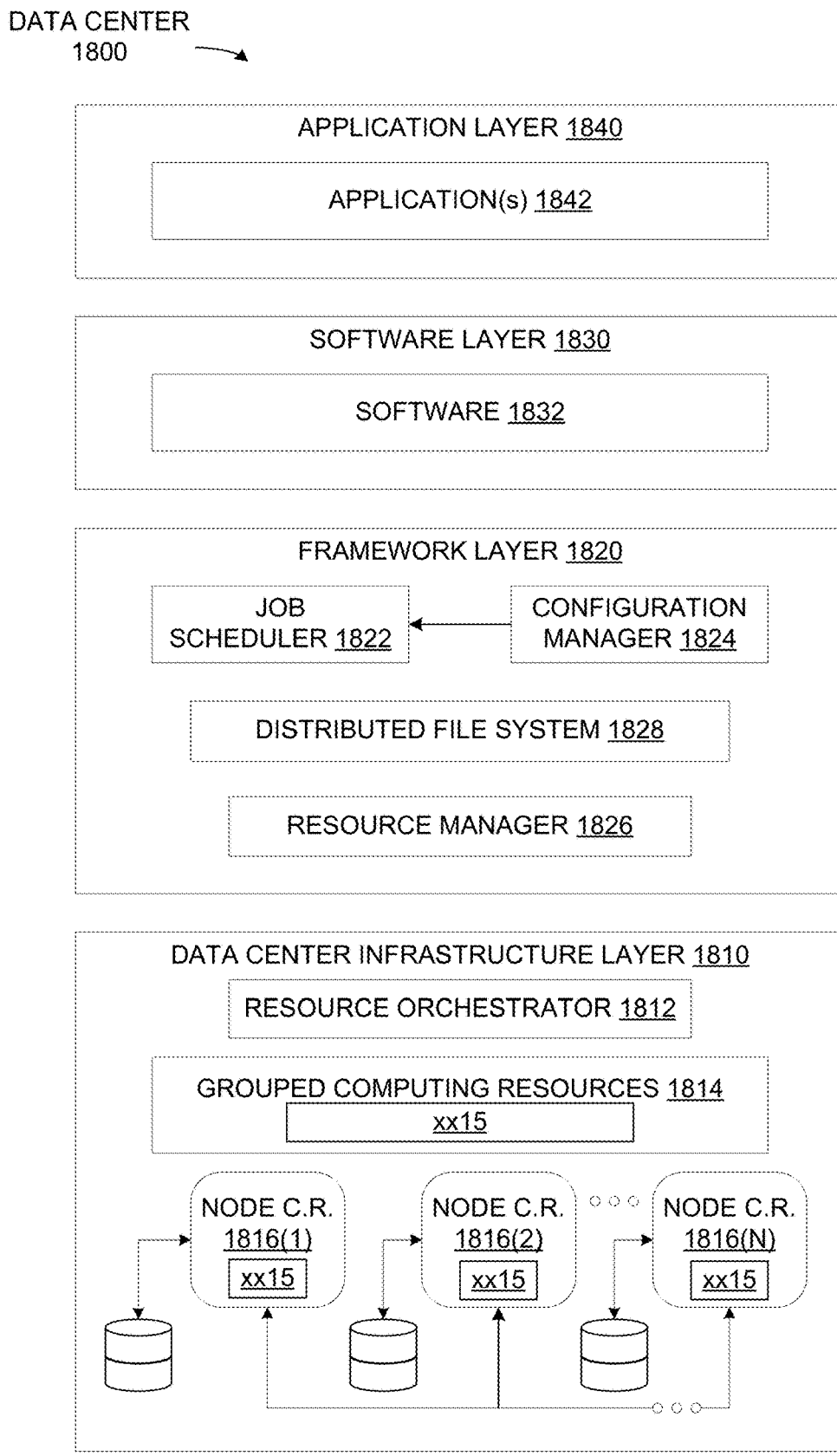
FIG. 18 illustrates an example data center system, according to at least one embodiment.

FIG. 18 illustrates an example data center 1800, in which at least one embodiment may be used. In at least one embodiment, data center 1800 includes a data center infrastructure layer 1810, a framework layer 1820, a software layer 1830, and an application layer 1840.

In at least one embodiment, as shown in FIG. 18, data center infrastructure layer 1810 may include a resource orchestrator 1812, grouped computing resources 1814, and node computing resources ("node C.R.s") 1816(1)-1816(N), where "N" represents any whole, positive integer. In at least one embodiment, node C.R.s 1816(1)-1816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1816(1)-1816(N) may be a server having one or more of above-mentioned computing resources.

In at least one embodiment, grouped computing resources 1814 may include separate groupings of node C.R.s housed within one or more racks (not shown), or many racks housed in data centers at various geographical locations (also not shown). Separate groupings of node C.R.s within grouped computing resources 1814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1812 may configure or otherwise control one or more node C.R.s 1816(1)-1816(N) and/or grouped computing resources 1814. In at least one embodiment, resource orchestrator 1812 may include a software design infrastructure ("SDI") management entity for data center 1800. In at least one embodiment, resource orchestrator may include hardware, software or some combination thereof.

In at least one embodiment, as shown in FIG. 18, framework layer 1820 includes a job scheduler 1822, a configuration manager 1824, a resource manager 1826 and a distributed file system 1828. In at least one embodiment, framework layer 1820 may include a framework to support software 1832 of software layer 1830 and/or one or more application(s) 1842 of application layer 1840. In at least one embodiment, software 1832 or application(s) 1842 may respectively include web-based service software or applications, such as those provided by Amazon Web Services, Google Cloud and Microsoft Azure. In at least one embodiment, framework layer 1820 may be, but is not limited to, a type of free and open-source software web application framework such as Apache Spark™ (hereinafter "Spark") that may utilize distributed file system 1828 for large-scale data processing (e.g., "big data"). In at least one embodiment, job scheduler 1822 may include a Spark driver to facilitate scheduling of workloads supported by various layers of data center 1800. In at least one embodiment, configuration manager 1824 may be capable of configuring different layers such as software layer 1830 and framework layer 1820 including Spark and distributed file system 1828 for supporting large-scale data processing. In at least one embodiment, resource manager 1826 may be capable of managing clustered or grouped computing resources mapped to or allocated for support of distributed file system 1828 and job scheduler 1822. In at least one embodiment, clustered or grouped computing resources may include grouped computing resource 1814 at data center infrastructure layer 1810. In at least one embodiment, resource manager 1826 may coordinate with resource orchestrator 1812 to manage these mapped or allocated computing resources.

In at least one embodiment, software 1832 included in software layer 1830 may include software used by at least portions of node C.R.s 1816(1)-1816(N), grouped computing resources 1814, and/or distributed file system 1828 of framework layer 1820. one or more types of software may include, but are not limited to, Internet web page search software, e-mail virus scan software, database software, and streaming video content software.

In at least one embodiment, application(s) 1842 included in application layer 1840 may include one or more types of applications used by at least portions of node C.R.s 1816(1)-1816(N), grouped computing resources 1814, and/or distributed file system 1828 of framework layer 1820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1824, resource manager 1826, and resource orchestrator 1812 may implement any number and type of self-modifying actions based on any amount and type of data acquired in any technically feasible fashion. In at least one embodiment, self-modifying actions may relieve a data center operator of data center 1800 from making possibly bad configuration decisions and possibly avoiding underutilized and/or poor performing portions of a data center.

In at least one embodiment, data center 1800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1800. In at least one embodiment, trained machine learning models corresponding to one or more neural networks may be used to infer or predict information using resources described above with respect to data center 1800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 18 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Autonomous Vehicle

Figure 19A:
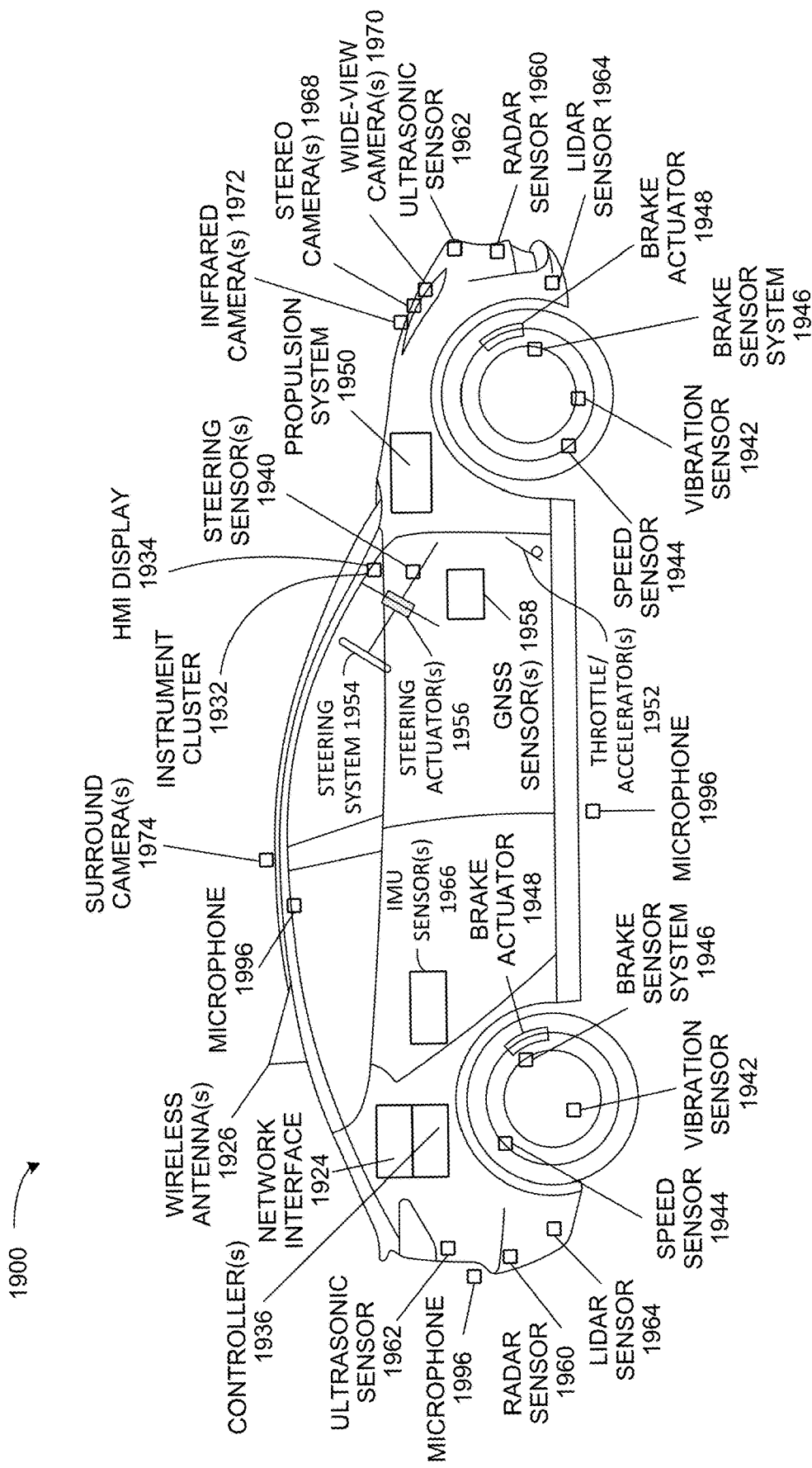
FIG. 19A illustrates an example of an autonomous vehicle, according to at least one embodiment.

FIG. 19A illustrates an example of an autonomous vehicle 1900, according to at least one embodiment. In at least one embodiment, autonomous vehicle 1900 (alternatively referred to herein as "vehicle 1900") may be, without limitation, a passenger vehicle, such as a car, a truck, a bus, and/or another type of vehicle that accommodates one or more passengers. In at least one embodiment, vehicle 1*a*00 may be a semi-tractor-trailer truck used for hauling cargo. In at least one embodiment, vehicle 1*a*00 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1900 may be capable of functionality in accordance with one or more of level 1-level 5 of autonomous driving levels. For example, in at least one embodiment, vehicle 1900 may be capable of conditional automation (Level 3), high automation (Level 4), and/or full automation (Level 5), depending on embodiment.

In at least one embodiment, vehicle 1900 may include, without limitation, components such as a chassis, a vehicle body, wheels (e.g., 2, 4, 6, 8, 18, etc.), tires, axles, and other components of a vehicle. In at least one embodiment, vehicle 1900 may include, without limitation, a propulsion system 1950, such as an internal combustion engine, hybrid electric power plant, an all-electric engine, and/or another propulsion system type. In at least one embodiment, propulsion system 1950 may be connected to a drive train of vehicle 1900, which may include, without limitation, a transmission, to enable propulsion of vehicle 1900. In at least one embodiment, propulsion system 1950 may be controlled in response to receiving signals from a throttle/accelerator(s) 1952.

In at least one embodiment, a steering system 1954, which may include, without limitation, a steering wheel, is used to steer a vehicle 1900 (e.g., along a desired path or route) when a propulsion system 1950 is operating (e.g., when vehicle is in motion). In at least one embodiment, a steering system 1954 may receive signals from steering actuator(s) 1956. A steering wheel may be optional for full automation (Level 5) functionality. In at least one embodiment, a brake sensor system 1946 may be used to operate vehicle brakes in response to receiving signals from brake actuator(s) 1948 and/or brake sensors.

In at least one embodiment, controller(s) 1936, which may include, without limitation, one or more system on chips ("SoCs") (not shown in FIG. 19A) and/or graphics processing unit(s) ("GPU(s)"), provide signals (e.g., representative of commands) to one or more components and/or systems of vehicle 1900. For instance, in at least one embodiment, controller(s) 1936 may send signals to operate vehicle brakes via brake actuator(s) 1948, to operate steering system 1954 via steering actuator(s) 1956, and/or to operate propulsion system 1950 via throttle/accelerator(s) 1952. Controller(s) 1936 may include one or more onboard (e.g., integrated) computing devices (e.g., supercomputers) that process sensor signals, and output operation commands (e.g., signals representing commands) to enable autonomous driving and/or to assist a human driver in driving vehicle 1900. In at least one embodiment, controller(s) 1936 may include a first controller 1936 for autonomous driving functions, a second controller 1936 for functional safety functions, a third controller 1936 for artificial intelligence functionality (e.g., computer vision), a fourth controller 1936 for infotainment functionality, a fifth controller 1936 for redundancy in emergency conditions, and/or other controllers. In at least one embodiment, a single controller 1936 may handle two or more of above functionalities, two or more controllers 1936 may handle a single functionality, and/or any combination thereof.

In at least one embodiment, controller(s) 1936 provide signals for controlling one or more components and/or systems of vehicle 1900 in response to sensor data received from one or more sensors (e.g., sensor inputs). In at least one embodiment, sensor data may be received from, for example and without limitation, global navigation satellite systems ("GNSS") sensor(s) 1958 (e.g., Global Positioning System sensor(s)), RADAR sensor(s) 1960, ultrasonic sensor(s) 1962, LIDAR sensor(s) 1964, inertial measurement unit ("IMU") sensor(s) 1966 (e.g., accelerometer(s), gyroscope(s), magnetic compass(es), magnetometer(s), etc.), microphone(s) 1996, stereo camera(s) 1968, wide-view camera(s) 1970 (e.g., fisheye cameras), infrared camera(s) 1972, surround camera(s) 1974 (e.g., 360 degree cameras), long-range cameras (not shown in FIG. 19A), mid-range camera(s) (not shown in FIG. 19A), speed sensor(s) 1944 (e.g., for measuring speed of vehicle 1900), vibration sensor(s) 1942, steering sensor(s) 1940, brake sensor(s) (e.g., as part of brake sensor system 1946), and/or other sensor types.

In at least one embodiment, one or more of controller(s) 1936 may receive inputs (e.g., represented by input data) from an instrument cluster 1932 of vehicle 1900 and provide outputs (e.g., represented by output data, display data, etc.) via a human-machine interface ("HMI") display 1934, an audible annunciator, a loudspeaker, and/or via other components of vehicle 1900. In at least one embodiment, outputs may include information such as vehicle velocity, speed, time, map data (e.g., a High Definition map (not shown in FIG. 19A), location data (e.g., vehicle 1900's location, such as on a map), direction, location of other vehicles (e.g., an occupancy grid), information about objects and status of objects as perceived by controller(s) 1936, etc. For example, in at least one embodiment, HMI display 1934 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1900 further includes a network interface 1924 which may use wireless antenna(s) 1926 and/or modem(s) to communicate over one or more networks. For example, in at least one embodiment, network interface 1924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA 2000"), etc. In at least one embodiment, wireless antenna(s) 1926 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 19A for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 19B:
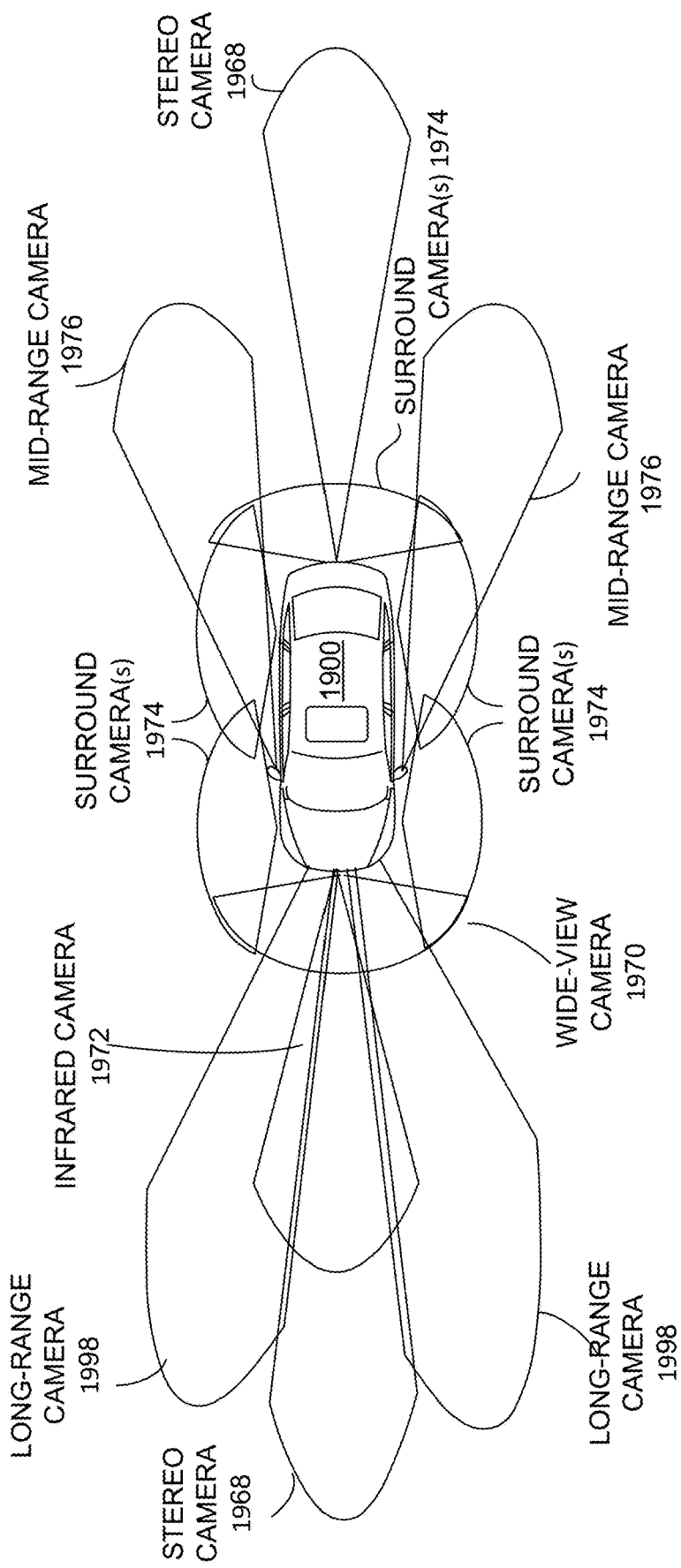
FIG. 19B illustrates an example of camera locations and fields of view for the autonomous vehicle of FIG. 19A, according to at least one embodiment.

FIG. 19B illustrates an example of camera locations and fields of view for autonomous vehicle 1900 of FIG. 19A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1900.

In at least one embodiment, camera types for cameras may include, but are not limited to, digital cameras that may be adapted for use with components and/or systems of vehicle 1900. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cabIn at least one embodiment.

In at least one embodiment, cameras with a field of view that include portions of environment in front of vehicle 1900 (e.g., front-facing cameras) may be used for surround view, to help identify forward facing paths and obstacles, as well as aid in, with help of one or more of controllers 1936 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1970 may be used to perceive objects coming into view from periphery (e.g., pedestrians, crossing traffic or bicycles). Although only one wide-view camera 1970 is illustrated in FIG. 19B, in other embodiments, there may be any number (including zero) of wide-view camera(s) 1970 on vehicle 1900. In at least one embodiment, any number of long-range camera(s) 1998 (e.g., a long-view stereo camera pair) may be used for depth-based object detection, especially for objects for which a neural network has not yet been trained. In at least one embodiment, long-range camera(s) 1998 may also be used for object detection and classification, as well as basic object tracking.

In at least one embodiment, any number of stereo camera(s) 1968 may also be included in a front-facing configuration. In at least one embodiment, one or more of stereo camera(s) 1968 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1900, including a distance estimate for all points in image. In at least one embodiment, one or more of stereo camera(s) 1968 may include, without limitation, compact stereo vision sensor(s) that may include, without limitation, two camera lenses (one each on left and right) and an image processing chip that may measure distance from vehicle 1900 to target object and use generated information (e.g., metadata) to activate autonomous emergency braking and lane departure warning functions. In at least one embodiment, other types of stereo camera(s) 1968 may be used in addition to, or alternatively from, those described herein.

In at least one embodiment, cameras with a field of view that include portions of environment to side of vehicle 1900 (e.g., side-view cameras) may be used for surround view, providing information used to create and update occupancy grid, as well as to generate side impact collision warnings. For example, in at least one embodiment, surround camera(s) 1974 (e.g., four surround cameras 1974 as illustrated in FIG. 19B) could be positioned on vehicle 1900. In at least one embodiment, surround camera(s) 1974 may include, without limitation, any number and combination of wide-view camera(s) 1970, fisheye camera(s), 360 degree camera(s), and/or like. For instance, in at least one embodiment, four fisheye cameras may be positioned on front, rear, and sides of vehicle 1900. In at least one embodiment, vehicle 1900 may use three surround camera(s) 1974 (e.g., left, right, and rear), and may leverage one or more other camera(s) (e.g., a forward-facing camera) as a fourth surround-view camera.

In at least one embodiment, cameras with a field of view that include portions of environment to rear of vehicle 1900 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1998 and/or mid-range camera(s) 1976, stereo camera(s) 1968), infrared camera(s) 1972, etc.), as described herein.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 19B for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 19C:
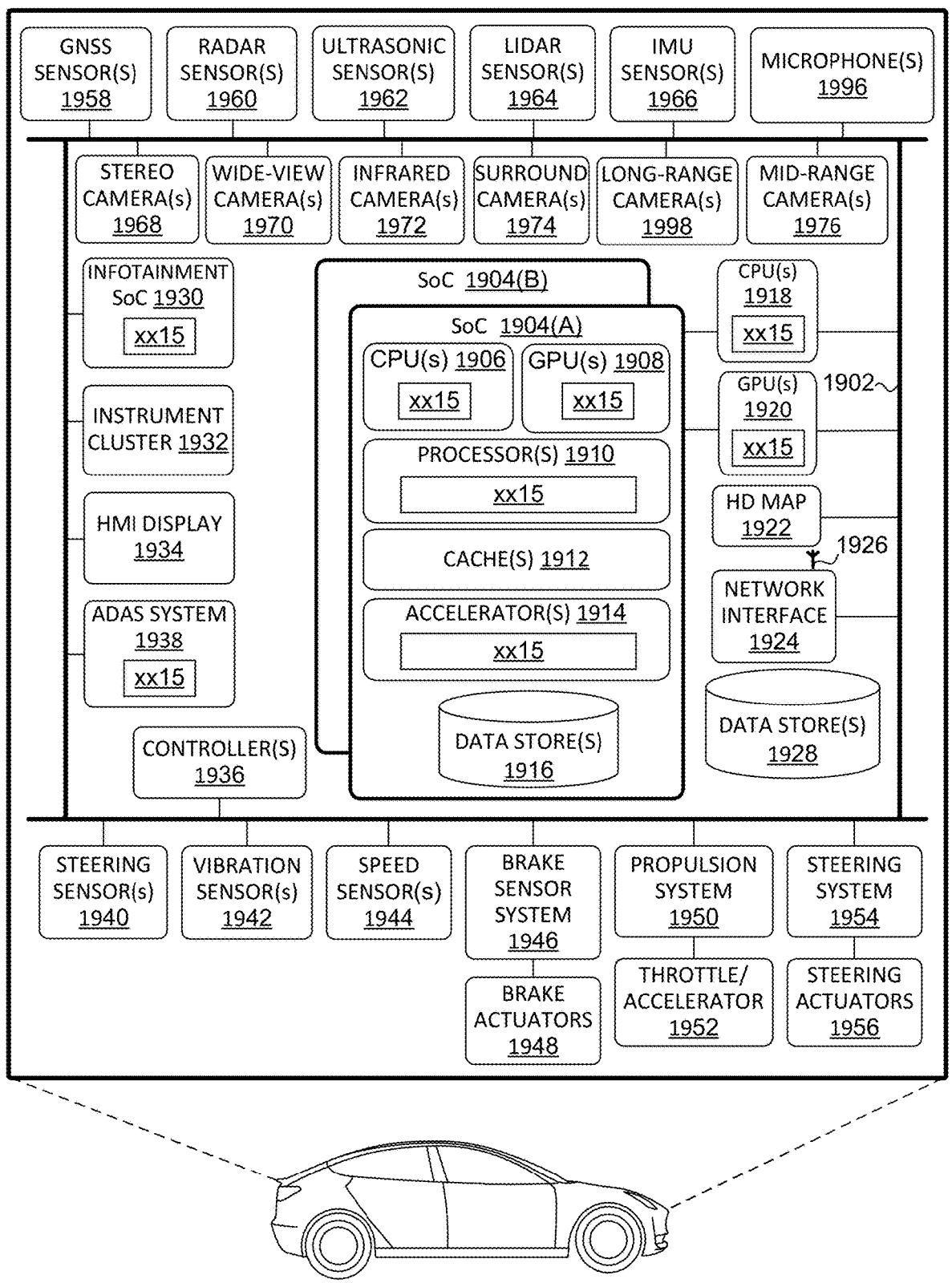
FIG. 19C illustrates an example system architecture for the autonomous vehicle of FIG. 19A, according to at least one embodiment.

FIG. 19C is a block diagram illustrating an example system architecture for autonomous vehicle 1900 of FIG. 19A, according to at least one embodiment. In at least one embodiment, each of components, features, and systems of vehicle 1900 in FIG. 19C are illustrated as being connected via a bus 1902. In at least one embodiment, bus 1902 may include, without limitation, a CAN data interface (alternatively referred to herein as a "CAN bus"). In at least one embodiment, a CAN bus may be a network inside vehicle 1900 used to aid in control of various features and functionality of vehicle 1900, such as actuation of brakes, acceleration, braking, steering, windshield wipers, etc. In at least one embodiment, bus 1902 may be configured to have dozens or even hundreds of nodes, each with its own unique identifier (e.g., a CAN ID). In at least one embodiment, bus 1902 may be read to find steering wheel angle, ground speed, engine revolutions per minute ("RPMs"), button positions, and/or other vehicle status indicators. In at least one embodiment, bus 1902 may be a CAN bus that is ASIL B compliant.

In at least one embodiment, in addition to, or alternatively from CAN, FlexRay and/or Ethernet may be used. In at least one embodiment, there may be any number of busses 1902, which may include, without limitation, zero or more CAN busses, zero or more FlexRay busses, zero or more Ethernet busses, and/or zero or more other types of busses using a different protocol. In at least one embodiment, two or more busses 1902 may be used to perform different functions, and/or may be used for redundancy. For example, a first bus 1902 may be used for collision avoidance functionality and a second bus 1902 may be used for actuation control. In at least one embodiment, each bus 1902 may communicate with any of components of vehicle 1900, and two or more busses 1902 may communicate with same components. In at least one embodiment, each of any number of system(s) on chip(s) ("SoC(s)") 1904, each of controller(s) 1936, and/or each computer within vehicle may have access to same input data (e.g., inputs from sensors of vehicle 1900), and may be connected to a common bus, such CAN bus.

In at least one embodiment, vehicle 1900 may include one or more controller(s) 1936, such as those described herein with respect to FIG. 19A. Controller(s) 1936 may be used for a variety of functions. In at least one embodiment, controller(s) 1936 may be coupled to any of various other components and systems of vehicle 1900, and may be used for control of vehicle 1900, artificial intelligence of vehicle 1900, infotainment for vehicle 1900, and/or like.

In at least one embodiment, vehicle 1900 may include any number of SoCs 1904. Each of SoCs 1904 may include, without limitation, central processing units ("CPU(s)") 1906, graphics processing units ("GPU(s)") 1908, processor(s) 1910, cache(s) 1912, accelerator(s) 1914, data store(s) 1916, and/or other components and features not illustrated. In at least one embodiment, SoC(s) 1904 may be used to control vehicle 1900 in a variety of platforms and systems. For example, in at least one embodiment, SoC(s) 1904 may be combined in a system (e.g., system of vehicle 1900) with a High Definition ("HD") map 1922 which may obtain map refreshes and/or updates via network interface 1924 from one or more servers (not shown in FIG. 19C).

In at least one embodiment, CPU(s) 1906 may include a CPU cluster or CPU complex (alternatively referred to herein as a "CCPLEX"). In at least one embodiment, CPU(s) 1906 may include multiple cores and/or level two ("L2") caches. For instance, in at least one embodiment, CPU(s) 1906 may include eight cores in a coherent multi-processor configuration. In at least one embodiment, CPU(s) 1906 may include four dual-core clusters where each cluster has a dedicated L2 cache (e.g., a 2 MB L2 cache). In at least one embodiment, CPU(s) 1906 (e.g., CCPLEX) may be configured to support simultaneous cluster operation enabling any combination of clusters of CPU(s) 1906 to be active at any given time.

In at least one embodiment, one or more of CPU(s) 1906 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1906 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1908 may include an integrated GPU (alternatively referred to herein as an "iGPU"). In at least one embodiment, GPU(s) 1908 may be programmable and may be efficient for parallel workloads. In at least one embodiment, GPU(s) 1908, in at least one embodiment, may use an enhanced tensor instruction set. In at least one embodiment, GPU(s) 1908 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1908 may include at least eight streaming microprocessors. In at least one embodiment, GPU(s) 1908 may use compute application programming interface(s) (API(s)). In at least one embodiment, GPU(s) 1908 may use one or more parallel computing platforms and/or programming models (e.g., NVIDIA's CUDA).

In at least one embodiment, one or more of GPU(s) 1908 may be power-optimized for best performance in automotive and embedded use cases. For example, in on embodiment, GPU(s) 1908 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1908 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1908 may include unified memory technology. In at least one embodiment, address translation services ("ATS") support may be used to allow GPU(s) 1908 to access CPU(s) 1906 page tables directly. In at least one embodiment, embodiment, when GPU(s) 1908 memory management unit ("MMU") experiences a miss, an address translation request may be transmitted to CPU(s) 1906. In response, CPU(s) 1906 may look in its page tables for virtual-to-physical mapping for address and transmits translation back to GPU(s) 1908, in at least one embodiment. In at least one embodiment, unified memory technology may allow a single unified virtual address space for memory of both CPU(s) 1906 and GPU(s) 1908, thereby simplifying GPU(s) 1908 programming and porting of applications to GPU(s) 1908.

In at least one embodiment, GPU(s) 1908 may include any number of access counters that may keep track of frequency of access of GPU(s) 1908 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1904 may include any number of cache(s) 1912, including those described herein. For example, in at least one embodiment, cache(s) 1912 could include a level three ("L3") cache that is available to both CPU(s) 1906 and GPU(s) 1908 (e.g., that is connected both CPU(s) 1906 and GPU(s) 1908). In at least one embodiment, cache(s) 1912 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1904 may include one or more accelerator(s) 1914 (e.g., hardware accelerators, software accelerators, or a combination thereof). In at least one embodiment, SoC(s) 1904 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1908 and to off-load some of tasks of GPU(s) 1908 (e.g., to free up more cycles of GPU(s) 1908 for performing other tasks). In at least one embodiment, accelerator(s) 1914 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1914 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1996; a CNN for facial recognition and vehicle owner identification using data from camera sensors; and/or a CNN for security and/or safety related events.

In at least one embodiment, DLA(s) may perform any function of GPU(s) 1908, and by using an inference accelerator, for example, a designer may target either DLA(s) or GPU(s) 1908 for any function. For example, in at least one embodiment, designer may focus processing of CNNs and floating point operations on DLA(s) and leave other functions to GPU(s) 1908 and/or other accelerator(s) 1914.

In at least one embodiment, accelerator(s) 1914 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1938, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1906. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1914 (e.g., hardware acceleration cluster) may include a computer vision network on-chip and static random-access memory ("SRAM"), for providing a high-bandwidth, low latency SRAM for accelerator(s) 1914. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1904 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1914 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1900, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1966 that correlates with vehicle 1900 orientation, distance, 3D location estimates of object obtained from neural network and/or other sensors (e.g., LIDAR sensor(s) 1964 or RADAR sensor(s) 1960), among others.

In at least one embodiment, one or more of SoC(s) 1904 may include data store(s) 1916 (e.g., memory). In at least one embodiment, data store(s) 1916 may be on-chip memory of SoC(s) 1904, which may store neural networks to be executed on GPU(s) 1908 and/or DLA. In at least one embodiment, data store(s) 1916 may be large enough in capacity to store multiple instances of neural networks for redundancy and safety. In at least one embodiment, data store(s) 1916 may comprise L2 or L3 cache(s).

In at least one embodiment, one or more of SoC(s) 1904 may include any number of processor(s) 1910 (e.g., embedded processors). In at least one embodiment, processor(s) 1910 may include a boot and power management processor that may be a dedicated processor and subsystem to handle boot power and management functions and related security enforcement. In at least one embodiment, boot and power management processor may be a part of SoC(s) 1904 boot sequence and may provide runtime power management services. In at least one embodiment, boot power and management processor may provide clock and voltage programming, assistance in system low power state transitions, management of SoC(s) 1904 thermals and temperature sensors, and/or management of SoC(s) 1904 power states. In at least one embodiment, each temperature sensor may be implemented as a ring-oscillator whose output frequency is proportional to temperature, and SoC(s) 1904 may use ring-oscillators to detect temperatures of CPU(s) 1906, GPU(s) 1908, and/or accelerator(s) 1914. In at least one embodiment, if temperatures are determined to exceed a threshold, then boot and power management processor may enter a temperature fault routine and put SoC(s) 1904 into a lower power state and/or put vehicle 1900 into a chauffeur to safe stop mode (e.g., bring vehicle 1900 to a safe stop).

In at least one embodiment, processor(s) 1910 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1910 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1910 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1910 may further include a real-time camera engine that may include, without limitation, a dedicated processor subsystem for handling real-time camera management. In at least one embodiment, processor(s) 1910 may further include a high-dynamic range signal processor that may include, without limitation, an image signal processor that is a hardware engine that is part of camera processing pipeline.

In at least one embodiment, processor(s) 1910 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1970, surround camera(s) 1974, and/or on in-cabin monitoring camera sensor(s). In at least one embodiment, in-cabin monitoring camera sensor(s) are preferably monitored by a neural network running on another instance of SoC(s) 1904, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1908 are not required to continuously render new surfaces. In at least one embodiment, when GPU(s) 1908 are powered on and active doing 3D rendering, video image compositor may be used to offload GPU(s) 1908 to improve performance and responsiveness.

In at least one embodiment, one or more of SoC(s) 1904 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1904 may further include an input/output controller(s) that may be controlled by software and may be used for receiving I/O signals that are uncommitted to a specific role.

In at least one embodiment, one or more of SoC(s) 1904 may further include a broad range of peripheral interfaces to enable communication with peripherals, audio encoders/decoders ("codecs"), power management, and/or other devices. SoC(s) 1904 may be used to process data from cameras (e.g., connected over Gigabit Multimedia Serial Link and Ethernet), sensors (e.g., LIDAR sensor(s) 1964, RADAR sensor(s) 1960, etc. that may be connected over Ethernet), data from bus 1902 (e.g., speed of vehicle 1900, steering wheel position, etc.), data from GNSS sensor(s) 1958 (e.g., connected over Ethernet or CAN bus), etc. In at least one embodiment, one or more of SoC(s) 1904 may further include dedicated high-performance mass storage controllers that may include their own DMA engines, and that may be used to free CPU(s) 1906 from routine data management tasks.

In at least one embodiment, SoC(s) 1904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1904 may be faster, more reliable, and even more energy-efficient and space-efficient than conventional systems. For example, in at least one embodiment, accelerator(s) 1914, when combined with CPU(s) 1906, GPU(s) 1908, and data store(s) 1916, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1920) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1908.

In at least one embodiment, a CNN for facial recognition and vehicle owner identification may use data from camera sensors to identify presence of an authorized driver and/or owner of vehicle 1900. In at least one embodiment, an always on sensor processing engine may be used to unlock vehicle when owner approaches driver door and turn on lights, and, in security mode, to disable vehicle when owner leaves vehicle. In this way, SoC(s) 1904 provide for security against theft and/or carjacking.

In at least one embodiment, a CNN for emergency vehicle detection and identification may use data from microphones 1996 to detect and identify emergency vehicle sirens. In at least one embodiment, SoC(s) 1904 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1958. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1962, until emergency vehicle(s) passes.

In at least one embodiment, vehicle 1900 may include CPU(s) 1918 (e.g., discrete CPU(s), or dCPU(s)), that may be coupled to SoC(s) 1904 via a high-speed interconnect (e.g., PCIe). In at least one embodiment, CPU(s) 1918 may include an X86 processor, for example. CPU(s) 1918 may be used to perform any of a variety of functions, including arbitrating potentially inconsistent results between ADAS sensors and SoC(s) 1904, and/or monitoring status and health of controller(s) 1936 and/or an infotainment system on a chip ("infotainment SoC") 1930, for example.

In at least one embodiment, vehicle 1900 may include GPU(s) 1920 (e.g., discrete GPU(s), or dGPU(s)), that may be coupled to SoC(s) 1904 via a high-speed interconnect (e.g., NVIDIA's NVLINK). In at least one embodiment, GPU(s) 1920 may provide additional artificial intelligence functionality, such as by executing redundant and/or different neural networks, and may be used to train and/or update neural networks based at least in part on input (e.g., sensor data) from sensors of vehicle 1900.

In at least one embodiment, vehicle 1900 may further include network interface 1924 which may include, without limitation, wireless antenna(s) 1926 (e.g., one or more wireless antennas 1926 for different communication protocols, such as a cellular antenna, a Bluetooth antenna, etc.). In at least one embodiment, network interface 1924 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 190 and other vehicle and/or an indirect link may be established (e.g., across networks and over Internet). In at least one embodiment, direct links may be provided using a vehicle-to-vehicle communication link. A vehicle-to-vehicle communication link may provide vehicle 1900 information about vehicles in proximity to vehicle 1900 (e.g., vehicles in front of, on side of, and/or behind vehicle 1900). In at least one embodiment, aforementioned functionality may be part of a cooperative adaptive cruise control functionality of vehicle 1900.

In at least one embodiment, network interface 1924 may include an SoC that provides modulation and demodulation functionality and enables controller(s) 1936 to communicate over wireless networks. In at least one embodiment, network interface 1924 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA 2000, Bluetooth, Bluetooth LE, Wi-Fi, Z-Wave, ZigBee, LoRaWAN, and/or other wireless protocols.

In at least one embodiment, vehicle 1900 may further include data store(s) 1928 which may include, without limitation, off-chip (e.g., off SoC(s) 1904) storage. In at least one embodiment, data store(s) 1928 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1900 may further include GNSS sensor(s) 1958 (e.g., GPS and/or assisted GPS sensors), to assist in mapping, perception, occupancy grid generation, and/or path planning functions. In at least one embodiment, any number of GNSS sensor(s) 1958 may be used, including, for example and without limitation, a GPS using a USB connector with an Ethernet to Serial (e.g., RS-232) bridge.

In at least one embodiment, vehicle 1900 may further include RADAR sensor(s) 1960. RADAR sensor(s) 1960 may be used by vehicle 1900 for long-range vehicle detection, even in darkness and/or severe weather conditions. In at least one embodiment, RADAR functional safety levels may be ASIL B. RADAR sensor(s) 1960 may use CAN and/or bus 1902 (e.g., to transmit data generated by RADAR sensor(s) 1960) for control and to access object tracking data, with access to Ethernet to access raw data in some examples. In at least one embodiment, wide variety of RADAR sensor types may be used. For example, and without limitation, RADAR sensor(s) 1960 may be suitable for front, rear, and side RADAR use. In at least one embodiment, one or more of RADAR sensors(s) 1960 are Pulse Doppler RADAR sensor(s).

In at least one embodiment, RADAR sensor(s) 1960 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1960 may help in distinguishing between static and moving objects, and may be used by ADAS system 1938 for emergency brake assist and forward collision warning. Sensors 1960(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1900's surroundings at higher speeds with minimal interference from traffic in adjacent lanes. In at least one embodiment, other two antennae may expand field of view, making it possible to quickly detect vehicles entering or leaving vehicle 1900's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1960 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1938 for blind spot detection and/or lane change assist.

In at least one embodiment, vehicle 1900 may further include ultrasonic sensor(s) 1962. Ultrasonic sensor(s) 1962, which may be positioned at front, back, and/or sides of vehicle 1900, may be used for park assist and/or to create and update an occupancy grid. In at least one embodiment, a wide variety of ultrasonic sensor(s) 1962 may be used, and different ultrasonic sensor(s) 1962 may be used for different ranges of detection (e.g., 2.5 m, 4 m). In at least one embodiment, ultrasonic sensor(s) 1962 may operate at functional safety levels of ASIL B.

In at least one embodiment, vehicle 1900 may include LIDAR sensor(s) 1964. LIDAR sensor(s) 1964 may be used for object and pedestrian detection, emergency braking, collision avoidance, and/or other functions. In at least one embodiment, LIDAR sensor(s) 1964 may be functional safety level ASIL B. In at least one embodiment, vehicle 1900 may include multiple LIDAR sensors 1964 (e.g., two, four, six, etc.) that may use Ethernet (e.g., to provide data to a Gigabit Ethernet switch).

In at least one embodiment, LIDAR sensor(s) 1964 may be capable of providing a list of objects and their distances for a 360-degree field of view. In at least one embodiment, commercially available LIDAR sensor(s) 1964 may have an advertised range of approximately 100 m, with an accuracy of 2 cm-3 cm, and with support for a 100 Mbps Ethernet connection, for example. In at least one embodiment, one or more non-protruding LIDAR sensors 1964 may be used. In such an embodiment, LIDAR sensor(s) 1964 may be implemented as a small device that may be embedded into front, rear, sides, and/or corners of vehicle 1900. In at least one embodiment, LIDAR sensor(s) 1964, in such an embodiment, may provide up to a 120-degree horizontal and 35-degree vertical field-of-view, with a 200 m range even for low-reflectivity objects. In at least one embodiment, front-mounted LIDAR sensor(s) 1964 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1900 up to approximately 200 m. In at least one embodiment, a flash LIDAR unit includes, without limitation, a receptor, which records laser pulse transit time and reflected light on each pixel, which in turn corresponds to range from vehicle 1900 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1900. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1966. In at least one embodiment, IMU sensor(s) 1966 may be located at a center of rear axle of vehicle 1900, in at least one embodiment. In at least one embodiment, IMU sensor(s) 1966 may include, for example and without limitation, accelerometer(s), magnetometer(s), gyroscope(s), magnetic compass(es), and/or other sensor types. In at least one embodiment, such as in six-axis applications, IMU sensor(s) 1966 may include, without limitation, accelerometers and gyroscopes. In at least one embodiment, such as in nine-axis applications, IMU sensor(s) 1966 may include, without limitation, accelerometers, gyroscopes, and magnetometers.

In at least one embodiment, IMU sensor(s) 1966 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1966 may enable vehicle 1900 to estimate heading without requiring input from a magnetic sensor by directly observing and correlating changes in velocity from GPS to IMU sensor(s) 1966. In at least one embodiment, IMU sensor(s) 1966 and GNSS sensor(s) 1958 may be combined in a single integrated unit.

In at least one embodiment, vehicle 1900 may include microphone(s) 1996 placed in and/or around vehicle 1900. In at least one embodiment, microphone(s) 1996 may be used for emergency vehicle detection and identification, among other things.

In at least one embodiment, vehicle 1900 may further include any number of camera types, including stereo camera(s) 1968, wide-view camera(s) 1970, infrared camera(s) 1972, surround camera(s) 1974, long-range camera(s) 1998, mid-range camera(s) 1976, and/or other camera types. In at least one embodiment, cameras may be used to capture image data around an entire periphery of vehicle 1900. In at least one embodiment, types of cameras used depends on vehicle 1900. In at least one embodiment, any combination of camera types may be used to provide necessary coverage around vehicle 1900. In at least one embodiment, number of cameras may differ depending on embodiment. For example, in at least one embodiment, vehicle 1900 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 19A and FIG. 19B.

In at least one embodiment, vehicle 1900 may further include vibration sensor(s) 1942. In at least one embodiment, vibration sensor(s) 1942 may measure vibrations of components of vehicle 1900, such as axle(s). For example, in at least one embodiment, changes in vibrations may indicate a change in road surfaces. In at least one embodiment, when two or more vibration sensors 1942 are used, differences between vibrations may be used to determine friction or slippage of road surface (e.g., when difference in vibration is between a power-driven axle and a freely rotating axle).

In at least one embodiment, vehicle 1900 may include ADAS system 1938. ADAS system 1938 may include, without limitation, an SoC, in some examples. In at least one embodiment, ADAS system 1938 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1960, LIDAR sensor(s) 1964, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1900 and automatically adjust speed of vehicle 1900 to maintain a safe distance from vehicles ahead. In at least one embodiment, lateral ACC system performs distance keeping, and advises vehicle 1900 to change lanes when necessary. In at least one embodiment, lateral ACC is related to other ADAS applications such as LC and CW.

In at least one embodiment, CACC system uses information from other vehicles that may be received via network interface 1924 and/or wireless antenna(s) 1926 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1900), while I2V communication concept provides information about traffic further ahead. In at least one embodiment, CACC system may include either or both I2V and V2V information sources. In at least one embodiment, given information of vehicles ahead of vehicle 1900, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1960, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1960, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1900 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1900 if vehicle 1900 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1960, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1900 is backing up. In at least one embodiment, RCTW system includes AEB system to ensure that vehicle brakes are applied to avoid a crash. In at least one embodiment, RCTW system may use one or more rear-facing RADAR sensor(s) 1960, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1900 itself decides, in case of conflicting results, whether to heed result from a primary computer or a secondary computer (e.g., first controller 1936 or second controller 1936). For example, in at least one embodiment, ADAS system 1938 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1938 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1904.

In at least one embodiment, ADAS system 1938 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1938 may be fed into primary computer's perception block and/or primary computer's dynamic driving task block. For example, in at least one embodiment, if ADAS system 1938 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1900 may further include infotainment SoC 1930 (e.g., an in-vehicle infotainment system (IVI)). Although illustrated and described as an SoC, infotainment system 1930, in at least one embodiment, may not be an SoC, and may include, without limitation, two or more discrete components. In at least one embodiment, infotainment SoC 1930 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1900. For example, infotainment SoC 1930 could include radios, disk players, navigation systems, video players, USB and Bluetooth connectivity, carputers, in-car entertainment, WiFi, steering wheel audio controls, hands free voice control, a heads-up display ("HUD"), HMI display 1934, a telematics device, a control panel (e.g., for controlling and/or interacting with various components, features, and/or systems), and/or other components. In at least one embodiment, infotainment SoC 1930 may further be used to provide information (e.g., visual and/or audible) to user(s) of vehicle, such as information from ADAS system 1938, autonomous driving information such as planned vehicle maneuvers, trajectories, surrounding environment information (e.g., intersection information, vehicle information, road information, etc.), and/or other information.

In at least one embodiment, infotainment SoC 1930 may include any amount and type of GPU functionality. In at least one embodiment, infotainment SoC 1930 may communicate over bus 1902 (e.g., CAN bus, Ethernet, etc.) with other devices, systems, and/or components of vehicle 1900. In at least one embodiment, infotainment SoC 1930 may be coupled to a supervisory MCU such that GPU of infotainment system may perform some self-driving functions in event that primary controller(s) 1936 (e.g., primary and/or backup computers of vehicle 1900) fail. In at least one embodiment, infotainment SoC 1930 may put vehicle 1900 into a chauffeur to safe stop mode, as described herein.

In at least one embodiment, vehicle 1900 may further include instrument cluster 1932 (e.g., a digital dash, an electronic instrument cluster, a digital instrument panel, etc.). In at least one embodiment, instrument cluster 1932 may include, without limitation, a controller and/or supercomputer (e.g., a discrete controller or supercomputer). In at least one embodiment, instrument cluster 1932 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1930 and instrument cluster 1932. In at least one embodiment, instrument cluster 1932 may be included as part of infotainment SoC 1930, or vice versa.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 19C for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 19D:
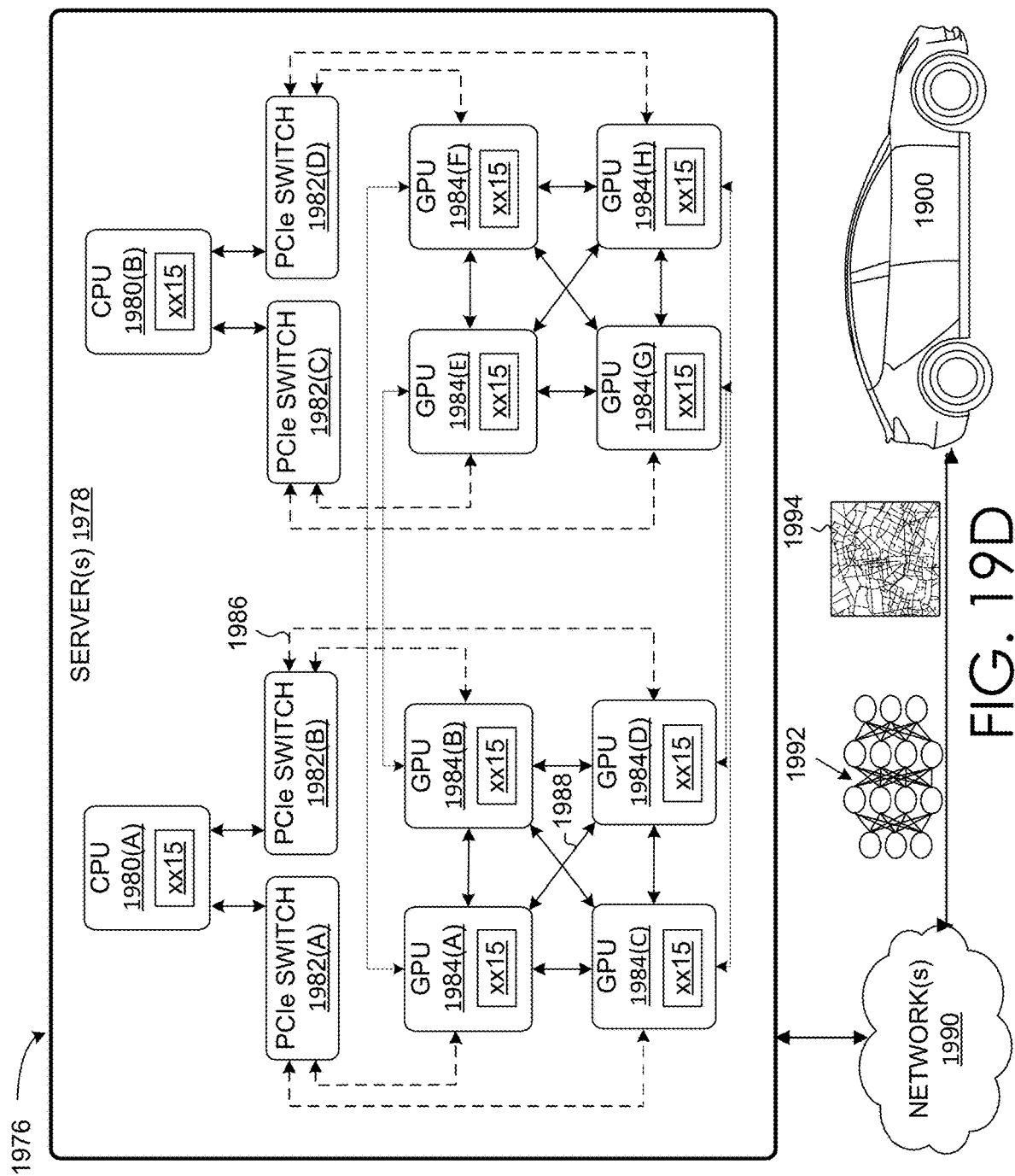
FIG. 19D illustrates a system for communication between cloud-based server(s) and the autonomous vehicle of FIG. 19A, according to at least one embodiment.

FIG. 19D is a diagram of a system 1976 for communication between cloud-based server(s) and autonomous vehicle 1900 of FIG. 19A, according to at least one embodiment. In at least one embodiment, system 1976 may include, without limitation, server(s) 1978, network(s) 1990, and any number and type of vehicles, including vehicle 1900. In at least one embodiment, server(s) 1978 may include, without limitation, a plurality of GPUs 1984(A)-1984(H) (collectively referred to herein as GPUs 1984), PCIe switches 1982(A)-1982(D) (collectively referred to herein as PCIe switches 1982), and/or CPUs 1980(A)-1980(B) (collectively referred to herein as CPUs 1980). GPUs 1984, CPUs 1980, and PCIe switches 1982 may be interconnected with high-speed interconnects such as, for example and without limitation, NVLink interfaces 1988 developed by NVIDIA and/or PCIe connections 1986. In at least one embodiment, GPUs 1984 are connected via an NVLink and/or NVSwitch SoC and GPUs 1984 and PCIe switches 1982 are connected via PCIe interconnects. In at least one embodiment, although eight GPUs 1984, two CPUs 1980, and four PCIe switches 1982 are illustrated, this is not intended to be limiting. In at least one embodiment, each of server(s) 1978 may include, without limitation, any number of GPUs 1984, CPUs 1980, and/or PCIe switches 1982, in any combination. For example, in at least one embodiment, server(s) 1978 could each include eight, sixteen, thirty-two, and/or more GPUs 1984.

In at least one embodiment, server(s) 1978 may receive, over network(s) 1990 and from vehicles, image data representative of images showing unexpected or changed road conditions, such as recently commenced road-work. In at least one embodiment, server(s) 1978 may transmit, over network(s) 1990 and to vehicles, neural networks 1992, updated neural networks 1992, and/or map information 1994, including, without limitation, information regarding traffic and road conditions. In at least one embodiment, updates to map information 1994 may include, without limitation, updates for HD map 1922, such as information regarding construction sites, potholes, detours, flooding, and/or other obstructions. In at least one embodiment, neural networks 1992, updated neural networks 1992, and/or map information 1994 may have resulted from new training and/or experiences represented in data received from any number of vehicles in environment, and/or based at least in part on training performed at a data center (e.g., using server(s) 1978 and/or other servers).

In at least one embodiment, server(s) 1978 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1990, and/or machine learning models may be used by server(s) 1978 to remotely monitor vehicles.

In at least one embodiment, server(s) 1978 may receive data from vehicles and apply data to up-to-date real-time neural networks for real-time intelligent inferencing. In at least one embodiment, server(s) 1978 may include deep-learning supercomputers and/or dedicated AI computers powered by GPU(s) 1984, such as a DGX and DGX Station machines developed by NVIDIA. However, in at least one embodiment, server(s) 1978 may include deep learning infrastructure that use CPU-powered data centers.

In at least one embodiment, deep-learning infrastructure of server(s) 1978 may be capable of fast, real-time inferencing, and may use that capability to evaluate and verify health of processors, software, and/or associated hardware in vehicle 1900. For example, in at least one embodiment, deep-learning infrastructure may receive periodic updates from vehicle 1900, such as a sequence of images and/or objects that vehicle 1900 has located in that sequence of images (e.g., via computer vision and/or other machine learning object classification techniques). In at least one embodiment, deep-learning infrastructure may run its own neural network to identify objects and compare them with objects identified by vehicle 1900 and, if results do not match and deep-learning infrastructure concludes that AI in vehicle 1900 is malfunctioning, then server(s) 1978 may transmit a signal to vehicle 1900 instructing a fail-safe computer of vehicle 1900 to assume control, notify passengers, and complete a safe parking maneuver.

In at least one embodiment, server(s) 1978 may include GPU(s) 1984 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 1715 are used to perform one or more embodiments. Details regarding inference and/or training logic 1715 are provided below in conjunction with FIGS. 17A and/or 17B.

Computer Systems

Figure 20:
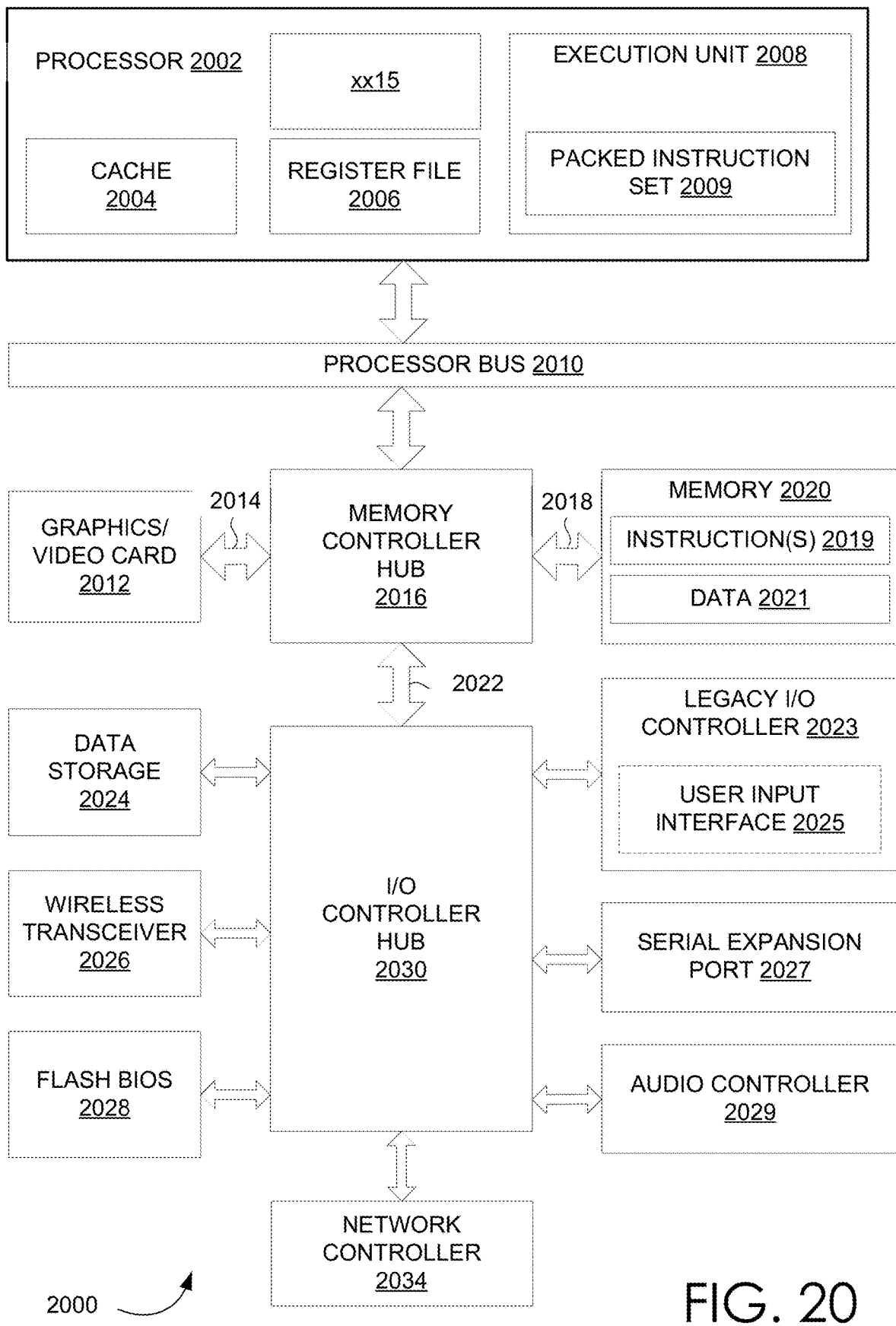
FIG. 20 illustrates a computer system, according to at least one embodiment.

FIG. 20 is a block diagram illustrating an exemplary computer system, which may be a system with interconnected devices and components, a system-on-a-chip (SOC) or some combination thereof 2000 formed with a processor that may include execution units to execute an instruction, according to at least one embodiment. In at least one embodiment, computer system 2000 may include, without limitation, a component, such as a processor 2002 to employ execution units including logic to perform algorithms for process data, in accordance with present disclosure, such as in embodiment described herein. In at least one embodiment, computer system 2000 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 2000 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2000 may include, without limitation, processor 2002 that may include, without limitation, one or more execution units 2008 to perform machine learning model training and/or inferencing according to techniques described herein. In at least one embodiment, computer system 2000 is a single processor desktop or server system, but in another embodiment computer system 2000 may be a multiprocessor system. In at least one embodiment, processor 2002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2002 may be coupled to a processor bus 2010 that may transmit data signals between processor 2002 and other components in computer system 2000.

In at least one embodiment, processor 2002 may include, without limitation, a Level 1 ("L1") internal cache memory ("cache") 2004. In at least one embodiment, processor 2002 may have a single internal cache or multiple levels of internal cache. In at least one embodiment, cache memory may reside external to processor 2002. Other embodiments may also include a combination of both internal and external caches depending on particular implementation and needs. In at least one embodiment, register file 2006 may store different types of data in various registers including, without limitation, integer registers, floating point registers, status registers, and instruction pointer register.

In at least one embodiment, execution unit 2008, including, without limitation, logic to perform integer and floating point operations, also resides in processor 2002. In at least one embodiment, processor 2002 may also include a microcode ("ucode") read only memory ("ROM") that stores microcode for certain macro instructions. In at least one embodiment, execution unit 2008 may include logic to handle a packed instruction set 2009. In at least one embodiment, by including packed instruction set 2009 in an instruction set of a general-purpose processor 2002, along with associated circuitry to execute instructions, operations used by many multimedia applications may be performed using packed data in a general-purpose processor 2002. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 2008 may also be used in microcontrollers, embedded processors, graphics devices, DSPs, and other types of logic circuits. In at least one embodiment, computer system 2000 may include, without limitation, a memory 2020. In at least one embodiment, memory 2020 may be implemented as a Dynamic Random Access Memory ("DRAM") device, a Static Random Access Memory ("SRAM") device, flash memory device, or other memory device. In at least one embodiment, memory 2020 may store instruction(s) 2019 and/or data 2021 represented by data signals that may be executed by processor 2002.

In at least one embodiment, system logic chip may be coupled to processor bus 2010 and memory 2020. In at least one embodiment, system logic chip may include, without limitation, a memory controller hub ("MCH") 2016, and processor 2002 may communicate with MCH 2016 via processor bus 2010. In at least one embodiment, MCH 2016 may provide a high bandwidth memory path 2018 to memory 2020 for instruction and data storage and for storage of graphics commands, data and textures. In at least one embodiment, MCH 2016 may direct data signals between processor 2002, memory 2020, and other components in computer system 2000 and to bridge data signals between processor bus 2010, memory 2020, and a system I/O 2022. In at least one embodiment, system logic chip may provide a graphics port for coupling to a graphics controller. In at least one embodiment, MCH 2016 may be coupled to memory 2020 through a high bandwidth memory path 2018 and graphics/video card 2012 may be coupled to MCH 2016 through an Accelerated Graphics Port ("AGP") interconnect 2014.

In at least one embodiment, computer system 2000 may use system I/O 2022 that is a proprietary hub interface bus to couple MCH 2016 to I/O controller hub ("ICH") 2030. In at least one embodiment, ICH 2030 may provide direct connections to some I/O devices via a local I/O bus. In at least one embodiment, local I/O bus may include, without limitation, a high-speed I/O bus for connecting peripherals to memory 2020, chipset, and processor 2002. Examples may include, without limitation, an audio controller 2029, a firmware hub ("flash BIOS") 2028, a wireless transceiver 2026, a data storage 2024, a legacy I/O controller 2023 containing user input and keyboard interfaces 2025, a serial expansion port 2027, such as Universal Serial Bus ("USB"), and a network controller 2034. data storage 2024 may comprise a hard disk drive, a floppy disk drive, a CD-ROM device, a flash memory device, or other mass storage device.

In at least one embodiment, FIG. 20 illustrates a system, which includes interconnected hardware devices or "chips", whereas in other embodiments, FIG. 20 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 2000 are interconnected using compute express link (CXL) interconnects.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 20 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 21:
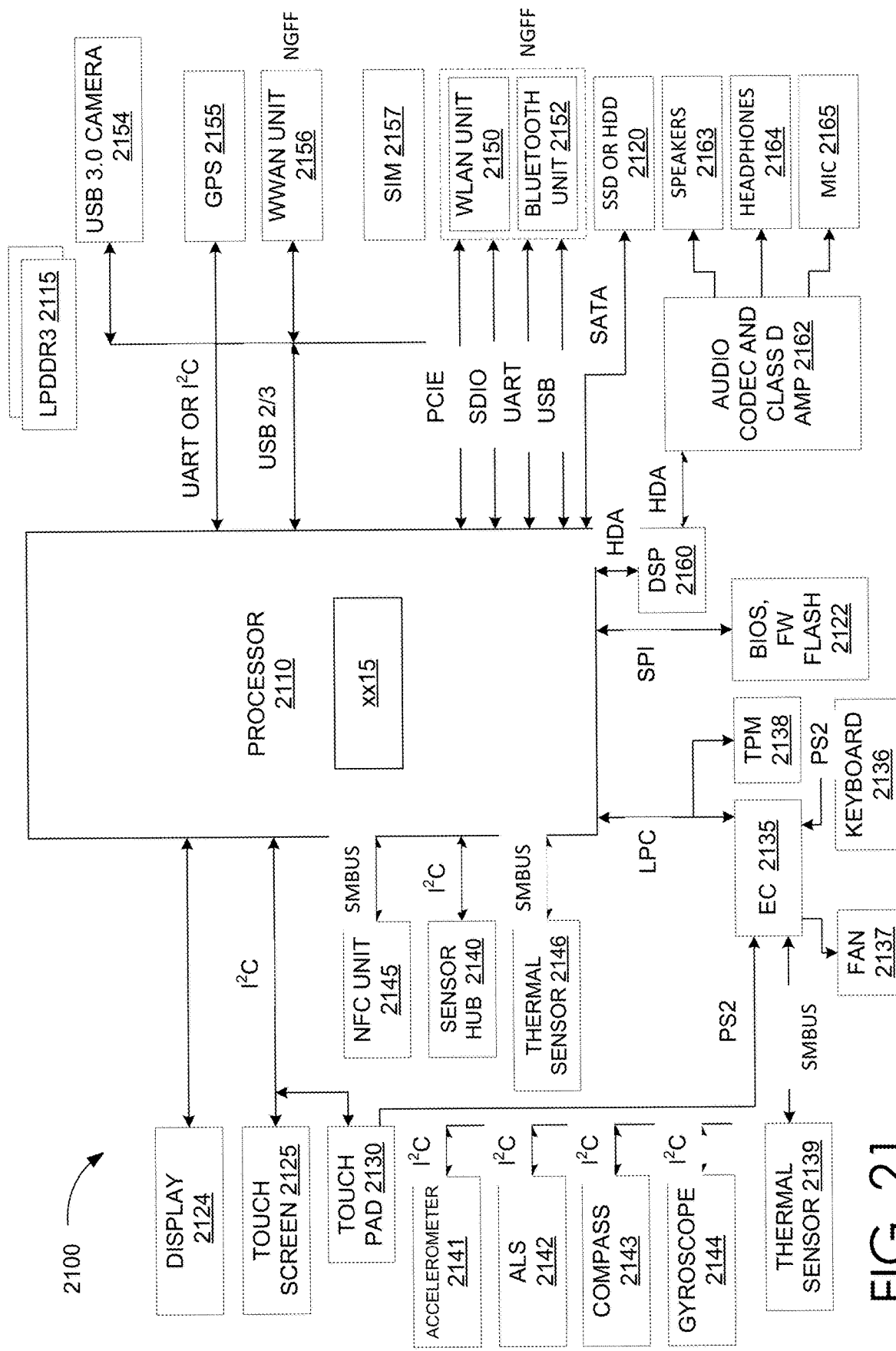
FIG. 21 illustrates a computer system, according to at least one embodiment.

FIG. 21 is a block diagram illustrating an electronic device 2100 for utilizing a processor 2110, according to at least one embodiment. In at least one embodiment, electronic device 2100 may be, for example and without limitation, a notebook, a tower server, a rack server, a blade server, a laptop, a desktop, a tablet, a mobile device, a phone, an embedded computer, or any other suitable electronic device.

In at least one embodiment, system 2100 may include, without limitation, processor 2110 communicatively coupled to any suitable number or kind of components, peripherals, modules, or devices. In at least one embodiment, processor 2110 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 21 illustrates a system, which includes interconnected hardware devices or "chips", whereas in other embodiments, FIG. 21 may illustrate an exemplary System on a Chip ("SoC"). In at least one embodiment, devices illustrated in FIG. 21 may be interconnected with proprietary interconnects, standardized interconnects (e.g., PCIe) or some combination thereof. In at least one embodiment, one or more components of FIG. 21 are interconnected using compute express link (CXL) interconnects.

In at least one embodiment, FIG. 21 may include a display 2124, a touch screen 2125, a touch pad 2130, a Near Field Communications unit ("NFC") 2145, a sensor hub 2140, a thermal sensor 2146, an Express Chipset ("EC") 2135, a Trusted Platform Module ("TPM") 2138, BIOS/firmware/flash memory ("BIOS, FW Flash") 2122, a DSP 2160, a drive 2120 such as a Solid State Disk ("SSD") or a Hard Disk Drive ("HDD"), a wireless local area network unit ("WLAN") 2150, a Bluetooth unit 2152, a Wireless Wide Area Network unit ("WWAN") 2156, a Global Positioning System (GPS) 2155, a camera ("USB 3.0 camera") 2154 such as a USB 3.0 camera, and/or a Low Power Double Data Rate ("LPDDR") memory unit ("LPDDR3") 2115 implemented in, for example, LPDDR3 standard. These components may each be implemented in any suitable manner.

In at least one embodiment, other components may be communicatively coupled to processor 2110 through components discussed above. In at least one embodiment, an accelerometer 2141, Ambient Light Sensor ("ALS") 2142, compass 2143, and a gyroscope 2144 may be communicatively coupled to sensor hub 2140. In at least one embodiment, thermal sensor 2139, a fan 2137, a keyboard 2146, and a touch pad 2130 may be communicatively coupled to EC 2135. In at least one embodiment, speaker 2163, headphones 2164, and microphone ("mic") 2165 may be communicatively coupled to an audio unit ("audio codec and class d amp") 2162, which may in turn be communicatively coupled to DSP 2160. In at least one embodiment, audio unit 2164 may include, for example and without limitation, an audio coder/decoder ("codec") and a class D amplifier. In at least one embodiment, SIM card ("SIM") 2157 may be communicatively coupled to WWAN unit 2156. In at least one embodiment, components such as WLAN unit 2150 and Bluetooth unit 2152, as well as WWAN unit 2156 may be implemented in a Next Generation Form Factor ("NGFF").

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 21 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 22:
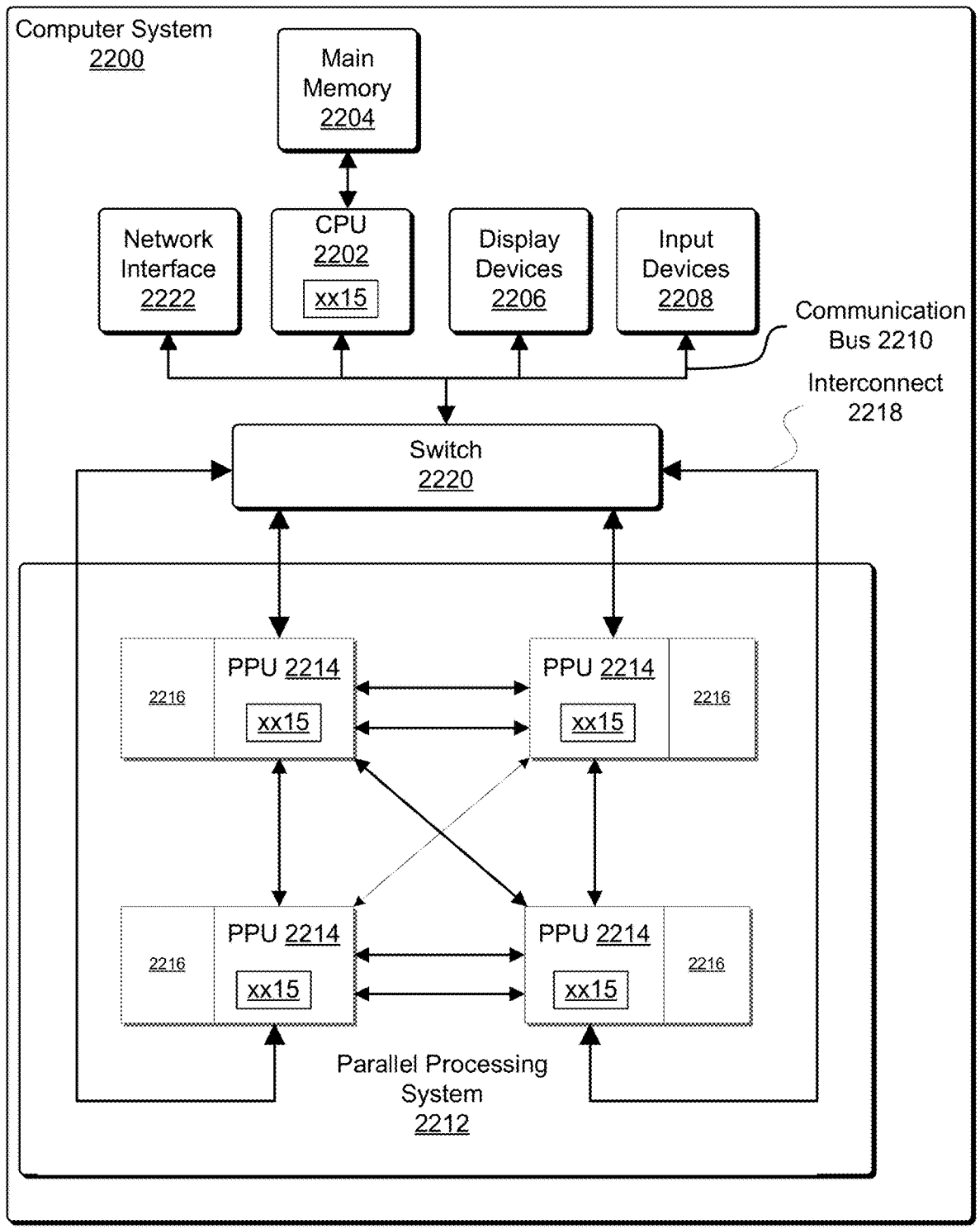
FIG. 22 illustrates a computer system, according to at least one embodiment.

FIG. 22 illustrates a computer system 2200, according to at least one embodiment. In at least one embodiment, computer system 2200 is configured to implement various processes and methods described throughout this disclosure.

In at least one embodiment, computer system 2200 comprises, without limitation, at least one central processing unit ("CPU") 2202 that is connected to a communication bus 2210 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2200 includes, without limitation, a main memory 2204 and control logic (e.g., implemented as hardware, software, or a combination thereof) and data are stored in main memory 2204 which may take form of random access memory ("RAM"). In at least one embodiment, a network interface subsystem ("network interface") 2222 provides an interface to other computing devices and networks for receiving data from and transmitting data to other systems from computer system 2200.

In at least one embodiment, computer system 2200, in at least one embodiment, includes, without limitation, input devices 2208, parallel processing system 2212, and display devices 2206 which can be implemented using a conventional cathode ray tube ("CRT"), liquid crystal display ("LCD"), light emitting diode ("LED"), plasma display, or other suitable display technologies. In at least one embodiment, user input is received from input devices 2208 such as keyboard, mouse, touchpad, microphone, and more. In at least one embodiment, each of foregoing modules can be situated on a single semiconductor platform to form a processing system.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 22 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

FIG. 23 illustrates a computer system 2300, according to at least one embodiment. In at least one embodiment, computer system 2300 includes, without limitation, a computer 2310 and a USB stick 2320. In at least one embodiment, computer 2310 may include, without limitation, any number and type of processor(s) (not shown) and a memory (not shown). In at least one embodiment, computer 2310 includes, without limitation, a server, a cloud instance, a laptop, and a desktop computer.

In at least one embodiment, USB stick 2320 includes, without limitation, a processing unit 2330, a USB interface 2340, and USB interface logic 2350. In at least one embodiment, processing unit 2330 may be any instruction execution system, apparatus, or device capable of executing instructions. In at least one embodiment, processing unit 2330 may include, without limitation, any number and type of processing cores (not shown). In at least one embodiment, processing core 2330 comprises an application specific integrated circuit ("ASIC") that is optimized to perform any amount and type of operations associated with machine learning. For instance, in at least one embodiment, processing core 2330 is a tensor processing unit ("TPC") that is optimized to perform machine learning inference operations. In at least one embodiment, processing core 2330 is a vision processing unit ("VPU") that is optimized to perform machine vision and machine learning inference operations.

In at least one embodiment, USB interface 2340 may be any type of USB connector or USB socket. For instance, in at least one embodiment, USB interface 2340 is a USB 3.0 Type-C socket for data and power. In at least one embodiment, USB interface 2340 is a USB 3.0 Type-A connector. In at least one embodiment, USB interface logic 2350 may include any amount and type of logic that enables processing unit 2330 to interface with or devices (e.g., computer 2310) via USB connector 2340.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 23 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 24A:
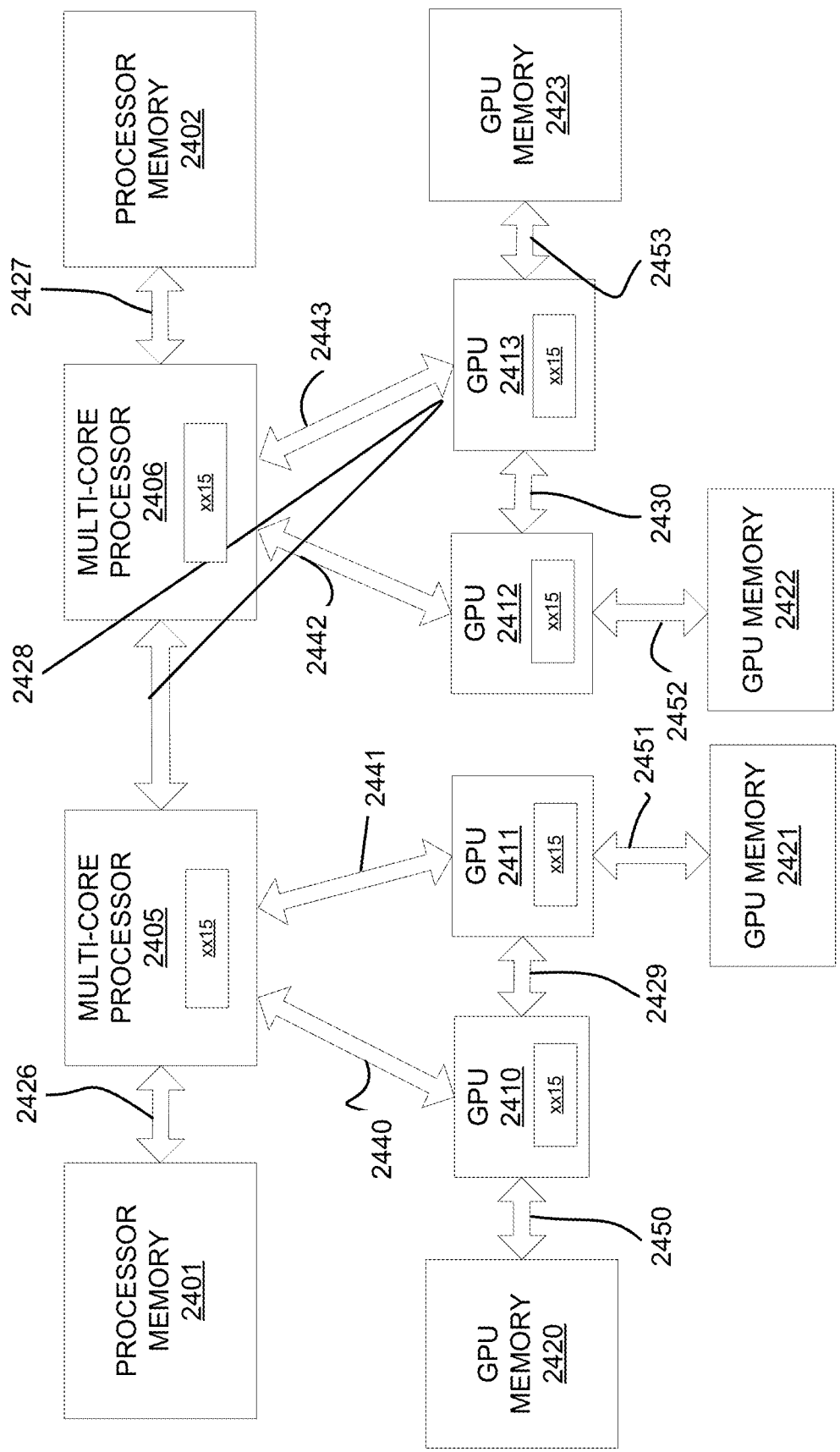
FIG. 24A illustrates a computer system, according to at least one embodiment.

FIG. 24A illustrates an exemplary architecture in which a plurality of GPUs 2410-2413 is communicatively coupled to a plurality of multi-core processors 2405-2406 over high-speed links 2440-2443 (e.g., buses, point-to-point interconnects, etc.). In one embodiment, high-speed links 2440-2443 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2410-2413 are interconnected over high-speed links 2429-2430, which may be implemented using same or different protocols/links than those used for high-speed links 2440-2443. Similarly, two or more of multi-core processors 2405-2406 may be connected over high speed link 2428 which may be symmetric multi-processor (SMP) buses operating at 20 GB/s, 30 GB/s, 120 GB/s or higher. Alternatively, all communication between various system components shown in FIG. 24A may be accomplished using same protocols/links (e.g., over a common interconnection fabric).

In one embodiment, each multi-core processor 2405-2406 is communicatively coupled to a processor memory 2401-2402, via memory interconnects 2426-2427, respectively, and each GPU 2410-2413 is communicatively coupled to GPU memory 2420-2423 over GPU memory interconnects 2450-2453, respectively. Memory interconnects 2426-2427 and 2450-2453 may utilize same or different memory access technologies. By way of example, and not limitation, processor memories 2401-2402 and GPU memories 2420-2423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2401-2402 may be volatile memory and another portion may be non-volatile memory (e.g., using a two-level memory (2LM) hierarchy).

As described below, although various processors 2405-2406 and GPUs 2410-2413 may be physically coupled to a particular memory 2401-2402, 2420-2423, respectively, a unified memory architecture may be implemented in which a same virtual system address space (also referred to as "effective address" space) is distributed among various physical memories. For example, processor memories 2401-2402 may each comprise 64 GB of system memory address space and GPU memories 2420-2423 may each comprise 32 GB of system memory address space (resulting in a total of 256 GB addressable memory in this example).

Figure 24B:
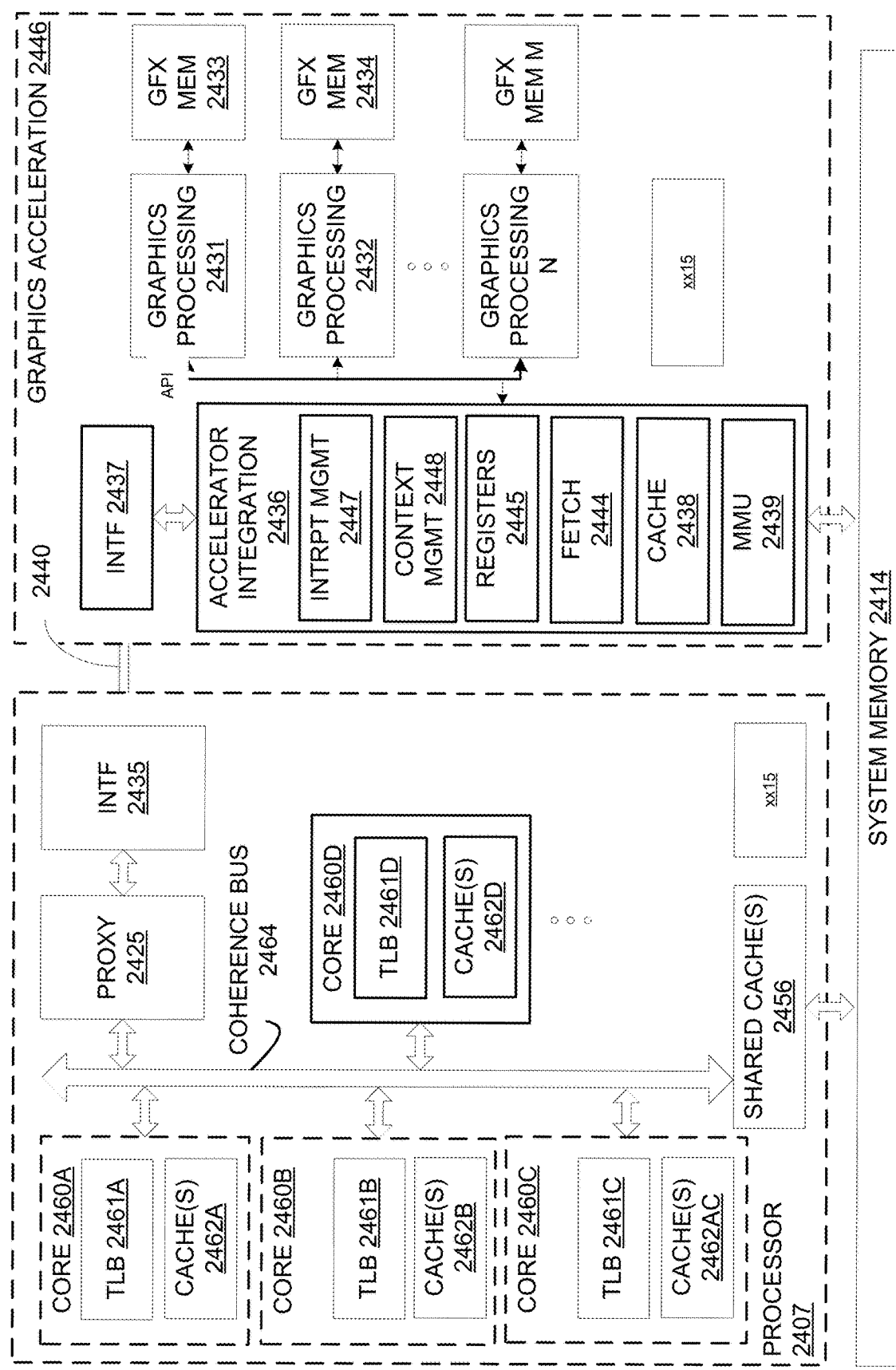
FIG. 24B illustrates a computer system, according to at least one embodiment.

FIG. 24B illustrates additional details for an interconnection between a multi-core processor 2407 and a graphics acceleration module 2446 in accordance with one exemplary embodiment. Graphics acceleration module 2446 may include one or more GPU chips integrated on a line card which is coupled to processor 2407 via high-speed link 2440. Alternatively, graphics acceleration module 2446 may be integrated on a same package or chip as processor 2407.

In at least one embodiment, illustrated processor 2407 includes a plurality of cores 2460A-2460D, each with a translation lookaside buffer 2461A-2461D and one or more caches 2462A-2462D. In at least one embodiment, cores 2460A-2460D may include various other components for executing instructions and processing data which are not illustrated. Caches 2462A-2462D may comprise level 1 (L1) and level 2 (L2) caches. In addition, one or more shared caches 2456 may be included in caches 2462A-2462D and shared by sets of cores 2460A-2460D. For example, one embodiment of processor 2407 includes 24 cores, each with its own L1 cache, twelve shared L2 caches, and twelve shared L3 caches. In this embodiment, one or more L2 and L3 caches are shared by two adjacent cores. Processor 2407 and graphics acceleration module 2446 connect with system memory 2414, which may include processor memories 2401-2402 of FIG. 24A.

Coherency is maintained for data and instructions stored in various caches 2462A-2462D, 2456 and system memory 2414 via inter-core communication over a coherence bus 2464. For example, each cache may have cache coherency logic/circuitry associated therewith to communicate to over coherence bus 2464 in response to detected reads or writes to particular cache lines. In one implementation, a cache snooping protocol is implemented over coherence bus 2464 to snoop cache accesses.

In one embodiment, a proxy circuit 2425 communicatively couples graphics acceleration module 2446 to coherence bus 2464, allowing graphics acceleration module 2446 to participate in a cache coherence protocol as a peer of cores 2460A-2460D. In particular, an interface 2435 provides connectivity to proxy circuit 2425 over high-speed link 2440 (e.g., a PCIe bus, NVLink, etc.) and an interface 2437 connects graphics acceleration module 2446 to link 2440.

In one implementation, an accelerator integration circuit 2436 provides cache management, memory access, context management, and interrupt management services on behalf of a plurality of graphics processing engines 2431, 2432, N of graphics acceleration module 2446. Graphics processing engines 2431, 2432, N may each comprise a separate graphics processing unit (GPU). Alternatively, graphics processing engines 2431, 2432, N may comprise different types of graphics processing engines within a GPU such as graphics execution units, media processing engines (e.g., video encoders/decoders), samplers, and blit engines. In at least one embodiment, graphics acceleration module 2446 may be a GPU with a plurality of graphics processing engines 2431-2432, N or graphics processing engines 2431-2432, N may be individual GPUs integrated on a common package, line card, or chip.

In one embodiment, accelerator integration circuit 2436 includes a memory management unit (MMU) 2439 for performing various memory management functions such as virtual-to-physical memory translations (also referred to as effective-to-real memory translations) and memory access protocols for accessing system memory 2414. MMU 2439 may also include a translation lookaside buffer (TLB) (not shown) for caching virtual/effective to physical/real address translations. In one implementation, a cache 2438 stores commands and data for efficient access by graphics processing engines 2431-2432, N. In one embodiment, data stored in cache 2438 and graphics memories 2433-2434, M is kept coherent with core caches 2462A-2462D, 2456, and system memory 2414. As mentioned above, this may be accomplished via proxy circuit 2425 on behalf of cache 2438 and memories 2433-2434, M (e.g., sending updates to cache 2438 related to modifications/accesses of cache lines on processor caches 2462A-2462D, 2456, and receiving updates from cache 2438).

A set of registers 2445 store context data for threads executed by graphics processing engines 2431-2432, N and a context management circuit 2448 manages thread contexts. For example, context management circuit 2448 may perform save and restore operations to save and restore contexts of various threads during contexts switches (e.g., where a first thread is saved and a second thread is stored so that a second thread can be executed by a graphics processing engine). For example, on a context switch, context management circuit 2448 may store current register values to a designated region in memory (e.g., identified by a context pointer). It may then restore register values when returning to a context. In one embodiment, an interrupt management circuit 2447 receives and processes interrupts received from system devices.

In one implementation, virtual/effective addresses from a graphics processing engine 2431 are translated to real/physical addresses in system memory 2414 by MMU 2439. One embodiment of accelerator integration circuit 2436 supports multiple (e.g., 4, 8, 16) graphics accelerator modules 2446 and/or other accelerator devices. Graphics accelerator module 2446 may be dedicated to a single application executed on processor 2407 or may be shared between multiple applications. In one embodiment, a virtualized graphics execution environment is presented in which resources of graphics processing engines 2431-2432, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2436 performs as a bridge to a system for graphics acceleration module 2446 and provides address translation and system memory cache services. In addition, accelerator integration circuit 2436 may provide virtualization facilities for a host processor to manage virtualization of graphics processing engines 2431-2432, N, interrupts, and memory management.

Because hardware resources of graphics processing engines 2431-2432, N are mapped explicitly to a real address space seen by host processor 2407, any host processor can address these resources directly using an effective address value. One function of accelerator integration circuit 2436, in one embodiment, is physical separation of graphics processing engines 2431-2432, N so that they appear to a system as independent units.

In at least one embodiment, one or more graphics memories 2433-2434, M are coupled to each of graphics processing engines 2431-2432, N, respectively. Graphics memories 2433-2434, M store instructions and data being processed by each of graphics processing engines 2431-2432, N. Graphics memories 2433-2434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2440, biasing techniques are used to ensure that data stored in graphics memories 2433-2434, M is data which will be used most frequently by graphics processing engines 2431-2432, N and preferably not used by cores 2460A-2460D (at least not frequently). Similarly, a biasing mechanism attempts to keep data needed by cores (and preferably not graphics processing engines 2431-2432, N) within caches 2462A-2462D, 2456 of cores and system memory 2414.

Figure 24C:
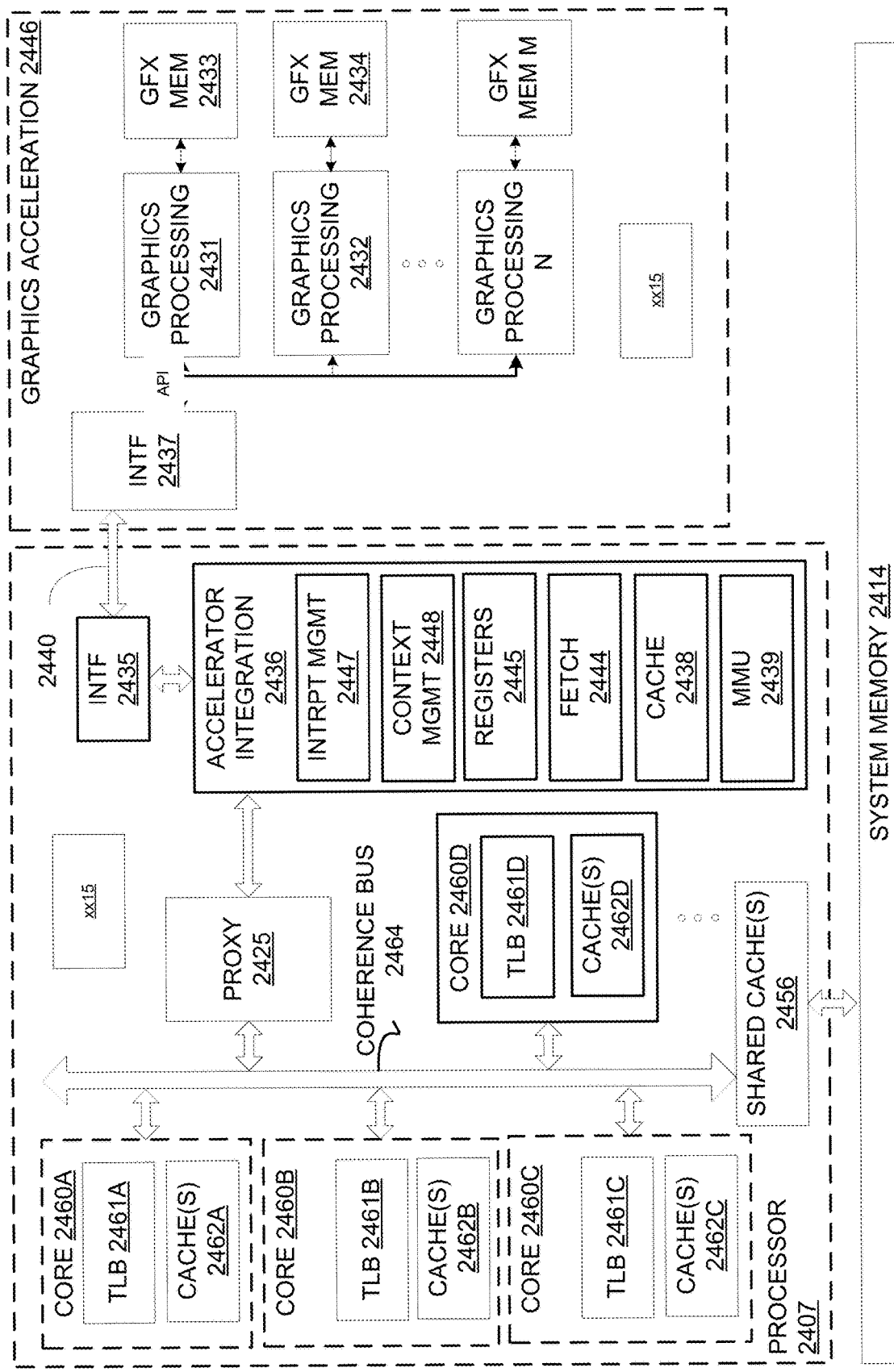
FIG. 24C illustrates a computer system, according to at least one embodiment.

FIG. 24C illustrates another exemplary embodiment in which accelerator integration circuit 2436 is integrated within processor 2407. In at least this embodiment, graphics processing engines 2431-2432, N communicate directly over high-speed link 2440 to accelerator integration circuit 2436 via interface 2437 and interface 2435 (which, again, may be utilize any form of bus or interface protocol). Accelerator integration circuit 2436 may perform same operations as those described with respect to FIG. 24B, but potentially at a higher throughput given its close proximity to coherence bus 2464 and caches 2462A-2462D, 2456. At least one embodiment supports different programming models including a dedicated-process programming model (no graphics acceleration module virtualization) and shared programming models (with virtualization), which may include programming models which are controlled by accelerator integration circuit 2436 and programming models which are controlled by graphics acceleration module 2446.

In at least one embodiment, graphics processing engines 2431-2432, N are dedicated to a single application or process under a single operating system. In at least one embodiment, a single application can funnel other application requests to graphics processing engines 2431-2432, N, providing virtualization within a VM/partition.

In at least one embodiment, graphics processing engines 2431-2432, N, may be shared by multiple VM/application partitions. In at least one embodiment, shared models may use a system hypervisor to virtualize graphics processing engines 2431-2432, N to allow access by each operating system. For single-partition systems without a hypervisor, graphics processing engines 2431-2432, N are owned by an operating system. In at least one embodiment, an operating system can virtualize graphics processing engines 2431-2432, N to provide access to each process or application.

In at least one embodiment, graphics acceleration module 2446 or an individual graphics processing engine 2431-2432, N selects a process element using a process handle. In at least one embodiment, process elements are stored in system memory 2414 and are addressable using an effective address to real address translation techniques described herein. In at least one embodiment, a process handle may be an implementation-specific value provided to a host process when registering its context with graphics processing engine 2431-2432, N (that is, calling system software to add a process element to a process element linked list). In at least one embodiment, a lower 16-bits of a process handle may be an offset of a process element within a process element linked list.

Figure 24D:
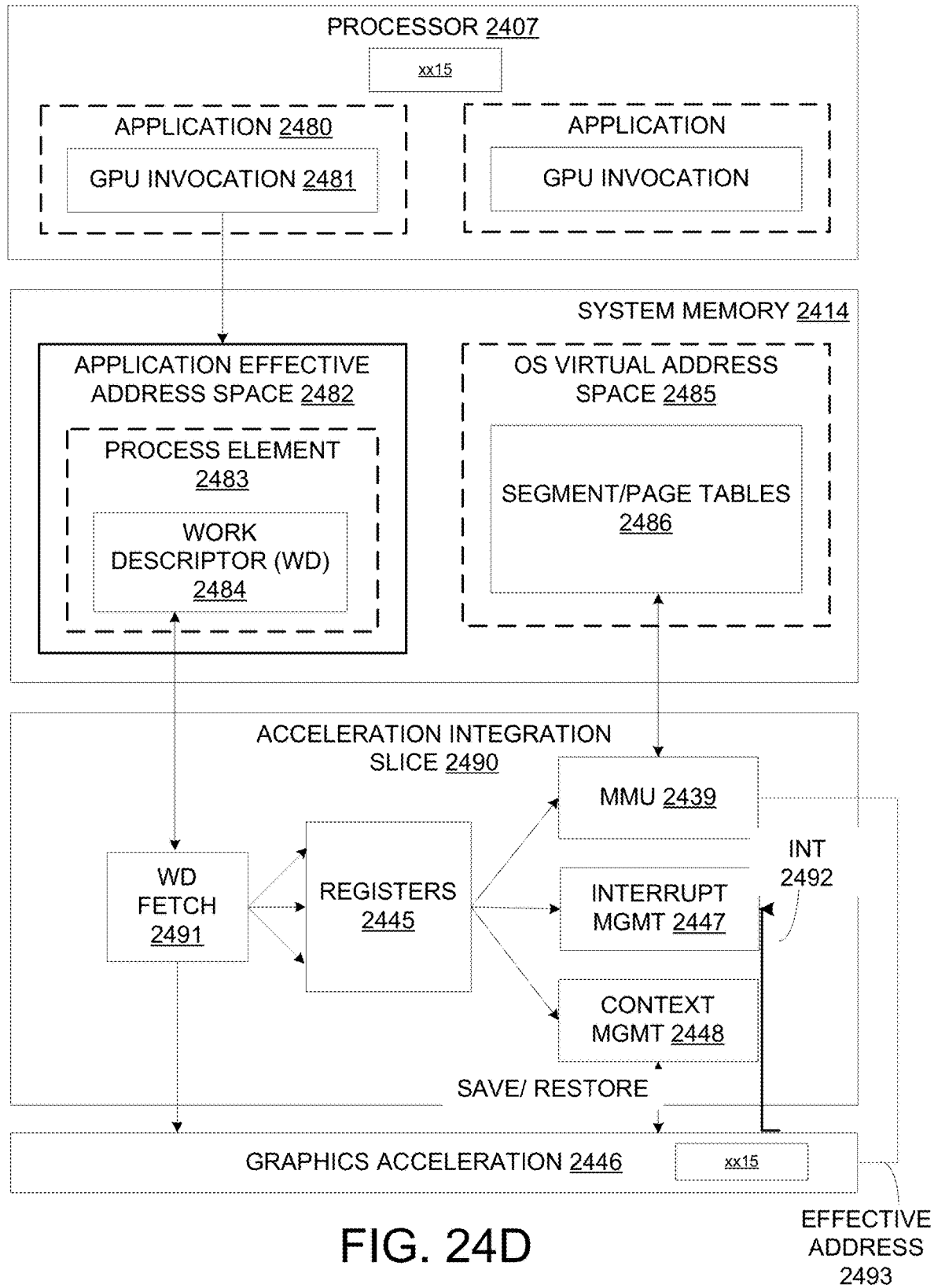
FIG. 24D illustrates a computer system, according to at least one embodiment.

FIG. 24D illustrates an exemplary accelerator integration slice 2490. As used herein, a "slice" comprises a specified portion of processing resources of accelerator integration circuit 2436. Application effective address space 2482 within system memory 2414 stores process elements 2483. In one embodiment, process elements 2483 are stored in response to GPU invocations 2481 from applications 2480 executed on processor 2407. A process element 2483 contains process state for corresponding application 2480. A work descriptor (WD) 2484 contained in process element 2483 can be a single job requested by an application or may contain a pointer to a queue of jobs. In at least one embodiment, WD 2484 is a pointer to a job request queue in an application's address space 2482.

Graphics acceleration module 2446 and/or individual graphics processing engines 2431-2432, N can be shared by all or a subset of processes in a system. In at least one embodiment, an infrastructure for setting up process state and sending a WD 2484 to a graphics acceleration module 2446 to start a job in a virtualized environment may be included.

In at least one embodiment, a dedicated-process programming model is implementation-specific. In this model, a single process owns graphics acceleration module 2446 or an individual graphics processing engine 2431. Because graphics acceleration module 2446 is owned by a single process, a hypervisor initializes accelerator integration circuit 2436 for an owning partition and an operating system initializes accelerator integration circuit 2436 for an owning process when graphics acceleration module 2446 is assigned.

In operation, a WD fetch unit 2491 in accelerator integration slice 2490 fetches next WD 2484 which includes an indication of work to be done by one or more graphics processing engines of graphics acceleration module 2446. Data from WD 2484 may be stored in registers 2445 and used by MMU 2439, interrupt management circuit 2447, and/or context management circuit 2448 as illustrated. For example, one embodiment of MMU 2439 includes segment/page walk circuitry for accessing segment/page tables 2486 within OS virtual address space 2485. Interrupt management circuit 2447 may process interrupt events 2492 received from graphics acceleration module 2446. When performing graphics operations, an effective address 2493 generated by a graphics processing engine 2431-2432, N is translated to a real address by MMU 2439.

In one embodiment, a same set of registers 2445 are duplicated for each graphics processing engine 2431-2432, N and/or graphics acceleration module 2446 and may be initialized by a hypervisor or operating system. Each of these duplicated registers may be included in an accelerator integration slice 2490. Exemplary registers that may be initialized by a hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by an operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 2484 is specific to a particular graphics acceleration module 2446 and/or graphics processing engines 2431-2432, N. It contains all information required by a graphics processing engine 2431-2432, N to do work or it can be a pointer to a memory location where an application has set up a command queue of work to be completed.

Figure 24E:
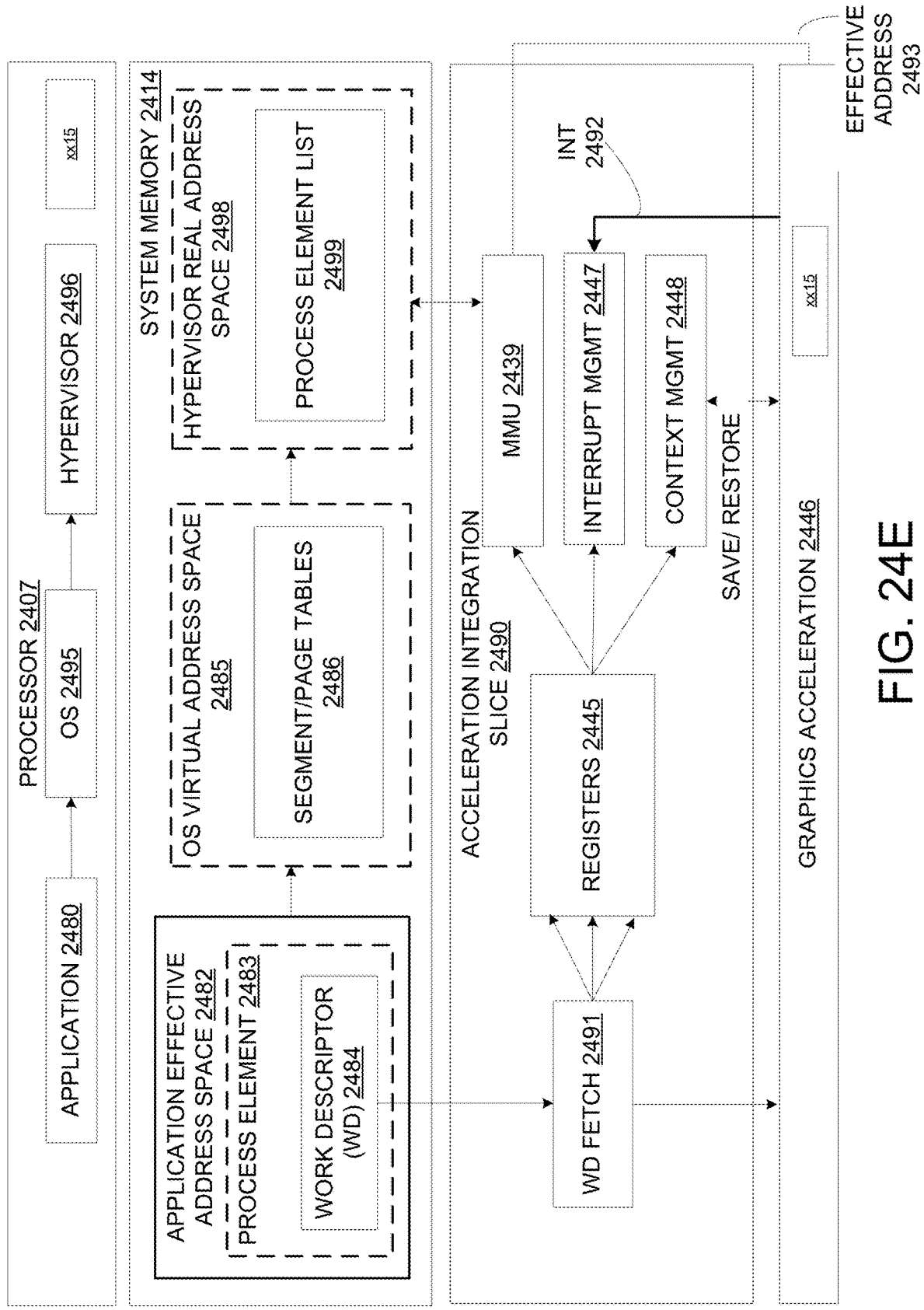
FIGS. 24E and 24F illustrate a shared programming model, according to at least one embodiment.

FIG. 24E illustrates additional details for one exemplary embodiment of a shared model. This embodiment includes a hypervisor real address space 2498 in which a process element list 2499 is stored. Hypervisor real address space 2498 is accessible via a hypervisor 2496 which virtualizes graphics acceleration module engines for operating system 2495.

In at least one embodiment, shared programming models allow for all or a subset of processes from all or a subset of partitions in a system to use a graphics acceleration module 2446. There are two programming models where graphics acceleration module 2446 is shared by multiple processes and partitions: time-sliced shared and graphics-directed shared.

In this model, system hypervisor 2496 owns graphics acceleration module 2446 and makes its function available to all operating systems 2495. For a graphics acceleration module 2446 to support virtualization by system hypervisor 2496, graphics acceleration module 2446 may adhere to the following: 1) An application's job request must be autonomous (that is, state does not need to be maintained between jobs), or graphics acceleration module 2446 must provide a context save and restore mechanism. 2) An application's job request is guaranteed by graphics acceleration module 2446 to complete in a specified amount of time, including any translation faults, or graphics acceleration module 2446 provides an ability to preempt processing of a job. 3) Graphics acceleration module 2446 must be guaranteed fairness between processes when operating in a directed shared programming model.

In at least one embodiment, application 2480 is required to make an operating system 2495 system call with a graphics acceleration module 2446 type, a work descriptor (WD), an authority mask register (AMR) value, and a context save/restore area pointer (CSRP). In at least one embodiment, graphics acceleration module 2446 type describes a targeted acceleration function for a system call. In at least one embodiment, graphics acceleration module 2446 type may be a system-specific value. In at least one embodiment, WD is formatted specifically for graphics acceleration module 2446 and can be in a form of a graphics acceleration module 2446 command, an effective address pointer to a user-defined structure, an effective address pointer to a queue of commands, or any other data structure to describe work to be done by graphics acceleration module 2446. In one embodiment, an AMR value is an AMR state to use for a current process. In at least one embodiment, a value passed to an operating system is similar to an application setting an AMR. If accelerator integration circuit 2436 and graphics acceleration module 2446 implementations do not support a User Authority Mask Override Register (UAMOR), an operating system may apply a current UAMOR value to an AMR value before passing an AMR in a hypervisor call. Hypervisor 2496 may optionally apply a current Authority Mask Override Register (AMOR) value before placing an AMR into process element 2483. In at least one embodiment, CSRP is one of registers 2445 containing an effective address of an area in an application's effective address space 2482 for graphics acceleration module 2446 to save and restore context state. This pointer is optional if no state is required to be saved between jobs or when a job is preempted. In at least one embodiment, context save/restore area may be pinned system memory.

Upon receiving a system call, operating system 2495 may verify that application 2480 has registered and been given authority to use graphics acceleration module 2446. Operating system 2495 then calls hypervisor 2496 with information shown in Table 3.

TABLE 3

-OS to Hypervisor Call Parameters

1 A work descriptor (WD)
2 An Authority Mask Register (AMR) value (potentially masked)
3 An effective address (EA) Context Save/Restore Area Pointer (CSRP)
4 A process ID (PID) and optional thread ID (TID)

TABLE 3-continued

-OS to Hypervisor Call Parameters

5  A virtual address (VA) accelerator utilization record pointer (AURP)
6  Virtual address of storage segment table pointer (SSTP)
7  A logical interrupt service number (LISN)

Upon receiving a hypervisor call, hypervisor 2496 verifies that operating system 2495 has registered and been given authority to use graphics acceleration module 2446. Hypervisor 2496 then puts process element 2483 into a process element linked list for a corresponding graphics acceleration module 2446 type. A process element may include information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  Virtual address of storage segment table pointer (SSTP)
7  A logical interrupt service number (LISN)
8  Interrupt vector table, derived from hypervisor call parameters
9  A state register (SR) value
10 A logical partition ID (LPID)
11 A real address (RA) hypervisor accelerator utilization record pointer
12 Storage Descriptor Register (SDR)

In at least one embodiment, hypervisor initializes a plurality of accelerator integration slice 2490 registers 2445.

Figure 24F:
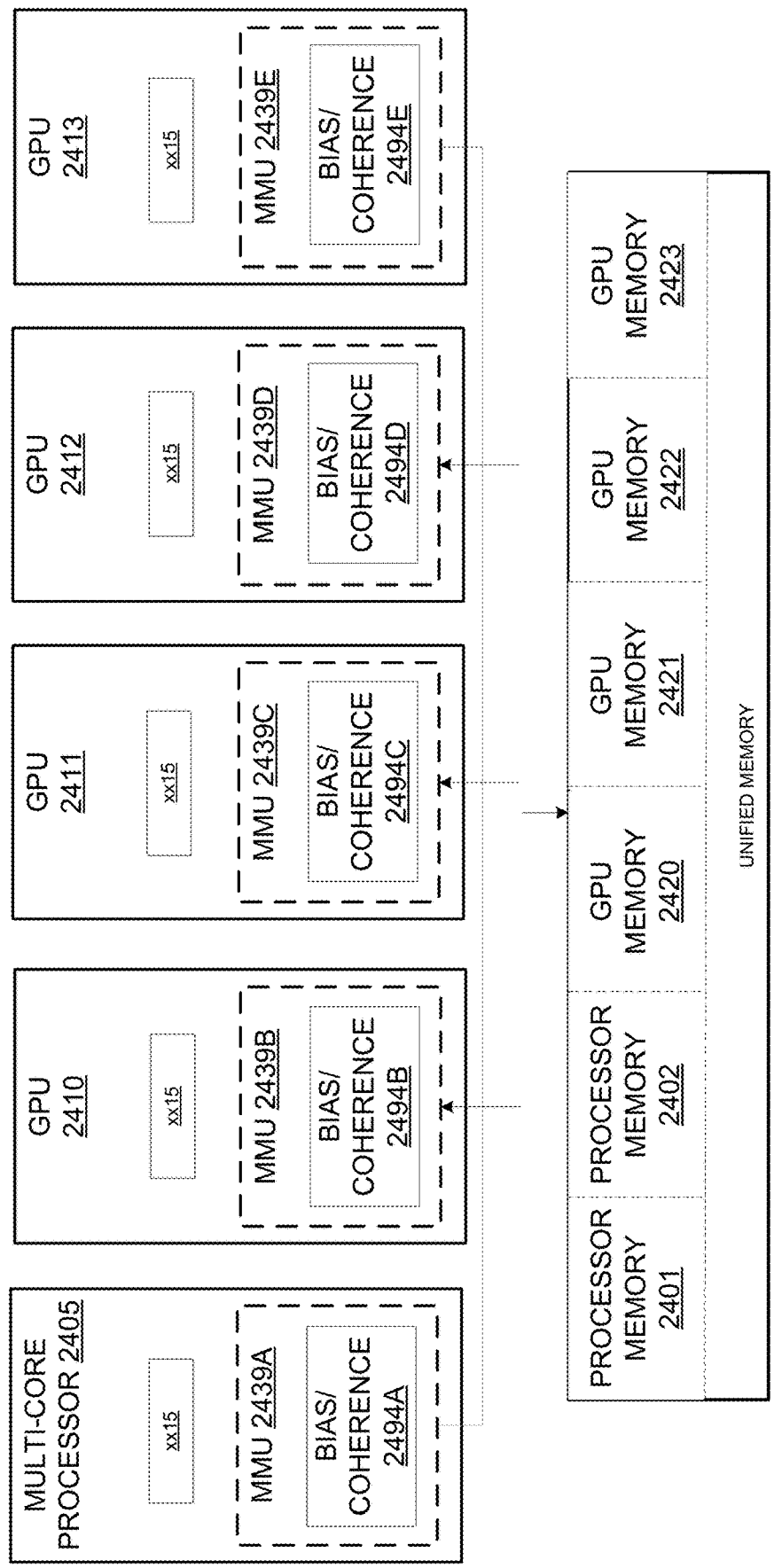

As illustrated in FIG. 24F, in at least one embodiment, a unified memory is used, addressable via a common virtual memory address space used to access physical processor memories 2401-2402 and GPU memories 2420-2423. In this implementation, operations executed on GPUs 2410-2413 utilize a same virtual/effective memory address space to access processor memories 2401-2402 and vice versa, thereby simplifying programmability. In one embodiment, a first portion of a virtual/effective address space is allocated to processor memory 2401, a second portion to second processor memory 2402, a third portion to GPU memory 2420, and so on. In at least one embodiment, an entire virtual/effective memory space (sometimes referred to as an effective address space) is thereby distributed across each of processor memories 2401-2402 and GPU memories 2420-2423, allowing any processor or GPU to access any physical memory with a virtual address mapped to that memory.

In one embodiment, bias/coherence management circuitry 2494A-2494E within one or more of MMUs 2439A-2439E ensures cache coherence between caches of one or more host processors (e.g., 2405) and GPUs 2410-2413 and implements biasing techniques indicating physical memories in which certain types of data should be stored. While multiple instances of bias/coherence management circuitry 2494A-2494E are illustrated in FIG. 24F, bias/coherence circuitry may be implemented within an MMU of one or more host processors 2405 and/or within accelerator integration circuit 2436.

One embodiment allows GPU-attached memory 2420-2423 to be mapped as part of system memory, and accessed using shared virtual memory (SVM) technology, but without suffering performance drawbacks associated with full system cache coherence. In at least one embodiment, an ability for GPU-attached memory 2420-2423 to be accessed as system memory without onerous cache coherence overhead provides a beneficial operating environment for GPU offload. This arrangement allows host processor 2405 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2420-2423 without cache coherence overheads can be critical to execution time of an offloaded computation. In cases with substantial streaming write memory traffic, for example, cache coherence overhead can significantly reduce an effective write bandwidth seen by a GPU 2410-2413. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2420-2423, with or without a bias cache in GPU 2410-2413 (e.g., to cache frequently/recently used entries of a bias table). Alternatively, an entire bias table may be maintained within a GPU.

In at least one embodiment, a bias table entry associated with each access to GPU-attached memory 2420-2423 is accessed prior to actual access to a GPU memory, causing the following operations. First, local requests from GPU 2410-2413 that find their page in GPU bias are forwarded directly to a corresponding GPU memory 2420-2423. Local requests from a GPU that find their page in host bias are forwarded to processor 2405 (e.g., over a high-speed link as discussed above). In one embodiment, requests from processor 2405 that find a requested page in host processor bias complete a request like a normal memory read. Alternatively, requests directed to a GPU-biased page may be forwarded to GPU 2410-2413. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2405 bias to GPU bias, but is not for an opposite transition.

In one embodiment, cache coherency is maintained by temporarily rendering GPU-biased pages uncacheable by host processor 2405. To access these pages, processor 2405 may request access from GPU 2410 which may or may not grant access right away. Thus, to reduce communication between processor 2405 and GPU 2410 it is beneficial to ensure that GPU-biased pages are those which are required by a GPU but not host processor 2405 and vice versa.

Inference and/or training logic 1715 are used to perform one or more embodiments. Details regarding the inference and/or training logic 1715 are provided below in conjunction with FIGS. 17A and/or 17B.

Such components can be useful in determining a position of an object with respect to a vehicle, in at least one embodiment.

Figure 25:
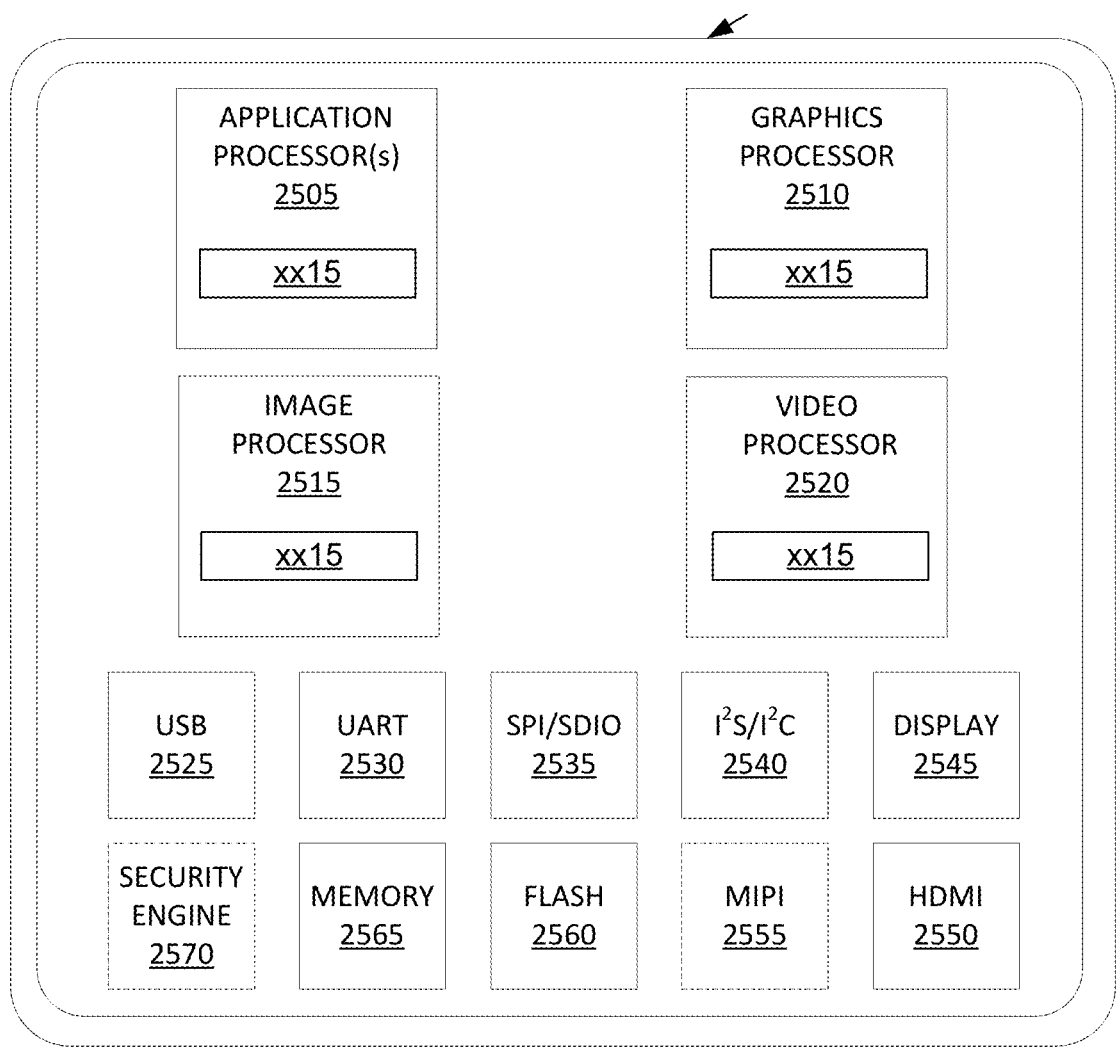
FIG. 25 illustrates exemplary integrated circuits and associated graphics processors, according to at least one embodiment.

FIG. 25 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 25 is a block diagram illustrating an exemplary system on a chip integrated circuit 2500 that may be fabricated using one or more IP cores, according to at least one embodiment. In at least one embodiment, integrated circuit 2500 includes one or more application processor(s) 2505 (e.g., CPUs), at least one graphics processor 2510, and may additionally include an image processor 2515 and/or a video processor 2520, any of which may be a modular IP core. In at least one embodiment, integrated circuit 2500 includes peripheral or bus logic including a USB controller 2525, UART controller 2530, an SPI/SDIO controller 2535, and an I$^2$S/I$^2$C controller 2540. In at least one embodiment, integrated circuit 2500 can include a display device 2545 coupled to one or more of a high-definition multimedia interface (HDMI) controller 2550 and a mobile industry processor interface (MIPI) display interface 2555. In at least one embodiment, storage may be provided by a flash memory subsystem 2560 including flash memory and a flash memory controller. In at least one embodiment, memory interface may be provided via a memory controller 2565 for access to SDRAM or SRAM memory devices. In at least one embodiment, some integrated circuits additionally include an embedded security engine 2570.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in integrated circuit 2500 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 26A:
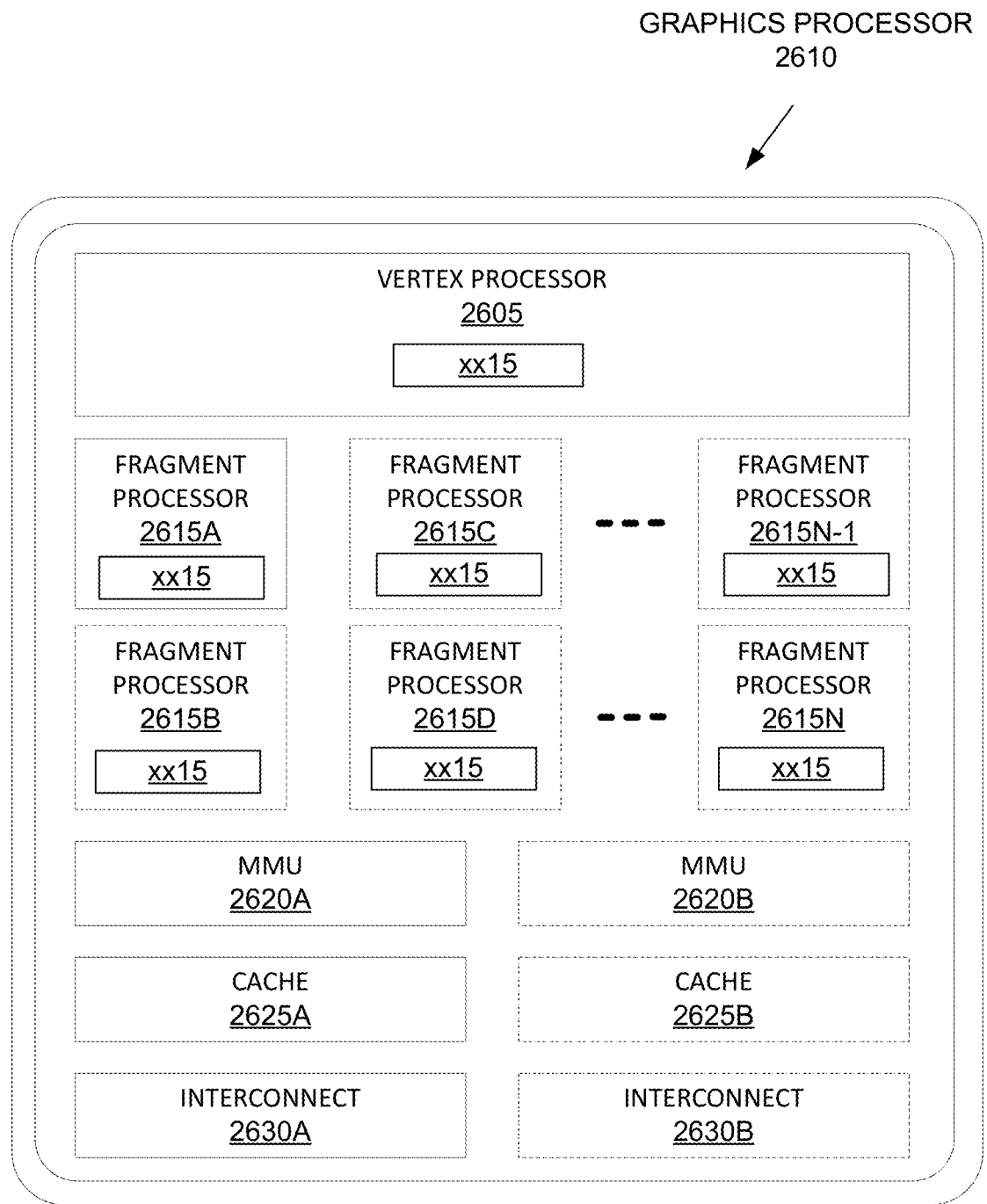
FIGS. 26A-26B illustrate exemplary integrated circuits and associated graphics processors, according to at least one embodiment.
Figure 26B:
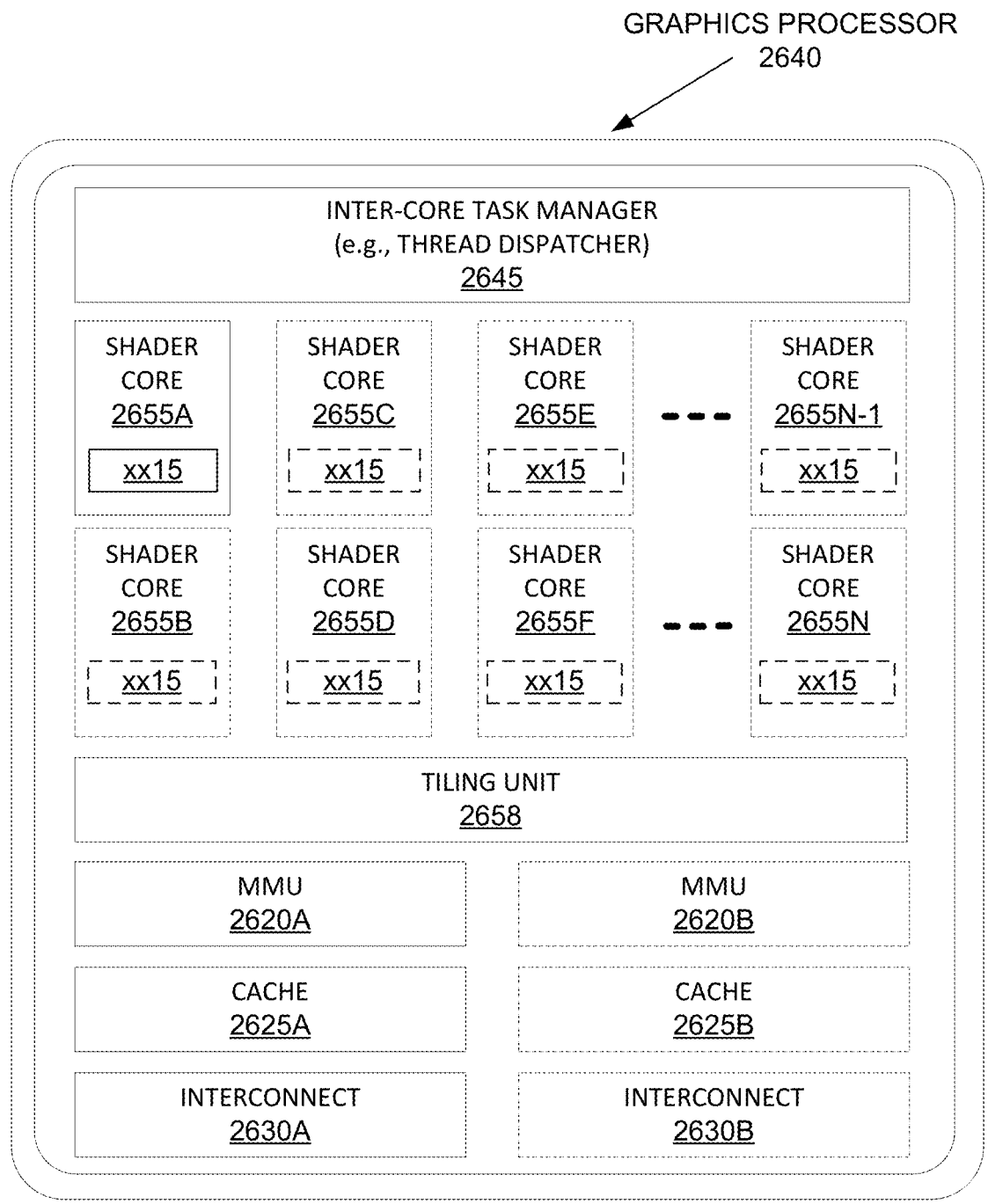

FIGS. 26A-26B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 26A-26B are block diagrams illustrating exemplary graphics processors for use within an SoC, according to embodiments described herein. FIG. 26A illustrates an exemplary graphics processor 2610 of a system on a chip integrated circuit that may be fabricated using one or more IP cores, according to at least one embodiment. FIG. 26B illustrates an additional exemplary graphics processor 2640 of a system on a chip integrated circuit that may be fabricated using one or more IP cores, according to at least one embodiment. In at least one embodiment, graphics processor 2610 of FIG. 26A is a low power graphics processor core. In at least one embodiment, graphics processor 2640 of FIG. 26B is a higher performance graphics processor core. In at least one embodiment, each of graphics processors 2610, 2640 can be variants of graphics processor 2510 of FIG. 25.

In at least one embodiment, graphics processor 2610 includes a vertex processor 2605 and one or more fragment processor(s) 2615A-2615N (e.g., 2615A, 2615B, 2615C, 2615D, through 2615N-1, and 2615N). In at least one embodiment, graphics processor 2610 can execute different shader programs via separate logic, such that vertex processor 2605 is optimized to execute operations for vertex shader programs, while one or more fragment processor(s) 2615A-2615N execute fragment (e.g., pixel) shading operations for fragment or pixel shader programs. In at least one embodiment, vertex processor 2605 performs a vertex processing stage of a 3D graphics pipeline and generates primitives and vertex data. In at least one embodiment, fragment processor(s) 2615A-2615N use primitive and vertex data generated by vertex processor 2605 to produce a framebuffer that is displayed on a display device. In at least one embodiment, fragment processor(s) 2615A-2615N are optimized to execute fragment shader programs as provided for in an OpenGL API, which may be used to perform similar operations as a pixel shader program as provided for in a Direct 3D API.

In at least one embodiment, graphics processor 2610 additionally includes one or more memory management units (MMUs) 2620A-2620B, cache(s) 2625A-2625B, and circuit interconnect(s) 2630A-2630B. In at least one embodiment, one or more MMU(s) 2620A-2620B provide for virtual to physical address mapping for graphics processor 2610, including for vertex processor 2605 and/or fragment processor(s) 2615A-2615N, which may reference vertex or image/texture data stored in memory, in addition to vertex or image/texture data stored in one or more cache(s) 2625A-2625B. In at least one embodiment, one or more MMU(s) 2620A-2620B may be synchronized with other MMUs within system, including one or more MMUs associated with one or more application processor(s) 2505, image processors 2515, and/or video processors 2520 of FIG. 25, such that each processor 2505-2520 can participate in a shared or unified virtual memory system. In at least one embodiment, one or more circuit interconnect(s) 2630A-2630B enable graphics processor 2610 to interface with other IP cores within SoC, either via an internal bus of SoC or via a direct connection.

In at least one embodiment, graphics processor 2640 includes one or more MMU(s) 2620A-2620B, cache(s) 2625A-2625B, and circuit interconnect(s) 2630A-2630B of graphics processor 2610 of FIG. 26A. In at least one embodiment, graphics processor 2640 includes one or more shader core(s) 2655A-2655N (e.g., 2655A, 2655B, 2655C, 2655D, 2655E, 2655F, through 2655N-1, and 2655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2640 includes an inter-core task manager 2645, which acts as a thread dispatcher to dispatch execution threads to one or more shader cores 2655A-2655N and a tiling unit 2658 to accelerate tiling operations for tile-based rendering, in which rendering operations for a scene are subdivided in image space, for example to exploit local spatial coherence within a scene or to optimize use of internal caches.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in integrated circuit 26A and/or 26B for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 27A:
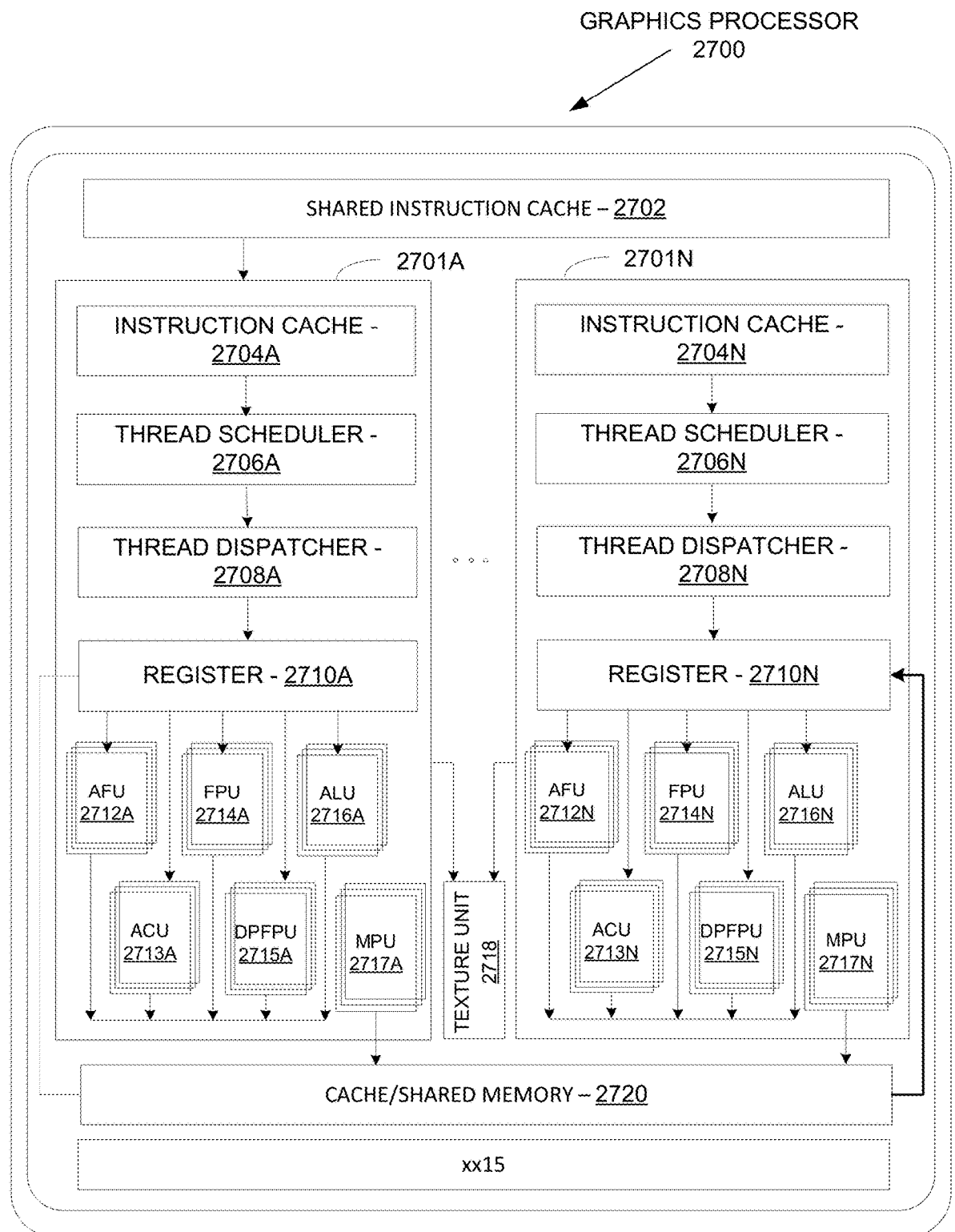
FIGS. 27A-27B illustrate additional exemplary graphics processor logic, according to at least one embodiment.
Figure 27B:
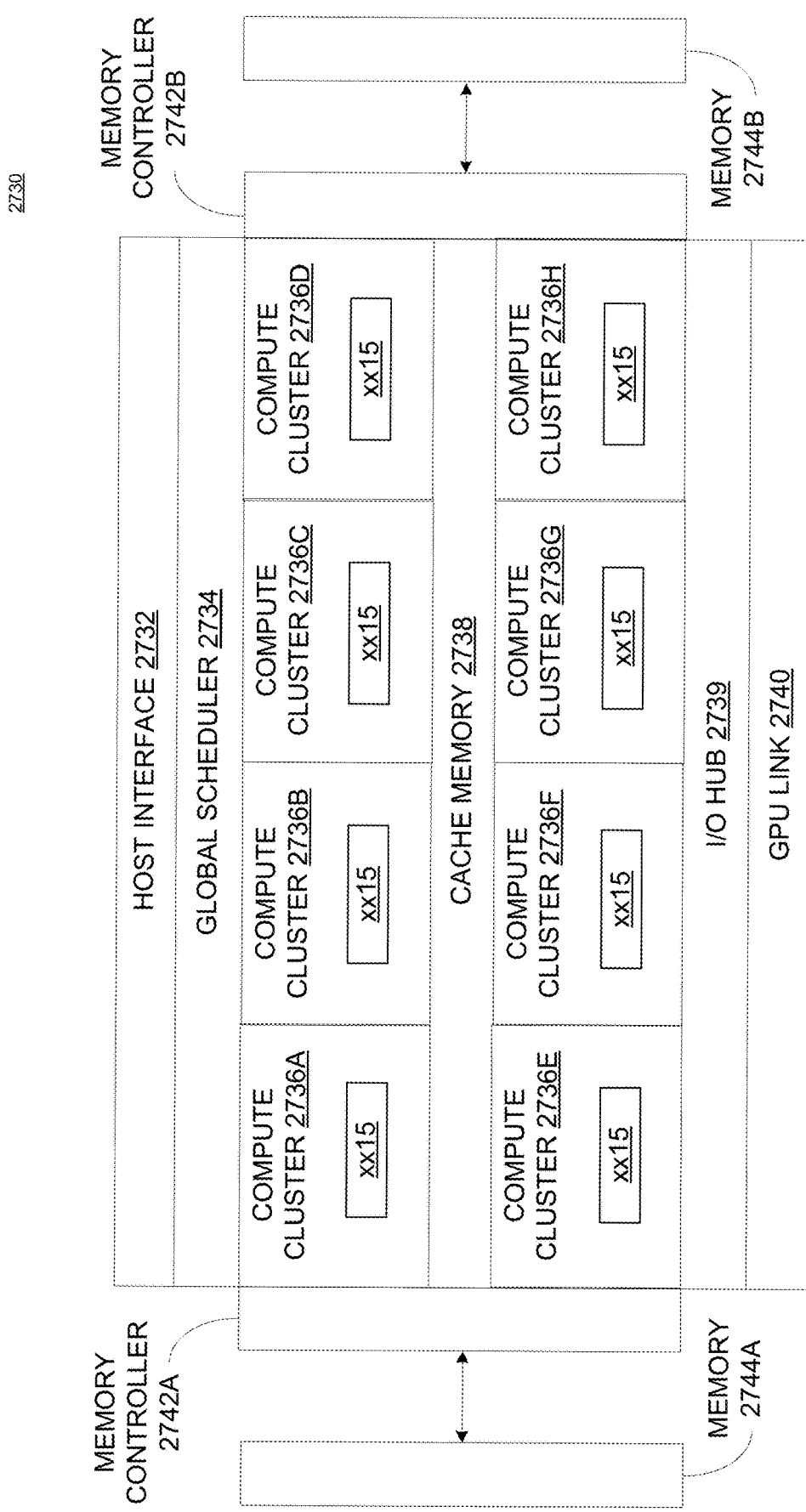

FIGS. 27A-27B illustrate additional exemplary graphics processor logic according to embodiments described herein. FIG. 27A illustrates a graphics core 2700 that may be included within graphics processor 2510 of FIG. 25, in at least one embodiment, and may be a unified shader core 2655A-2655N as in FIG. 26B in at least one embodiment. FIG. 27B illustrates a highly-parallel general-purpose graphics processing unit 2730 suitable for deployment on a multi-chip module in at least one embodiment.

In at least one embodiment, graphics core 2700 includes a shared instruction cache 2702, a texture unit 2718, and a cache/shared memory 2720 that are common to execution resources within graphics core 2700. In at least one embodiment, graphics core 2700 can include multiple slices 2701A-2701N or partition for each core, and a graphics processor can include multiple instances of graphics core 2700. Slices 2701A-2701N can include support logic including a local instruction cache 2704A-2704N, a thread scheduler 2706A-2706N, a thread dispatcher 2708A-2708N, and a set of registers 2710A-2710N. In at least one embodiment, slices 2701A-2701N can include a set of additional function units (AFUs 2712A-2712N), floating-point units (FPU 2714A-2714N), integer arithmetic logic units (ALUs 2716-2716N), address computational units (ACU 2713A-2713N), double-precision floating-point units (DPFPU 2715A-2715N), and matrix processing units (MPU 2717A-2717N).

In at least one embodiment, FPUs 2714A-2714N can perform single-precision (32-bit) and half-precision (16-bit) floating point operations, while DPFPUs 2715A-2715N perform double precision (64-bit) floating point operations. In at least one embodiment, ALUs 2716A-2716N can perform variable precision integer operations at 8-bit, 16-bit, and 32-bit precision, and can be configured for mixed precision operations. In at least one embodiment, MPUs 2717A-2717N can also be configured for mixed precision matrix operations, including half-precision floating point and 8-bit integer operations. In at least one embodiment, MPUs 2717A-2717N can perform a variety of matrix operations to accelerate machine learning application frameworks, including enabling support for accelerated general matrix to matrix multiplication (GEMINI). In at least one embodiment, AFUs 2712A-2712N can perform additional logic operations not supported by floating-point or integer units, including trigonometric operations (e.g., Sine, Cosine, etc.).

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in graphics core 2700 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

FIG. 27B illustrates a general-purpose processing unit (GPGPU) 2730 that can be configured to enable highly-parallel compute operations to be performed by an array of graphics processing units, in at least one embodiment. In at least one embodiment, GPGPU 2730 can be linked directly to other instances of GPGPU 2730 to create a multi-GPU cluster to improve training speed for deep neural networks. In at least one embodiment, GPGPU 2730 includes a host interface 2732 to enable a connection with a host processor. In at least one embodiment, host interface 2732 is a PCI Express interface. In at least one embodiment, host interj ace 2732 can be a vendor specific communications interface or communications fabric. In at least one embodiment, GPGPU 2730 receives commands from a host processor and uses a global scheduler 2734 to distribute execution threads associated with those commands to a set of compute clusters 2736A-2736H. In at least one embodiment, compute clusters 2736A-2736H share a cache memory 2738. In at least one embodiment, cache memory 2738 can serve as a higher-level cache for cache memories within compute clusters 2736A-2736H.

In at least one embodiment, GPGPU 2730 includes memory 2744A-2744B coupled with compute clusters 2736A-2736H via a set of memory controllers 2742A-2742B. In at least one embodiment, memory 2744A-2744B can include various types of memory devices including dynamic random access memory (DRAM) or graphics random access memory, such as synchronous graphics random access memory (SGRAM), including graphics double data rate (GDDR) memory.

In at least one embodiment, compute clusters 2736A-2736H each include a set of graphics cores, such as graphics core 2700 of FIG. 27A, which can include multiple types of integer and floating point logic units that can perform computational operations at a range of precisions including suited for machine learning computations. For example, in at least one embodiment, at least a subset of floating point units in each of compute clusters 2736A-2736H can be configured to perform 16-bit or 32-bit floating point operations, while a different subset of floating point units can be configured to perform 64-bit floating point operations.

In at least one embodiment, multiple instances of GPGPU 2730 can be configured to operate as a compute cluster. In at least one embodiment, communication used by compute clusters 2736A-2736H for synchronization and data exchange varies across embodiments. In at least one embodiment, multiple instances of GPGPU 2730 communicate over host interface 2732. In at least one embodiment, GPGPU 2730 includes an I/O hub 2739 that couples GPGPU 2730 with a GPU link 2740 that enables a direct connection to other instances of GPGPU 2730. In at least one embodiment, GPU link 2740 is coupled to a dedicated GPU-to-GPU bridge that enables communication and synchronization between multiple instances of GPGPU 2730. In at least one embodiment, GPU link 2740 couples with a high speed interconnect to transmit and receive data to other GPGPUs or parallel processors. In at least one embodiment, multiple instances of GPGPU 2730 are located in separate data processing systems and communicate via a network device that is accessible via host interface 2732. In at least one embodiment GPU, link 2740 can be configured to enable a connection to a host processor in addition to or as an alternative to host interface 2732.

In at least one embodiment, GPGPU 2730 can be configured to train neural networks. In at least one embodiment, GPGPU 2730 can be used within a inferencing platform. In at least one embodiment, in which GPGPU 2730 is used for inferencing, GPGPU may include fewer compute clusters 2736A-2736H relative to when GPGPU is used for training a neural network. In at least one embodiment, memory technology associated with memory 2744A-2744B may differ between inferencing and training configurations, with higher bandwidth memory technologies devoted to training configurations. In at least one embodiment, inferencing configuration of GPGPU 2730 can support inferencing specific instructions. For example, in at least one embodiment, an inferencing configuration can provide support for one or more 8-bit integer dot product instructions, which may be used during inferencing operations for deployed neural networks.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in GPGPU 2730 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 28:
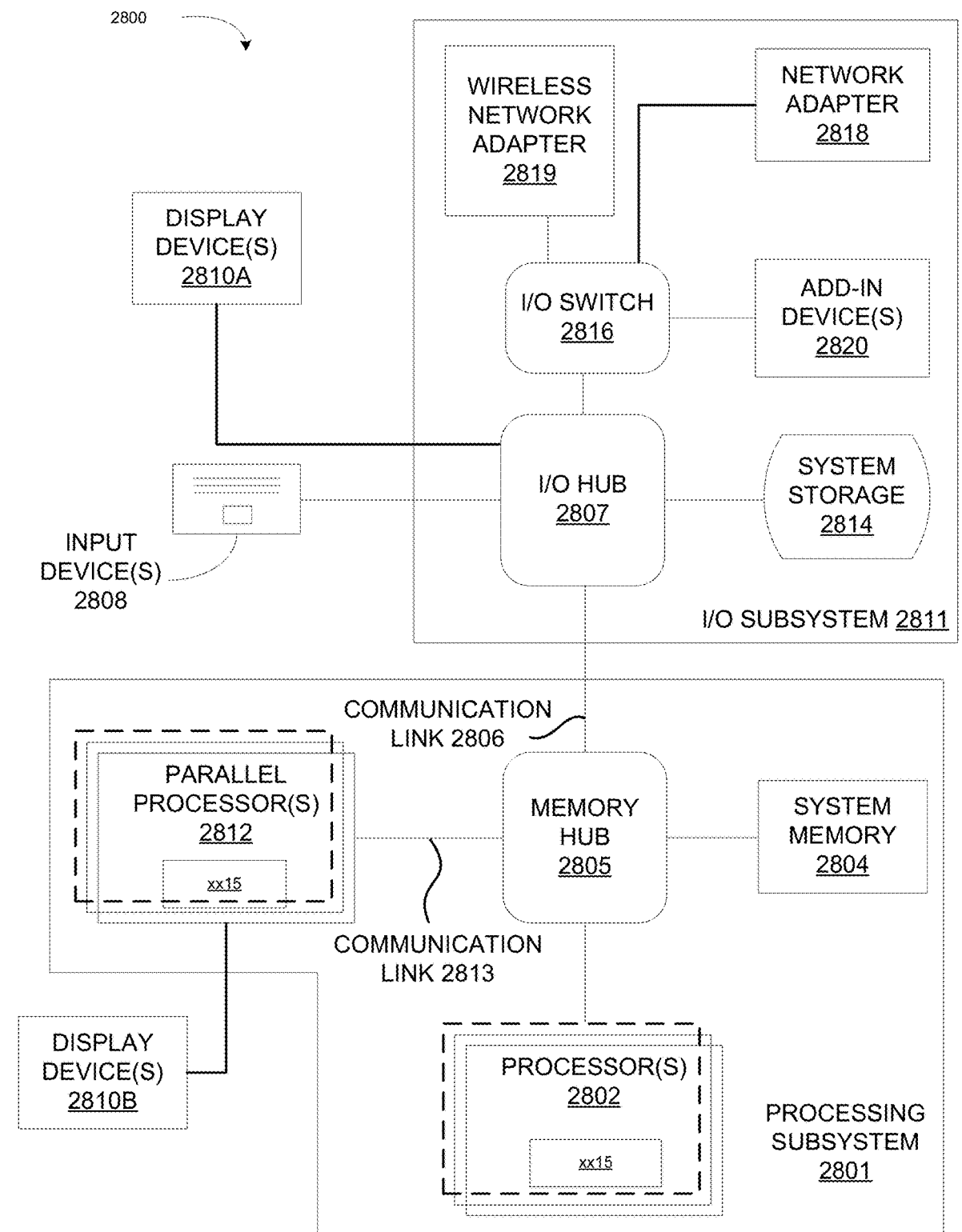
FIG. 28 illustrates a computer system, according to at least one embodiment.

FIG. 28 is a block diagram illustrating a computing system 2800 according to at least one embodiment. In at least one embodiment, computing system 2800 includes a processing subsystem 2801 having one or more processor(s) 2802 and a system memory 2804 communicating via an interconnection path that may include a memory hub 2805. In at least one embodiment, memory hub 2805 may be a separate component within a chipset component or may be integrated within one or more processor(s) 2802. In at least one embodiment, memory hub 2805 couples with an I/O subsystem 2811 via a communication link 2806. In at least one embodiment, I/O subsystem 2811 includes an I/O hub 2807 that can enable computing system 2800 to receive input from one or more input device(s) 2808. In at least one embodiment, I/O hub 2807 can enable a display controller, which may be included in one or more processor(s) 2802, to provide outputs to one or more display device(s) 2810A. In at least one embodiment, one or more display device(s) 2810A coupled with I/O hub 2807 can include a local, internal, or embedded display device.

In at least one embodiment, processing subsystem 2801 includes one or more parallel processor(s) 2812 coupled to memory hub 2805 via a bus or other communication link 2813. In at least one embodiment, communication link 2813 may be one of any number of standards based communication link technologies or protocols, such as, but not limited to PCI Express, or may be a vendor specific communications interface or communications fabric. In at least one embodiment, one or more parallel processor(s) 2812 form a computationally focused parallel or vector processing system that can include a large number of processing cores and/or processing clusters, such as a many integrated core (MIC) processor. In at least one embodiment, one or more parallel processor(s) 2812 form a graphics processing subsystem that can output pixels to one of one or more display device(s) 2810A coupled via I/O Hub 2807. In at least one embodiment, one or more parallel processor(s) 2812 can also include a display controller and display interface (not shown) to enable a direct connection to one or more display device(s) 2810B.

In at least one embodiment, a system storage unit 2814 can connect to I/O hub 2807 to provide a storage mechanism for computing system 2800. In at least one embodiment, an I/O switch 2816 can be used to provide an interface mechanism to enable connections between I/O hub 2807 and other components, such as a network adapter 2818 and/or wireless network adapter 2819 that may be integrated into a platform(s), and various other devices that can be added via one or more add-in device(s) 2820. In at least one embodiment, network adapter 2818 can be an Ethernet adapter or another wired network adapter. In at least one embodiment, wireless network adapter 2819 can include one or more of a Wi-Fi, Bluetooth, near field communication (NFC), or other network device that includes one or more wireless radios.

In at least one embodiment, computing system 2800 can include other components not explicitly shown, including USB or other port connections, optical storage drives, video capture devices, and so on, may also be connected to I/O hub 2807. In at least one embodiment, communication paths interconnecting various components in FIG. 28 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2812 incorporate circuitry optimized for graphics and video processing, including, for example, video output circuitry, and constitutes a graphics processing unit (GPU). In at least one embodiment, one or more parallel processor(s) 2812 incorporate circuitry optimized for general purpose processing. In at least one embodiment, components of computing system 2800 may be integrated with one or more other system elements on a single integrated circuit. For example, in at least one embodiment, one or more parallel processor(s) 2812, memory hub 2805, processor(s) 2802, and I/O hub 2807 can be integrated into a system on chip (SoC) integrated circuit. In at least one embodiment, components of computing system 2800 can be integrated into a single package to form a system in package (SIP) configuration. In at least one embodiment, at least a portion of components of computing system 2800 can be integrated into a multi-chip module (MCM), which can be interconnected with other multi-chip modules into a modular computing system.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in system FIG. 2800 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Processors

Figure 29A:
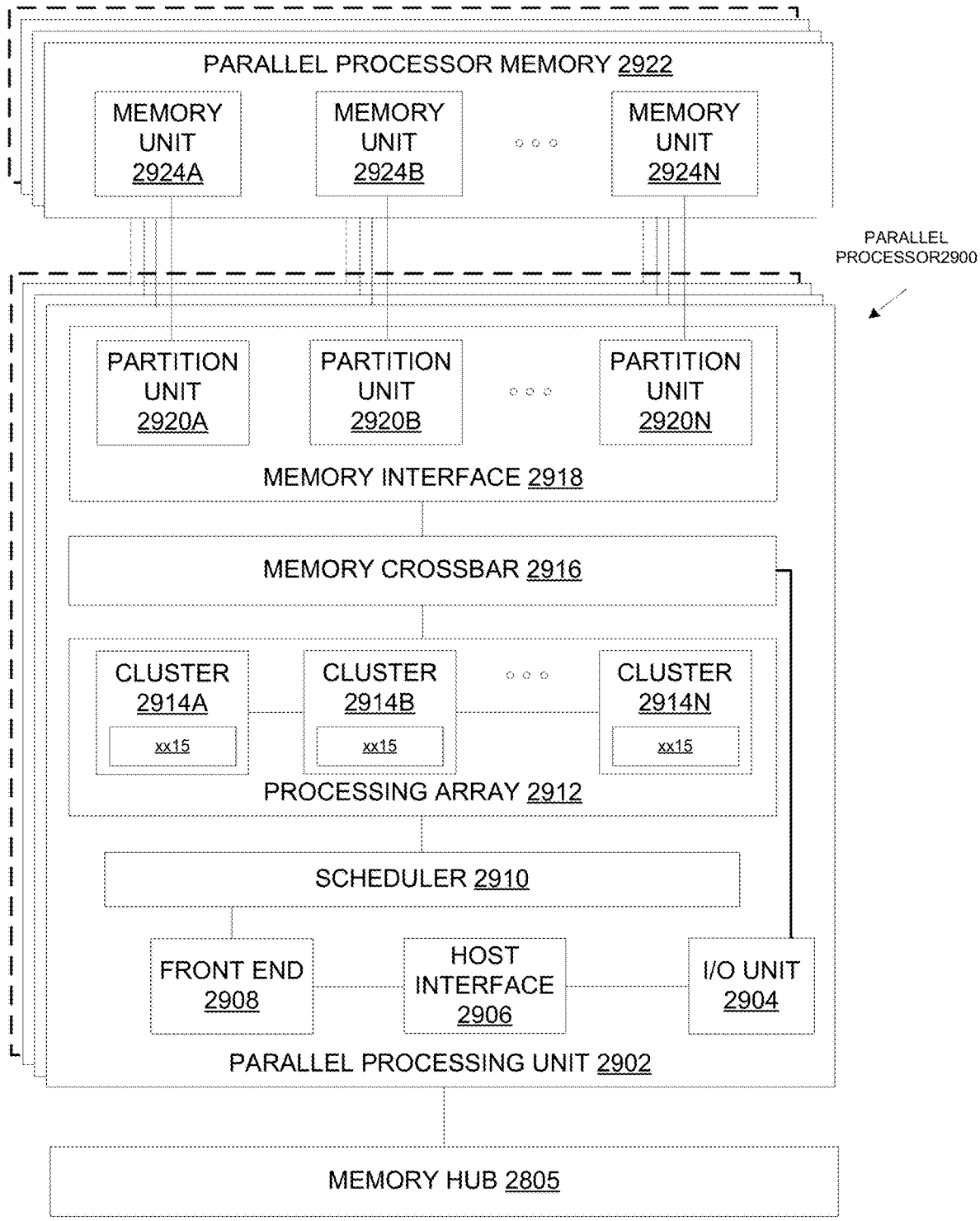
FIG. 29A illustrates a parallel processor, according to at least one embodiment.

FIG. 29A illustrates a parallel processor 2900 according to at least one embodiment. In at least one embodiment, various components of parallel processor 2900 may be implemented using one or more integrated circuit devices, such as programmable processors, application specific integrated circuits (ASICs), or field programmable gate arrays (FPGA). In at least one embodiment, illustrated parallel processor 2900 is a variant of one or more parallel processor(s) 2812 shown in FIG. 28 according to an exemplary embodiment.

In at least one embodiment, parallel processor 2900 includes a parallel processing unit 2902. In at least one embodiment, parallel processing unit 2902 includes an I/O unit 2904 that enables communication with other devices, including other instances of parallel processing unit 2902. In at least one embodiment, I/O unit 2904 may be directly connected to other devices. In at least one embodiment, I/O unit 2904 connects with other devices via use of a hub or switch interface, such as memory hub 2805. In at least one embodiment, connections between memory hub 2805 and I/O unit 2904 form a communication link 2813. In at least one embodiment, I/O unit 2904 connects with a host interface 2906 and a memory crossbar 2916, where host interface 2906 receives commands directed to performing processing operations and memory crossbar 2916 receives commands directed to performing memory operations.

In at least one embodiment, when host interface 2906 receives a command buffer via I/O unit 2904, host interface 2906 can direct work operations to perform those commands to a front end 2908. In at least one embodiment, front end 2908 couples with a scheduler 2910, which is configured to distribute commands or other work items to a processing cluster array 2912. In at least one embodiment, scheduler 2910 ensures that processing cluster array 2912 is properly configured and in a valid state before tasks are distributed to processing cluster array 2912. In at least one embodiment, scheduler 2910 is implemented via firmware logic executing on a microcontroller. In at least one embodiment, microcontroller implemented scheduler 2910 is configurable to perform complex scheduling and work distribution operations at coarse and fine granularity, enabling rapid preemption and context switching of threads executing on processing array 2912. In at least one embodiment, host software can prove workloads for scheduling on processing array 2912 via one of multiple graphics processing doorbells. In at least one embodiment, workloads can then be automatically distributed across processing array 2912 by scheduler 2910 logic within a microcontroller including scheduler 2910.

In at least one embodiment, processing cluster array 2912 can include up to "N" processing clusters (e.g., cluster 2914A, cluster 2914B, through cluster 2914N). In at least one embodiment, each cluster 2914A-2914N of processing cluster array 2912 can execute a large number of concurrent threads. In at least one embodiment, scheduler 2910 can allocate work to clusters 2914A-2914N of processing cluster array 2912 using various scheduling and/or work distribution algorithms, which may vary depending on workload arising for each type of program or computation. In at least one embodiment, scheduling can be handled dynamically by scheduler 2910, or can be assisted in part by compiler logic during compilation of program logic configured for execution by processing cluster array 2912. In at least one embodiment, different clusters 2914A-2914N of processing cluster array 2912 can be allocated for processing different types of programs or for performing different types of computations.

In at least one embodiment, processing cluster array 2912 can be configured to perform various types of parallel processing operations. In at least one embodiment, processing cluster array 2912 is configured to perform general-purpose parallel compute operations. For example, in at least one embodiment, processing cluster array 2912 can include logic to execute processing tasks including filtering of video and/or audio data, performing modeling operations, including physics operations, and performing data transformations.

In at least one embodiment, processing cluster array 2912 is configured to perform parallel graphics processing operations. In at least one embodiment, processing cluster array 2912 can include additional logic to support execution of such graphics processing operations, including, but not limited to texture sampling logic to perform texture operations, as well as tessellation logic and other vertex processing logic. In at least one embodiment, processing cluster array 2912 can be configured to execute graphics processing related shader programs such as, but not limited to vertex shaders, tessellation shaders, geometry shaders, and pixel shaders. In at least one embodiment, parallel processing unit 2902 can transfer data from system memory via I/O unit 2904 for processing. In at least one embodiment, during processing, transferred data can be stored to on-chip memory (e.g., parallel processor memory 2922) during processing, then written back to system memory.

In at least one embodiment, when parallel processing unit 2902 is used to perform graphics processing, scheduler 2910 can be configured to divide a processing workload into approximately equal sized tasks, to better enable distribution of graphics processing operations to multiple clusters 2914A-2914N of processing cluster array 2912. In at least one embodiment, portions of processing cluster array 2912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2914A-2914N may be stored in buffers to allow intermediate data to be transmitted between clusters 2914A-2914N for further processing.

In at least one embodiment, processing cluster array 2912 can receive processing tasks to be executed via scheduler 2910, which receives commands defining processing tasks from front end 2908. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2910 may be configured to fetch indices corresponding to tasks or may receive indices from front end 2908. In at least one embodiment, front end 2908 can be configured to ensure processing cluster array 2912 is configured to a valid state before a workload specified by incoming command buffers (e.g., batch-buffers, push buffers, etc.) is initiated.

In at least one embodiment, each of one or more instances of parallel processing unit 2902 can couple with parallel processor memory 2922. In at least one embodiment, parallel processor memory 2922 can be accessed via memory crossbar 2916, which can receive memory requests from processing cluster array 2912 as well as I/O unit 2904. In at least one embodiment, memory crossbar 2916 can access parallel processor memory 2922 via a memory interface 2918. In at least one embodiment, memory interface 2918 can include multiple partition units (e.g., partition unit 2920A, partition unit 2920B, through partition unit 2920N) that can each couple to a portion (e.g., memory unit) of parallel processor memory 2922. In at least one embodiment, a number of partition units 2920A-2920N is configured to be equal to a number of memory units, such that a first partition unit 2920A has a corresponding first memory unit 2924A, a second partition unit 2920B has a corresponding memory unit 2924B, and a Nth partition unit 2920N has a corresponding Nth memory unit 2924N. In at least one embodiment, a number of partition units 2920A-2920N may not be equal to a number of memory devices.

In at least one embodiment, memory units 2924A-2924N can include various types of memory devices, including dynamic random access memory (DRAM) or graphics random access memory, such as synchronous graphics random access memory (SGRAM), including graphics double data rate (GDDR) memory. In at least one embodiment, memory units 2924A-2924N may also include 3D stacked memory, including but not limited to high bandwidth memory (HBM). In at least one embodiment, render targets, such as frame buffers or texture maps may be stored across memory units 2924A-2924N, allowing partition units 2920A-2920N to write portions of each render target in parallel to efficiently use available bandwidth of parallel processor memory 2922. In at least one embodiment, a local instance of parallel processor memory 2922 may be excluded in favor of a unified memory design that utilizes system memory in conjunction with local cache memory.

In at least one embodiment, any one of clusters 2914A-2914N of processing cluster array 2912 can process data that will be written to any of memory units 2924A-2924N within parallel processor memory 2922. In at least one embodiment, memory crossbar 2916 can be configured to transfer an output of each cluster 2914A-2914N to any partition unit 2920A-2920N or to another cluster 2914A-2914N, which can perform additional processing operations on an output. In at least one embodiment, each cluster 2914A-2914N can communicate with memory interface 2918 through memory crossbar 2916 to read from or write to various external memory devices. In at least one embodiment, memory crossbar 2916 has a connection to memory interface 2918 to communicate with I/O unit 2904, as well as a connection to a local instance of parallel processor memory 2922, enabling processing units within different processing clusters 2914A-2914N to communicate with system memory or other memory that is not local to parallel processing unit 2902. In at least one embodiment, memory crossbar 2916 can use virtual channels to separate traffic streams between clusters 2914A-2914N and partition units 2920A-2920N.

In at least one embodiment, multiple instances of parallel processing unit 2902 can be provided on a single add-in card, or multiple add-in cards can be interconnected. In at least one embodiment, different instances of parallel processing unit 2902 can be configured to inter-operate even if different instances have different numbers of processing cores, different amounts of local parallel processor memory, and/or other configuration differences. For example, in at least one embodiment, some instances of parallel processing unit 2902 can include higher precision floating point units relative to other instances. In at least one embodiment, systems incorporating one or more instances of parallel processing unit 2902 or parallel processor 2900 can be implemented in a variety of configurations and form factors, including but not limited to desktop, laptop, or handheld personal computers, servers, workstations, game consoles, and/or embedded systems.

Figure 29B:
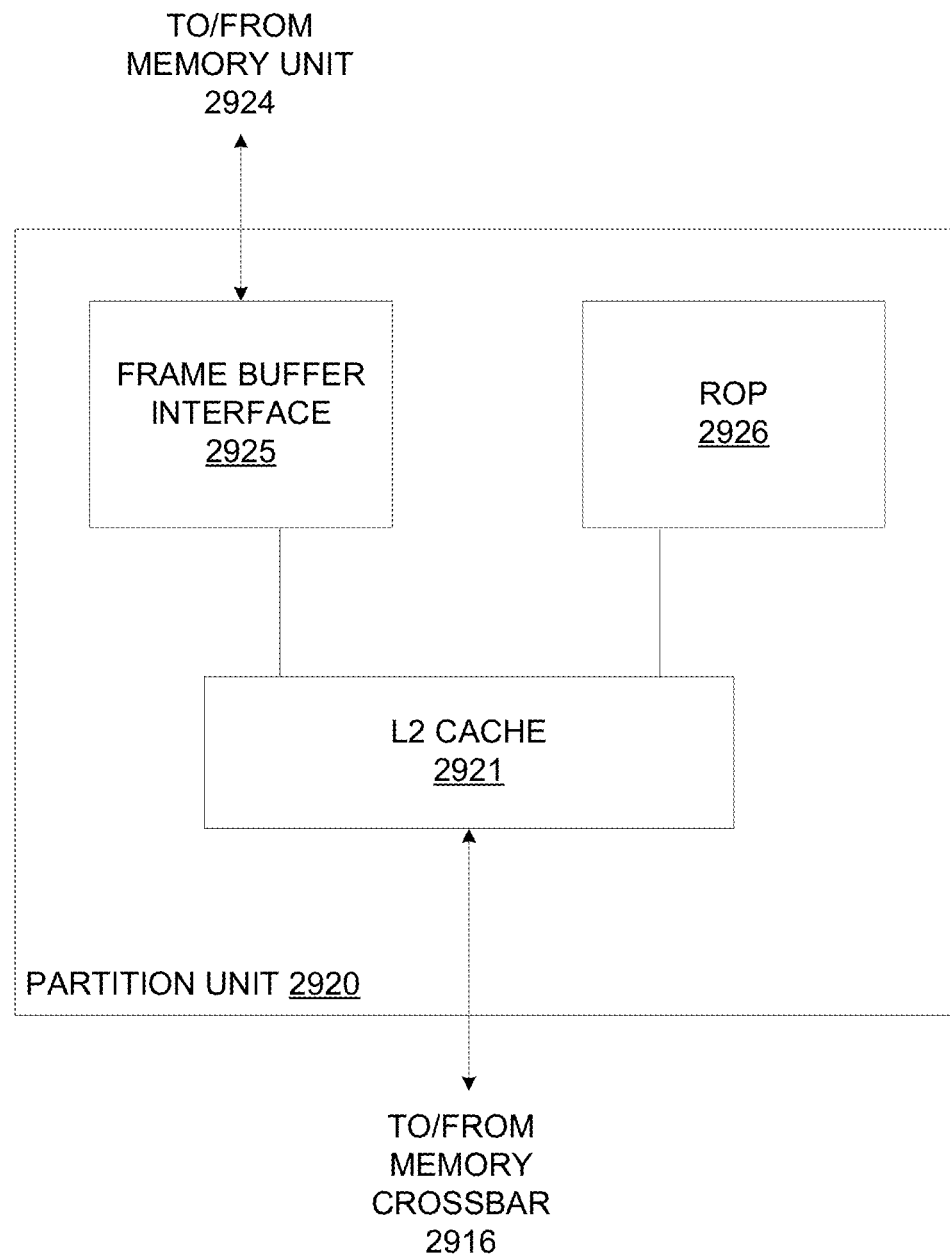
FIG. 29B illustrates a partition unit, according to at least one embodiment.

FIG. 29B is a block diagram of a partition unit 2920 according to at least one embodiment. In at least one embodiment, partition unit 2920 is an instance of one of partition units 2920A-2920N of FIG. 29A. In at least one embodiment, partition unit 2920 includes an L2 cache 2921, a frame buffer interface 2925, and a raster operations unit ("ROP") 2926. L2 cache 2921 is a read/write cache that is configured to perform load and store operations received from memory crossbar 2916 and ROP 2926. In at least one embodiment, read misses and urgent write-back requests are output by L2 cache 2921 to frame buffer interface 2925 for processing. In at least one embodiment, updates can also be sent to a frame buffer via frame buffer interface 2925 for processing. In at least one embodiment, frame buffer interface 2925 interfaces with one of memory units in parallel processor memory, such as memory units 2924A-2924N of FIG. 29 (e.g., within parallel processor memory 2922).

In at least one embodiment, ROP 2926 is a processing unit that performs raster operations such as stencil, z test, blending, and so forth. In at least one embodiment, ROP 2926 then outputs processed graphics data that is stored in graphics memory. In at least one embodiment, ROP 2926 includes compression logic to compress depth or color data that is written to memory and decompress depth or color data that is read from memory. In at least one embodiment, compression logic can be lossless compression logic that makes use of one or more of multiple compression algorithms. Compression logic that is performed by ROP 2926 can vary based on statistical characteristics of data to be compressed. For example, in at least one embodiment, delta color compression is performed on depth and color data on a per-tile basis.

In at least one embodiment, ROP 2926 is included within each processing cluster (e.g., cluster 2914A-2914N of FIG. 29A) instead of within partition unit 2920. In at least one embodiment, read and write requests for pixel data are transmitted over memory crossbar 2916 instead of pixel fragment data. In at least one embodiment, processed graphics data may be displayed on a display device, such as one of one or more display device(s) 2810 of FIG. 28, routed for further processing by processor(s) 2802, or routed for further processing by one of processing entities within parallel processor 2900 of FIG. 29A.

Figure 29C:
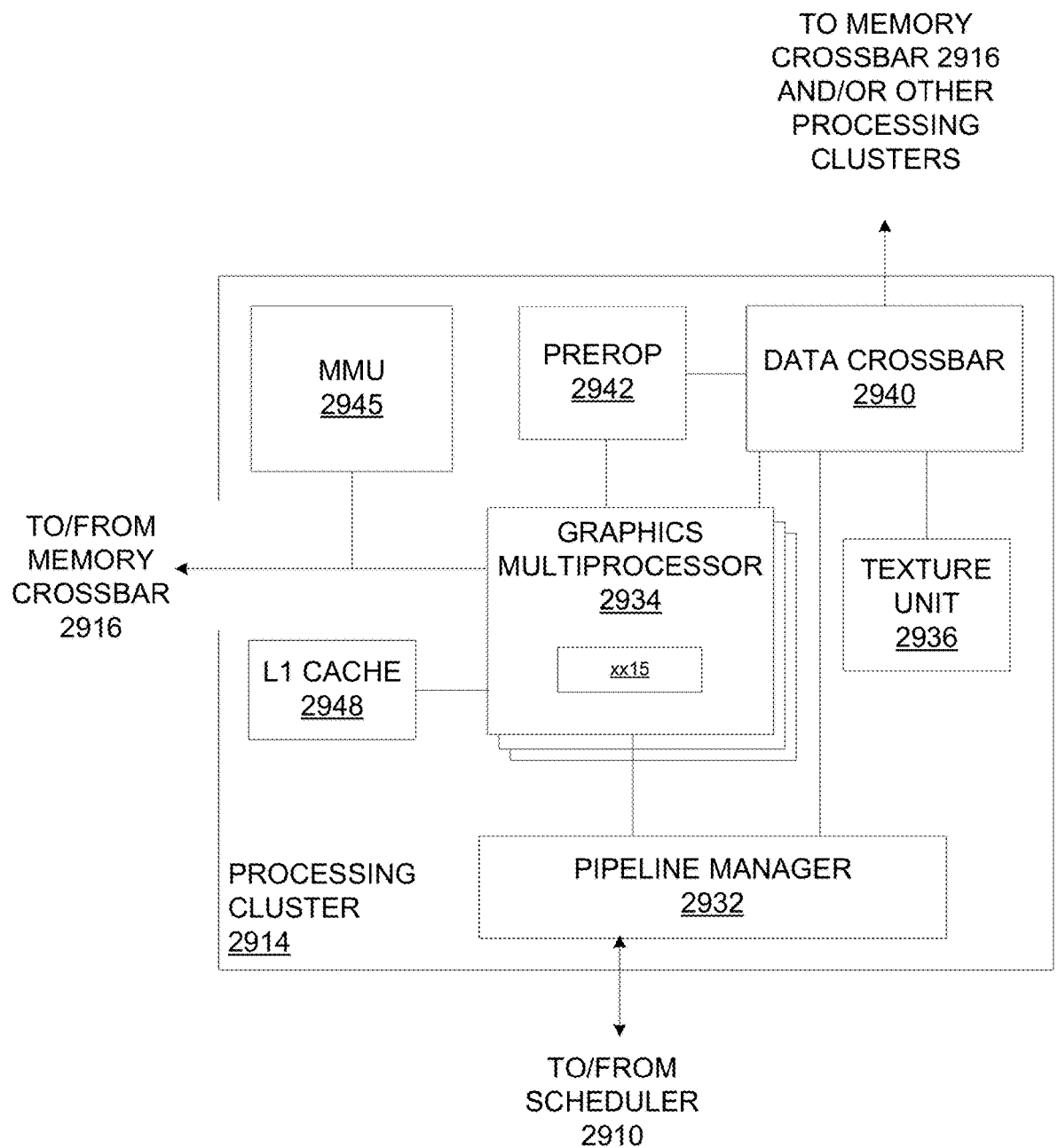
FIG. 29C illustrates a processing cluster, according to at least one embodiment.

FIG. 29C is a block diagram of a processing cluster 2914 within a parallel processing unit according to at least one embodiment. In at least one embodiment, a processing cluster is an instance of one of processing clusters 2914A-2914N of FIG. 29A. In at least one embodiment, one of more of processing cluster(s) 2914 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2914 can be controlled via a pipeline manager 2932 that distributes processing tasks to SIMT parallel processors. In at least one embodiment, pipeline manager 2932 receives instructions from scheduler 2910 of FIG. 29A and manages execution of those instructions via a graphics multiprocessor 2934 and/or a texture unit 2936. In at least one embodiment, graphics multiprocessor 2934 is an exemplary instance of a SIMT parallel processor. However, in at least one embodiment, various types of SIMT parallel processors of differing architectures may be included within processing cluster 2914. In at least one embodiment, one or more instances of graphics multiprocessor 2934 can be included within a processing cluster 2914. In at least one embodiment, graphics multiprocessor 2934 can process data and a data crossbar 2940 can be used to distribute processed data to one of multiple possible destinations, including other shader units. In at least one embodiment, pipeline manager 2932 can facilitate distribution of processed data by specifying destinations for processed data to be distributed vis data crossbar 2940.

In at least one embodiment, each graphics multiprocessor 2934 within processing cluster 2914 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2914 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2934. In at least one embodiment, a thread group may include fewer threads than a number of processing engines within graphics multiprocessor 2934. In at least one embodiment, when a thread group includes fewer threads than a number of processing engines, one or more processing engines may be idle during cycles in which that thread group is being processed. In at least one embodiment, a thread group may also include more threads than a number of processing engines within graphics multiprocessor 2934. In at least one embodiment, when a thread group includes more threads than processing engines within graphics multiprocessor 2934, processing can be performed over consecutive clock cycles. In at least one embodiment, multiple thread groups can be executed concurrently on a graphics multiprocessor 2934.

In at least one embodiment, graphics multiprocessor 2934 includes an internal cache memory to perform load and store operations. In at least one embodiment, graphics multiprocessor 2934 can forego an internal cache and use a cache memory (e.g., L1 cache 2948) within processing cluster 2914. In at least one embodiment, each graphics multiprocessor 2934 also has access to L2 caches within partition units (e.g., partition units 2920A-2920N of FIG. 29A) that are shared among all processing clusters 2914 and may be used to transfer data between threads. In at least one embodiment, graphics multiprocessor 2934 may also access off-chip global memory, which can include one or more of local parallel processor memory and/or system memory. In at least one embodiment, any memory external to parallel processing unit 2902 may be used as global memory. In at least one embodiment, processing cluster 2914 includes multiple instances of graphics multiprocessor 2934 can share common instructions and data, which may be stored in L1 cache 2948.

In at least one embodiment, each processing cluster 2914 may include a memory management unit ("MMU") 2945 that is configured to map virtual addresses into physical addresses. In at least one embodiment, one or more instances of MMU 2945 may reside within memory interface 2918 of FIG. 29A. In at least one embodiment, MMU 2945 includes a set of page table entries (PTEs) used to map a virtual address to a physical address of a tile and optionally a cache line index. In at least one embodiment, MMU 2945 may include address translation lookaside buffers (TLB) or caches that may reside within graphics multiprocessor 2934 or L1 cache or processing cluster 2914. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2914 may be configured such that each graphics multiprocessor 2934 is coupled to a texture unit 2936 for performing texture mapping operations, e.g., determining texture sample positions, reading texture data, and filtering texture data. In at least one embodiment, texture data is read from an internal texture L1 cache (not shown) or from an L1 cache within graphics multiprocessor 2934 and is fetched from an L2 cache, local parallel processor memory, or system memory, as needed. In at least one embodiment, each graphics multiprocessor 2934 outputs processed tasks to data crossbar 2940 to provide processed task(s) to another processing cluster 2914 for further processing or to store processed task(s) in an L2 cache, local parallel processor memory, or system memory via memory crossbar 2916. In at least one embodiment, preROP 2942 (pre-raster operations unit) is configured to receive data from graphics multiprocessor 2934, direct data to ROP units, which may be located with partition units as described herein (e.g., partition units 2920A-2920N of FIG. 29A). In at least one embodiment, PreROP 2942 unit can perform optimizations for color blending, organize pixel color data, and perform address translations.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in graphics processing cluster 2914 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 29D:
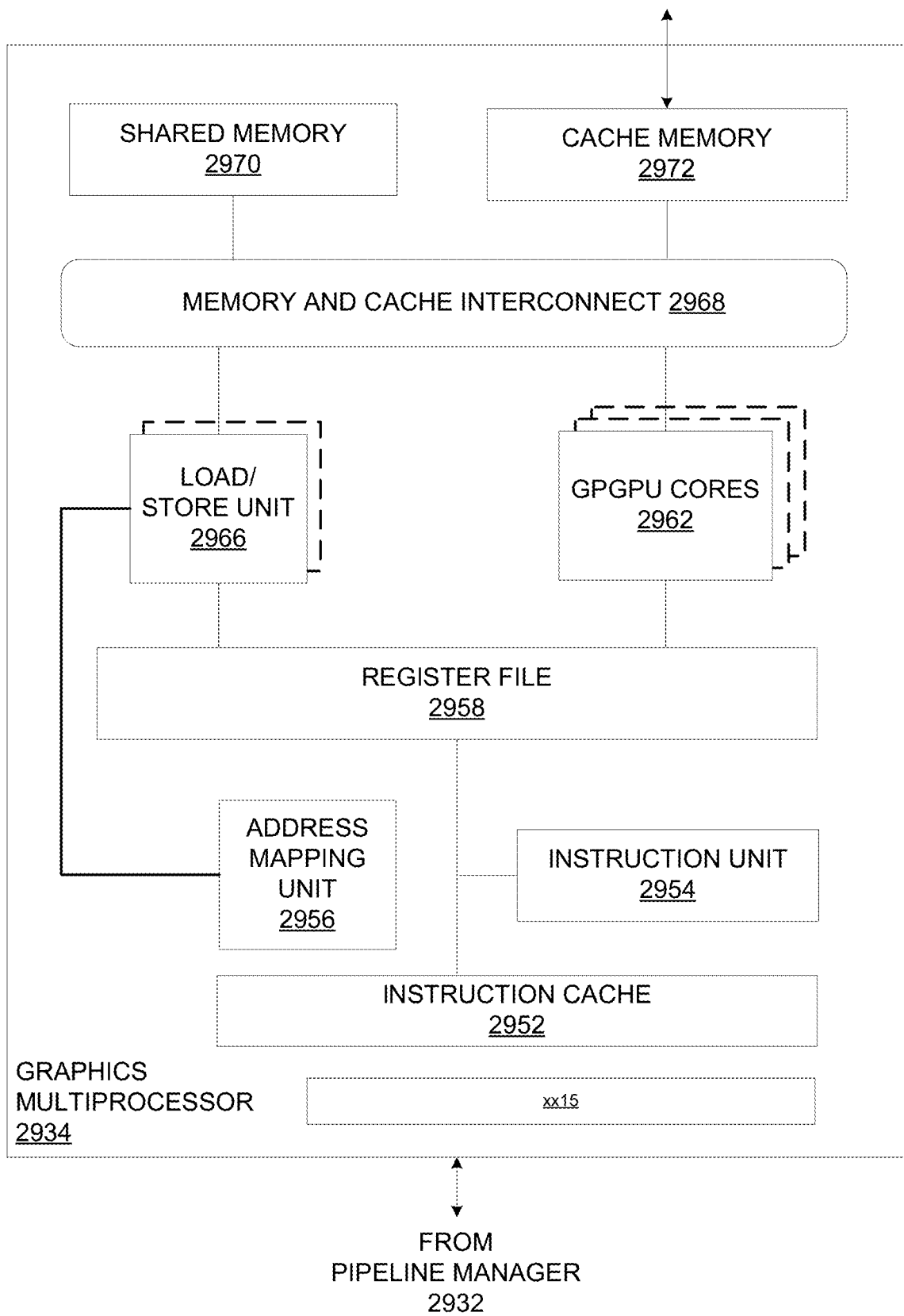
FIG. 29D illustrates a graphics multiprocessor, according to at least one embodiment.

FIG. 29D shows a graphics multiprocessor 2934 according to at least one embodiment. In at least one embodiment, graphics multiprocessor 2934 couples with pipeline manager 2932 of processing cluster 2914. In at least one embodiment, graphics multiprocessor 2934 has an execution pipeline including but not limited to an instruction cache 2952, an instruction unit 2954, an address mapping unit 2956, a register file 2958, one or more general purpose graphics processing unit (GPGPU) cores 2962, and one or more load/store units 2966. GPGPU core(s) 2962 and load/store unit(s) 2966 are coupled with cache memory 2972 and shared memory 2970 via a memory and cache interconnect 2968.

In at least one embodiment, instruction cache 2952 receives a stream of instructions to execute from pipeline manager 2932. In at least one embodiment, instructions are cached in instruction cache 2952 and dispatched for execution by instruction unit 2954. In at least one embodiment, instruction unit 2954 can dispatch instructions as thread groups (e.g., warps), with each thread group assigned to a different execution unit within GPGPU core(s) 2962. In at least one embodiment, an instruction can access any of a local, shared, or global address space by specifying an address within a unified address space. In at least one embodiment, address mapping unit 2956 can be used to translate addresses in a unified address space into a distinct memory address that can be accessed by load/store unit(s) 2966.

In at least one embodiment, register file 2958 provides a set of registers for functional units of graphics multiprocessor 2934. In at least one embodiment, register file 2958 provides temporary storage for operands connected to data paths of functional units (e.g., GPGPU cores 2962, load/store units 2966) of graphics multiprocessor 2934. In at least one embodiment, register file 2958 is divided between each of functional units such that each functional unit is allocated a dedicated portion of register file 2958. In at least one embodiment, register file 2958 is divided between different warps being executed by graphics multiprocessor 2934.

In at least one embodiment, GPGPU cores 2962 can each include floating point units (FPUs) and/or integer arithmetic logic units (ALUs) that are used to execute instructions of graphics multiprocessor 2934. GPGPU cores 2962 can be similar in architecture or can differ in architecture. In at least one embodiment, a first portion of GPGPU cores 2962 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2934 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2962 include SIMD logic capable of performing a single instruction on multiple sets of data. In at least one embodiment GPGPU cores 2962 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2968 is an interconnect network that connects each functional unit of graphics multiprocessor 2934 to register file 2958 and to shared memory 2970. In at least one embodiment, memory and cache interconnect 2968 is a crossbar interconnect that allows load/store unit 2966 to implement load and store operations between shared memory 2970 and register file 2958. In at least one embodiment, register file 2958 can operate at a same frequency as GPGPU cores 2962, thus data transfer between GPGPU cores 2962 and register file 2958 is very low latency. In at least one embodiment, shared memory 2970 can be used to enable communication between threads that execute on functional units within graphics multiprocessor 2934. In at least one embodiment, cache memory 2972 can be used as a data cache for example, to cache texture data communicated between functional units and texture unit 2936. In at least one embodiment, shared memory 2970 can also be used as a program managed cache. In at least one embodiment, threads executing on GPGPU cores 2962 can programmatically store data within shared memory in addition to automatically cached data that is stored within cache memory 2972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in graphics multiprocessor 2934 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 30:
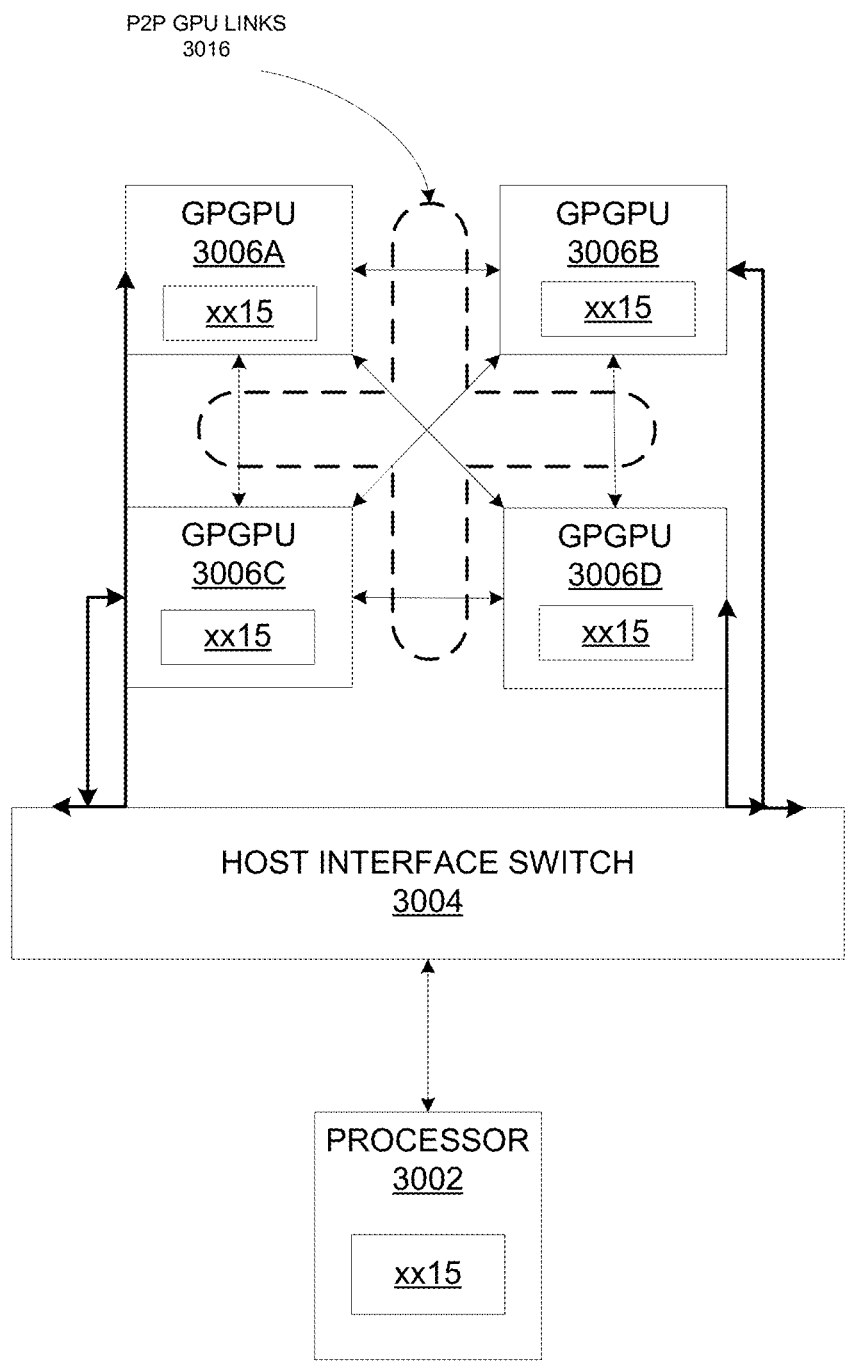
FIG. 30 illustrates a multi-graphics processing unit (GPU) system, according to at least one embodiment.

FIG. 30 illustrates a multi-GPU computing system 11900, according to at least one embodiment. In at least one embodiment, multi-GPU computing system 11900 can include a processor 11902 coupled to multiple general purpose graphics processing units (GPGPUs) 11906A-D via a host interface switch 11904. In at least one embodiment, host interface switch 11904 is a PCI express switch device that couples processor 11902 to a PCI express bus over which processor 11902 can communicate with GPGPUs 11906A-D. GPGPUs 11906A-D can interconnect via a set of high-speed point to point GPU to GPU links 11916. In at least one embodiment, GPU to GPU links 11916 connect to each of GPGPUs 11906A-D via a dedicated GPU link. In at least one embodiment, P2P GPU links 11916 enable direct communication between each of GPGPUs 11906A-D without requiring communication over host interface bus 11904 to which processor 11902 is connected. In at least one embodiment, with GPU-to-GPU traffic directed to P2P GPU links 11916, host interface bus 11904 remains available for system memory access or to communicate with other instances of multi-GPU computing system 11900, for example, via one or more network devices. While in at least one embodiment GPGPUs 11906A-D connect to processor 11902 via host interface switch 11904, in at least one embodiment processor 11902 includes direct support for P2P GPU links 11916 and can connect directly to GPGPUs 11906A-D.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in multi-GPU computing system 11900 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 31:
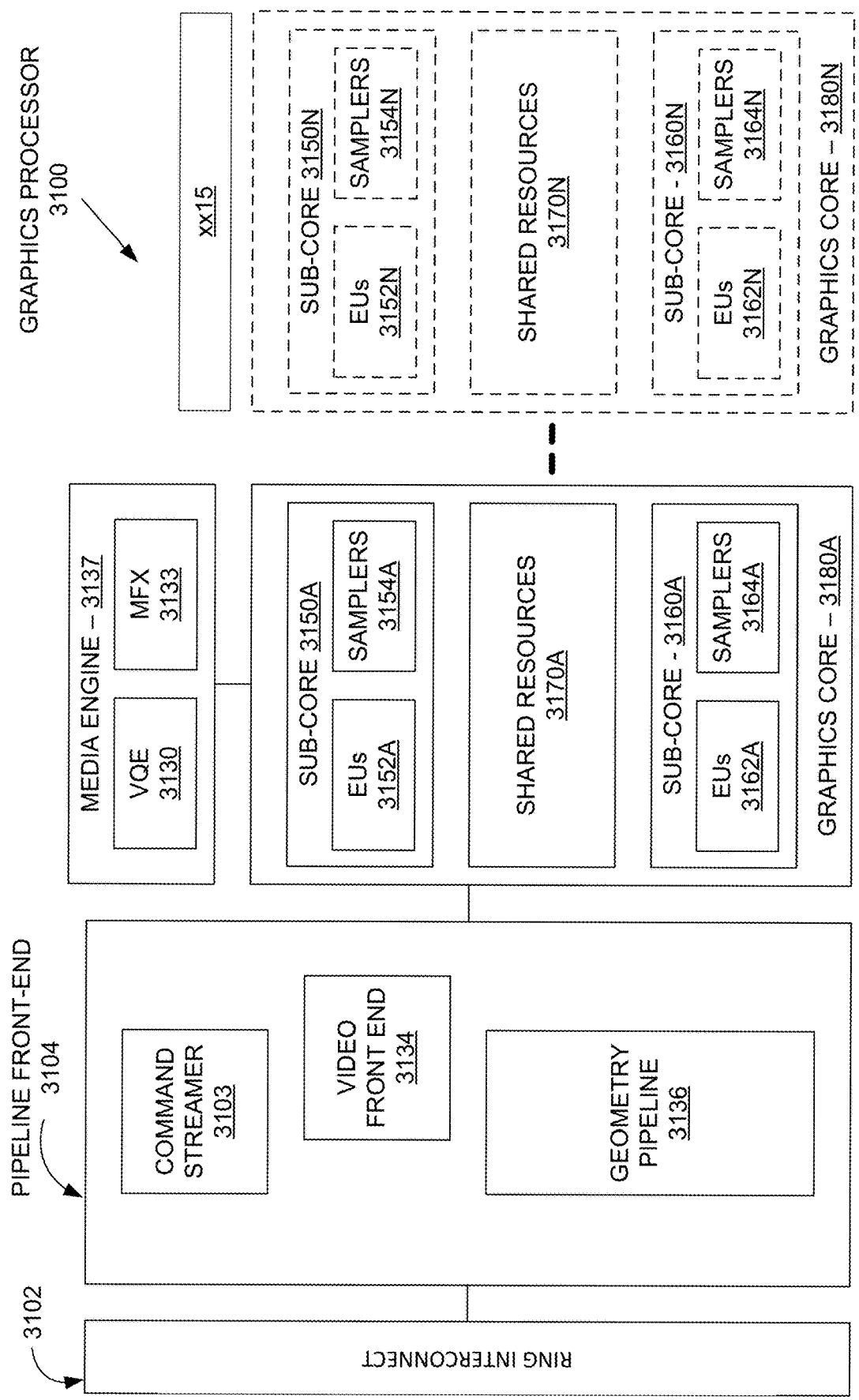
FIG. 31 illustrates a graphics processor, according to at least one embodiment.

FIG. 31 is a block diagram of a graphics processor 3100, according to at least one embodiment. In at least one embodiment, graphics processor 3100 includes a ring interconnect 3102, a pipeline front-end 3104, a media engine 3137, and graphics cores 3180A-3180N. In at least one embodiment, ring interconnect 3102 couples graphics processor 3100 to other processing units, including other graphics processors or one or more general-purpose processor cores. In at least one embodiment, graphics processor 3100 is one of many processors integrated within a multi-core processing system.

In at least one embodiment, graphics processor 3100 receives batches of commands via ring interconnect 3102. In at least one embodiment, incoming commands are interpreted by a command streamer 3103 in pipeline front-end 3104. In at least one embodiment, graphics processor 3100 includes scalable execution logic to perform 3D geometry processing and media processing via graphics core(s) 3180A-3180N. In at least one embodiment, for 3D geometry processing commands, command streamer 3103 supplies commands to geometry pipeline 3136. In at least one embodiment, for at least some media processing commands, command streamer 3103 supplies commands to a video front end 3134, which couples with a media engine 3137. In at least one embodiment, media engine 3137 includes a Video Quality Engine (VQE) 3130 for video and image post-processing and a multi-format encode/decode (MFX) 3133 engine to provide hardware-accelerated media data encode and decode. In at least one embodiment, geometry pipeline 3136 and media engine 3137 each generate execution threads for thread execution resources provided by at least one graphics core 3180A.

In at least one embodiment, graphics processor 3100 includes scalable thread execution resources featuring modular cores 3180A-3180N (sometimes referred to as core slices), each having multiple sub-cores 3150A-3150N, 3160A-3160N (sometimes referred to as core sub-slices). In at least one embodiment, graphics processor 3100 can have any number of graphics cores 3180A through 3180N. In at least one embodiment, graphics processor 3100 includes a graphics core 3180A having at least a first sub-core 3150A and a second sub-core 3160A. In at least one embodiment, graphics processor 3100 is a low power processor with a single sub-core (e.g., 3150A). In at least one embodiment, graphics processor 3100 includes multiple graphics cores 3180A-3180N, each including a set of first sub-cores 3150A-3150N and a set of second sub-cores 3160A-3160N. In at least one embodiment, each sub-core in first sub-cores 3150A-3150N includes at least a first set of execution units 3152A-3152N and media/texture samplers 3154A-3154N. In at least one embodiment, each sub-core in second sub-cores 3160A-3160N includes at least a second set of execution units 3162A-3162N and samplers 3164A-3164N. In at least one embodiment, each sub-core 3150A-3150N, 3160A-3160N shares a set of shared resources 3170A-3170N. In at least one embodiment, shared resources include shared cache memory and pixel operation logic.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, inference and/or training logic 1715 may be used in graphics processor 3100 for inferencing or predicting operations based, at least in part, on weight parameters calculated using neural network training operations, neural network functions and/or architectures, or neural network use cases described herein.

Such components can be useful in determining a position of an object with respect to a vehicle, in at least one embodiment.

Figure 32:
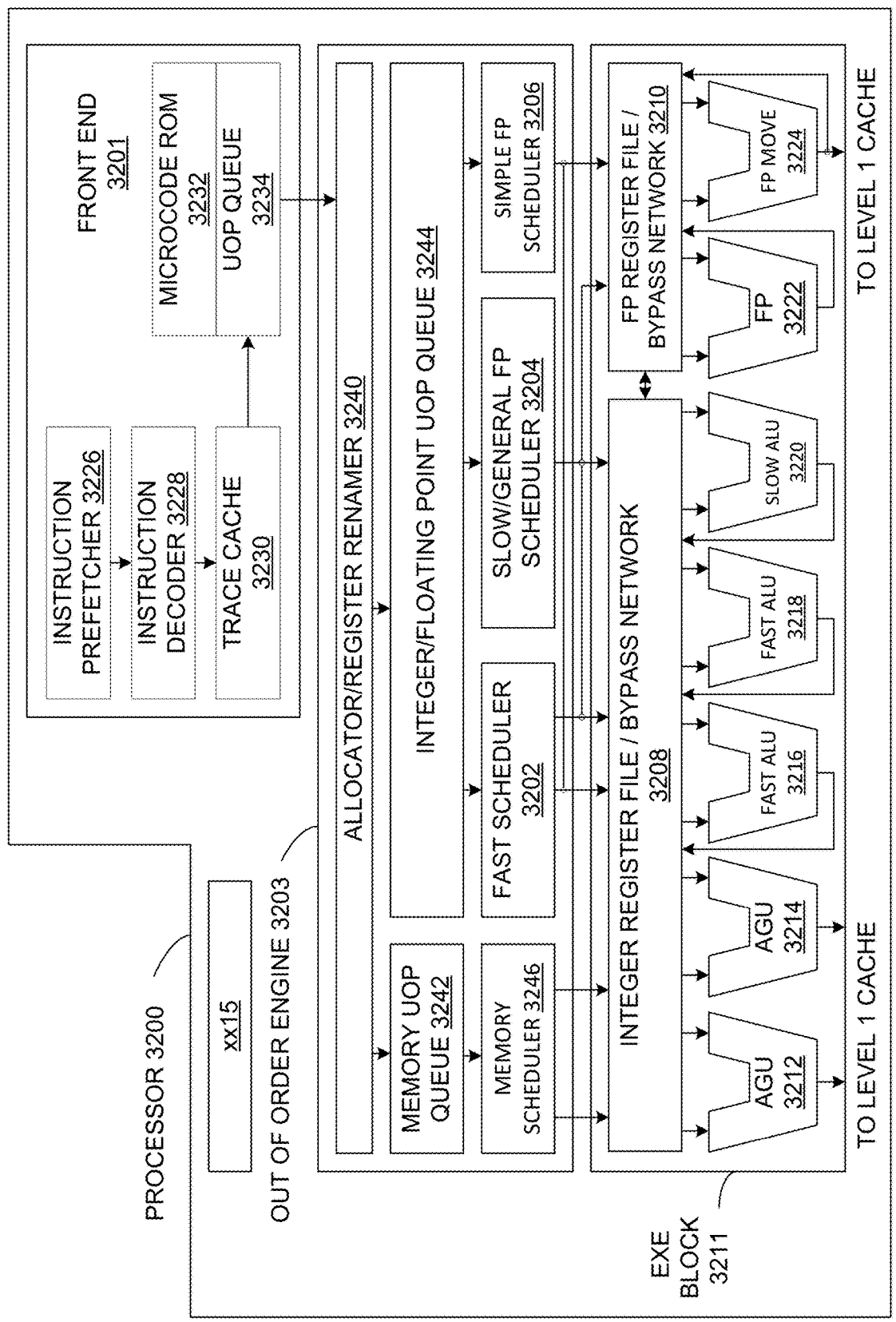
FIG. 32 illustrates a processor's micro-architecture, according to at least one embodiment.

FIG. 32 is a block diagram illustrating micro-architecture for a processor 3200 that may include logic circuits to perform instructions, according to at least one embodiment. In at least one embodiment, processor 3200 may perform instructions, including x86 instructions, ARM instructions, specialized instructions for application-specific integrated circuits (ASICs), etc. In at least one embodiment, processor 3200 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 3200 may perform instructions to accelerate machine learning or deep learning algorithms, training, or inferencing.

In at least one embodiment, processor 3200 includes an in-order front end ("front end") 3201 to fetch instructions to be executed and prepare instructions to be used later in processor pipeline. In at least one embodiment, front end 3201 may include several units. In at least one embodiment, an instruction prefetcher 3226 fetches instructions from memory and feeds instructions to an instruction decoder 3228 which in turn decodes or interprets instructions. For example, in at least one embodiment, instruction decoder 3228 decodes a received instruction into one or more operations called "micro-instructions" or "micro-operations" (also called "micro ops" or "uops") that machine may execute. In at least one embodiment, instruction decoder 3228 parses instruction into an opcode and corresponding data and control fields that may be used by micro-architecture to perform operations in accordance with at least one embodiment. In at least one embodiment, a trace cache 3230 may assemble decoded uops into program ordered sequences or traces in a uop queue 3234 for execution. In at least one embodiment, when trace cache 3230 encounters a complex instruction, a microcode ROM 3232 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3228 may access microcode ROM 3232 to perform instruction. In at least one embodiment, an instruction may be decoded into a small number of micro-ops for processing at instruction decoder 3228. In at least one embodiment, an instruction may be stored within microcode ROM 3232 should a number of micro-ops be needed to accomplish operation. In at least one embodiment, trace cache 3230 refers to an entry point programmable logic array ("PLA") to determine a correct micro-instruction pointer for reading microcode sequences to complete one or more instructions from microcode ROM 3232 in accordance with at least one embodiment. In at least one embodiment, after microcode ROM 3232 finishes sequencing micro-ops for an instruction, front end 3201 of machine may resume fetching micro-ops from trace cache 3230.

In at least one embodiment, out-of-order execution engine ("out of order engine") 3203 may prepare instructions for execution. In at least one embodiment, out-of-order execution logic has a number of buffers to smooth out and re-order flow of instructions to optimize performance as they go down pipeline and get scheduled for execution. In at least one embodiment, out-of-order execution engine 3203 includes, without limitation, an allocator/register renamer 3240, a memory uop queue 3242, an integer/floating point uop queue 3244, a memory scheduler 3246, a fast scheduler 3202, a slow/general floating point scheduler ("slow/general FP scheduler") 3204, and a simple floating point scheduler ("simple FP scheduler") 3206. In at least one embodiment, fast schedule 3202, slow/general floating point scheduler 3204, and simple floating point scheduler 3206 are also collectively referred to herein as "uop schedulers 3202, 3204, 3206." In at least one embodiment, allocator/register renamer 3240 allocates machine buffers and resources that each uop needs in order to execute. In at least one embodiment, allocator/register renamer 3240 renames logic registers onto entries in a register file. In at least one embodiment, allocator/register renamer 3240 also allocates an entry for each uop in one of two uop queues, memory uop queue 3242 for memory operations and integer/floating point uop queue 3244 for non-memory operations, in front of memory scheduler 3246 and uop schedulers 3202, 3204, 3206. In at least one embodiment, uop schedulers 3202, 3204, 3206 determine when a uop is ready to execute based on readiness of their dependent input register operand sources and availability of execution resources uops need to complete their operation. In at least one embodiment, fast scheduler 3202 of at least one embodiment may schedule on each half of main clock cycle while slow/general floating point scheduler 3204 and simple floating point scheduler 3206 may schedule once per main processor clock cycle. In at least one embodiment, uop schedulers 3202, 3204, 3206 arbitrate for dispatch ports to schedule uops for execution.

In at least one embodiment, execution block 3211 includes, without limitation, an integer register file/bypass network 3208, a floating point register file/bypass network ("FP register file/bypass network") 3210, address generation units ("AGUs") 3212 and 3214, fast Arithmetic Logic Units (ALUs) ("fast ALUs") 3216 and 3218, a slow Arithmetic Logic Unit ("slow ALU") 3220, a floating point ALU ("FP") 3222, and a floating point move unit ("FP move") 3224. In at least one embodiment, integer register file/bypass network 3208 and floating point register file/bypass network 3210 are also referred to herein as "register files 3208, 3210." In at least one embodiment, AGUs 3212 and 3214, fast ALUs 3216 and 3218, slow ALU 3220, floating point ALU 3222, and floating point move unit 3224 are also referred to herein as "execution units 3212, 3214, 3216, 3218, 3220, 3222, and 3224." In at least one embodiment, execution block b11 may include, without limitation, any number (including zero) and type of register files, bypass networks, address generation units, and execution units, in any combination.

In at least one embodiment, register files 3208, 3210 may be arranged between uop schedulers 3202, 3204, 3206, and execution units 3212, 3214, 3216, 3218, 3220, 3222, and 3224. In at least one embodiment, integer register file/bypass network 3208 performs integer operations. In at least one embodiment, floating point register file/bypass network 3210 performs floating point operations. In at least one embodiment, each of register files 3208, 3210 may include, without limitation, a bypass network that may bypass or forward just completed results that have not yet been written into register file to new dependent uops. In at least one embodiment, register files 3208, 3210 may communicate data with each other. In at least one embodiment, integer register file/bypass network 3208 may include, without limitation, two separate register files, one register file for low-order thirty-two bits of data and a second register file for high order thirty-two bits of data. In at least one embodiment, floating point register file/bypass network 3210 may include, without limitation, 128-bit wide entries because floating point instructions typically have operands from 64 to 128 bits in width.

In at least one embodiment, execution units 3212, 3214, 3216, 3218, 3220, 3222, 3224 may execute instructions. In at least one embodiment, register files 3208, 3210 store integer and floating point data operand values that micro-instructions need to execute. In at least one embodiment, processor 3200 may include, without limitation, any number and combination of execution units 3212, 3214, 3216, 3218, 3220, 3222, 3224. In at least one embodiment, floating point ALU 3222 and floating point move unit 3224, may execute floating point, MMX, SIMD, AVX and SSE, or other operations, including specialized machine learning instructions. In at least one embodiment, floating point ALU 3222 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3216, 3218. In at least one embodiment, fast ALUS 3216, 3218 may execute fast operations with an effective latency of half a clock cycle. In at least one embodiment, most complex integer operations go to slow ALU 3220 as slow ALU 3220 may include, without limitation, integer execution hardware for long-latency type of operations, such as a multiplier, shifts, flag logic, and branch processing. In at least one embodiment, memory load/store operations may be executed by AGUS 3212, 3214. In at least one embodiment, fast ALU 3216, fast ALU 3218, and slow ALU 3220 may perform integer operations on 64-bit data operands. In at least one embodiment, fast ALU 3216, fast ALU 3218, and slow ALU 3220 may be implemented to support a variety of data bit sizes including sixteen, thirty-two, 128, 256, etc. In at least one embodiment, floating point ALU 3222 and floating point move unit 3224 may be implemented to support a range of operands having bits of various widths. In at least one embodiment, floating point ALU 3222 and floating point move unit 3224 may operate on 128-bit wide packed data operands in conjunction with SIMD and multimedia instructions.

In at least one embodiment, uop schedulers 3202, 3204, 3206, dispatch dependent operations before parent load has finished executing. In at least one embodiment, as uops may be speculatively scheduled and executed in processor 3200, processor 3200 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment portions or all of inference and/or training logic 1715 may be incorporated into execution block 3211 and other memory or registers shown or not shown. For example, in at least one embodiment, training and/or inferencing techniques described herein may use one or more of ALUs illustrated in execution block 3211. Moreover, weight parameters may be stored in on-chip or off-chip memory and/or registers (shown or not shown) that configure ALUs of execution block 3211 to perform one or more machine learning algorithms, neural network architectures, use cases, or training techniques described herein.

Such components can be useful in determining a position of an object with respect to a vehicle, in at least one embodiment.

Figure 33:
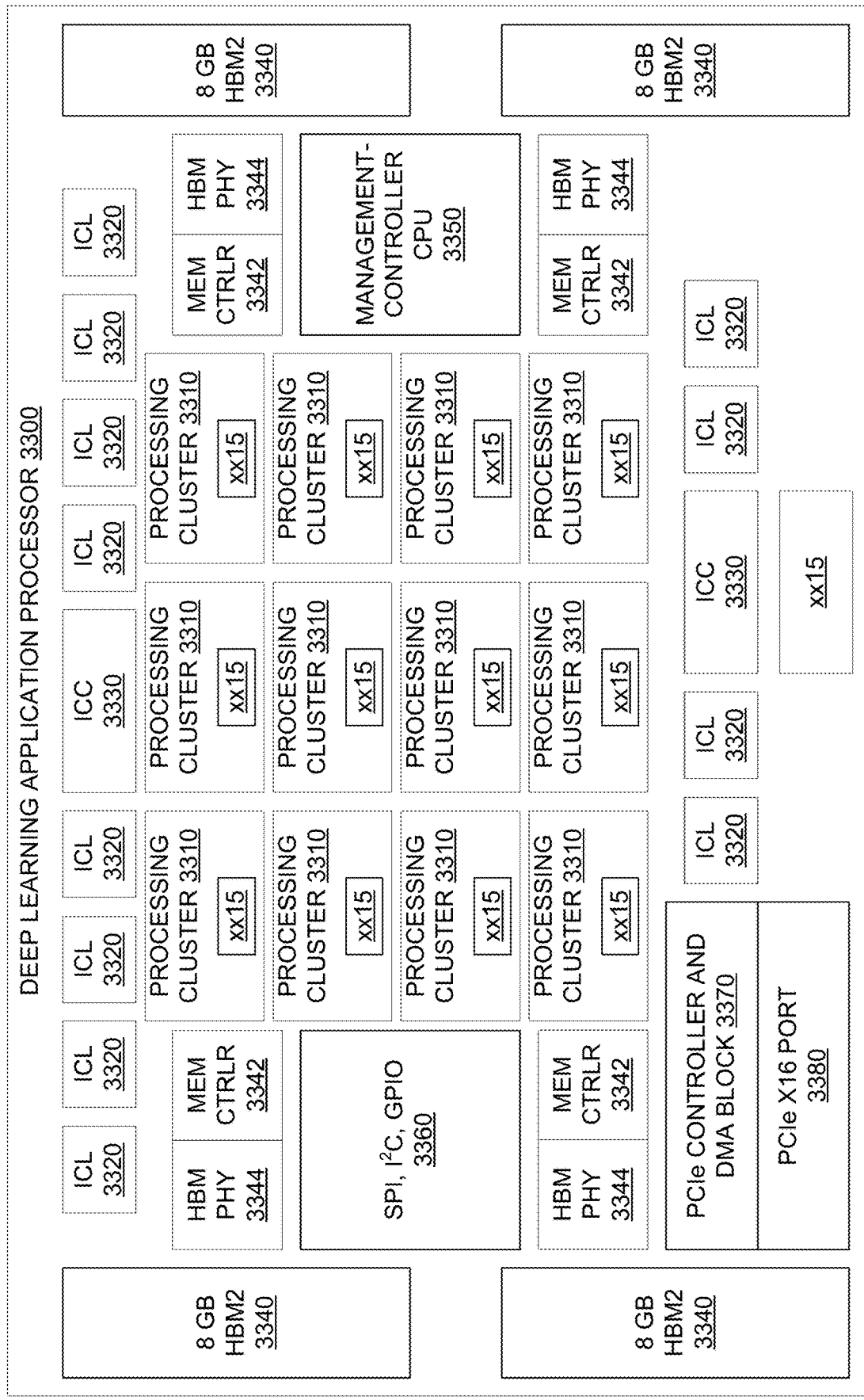
FIG. 33 illustrates a deep learning application processor, according to at least one embodiment.

FIG. 33 illustrates a deep learning application processor 3300, according to at least one embodiment. In at least one embodiment, deep learning application processor 3300 uses instructions that, if executed by deep learning application processor 3300, cause deep learning application processor 3300 to perform some or all of processes and techniques described throughout this disclosure. In at least one embodiment, deep learning application processor 3300 is an application-specific integrated circuit (ASIC). In at least one embodiment, application processor 3300 performs matrix multiply operations either "hard-wired" into hardware as a result of performing one or more instructions or both. In at least one embodiment, deep learning application processor 3300 includes, without limitation, processing clusters 3310(1)-3310(12), Inter-Chip Links ("ICLs") 3320(1)-3320(12), Inter-Chip Controllers ("ICCs") 3330(1)-3330(2), memory controllers ("Mem Ctrlrs") 3342(1)-3342(4), high bandwidth memory physical layer ("HBM PHY") 3344(1)-3344(4), a management-controller central processing unit ("management-controller CPU") 3350, a Serial Peripheral Interface, Inter-Integrated Circuit, and General Purpose Input/Output block ("SPI, I2C, GPIO"), a peripheral component interconnect express controller and direct memory access block ("PCIe Controller and DMA") 3370, and a sixteen-lane peripheral component interconnect express port ("PCI Express x 16") 3380.

In at least one embodiment, processing clusters 3310 may perform deep learning operations, including inference or prediction operations based on weight parameters calculated one or more training techniques, including those described herein. In at least one embodiment, each processing cluster 3310 may include, without limitation, any number and type of processors. In at least one embodiment, deep learning application processor 3300 may include any number and type of processing clusters 3300. In at least one embodiment, Inter-Chip Links 3320 are bi-directional. In at least one embodiment, Inter-Chip Links 3320 and Inter-Chip Controllers 3330 enable multiple deep learning application processors 3300 to exchange information, including activation information resulting from performing one or more machine learning algorithms embodied in one or more neural networks. In at least one embodiment, deep learning application processor 3300 may include any number (including zero) and type of ICLs 3320 and ICCs 3330.

In at least one embodiment, HBM2s 3340 provide a total of 32 Gigabytes (GB) of memory. HBM2 3340(*i*) is associated with both memory controller 3342(*i*) and HBM PHY 3344(*i*). In at least one embodiment, any number of HBM2s 3340 may provide any type and total amount of high bandwidth memory and may be associated with any number (including zero) and type of memory controllers 3342 and HBM PHYs 3344. In at least one embodiment, SPI, I2C, GPIO 3360, PCIe Controller and DMA 3370, and/or PCIe 3380 may be replaced with any number and type of blocks that enable any number and type of communication standards in any technically feasible fashion.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, deep learning application processor 3300 is used to train a machine learning model, such as a neural network, to predict or infer information provided to deep learning application processor 3300. In at least one embodiment, deep learning application processor 3300 is used to infer or predict information based on a trained machine learning model (e.g., neural network) that has been trained by another processor or system or by deep learning application processor 3300. In at least one embodiment, processor 3300 may be used to perform one or more neural network use cases described herein.

Such components can be useful in determining a position of an object with respect to a vehicle, in at least one embodiment.

Figure 34:
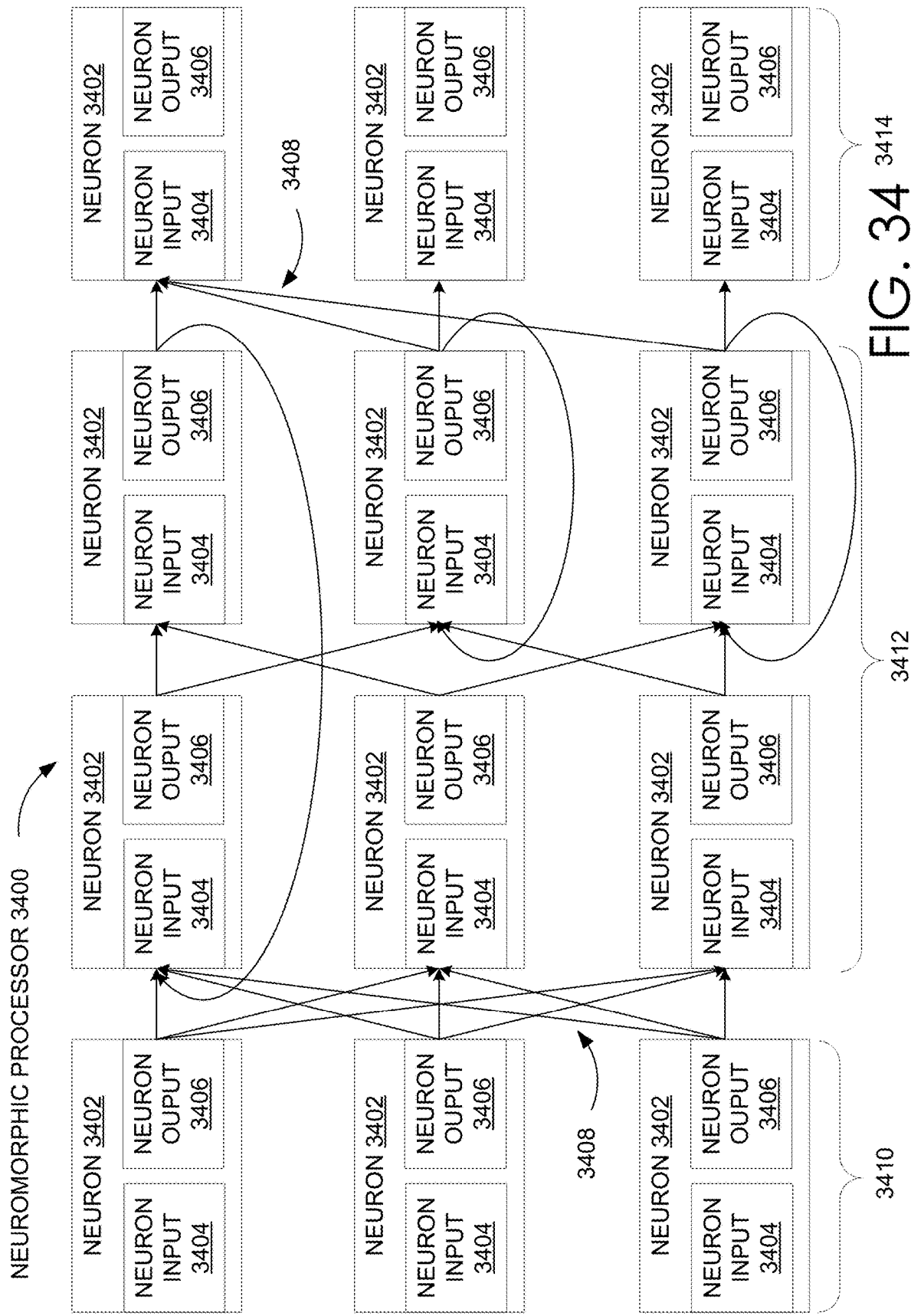
FIG. 34 illustrates an example neuromorphic processor, according to at least one embodiment.

FIG. 34 is a block diagram of a neuromorphic processor 3400, according to at least one embodiment. In at least one embodiment, neuromorphic processor 3400 may receive one or more inputs from sources external to neuromorphic processor 3400. In at least one embodiment, these inputs may be transmitted to one or more neurons 3402 within neuromorphic processor 3400. In at least one embodiment, neurons 3402 and components thereof may be implemented using circuitry or logic, including one or more arithmetic logic units (ALUs). In at least one embodiment, neuromorphic processor 3400 may include, without limitation, thousands or millions of instances of neurons 3402, but any suitable number of neurons 3402 may be used. In at least one embodiment, each instance of neuron 3402 may include a neuron input 3404 and a neuron output 3406. In at least one embodiment, neurons 3402 may generate outputs that may be transmitted to inputs of other instances of neurons 3402. For example, in at least one embodiment, neuron inputs 3404 and neuron outputs 3406 may be interconnected via synapses 3408.

In at least one embodiment, neurons 3402 and synapses 3408 may be interconnected such that neuromorphic processor 3400 operates to process or analyze information received by neuromorphic processor 3400. In at least one embodiment, neurons 3402 may transmit an output pulse (or "fire" or "spike") when inputs received through neuron input 3404 exceed a threshold. In at least one embodiment, neurons 3402 may sum or integrate signals received at neuron inputs 3404. For example, in at least one embodiment, neurons 3402 may be implemented as leaky integrate-and-fire neurons, wherein if a sum (referred to as a "membrane potential") exceeds a threshold value, neuron 3402 may generate an output (or "fire") using a transfer function such as a sigmoid or threshold function. In at least one embodiment, a leaky integrate-and-fire neuron may sum signals received at neuron inputs 3404 into a membrane potential and may also apply a decay factor (or leak) to reduce a membrane potential. In at least one embodiment, a leaky integrate-and-fire neuron may fire if multiple input signals are received at neuron inputs 3404 rapidly enough to exceed a threshold value (i.e., before a membrane potential decays too low to fire). In at least one embodiment, neurons 3402 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3402 may include, without limitation, comparator circuits or logic that generate an output spike at neuron output 3406 when result of applying a transfer function to neuron input 3404 exceeds a threshold. In at least one embodiment, once neuron 3402 fires, it may disregard previously received input information by, for example, resetting a membrane potential to 0 or another suitable default value. In at least one embodiment, once membrane potential is reset to 0, neuron 3402 may resume normal operation after a suitable period of time (or refractory period).

In at least one embodiment, neurons 3402 may be interconnected through synapses 3408. In at least one embodiment, synapses 3408 may operate to transmit signals from an output of a first neuron 3402 to an input of a second neuron 3402. In at least one embodiment, neurons 3402 may transmit information over more than one instance of synapse 3408. In at least one embodiment, one or more instances of neuron output 3406 may be connected, via an instance of synapse 3408, to an instance of neuron input 3404 in same neuron 3402. In at least one embodiment, an instance of neuron 3402 generating an output to be transmitted over an instance of synapse 3408 may be referred to as a "pre-synaptic neuron" with respect to that instance of synapse 3408. In at least one embodiment, an instance of neuron 3402 receiving an input transmitted over an instance of synapse 3408 may be referred to as a "post-synaptic neuron" with respect to that instance of synapse 3408. Because an instance of neuron 3402 may receive inputs from one or more instances of synapse 3408, and may also transmit outputs over one or more instances of synapse 3408, a single instance of neuron 3402 may therefore be both a "pre-synaptic neuron" and "post-synaptic neuron," with respect to various instances of synapses 3408, in at least one embodiment.

In at least one embodiment, neurons 3402 may be organized into one or more layers. Each instance of neuron 3402 may have one neuron output 3406 that may fan out through one or more synapses 3408 to one or more neuron inputs 3404. In at least one embodiment, neuron outputs 3406 of neurons 3402 in a first layer 3410 may be connected to neuron inputs 3404 of neurons 3402 in a second layer 3412. In at least one embodiment, layer 3410 may be referred to as a "feed-forward layer." In at least one embodiment, each instance of neuron 3402 in an instance of first layer 3410 may fan out to each instance of neuron 3402 in second layer 3412. In at least one embodiment, first layer 3410 may be referred to as a "fully connected feed-forward layer." In at least one embodiment, each instance of neuron 3402 in an instance of second layer 3412 may fan out to fewer than all instances of neuron 3402 in a third layer 3414. In at least one embodiment, second layer 3412 may be referred to as a "sparsely connected feed-forward layer." In at least one embodiment, neurons 3402 in second layer 3412 may fan out to neurons 3402 in multiple other layers, including to neurons 3402 in (same) second layer 3412. In at least one embodiment, second layer 3412 may be referred to as a "recurrent layer." In at least one embodiment, neuromorphic processor 3400 may include, without limitation, any suitable combination of recurrent layers and feed-forward layers, including, without limitation, both sparsely connected feed-forward layers and fully connected feed-forward layers.

In at least one embodiment, neuromorphic processor 3400 may include, without limitation, a reconfigurable interconnect architecture or dedicated hard wired interconnects to connect synapse 3408 to neurons 3402. In at least one embodiment, neuromorphic processor 3400 may include, without limitation, circuitry or logic that allows synapses to be allocated to different neurons 3402 as needed based on neural network topology and neuron fan-in/out. For example, in at least one embodiment, synapses 3408 may be connected to neurons 3402 using an interconnect fabric, such as network-on-chip, or with dedicated connections. In at least one embodiment, synapse interconnections and components thereof may be implemented using circuitry or logic.

Such components can be useful in determining a position of an object with respect to a vehicle, in at least one embodiment.

Figure 35:
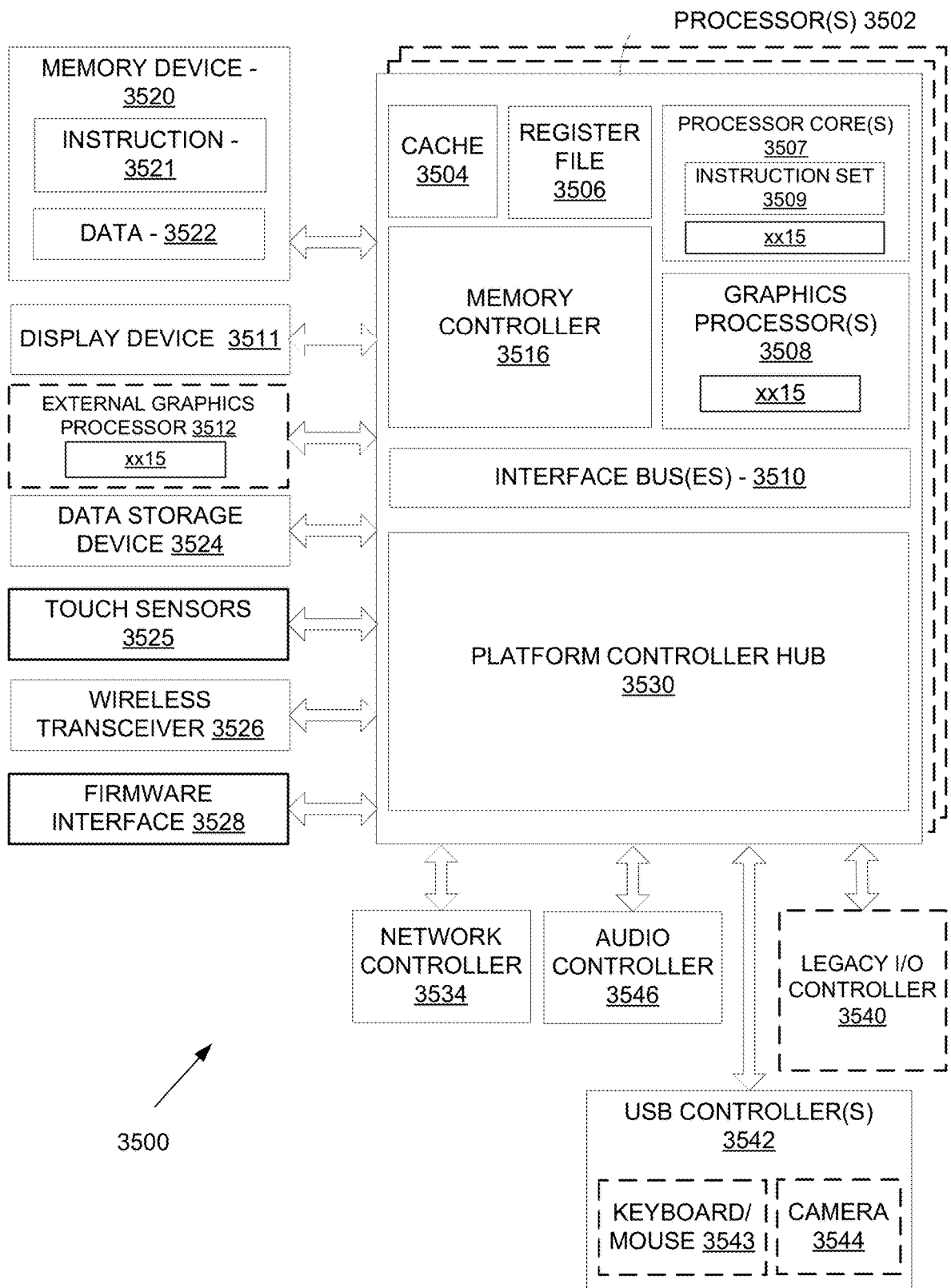
FIGS. 35 and 36 illustrate at least portions of a graphics processor, according to one or more embodiments.

FIG. 35 is a block diagram of a processing system, according to at least one embodiment. In at least one embodiment, system 3500 includes one or more processors 3502 and one or more graphics processors 3508, and may be a single processor desktop system, a multiprocessor workstation system, or a server system having a large number of processors 3502 or processor cores 3507. In at least one embodiment, system 3500 is a processing platform incorporated within a system-on-a-chip (SoC) integrated circuit for use in mobile, handheld, or embedded devices.

In at least one embodiment, system 3500 can include, or be incorporated within a server-based gaming platform, a game console, including a game and media console, a mobile gaming console, a handheld game console, or an online game console. In at least one embodiment, system 3500 is a mobile phone, smart phone, tablet computing device or mobile Internet device. In at least one embodiment, processing system 3500 can also include, couple with, or be integrated within a wearable device, such as a smart watch wearable device, smart eyewear device, augmented reality device, or virtual reality device. In at least one embodiment, processing system 3500 is a television or set top box device having one or more processors 3502 and a graphical interface generated by one or more graphics processors 3508.

In at least one embodiment, one or more processors 3502 each include one or more processor cores 3507 to process instructions which, when executed, perform operations for system and user software. In at least one embodiment, each of one or more processor cores 3507 is configured to process a specific instruction set 3509. In at least one embodiment, instruction set 3509 may facilitate Complex Instruction Set Computing (CISC), Reduced Instruction Set Computing (RISC), or computing via a Very Long Instruction Word (VLIW). In at least one embodiment, processor cores 3507 may each process a different instruction set 3509, which may include instructions to facilitate emulation of other instruction sets. In at least one embodiment, processor core 3507 may also include other processing devices, such a Digital Signal Processor (DSP).

In at least one embodiment, processor 3502 includes cache memory 3504. In at least one embodiment, processor 3502 can have a single internal cache or multiple levels of internal cache. In at least one embodiment, cache memory is shared among various components of processor 3502. In at least one embodiment, processor 3502 also uses an external cache (e.g., a Level-3 (L3) cache or Last Level Cache (LLC)) (not shown), which may be shared among processor cores 3507 using known cache coherency techniques. In at least one embodiment, register file 3506 is additionally included in processor 3502 which may include different types of registers for storing different types of data (e.g., integer registers, floating point registers, status registers, and an instruction pointer register). In at least one embodiment, register file 3506 may include general-purpose registers or other registers.

In at least one embodiment, one or more processor(s) 3502 are coupled with one or more interface bus(es) 3510 to transmit communication signals such as address, data, or control signals between processor 3502 and other components in system 3500. In at least one embodiment, interface bus 3510, in one embodiment, can be a processor bus, such as a version of a Direct Media Interface (DMI) bus. In at least one embodiment, interface 3510 is not limited to a DMI bus, and may include one or more Peripheral Component Interconnect buses (e.g., PCI, PCI Express), memory busses, or other types of interface busses. In at least one embodiment processor(s) 3502 include an integrated memory controller 3516 and a platform controller hub 3530. In at least one embodiment, memory controller 3516 facilitates communication between a memory device and other components of system 3500, while platform controller hub (PCH) 3530 provides connections to I/O devices via a local I/O bus.

In at least one embodiment, memory device 3520 can be a dynamic random access memory (DRAM) device, a static random access memory (SRAM) device, flash memory device, phase-change memory device, or some other memory device having suitable performance to serve as process memory. In at least one embodiment memory device 3520 can operate as system memory for system 3500, to store data 3522 and instructions 3521 for use when one or more processors 3502 executes an application or process. In at least one embodiment, memory controller 3516 also couples with an optional external graphics processor 3512, which may communicate with one or more graphics processors 3508 in processors 3502 to perform graphics and media operations. In at least one embodiment, a display device 3511 can connect to processor(s) 3502. In at least one embodiment display device 3511 can include one or more of an internal display device, as in a mobile electronic device or a laptop device or an external display device attached via a display interface (e.g., DisplayPort, etc.). In at least one embodiment, display device 3511 can include a head mounted display (HMD) such as a stereoscopic display device for use in virtual reality (VR) applications or augmented reality (AR) applications.

In at least one embodiment, platform controller hub 3530 enables peripherals to connect to memory device 3520 and processor 3502 via a high-speed I/O bus. In at least one embodiment, I/O peripherals include, but are not limited to, an audio controller 3546, a network controller 3534, a firmware interface 3528, a wireless transceiver 3526, touch sensors 3525, a data storage device 3524 (e.g., hard disk drive, flash memory, etc.). In at least one embodiment, data storage device 3524 can connect via a storage interface (e.g., SATA) or via a peripheral bus, such as a Peripheral Component Interconnect bus (e.g., PCI, PCI Express). In at least one embodiment, touch sensors 3525 can include touch screen sensors, pressure sensors, or fingerprint sensors. In at least one embodiment, wireless transceiver 3526 can be a Wi-Fi transceiver, a Bluetooth transceiver, or a mobile network transceiver such as a 3G, 4G, or Long Term Evolution (LTE) transceiver. In at least one embodiment, firmware interface 3528 enables communication with system firmware, and can be, for example, a unified extensible firmware interface (UEFI). In at least one embodiment, network controller 3534 can enable a network connection to a wired network. In at least one embodiment, a high-performance network controller (not shown) couples with interface bus 3510. In at least one embodiment, audio controller 3546 is a multi-channel high definition audio controller. In at least one embodiment, system 3500 includes an optional legacy I/O controller 3540 for coupling legacy (e.g., Personal System 2 (PS/2)) devices to system. In at least one embodiment, platform controller hub 3530 can also connect to one or more Universal Serial Bus (USB) controllers 3542 connect input devices, such as keyboard and mouse 3543 combinations, a camera 3544, or other USB input devices.

In at least one embodiment, an instance of memory controller 3516 and platform controller hub 3530 may be integrated into a discreet external graphics processor, such as external graphics processor 3512. In at least one embodiment, platform controller hub 3530 and/or memory controller 3516 may be external to one or more processor(s) 3502. For example, in at least one embodiment, system 3500 can include an external memory controller 3516 and platform controller hub 3530, which may be configured as a memory controller hub and peripheral controller hub within a system chipset that is in communication with processor(s) 3502.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment portions or all of inference and/or training logic 1715 may be incorporated into graphics processor 3500. For example, in at least one embodiment, training and/or inferencing techniques described herein may use one or more of ALUs embodied in graphics processor 3512. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3500 to perform one or more machine learning algorithms, neural network architectures, use cases, or training techniques described herein.

Such components can be useful in determining a position of an object with respect to a vehicle, in at least one embodiment.

Figure 36:
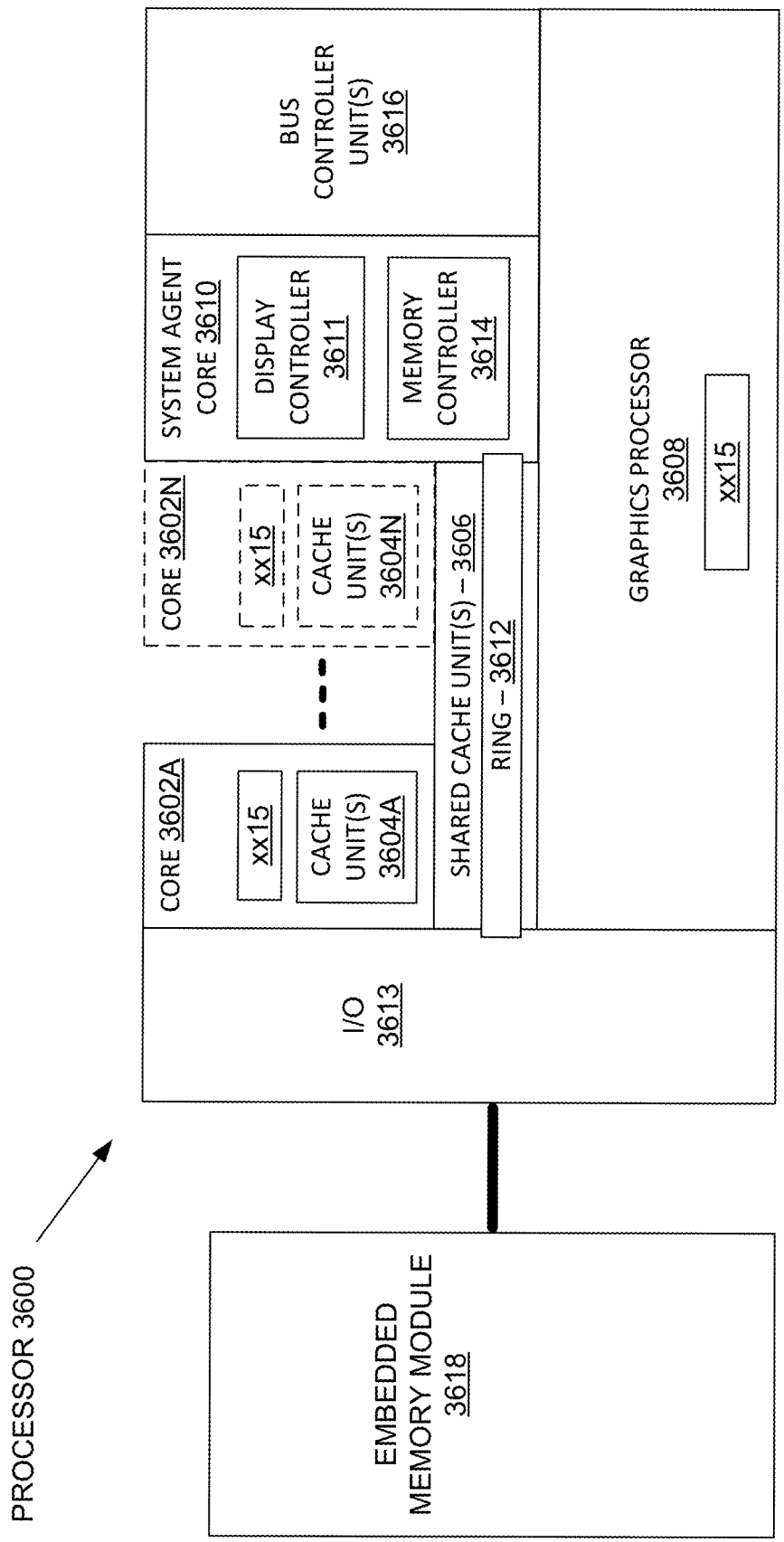

FIG. 36 is a block diagram of a processor 3600 having one or more processor cores 3602A-3602N, an integrated memory controller 3614, and an integrated graphics processor 3608, according to at least one embodiment. In at least one embodiment, processor 3600 can include additional cores up to and including additional core 3602N represented by dashed lined boxes. In at least one embodiment, each of processor cores 3602A-3602N includes one or more internal cache units 3604A-3604N. In at least one embodiment, each processor core also has access to one or more shared cached units 3606.

In at least one embodiment, internal cache units 3604A-3604N and shared cache units 3606 represent a cache memory hierarchy within processor 3600. In at least one embodiment, cache memory units 3604A-3604N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3606 and 3604A-3604N.

In at least one embodiment, processor 3600 may also include a set of one or more bus controller units 3616 and a system agent core 3610. In at least one embodiment, one or more bus controller units 3616 manage a set of peripheral buses, such as one or more PCI or PCI express busses. In at least one embodiment, system agent core 3610 provides management functionality for various processor components. In at least one embodiment, system agent core 3610 includes one or more integrated memory controllers 3614 to manage access to various external memory devices (not shown).

In at least one embodiment, one or more of processor cores 3602A-3602N include support for simultaneous multi-threading. In at least one embodiment, system agent core 3610 includes components for coordinating and operating cores 3602A-3602N during multi-threaded processing. In at least one embodiment, system agent core 3610 may additionally include a power control unit (PCU), which includes logic and components to regulate one or more power states of processor cores 3602A-3602N and graphics processor 3608.

In at least one embodiment, processor 3600 additionally includes graphics processor 3608 to execute graphics processing operations. In at least one embodiment, graphics processor 3608 couples with shared cache units 3606, and system agent core 3610, including one or more integrated memory controllers 3614. In at least one embodiment, system agent core 3610 also includes a display controller 3611 to drive graphics processor output to one or more coupled displays. In at least one embodiment, display controller 3611 may also be a separate module coupled with graphics processor 3608 via at least one interconnect, or may be integrated within graphics processor 3608.

In at least one embodiment, a ring based interconnect unit 3612 is used to couple internal components of processor 3600. In at least one embodiment, an alternative interconnect unit may be used, such as a point-to-point interconnect, a switched interconnect, or other techniques. In at least one embodiment, graphics processor 3608 couples with ring interconnect 3612 via an I/O link 3613.

In at least one embodiment, I/O link 3613 represents at least one of multiple varieties of I/O interconnects, including an on package I/O interconnect which facilitates communication between various processor components and a high-performance embedded memory module 3618, such as an eDRAM module. In at least one embodiment, each of processor cores 3602A-3602N and graphics processor 3608 use embedded memory modules 3618 as a shared Last Level Cache.

In at least one embodiment, processor cores 3602A-3602N are homogenous cores executing a common instruction set architecture. In at least one embodiment, processor cores 3602A-3602N are heterogeneous in terms of instruction set architecture (ISA), where one or more of processor cores 3602A-3602N execute a common instruction set, while one or more other cores of processor cores 3602A-36-02N executes a subset of a common instruction set or a different instruction set. In at least one embodiment, processor cores 3602A-3602N are heterogeneous in terms of microarchitecture, where one or more cores having a relatively higher power consumption couple with one or more power cores having a lower power consumption. In at least one embodiment, processor 3600 can be implemented on one or more chips or as an SoC integrated circuit.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment portions or all of inference and/or training logic 1715 may be incorporated into processor 3600. For example, in at least one embodiment, training and/or inferencing techniques described herein may use one or more of ALUs embodied in graphics processor 3512, graphics core(s) 3602A-3602N, or other components in FIG. 36. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3600 to perform one or more machine learning algorithms, neural network architectures, use cases, or training techniques described herein.

Such components can be useful in determining a position of an object with respect to a vehicle, in at least one embodiment.

Figure 37:
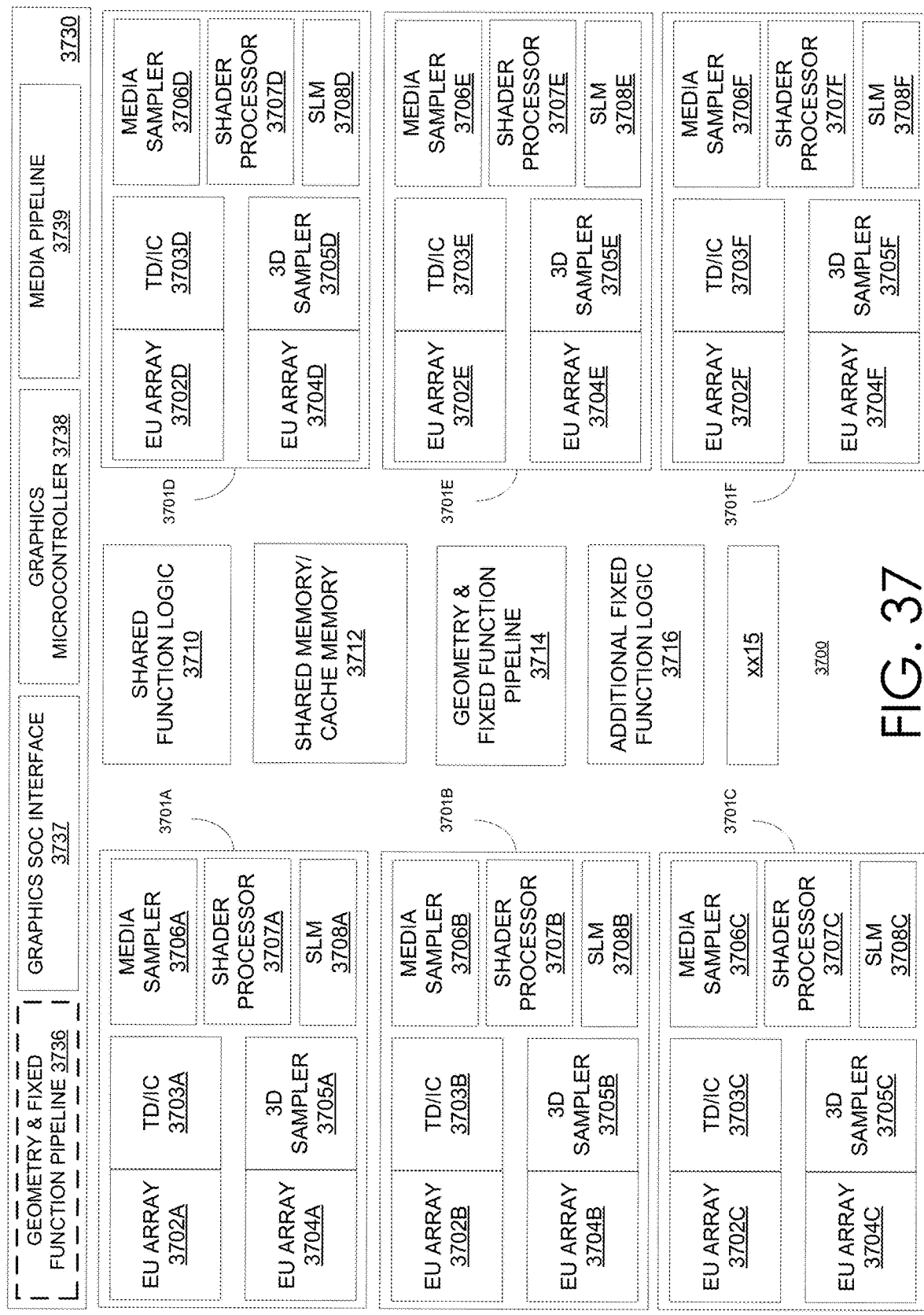
FIG. 37 illustrates at least portions of a graphics processor core, according to at least one embodiment.

FIG. 37 is a block diagram of hardware logic of a graphics processor core 3700, according to at least one embodiment described herein. In at least one embodiment, graphics processor core 3700 is included within a graphics core array. In at least one embodiment, graphics processor core 3700, sometimes referred to as a core slice, can be one or multiple graphics cores within a modular graphics processor. In at least one embodiment, graphics processor core 3700 is exemplary of one graphics core slice, and a graphics processor as described herein may include multiple graphics core slices based on target power and performance envelopes. In at least one embodiment, each graphics core 3700 can include a fixed function block 3730 coupled with multiple sub-cores 3701A-3701F, also referred to as sub-slices, that include modular blocks of general-purpose and fixed function logic.

In at least one embodiment, fixed function block 3730 includes a geometry/fixed function pipeline 3736 that can be shared by all sub-cores in graphics processor 3700, for example, in lower performance and/or lower power graphics processor implementations. In at least one embodiment, geometry/fixed function pipeline 3736 includes a 3D fixed function pipeline, a video front-end unit, a thread spawner and thread dispatcher, and a unified return buffer manager, which manages unified return buffers.

In at least one embodiment fixed, function block 3730 also includes a graphics SoC interface 3737, a graphics microcontroller 3738, and a media pipeline 3739. In at least one embodiment fixed, graphics SoC interface 3737 provides an interface between graphics core 3700 and other processor cores within a system on a chip integrated circuit. In at least one embodiment, graphics microcontroller 3738 is a programmable sub-processor that is configurable to manage various functions of graphics processor 3700, including thread dispatch, scheduling, and pre-emption. In at least one embodiment, media pipeline 3739 includes logic to facilitate decoding, encoding, pre-processing, and/or post-processing of multimedia data, including image and video data. In at least one embodiment, media pipeline 3739 implements media operations via requests to compute or sampling logic within sub-cores 3701-3701F.

In at least one embodiment, SoC interface 3737 enables graphics core 3700 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3737 can also enable communication with fixed function devices within an SoC, such as camera imaging pipelines, and enables use of and/or implements global memory atomics that may be shared between graphics core 3700 and CPUs within an SoC. In at least one embodiment, SoC interface 3737 can also implement power management controls for graphics core 3700 and enable an interface between a clock domain of graphic core 3700 and other clock domains within an SoC. In at least one embodiment, SoC interface 3737 enables receipt of command buffers from a command streamer and global thread dispatcher that are configured to provide commands and instructions to each of one or more graphics cores within a graphics processor. In at least one embodiment, commands and instructions can be dispatched to media pipeline 3739, when media operations are to be performed, or a geometry and fixed function pipeline (e.g., geometry and fixed function pipeline 3736, geometry and fixed function pipeline 3714) when graphics processing operations are to be performed.

In at least one embodiment, graphics microcontroller 3738 can be configured to perform various scheduling and management tasks for graphics core 3700. In at least one embodiment, graphics microcontroller 3738 can perform graphics and/or compute workload scheduling on various graphics parallel engines within execution unit (EU) arrays 3702A-3702F, 3704A-3704F within sub-cores 3701A-3701F. In at least one embodiment, host software executing on a CPU core of an SoC including graphics core 3700 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3738 can also facilitate low-power or idle states for graphics core 3700, providing graphics core 3700 with an ability to save and restore registers within graphics core 3700 across low-power state transitions independently from an operating system and/or graphics driver software on a system.

In at least one embodiment, graphics core 3700 may have greater than or fewer than illustrated sub-cores 3701A-3701F, up to N modular sub-cores. For each set of N sub-cores, in at least one embodiment, graphics core 3700 can also include shared function logic 3710, shared and/or cache memory 3712, a geometry/fixed function pipeline 3714, as well as additional fixed function logic 3716 to accelerate various graphics and compute processing operations. In at least one embodiment, shared function logic 3710 can include logic units (e.g., sampler, math, and/or inter-thread communication logic) that can be shared by each N sub-cores within graphics core 3700. In at least one embodiment fixed, shared and/or cache memory 3712 can be a last-level cache for N sub-cores 3701A-3701F within graphics core 3700 and can also serve as shared memory that is accessible by multiple sub-cores. In at least one embodiment, geometry/fixed function pipeline 3714 can be included instead of geometry/fixed function pipeline 3736 within fixed function block 3730 and can include same or similar logic units.

In at least one embodiment, graphics core 3700 includes additional fixed function logic 3716 that can include various fixed function acceleration logic for use by graphics core 3700. In at least one embodiment, additional fixed function logic 3716 includes an additional geometry pipeline for use in position only shading. In position-only shading, at least two geometry pipelines exist, whereas in a full geometry pipeline within geometry/fixed function pipeline 3716, 3736, and a cull pipeline, which is an additional geometry pipeline which may be included within additional fixed function logic 3716. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3716 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3716 can also include machine-learning acceleration logic, such as fixed function matrix multiplication logic, for implementations including optimizations for machine learning training or inferencing.

In at least one embodiment, within each graphics sub-core 3701A-3701F includes a set of execution resources that may be used to perform graphics, media, and compute operations in response to requests by graphics pipeline, media pipeline, or shader programs. In at least one embodiment, graphics sub-cores 3701A-3701F include multiple EU arrays 3702A-3702F, 3704A-3704F, thread dispatch and inter-thread communication (TD/IC) logic 3703A-3703F, a 3D (e.g., texture) sampler 3705A-3705F, a media sampler 3706A-3706F, a shader processor 3707A-3707F, and shared local memory (SLM) 3708A-3708F. EU arrays 3702A-3702F, 3704A-3704F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3703A-3703F performs local thread dispatch and thread control operations for execution units within a sub-core and facilitate communication between threads executing on execution units of a sub-core. In at least one embodiment, 3D sampler 3705A-3705F can read texture or other 3D graphics related data into memory. In at least one embodiment, 3D sampler can read texture data differently based on a configured sample state and texture format associated with a given texture. In at least one embodiment, media sampler 3706A-3706F can perform similar read operations based on a type and format associated with media data. In at least one embodiment, each graphics sub-core 3701A-3701F can alternately include a unified 3D and media sampler. In at least one embodiment, threads executing on execution units within each of sub-cores 3701A-3701F can make use of shared local memory 3708A-3708F within each sub-core, to enable threads executing within a thread group to execute using a common pool of on-chip memory.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, portions or all of inference and/or training logic 1715 may be incorporated into graphics processor 3710. For example, in at least one embodiment, training and/or inferencing techniques described herein may use one or more of ALUs embodied in graphics processor 3512, graphics microcontroller 3738, geometry & fixed function pipeline 3714 and 3736, or other logic in FIG. 36. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein.

Such components can be useful in determining a position of an object with respect to a vehicle, in at least one embodiment.

Figure 38A:
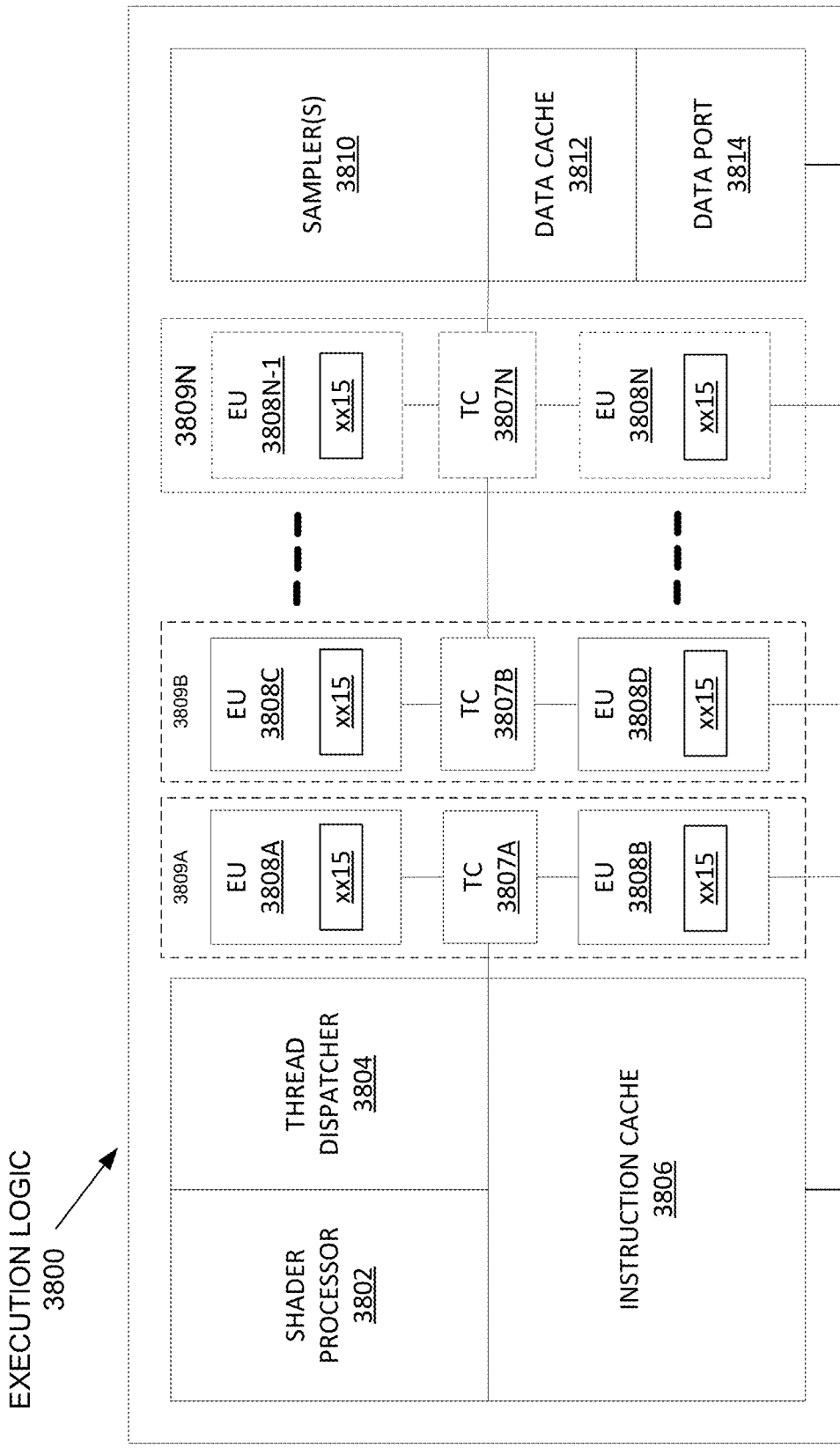
FIGS. 38A-38B illustrate at least portions of a graphics processor core, according to at least one embodiment.
Figure 38B:
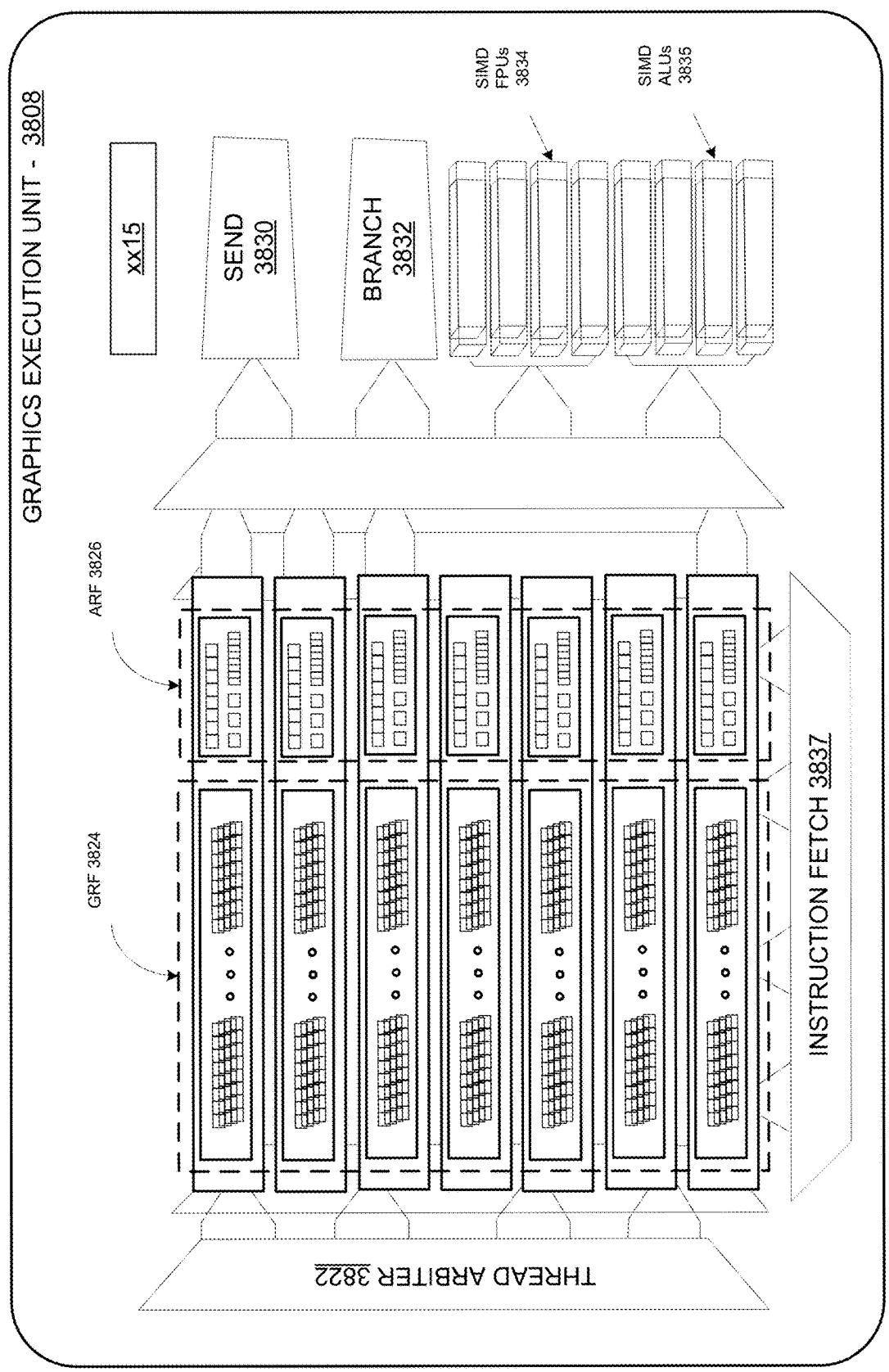

FIGS. 38A-38B illustrate thread execution logic 3800 including an array of processing elements of a graphics processor core according to at least one embodiment. FIG. 38A illustrates at least one embodiment, in which thread execution logic 3800 is used. FIG. 38B illustrates exemplary internal details of an execution unit, according to at least one embodiment.

As illustrated in FIG. 38A, in at least one embodiment, thread execution logic 3800 includes a shader processor 3802, a thread dispatcher 3804, instruction cache 3806, a scalable execution unit array including a plurality of execution units 3808A-3808N, sampler(s) 3810, a data cache 3812, and a data port 3814. In at least one embodiment a scalable execution unit array can dynamically scale by enabling or disabling one or more execution units (e.g., any of execution unit 3808A, 3808B, 3808C, 3808D, through 3808N-1 and 3808N) based on computational requirements of a workload, for example. In at least one embodiment, scalable execution units are interconnected via an interconnect fabric that links to each of execution unit. In at least one embodiment, thread execution logic 3800 includes one or more connections to memory, such as system memory or cache memory, through one or more of instruction cache 3806, data port 3814, sampler 3810, and execution units 3808A-3808N. In at least one embodiment, each execution unit (e.g., 3808A) is a stand-alone programmable general-purpose computational unit that is capable of executing multiple simultaneous hardware threads while processing multiple data elements in parallel for each thread. In at least one embodiment, array of execution units 3808A-3808N is scalable to include any number individual execution units.

In at least one embodiment, execution units 3808A-3808N are primarily used to execute shader programs. In at least one embodiment, shader processor 3802 can process various shader programs and dispatch execution threads associated with shader programs via a thread dispatcher 3804. In at least one embodiment, thread dispatcher 3804 includes logic to arbitrate thread initiation requests from graphics and media pipelines and instantiate requested threads on one or more execution units in execution units 3808A-3808N. For example, in at least one embodiment, a geometry pipeline can dispatch vertex, tessellation, or geometry shaders to thread execution logic for processing. In at least one embodiment, thread dispatcher 3804 can also process runtime thread spawning requests from executing shader programs.

In at least one embodiment, execution units 3808A-3808N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3808A-3808N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3808A-3808N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3808A-3808N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3808A-3808N support integer and floating-point data types.

In at least one embodiment, an execution unit instruction set includes SIMD instructions. In at least one embodiment, various data elements can be stored as a packed data type in a register and an execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3809A-3809N having thread control logic (3807A-3807N) that is common to fused EUs. In at least one embodiment, multiple EUs can be fused into an EU group. In at least one embodiment, each EU in fused EU group can be configured to execute a separate SIMD hardware thread. Number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3809A-3809N includes at least two execution units. For example, in at least one embodiment, fused execution unit 3809A includes a first EU 3808A, second EU 3808B, and thread control logic 3807A that is common to first EU 3808A and second EU 3808B. In at least one embodiment, thread control logic 3807A controls threads executed on fused graphics execution unit 3809A, allowing each EU within fused execution units 3809A-3809N to execute using a common instruction pointer register.

In at least one embodiment, one or more internal instruction caches (e.g., 3806) are included in thread execution logic 3800 to cache thread instructions for execution units. In at least one embodiment, one or more data caches (e.g., 3812) are included to cache thread data during thread execution. In at least one embodiment, a sampler 3810 is included to provide texture sampling for 3D operations and media sampling for media operations. In at least one embodiment, sampler 3810 includes specialized texture or media sampling functionality to process texture or media data during a sampling process before providing sampled data to an execution unit.

During execution, in at least one embodiment, graphics and media pipelines send thread initiation requests to thread execution logic 3800 via thread spawning and dispatch logic. In at least one embodiment, once a group of geometric objects has been processed and rasterized into pixel data, pixel processor logic (e.g., pixel shader logic, fragment shader logic, etc.) within shader processor 3802 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3802 then executes an application programming interface (API)-supplied pixel or fragment shader program. In at least one embodiment, to execute a shader program, shader processor 3802 dispatches threads to an execution unit (e.g., 3808A) via thread dispatcher 3804. In at least one embodiment, shader processor 3802 uses texture sampling logic in sampler 3810 to access texture data in texture maps stored in memory. In at least one embodiment, arithmetic operations on texture data and input geometry data compute pixel color data for each geometric fragment, or discards one or more pixels from further processing.

In at least one embodiment, data port 3814 provides a memory access mechanism for thread execution logic 3800 to output processed data to memory for further processing on a graphics processor output pipeline. In at least one embodiment, data port 3814 includes or couples to one or more cache memories (e.g., data cache 3812) to cache data for memory access via a data port.

As illustrated in FIG. 38B, in at least one embodiment, a graphics execution unit 3808 can include an instruction fetch unit 3837, a general register file array (GRF) 3824, an architectural register file array (ARF) 3826, a thread arbiter 3822, a send unit 3830, a branch unit 3832, a set of SIMD floating point units (FPUs) 3834, and, in at least one embodiment, a set of dedicated integer SIMD ALUs 3835. In at least one embodiment, GRF 3824 and ARF 3826 includes a set of general register files and architecture register files associated with each simultaneous hardware thread that may be active in graphics execution unit 3808. In at least one embodiment, per thread architectural state is maintained in ARF 3826, while data used during thread execution is stored in GRF 3824. In at least one embodiment, execution state of each thread, including instruction pointers for each thread, can be held in thread-specific registers in ARF 3826.

In at least one embodiment, graphics execution unit 3808 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3808 can co-issue multiple instructions, which may each be different instructions. In at least one embodiment, thread arbiter 3822 of graphics execution unit thread 3808 can dispatch instructions to one of send unit 3830, branch unit 3842, or SIMD FPU(s) 3834 for execution. In at least one embodiment, each execution thread can access 128 general-purpose registers within GRF 3824, where each register can store 32 bytes, accessible as a SIMD8-element vector of 32-bit data elements. In at least one embodiment, each execution unit thread has access to 4 Kbytes within GRF 3824, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3824 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3830. In at least one embodiment, branch instructions are dispatched to a dedicated branch unit 3832 to facilitate SIMD divergence and eventual convergence.

In at least one embodiment graphics execution unit 3808 includes one or more SIMD floating point units (FPU(s)) 3834 to perform floating-point operations. In at least one embodiment, FPU(s) 3834 also support integer computation. In at least one embodiment FPU(s) 3834 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3835 are also present, and may be specifically optimized to perform operations associated with machine learning computations.

In at least one embodiment, arrays of multiple instances of graphics execution unit 3808 can be instantiated in a graphics sub-core grouping (e.g., a sub-slice). In at least one embodiment, execution unit 3808 can execute instructions across a plurality of execution channels. In at least one embodiment, each thread executed on graphics execution unit 3808 is executed on a different channel.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, portions or all of inference and/or training logic 1715 may be incorporated into execution logic 3800. Moreover, in at least one embodiment, inferencing and/or training operations described herein may be done using logic other than logic illustrated in FIG. 17A or 17B. In at least one embodiment, weight parameters may be stored in on-chip or off-chip memory and/or registers (shown or not shown) that configure ALUs of execution logic 3800 to perform one or more machine learning algorithms, neural network architectures, use cases, or training techniques described herein.

Such components can be useful in determining a position of an object with respect to a vehicle, in at least one embodiment.

Figure 39:
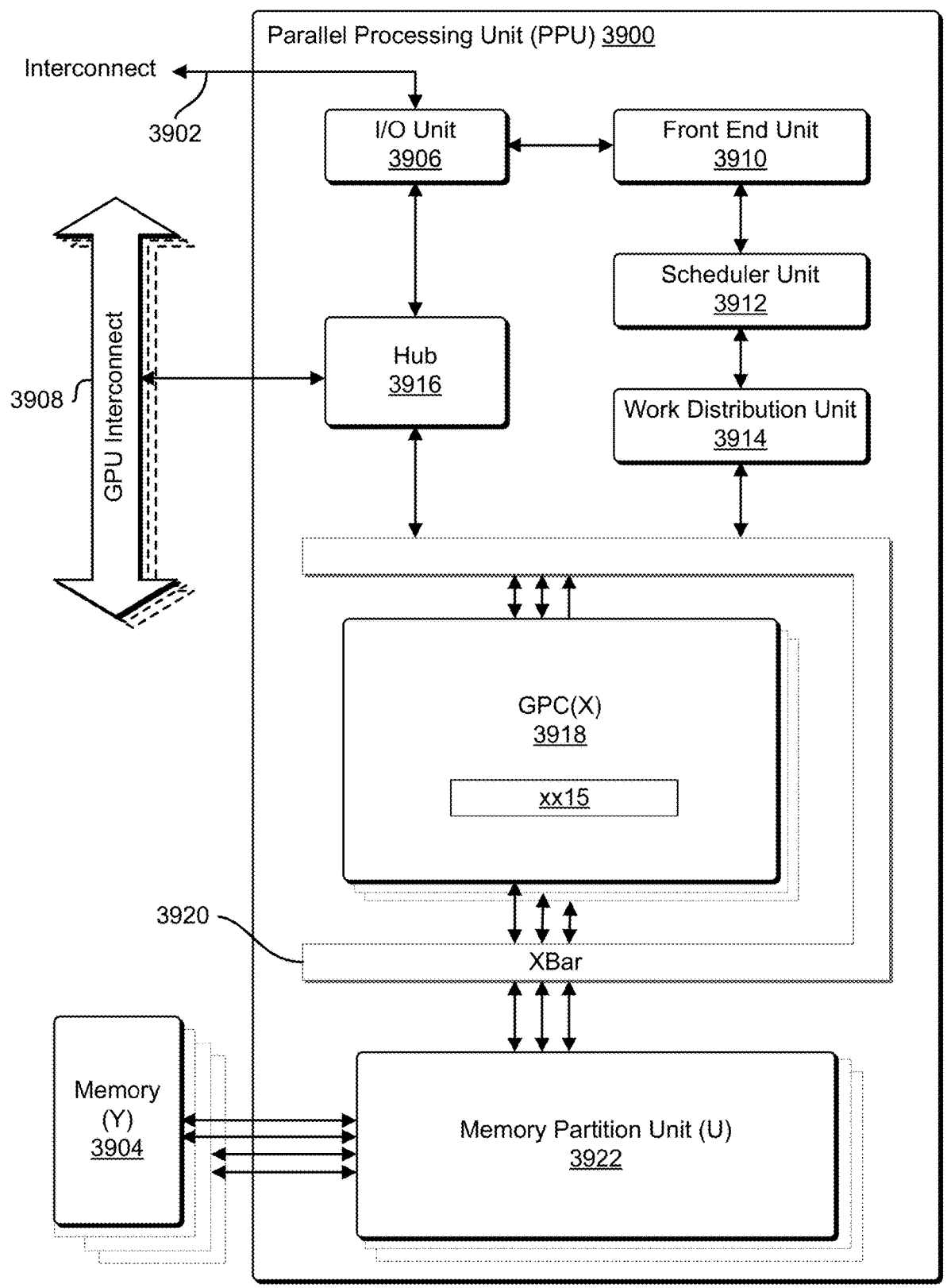
FIG. 39 illustrates a parallel processing unit ("PPU"), according to at least one embodiment.

FIG. 39 illustrates a parallel processing unit ("PPU") 3900, according to at least one embodiment. In at least one embodiment, PPU 3900 is configured with machine-readable code that, if executed by PPU 3900, causes PPU 3900 to perform some or all of processes and techniques described throughout this disclosure. In at least one embodiment, PPU 3900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3900. In at least one embodiment, PPU 3900 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3900 is utilized to perform computations such as linear algebra operations and machine-learning operations. FIG. 39 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3900 are configured to accelerate High Performance Computing ("HPC"), data center, and machine learning applications. In at least one embodiment, PPU 3900 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3900 includes, without limitation, an Input/Output ("I/O") unit 3906, a front-end unit 3910, a scheduler unit 3912, a work distribution unit 3914, a hub 3916, a crossbar ("Xbar") 3920, one or more general processing clusters ("GPCs") 3918, and one or more partition units ("memory partition units") 3922. In at least one embodiment, PPU 3900 is connected to a host processor or other PPUs 3900 via one or more high-speed GPU interconnects ("GPU interconnects") 3908. In at least one embodiment, PPU 3900 is connected to a host processor or other peripheral devices via an interconnect 3902. In at least one embodiment, PPU 3900 is connected to a local memory comprising one or more memory devices ("memory") 3904. In at least one embodiment, memory devices 3904 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3908 may refer to a wire-based multi-lane communications link that is used by systems to scale and include one or more PPUs 3900 combined with one or more central processing units ("CPUs"), supports cache coherence between PPUs 3900 and CPUs, and CPU mastering. In at least one embodiment, data and/or commands are transmitted by high-speed GPU interconnect 3908 through hub 3916 to/from other units of PPU 3900 such as one or more copy engines, video encoders, video decoders, power management units, and other components which may not be explicitly illustrated in FIG. 39.

In at least one embodiment, I/O unit 3906 is configured to transmit and receive communications (e.g., commands, data) from a host processor (not illustrated in FIG. 39) over system bus 3902. In at least one embodiment, I/O unit 3906 communicates with host processor directly via system bus 3902 or through one or more intermediate devices such as a memory bridge. In at least one embodiment, I/O unit 3906 may communicate with one or more other processors, such as one or more of PPUs 3900 via system bus 3902. In at least one embodiment, I/O unit 3906 implements a Peripheral Component Interconnect Express ("PCIe") interface for communications over a PCIe bus. In at least one embodiment, I/O unit 3906 implements interfaces for communicating with external devices.

In at least one embodiment, I/O unit 3906 decodes packets received via system bus 3902. In at least one embodiment, at least some packets represent commands configured to cause PPU 3900 to perform various operations. In at least one embodiment, I/O unit 3906 transmits decoded commands to various other units of PPU 3900 as specified by commands. In at least one embodiment, commands are transmitted to front-end unit 3910 and/or transmitted to hub 3916 or other units of PPU 3900 such as one or more copy engines, a video encoder, a video decoder, a power management unit, etc. (not explicitly illustrated in FIG. 39). In at least one embodiment, I/O unit 3906 is configured to route communications between and among various logical units of PPU 3900.

In at least one embodiment, a program executed by host processor encodes a command stream in a buffer that provides workloads to PPU 3900 for processing. In at least one embodiment, a workload comprises instructions and data to be processed by those instructions. In at least one embodiment, buffer is a region in a memory that is accessible (e.g., read/write) by both host processor and PPU 3900—a host interface unit may be configured to access buffer in a system memory connected to system bus 3902 via memory requests transmitted over system bus 3902 by I/O unit 3906. In at least one embodiment, host processor writes command stream to buffer and then transmits a pointer to start of command stream to PPU 3900 such that front-end unit 3910 receives pointers to one or more command streams and manages one or more command streams, reading commands from command streams and forwarding commands to various units of PPU 3900.

In at least one embodiment, front-end unit 3910 is coupled to scheduler unit 3912 that configures various GPCs 3918 to process tasks defined by one or more command streams. In at least one embodiment, scheduler unit 3912 is configured to track state information related to various tasks managed by scheduler unit 3912 where state information may indicate which of GPCs 3918 a task is assigned to, whether task is active or inactive, a priority level associated with task, and so forth. In at least one embodiment, scheduler unit 3912 manages execution of a plurality of tasks on one or more of GPCs 3918.

In at least one embodiment, scheduler unit 3912 is coupled to work distribution unit 3914 that is configured to dispatch tasks for execution on GPCs 3918. In at least one embodiment, work distribution unit 3914 tracks a number of scheduled tasks received from scheduler unit 3912 and work distribution unit 3914 manages a pending task pool and an active task pool for each of GPCs 3918. In at least one embodiment, pending task pool comprises a number of slots (e.g., 32 slots) that contain tasks assigned to be processed by a particular GPC 3918; active task pool may comprise a number of slots (e.g., 4 slots) for tasks that are actively being processed by GPCs 3918 such that as one of GPCs 3918 completes execution of a task, that task is evicted from active task pool for GPC 3918 and one of other tasks from pending task pool is selected and scheduled for execution on GPC 3918. In at least one embodiment, if an active task is idle on GPC 3918, such as while waiting for a data dependency to be resolved, then active task is evicted from GPC 3918 and returned to pending task pool while another task in pending task pool is selected and scheduled for execution on GPC 3918.

In at least one embodiment, work distribution unit 3914 communicates with one or more GPCs 3918 via XBar 3920. In at least one embodiment, XBar 3920 is an interconnect network that couples many of units of PPU 3900 to other units of PPU 3900 and can be configured to couple work distribution unit 3914 to a particular GPC 3918. In at least one embodiment, one or more other units of PPU 3900 may also be connected to XBar 3920 via hub 3916.

In at least one embodiment, tasks are managed by scheduler unit 3912 and dispatched to one of GPCs 3918 by work distribution unit 3914. GPC 3918 is configured to process task and generate results. In at least one embodiment, results may be consumed by other tasks within GPC 3918, routed to a different GPC 3918 via XBar 3920, or stored in memory 3904. In at least one embodiment, results can be written to memory 3904 via partition units 3922, which implement a memory interface for reading and writing data to/from memory 3904. In at least one embodiment, results can be transmitted to another PPU 3904 or CPU via high-speed GPU interconnect 3908. In at least one embodiment, PPU 3900 includes, without limitation, a number U of partition units 3922 that is equal to number of separate and distinct memory devices 3904 coupled to PPU 3900. In at least one embodiment, partition unit 3922 will be described in more detail below in conjunction with FIG. 41.

In at least one embodiment, a host processor executes a driver kernel that implements an application programming interface ("API") that enables one or more applications executing on host processor to schedule operations for execution on PPU 3900. In at least one embodiment, multiple compute applications are simultaneously executed by PPU 3900 and PPU 3900 provides isolation, quality of service ("QoS"), and independent address spaces for multiple compute applications. In at least one embodiment, an application generates instructions (e.g., in form of API calls) that cause driver kernel to generate one or more tasks for execution by PPU 3900 and driver kernel outputs tasks to one or more streams being processed by PPU 3900. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 41.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, deep learning application processor is used to train a machine learning model, such as a neural network, to predict or infer information provided to PPU 3900. In at least one embodiment, PPU 3900 is used to infer or predict information based on a trained machine learning model (e.g., neural network) that has been trained by another processor or system or by PPU 3900. In at least one embodiment, PPU 3900 may be used to perform one or more neural network use cases described herein.

Such components can be useful in determining a position of an object with respect to a vehicle, in at least one embodiment.

Figure 40:
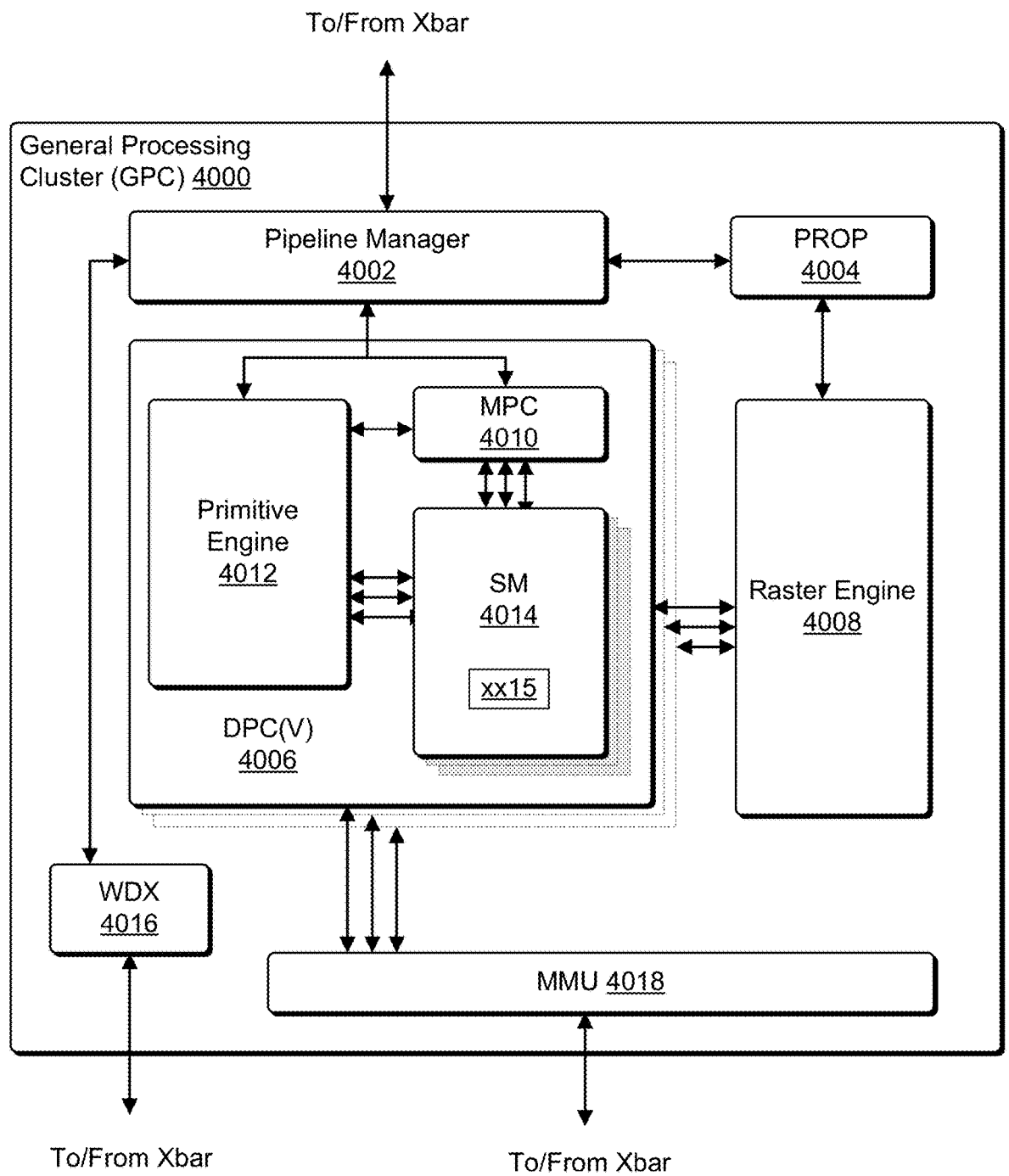
FIG. 40 illustrates a general processing cluster ("GPC"), according to at least one embodiment.

FIG. 40 illustrates a general processing cluster ("GPC") 4000, according to at least one embodiment. In at least one embodiment, GPC 4000 is GPC 3918 of FIG. 39. In at least one embodiment, each GPC 4000 includes, without limitation, a number of hardware units for processing tasks and each GPC 4000 includes, without limitation, a pipeline manager 4002, a pre-raster operations unit ("PROP") 4004, a raster engine 4008, a work distribution crossbar ("WDX") 4016, a memory management unit ("MMU") 4018, one or more Data Processing Clusters ("DPCs") 4006, and any suitable combination of parts.

In at least one embodiment, operation of GPC 4000 is controlled by pipeline manager 4002. In at least one embodiment, pipeline manager 4002 manages configuration of one or more DPCs 4006 for processing tasks allocated to GPC 4000. In at least one embodiment, pipeline manager 4002 configures at least one of one or more DPCs 4006 to implement at least a portion of a graphics rendering pipeline. In at least one embodiment, DPC 4006 is configured to execute a vertex shader program on a programmable streaming multi-processor ("SM") 4014. In at least one embodiment, pipeline manager 4002 is configured to route packets received from a work distribution unit to appropriate logical units within GPC 4000, in at least one embodiment, and some packets may be routed to fixed function hardware units in PROP 4004 and/or raster engine 4008 while other packets may be routed to DPCs 4006 for processing by a primitive engine 4012 or SM 4014. In at least one embodiment, pipeline manager 4002 configures at least one of DPCs 4006 to implement a neural network model and/or a computing pipeline.

In at least one embodiment, PROP unit 4004 is configured, in at least one embodiment, to route data generated by raster engine 4008 and DPCs 4006 to a Raster Operations ("ROP") unit in partition unit 3922, described in more detail above in conjunction with FIG. 39. In at least one embodiment, PROP unit 4004 is configured to perform optimizations for color blending, organize pixel data, perform address translations, and more. In at least one embodiment, raster engine 4008 includes, without limitation, a number of fixed function hardware units configured to perform various raster operations, in at least one embodiment, and raster engine 4008 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4008 comprises fragments to be processed by any suitable entity such as by a fragment shader implemented within DPC 4006.

In at least one embodiment, each DPC 4006 included in GPC 4000 comprise, without limitation, an M-Pipe Controller ("MPC") 4010; primitive engine 4012; one or more SMs 4014; and any suitable combination thereof. In at least one embodiment, MPC 4010 controls operation of DPC 4006, routing packets received from pipeline manager 4002 to appropriate units in DPC 4006. In at least one embodiment, packets associated with a vertex are routed to primitive engine 4012, which is configured to fetch vertex attributes associated with vertex from memory; in contrast, packets associated with a shader program may be transmitted to SM 4014.

In at least one embodiment, SM 4014 comprises, without limitation, a programmable streaming processor that is configured to process tasks represented by a number of threads. In at least one embodiment, SM 4014 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4014 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4014 are described in more detail below.

In at least one embodiment, MMU 4018 provides an interface between GPC 4000 and memory partition unit (e.g., partition unit 3922 of FIG. 39) and MMU 4018 provides translation of virtual addresses into physical addresses, memory protection, and arbitration of memory requests. In at least one embodiment, MMU 4018 provides one or more translation lookaside buffers ("TLBs") for performing translation of virtual addresses into physical addresses in memory.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, deep learning application processor is used to train a machine learning model, such as a neural network, to predict or infer information provided to GPC 4000. In at least one embodiment, GPC 4000 is used to infer or predict information based on a trained machine learning model (e.g., neural network) that has been trained by another processor or system or by GPC 4000. In at least one embodiment, GPC 4000 may be used to perform one or more neural network use cases described herein.

Such components can be useful in determining a position of an object with respect to a vehicle, in at least one embodiment.

Figure 41:
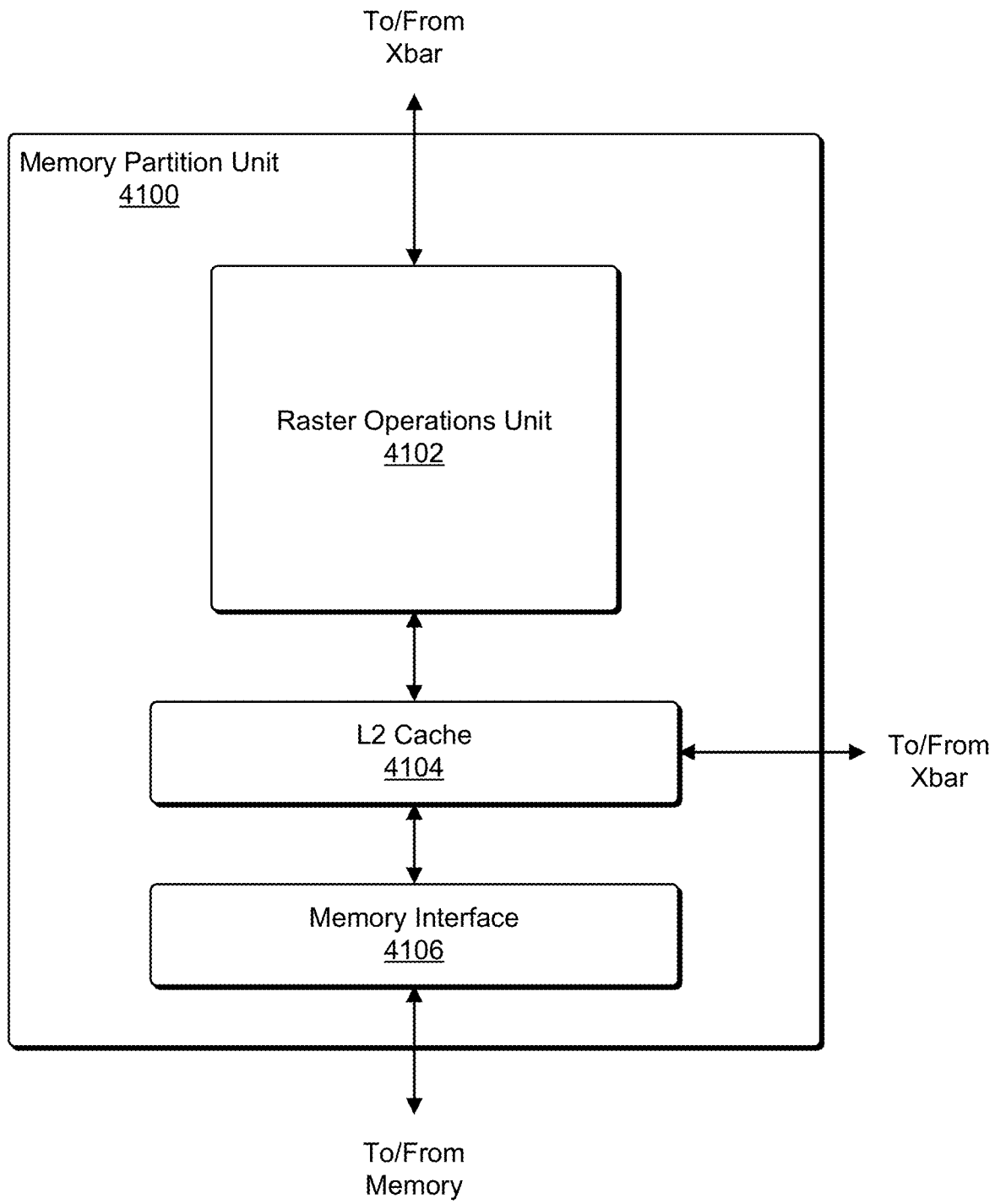
FIG. 41 illustrates a memory partition unit of a parallel processing unit ("PPU"), according to at least one embodiment.

FIG. 41 illustrates a memory partition unit 4100 of a parallel processing unit ("PPU"), in accordance with at least one embodiment. In at least one embodiment, memory partition unit 4100 includes, without limitation, a Raster Operations ("ROP") unit 4102; a level two ("L2") cache 4104; a memory interface 4106; and any suitable combination thereof. In at least one embodiment, memory interface 4106 is coupled to memory. In at least one embodiment, memory interface 4106 may implement 32, 64, 128, 1024-bit data buses, or similar implementations, for high-speed data transfer. In at least one embodiment, PPU incorporates U memory interfaces 4106, one memory interface 4106 per pair of partition units 4100, where each pair of partition units 4100 is connected to a corresponding memory device. For example, in at least one embodiment, PPU may be connected to up to Y memory devices, such as high bandwidth memory stacks or graphics double-data-rate, version 5, synchronous dynamic random a 4 less memory ("GDDR5 SDRAM").

In at least one embodiment, memory interface 4106 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. In at least one embodiment, ECC provides higher reliability for compute applications that are sensitive to data corruption.

In at least one embodiment, PPU implements a multi-level memory hierarchy. In at least one embodiment, memory partition unit 4100 supports a unified memory to provide a single unified virtual address space for central processing unit ("CPU") and PPU memory, enabling data sharing between virtual memory systems. In at least one embodiment, frequency of accesses by a PPU to memory located on other processors is traced to ensure that memory pages are moved to physical memory of PPU that is accessing pages more frequently. In at least one embodiment, high-speed GPU interconnect 3908 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4100 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3904 of FIG. 39 or other system memory is fetched by memory partition unit 4100 and stored in L2 cache 4104, which is located on-chip and is shared between various GPCs, in accordance with at least one embodiment. Each memory partition unit 4100, in at least one embodiment, includes, without limitation, at least a portion of L2 cache associated with a corresponding memory device. In at least one embodiment, lower level caches are implemented in various units within GPCs. In at least one embodiment, each of SMs 4014 may implement a level one ("L1") cache wherein L1 cache is private memory that is dedicated to a particular SM 4014 and data from L2 cache 4104 is fetched and stored in each of L1 caches for processing in functional units of SMs 4014. In at least one embodiment, L2 cache 4104 is coupled to memory interface 4106 and XBar 3920.

ROP unit 4102 performs graphics raster operations related to pixel color, such as color compression, pixel blending, and more, in at least one embodiment. ROP unit 4102, in at least one embodiment, implements depth testing in conjunction with raster engine 4008, receiving a depth for a sample location associated with a pixel fragment from culling engine of raster engine 4008. In at least one embodiment, depth is tested against a corresponding depth in a depth buffer for a sample location associated with fragment. In at least one embodiment, if fragment passes depth test for sample location, then ROP unit 4102 updates depth buffer and transmits a result of depth test to raster engine 4008. It will be appreciated that number of partition units 4100 may be different than number of GPCs and, therefore, each ROP unit 4102 can, in at least one embodiment, be coupled to each of GPCs. In at least one embodiment, ROP unit 4102 tracks packets received from different GPCs and determines which that a result generated by ROP unit 4102 is routed to through XBar 3920.

Figure 42:
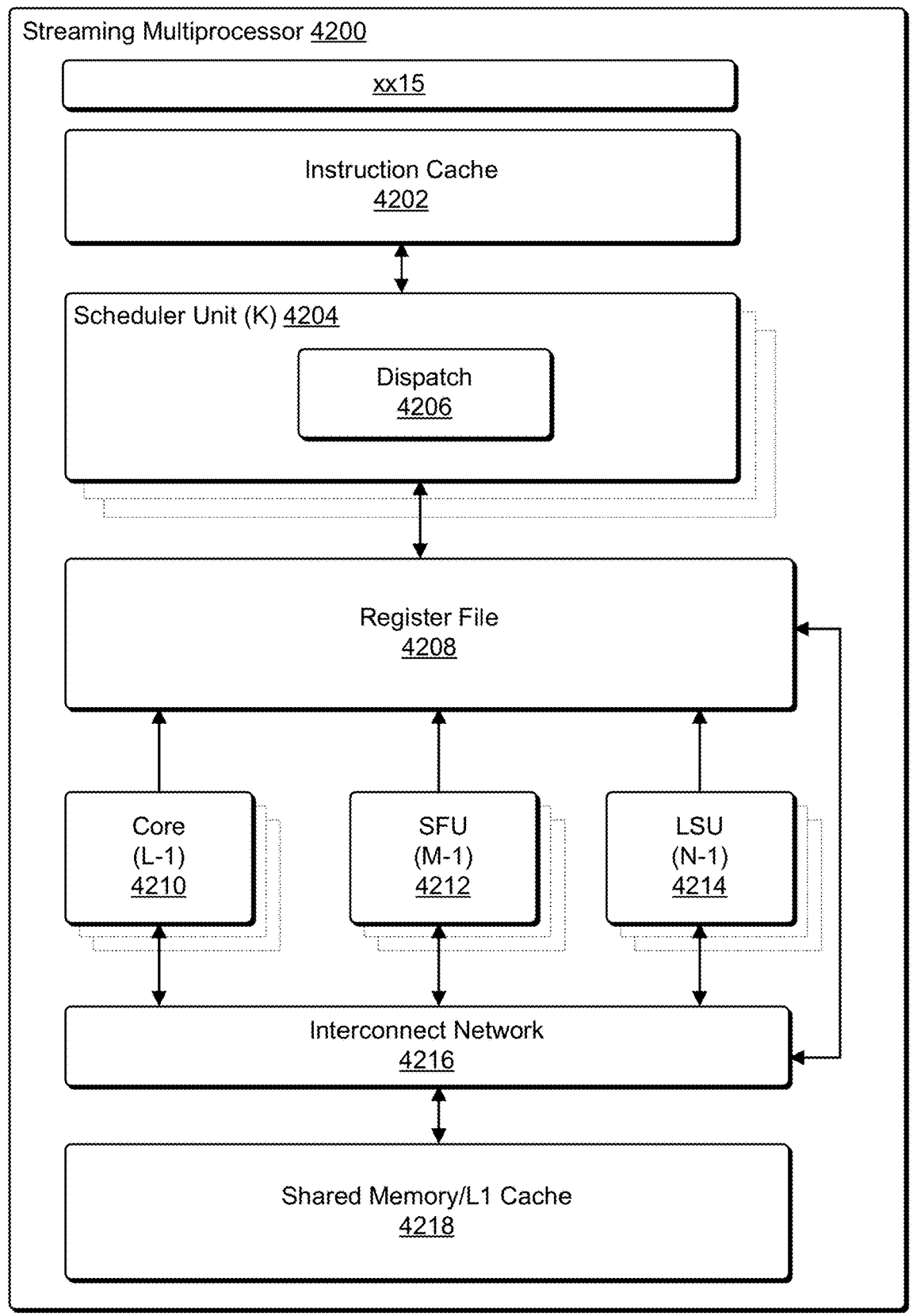
FIG. 42 illustrates a streaming multi-processor, according to at least one embodiment.

FIG. 42 illustrates a streaming multi-processor ("SM") 4200, according to at least one embodiment. In at least one embodiment, SM 4200 is SM 4014 of FIG. 40. In at least one embodiment, SM 4200 includes, without limitation, an instruction cache 4202; one or more scheduler units 4204; a register file 4208; one or more processing cores ("cores") 4210; one or more special function units ("SFUs") 4212; one or more load/store units ("LSUs") 4214; an interconnect network 4216; a shared memory/level one ("L1") cache 4218; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4200. In at least one embodiment, scheduler unit 4204 receives tasks from work distribution unit and manages instruction scheduling for one or more thread blocks assigned to SM 4200. In at least one embodiment, scheduler unit 4204 schedules thread blocks for execution as warps of parallel threads, wherein each thread block is allocated at least one warp. In at least one embodiment, each warp executes threads. In at least one embodiment, scheduler unit 4204 manages a plurality of different thread blocks, allocating warps to different thread blocks and then dispatching instructions from plurality of different cooperative groups to various functional units (e.g., processing cores 4210, SFUs 4212, and LSUs 4214) during each clock cycle.

In at least one embodiment, Cooperative Groups may refer to a programming model for organizing groups of communicating threads that allows developers to express granularity at which threads are communicating, enabling expression of richer, more efficient parallel decompositions.

In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4206 is configured to transmit instructions to one or more of functional units and scheduler unit 4204 includes, without limitation, two dispatch units 4206 that enable two different instructions from same warp to be dispatched during each clock cycle. In at least one embodiment, each scheduler unit 4204 includes a single dispatch unit 4206 or additional dispatch units 4206.

In at least one embodiment, each SM 4200, in at least one embodiment, includes, without limitation, register file 4208 that provides a set of registers for functional units of SM 4200. In at least one embodiment, register file 4208 is divided between each of functional units such that each functional unit is allocated a dedicated portion of register file 4208. In at least one embodiment, register file 4208 is divided between different warps being executed by SM 4200 and register file 4208 provides temporary storage for operands connected to data paths of functional units. In at least one embodiment, each SM 4200 comprises, without limitation, a plurality of L processing cores 4210. In at least one embodiment, SM 4200 includes, without limitation, a large number (e.g., 128 or more) of distinct processing cores 4210. In at least one embodiment, each processing core 4210, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4210 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4210. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4200 comprises, without limitation, M SFUs 4212 that perform special functions (e.g., attribute evaluation, reciprocal square root, etc.). In at least one embodiment, SFUs 4212 include, without limitation, a tree traversal unit configured to traverse a hierarchical tree data structure. In at least one embodiment, SFUs 4212 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4200. In at least one embodiment, texture maps are stored in shared memory/L1 cache 4218. In at least one embodiment, texture units implement texture operations such as filtering operations using mip-maps (e.g., texture maps of varying levels of detail), in accordance with at least one embodiment. In at least one embodiment, each SM 4200 includes, without limitation, two texture units.

Each SM 4200 comprises, without limitation, N LSUs 4214 that implement load and store operations between shared memory/L1 cache 4218 and register file 4208, in at least one embodiment. Each SM 4200 includes, without limitation, interconnect network 4216 that connects each of functional units to register file 4208 and LSU 4214 to register file 4208 and shared memory/L1 cache 4218 in at least one embodiment. In at least one embodiment, interconnect network 4216 is a crossbar that can be configured to connect any of functional units to any of registers in register file 4208 and connect LSUs 4214 to register file 4208 and memory locations in shared memory/L1 cache 4218.

In at least one embodiment, shared memory/L1 cache 4218 is an array of on-chip memory that allows for data storage and communication between SM 4200 and primitive engine and between threads in SM 4200, in at least one embodiment. In at least one embodiment, shared memory/ L1 cache 4218 comprises, without limitation, 128 KB of storage capacity and is in path from SM 4200 to partition unit. In at least one embodiment, shared memory/L1 cache 4218, in at least one embodiment, is used to cache reads and writes. In at least one embodiment, one or more of shared memory/L1 cache 4218, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4218 enables shared memory/L1 cache 4218 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4200 to execute program and perform calculations, shared memory/L1 cache 4218 to communicate between threads, and LSU 4214 to read and write global memory through shared memory/L1 cache 4218 and memory partition unit. In at least one embodiment, when configured for general purpose parallel computation, SM 4200 writes commands that scheduler unit 4204 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. A graphics card may be configured to interface with a PCIe slot on a motherboard of a desktop computer. In at least one embodiment, PPU may be an integrated graphics processing unit ("iGPU") included in chipset of motherboard.

Inference and/or training logic 1715 are used to perform inferencing and/or training operations associated with one or more embodiments. Details regarding inference and/or training logic 1715 are provided below in conjunction with FIGS. 17A and/or 17B. In at least one embodiment, deep learning application processor is used to train a machine learning model, such as a neural network, to predict or infer information provided to SM 4200. In at least one embodiment, SM 4200 is used to infer or predict information based on a trained machine learning model (e.g., neural network) that has been trained by another processor or system or by SM 4200. In at least one embodiment, SM 4200 may be used to perform one or more neural network use cases described herein.

Such components can be useful in determining a position of an object with respect to a vehicle, in at least one embodiment.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2204 and/or secondary storage. Computer programs, if executed by one or more processors, enable system 2200 to perform various functions in accordance with at least one embodiment. In at least one embodiment, memory 2204, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2202; parallel processing system 2212; an integrated circuit capable of at least a portion of capabilities of both CPU 2202; parallel processing system 2212; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2200 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2212 includes, without limitation, a plurality of parallel processing units ("PPUs") 2214 and associated memories 2216. In at least one embodiment, PPUs 2214 are connected to a host processor or other peripheral devices via an interconnect 2218 and a switch 2220 or multiplexer. In at least one embodiment, parallel processing system 2212 distributes computational tasks across PPUs 2214 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2214, although such shared memory may incur performance penalties relative to use of local memory and registers resident to a PPU 2214. In at least one embodiment, operation of PPUs 2214 is synchronized through use of a command such as _syncthreads( ) wherein all threads in a block (e.g., executed across multiple PPUs 2214) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
   one or more circuits to help determine a gaze of an occupant of a vehicle independently of an angle from which the occupant is detected by one or more sensors in the vehicle,
   wherein the gaze is determined based, at least in part, on one or more neural networks, and
   wherein the one or more neural networks are trained using position data known for a vehicle coordinate system and mapped to at least one virtual coordinate system corresponding to the one or more sensors.

2. The processor of claim 1, wherein the position data is obtained, in part, by recognizing fiducial elements positioned in the vehicle and represented in data detected during a training data collection process.

3. The processor of claim 1, wherein the vehicle coordinate system is mapped to the at least one virtual coordinate system using a calibration mount positioned at a fixed position of the vehicle coordinate system in the vehicle.

4. The processor of claim 1, wherein the one or more circuits are further to help determine the gaze by determining an intersection of an occupant gaze vector with a region of the vehicle.

5. A vehicle comprising:
   one or more sensors; and
   one or more processors to help determine a gaze of an occupant of the vehicle independently of an angle from which the occupant is detected by the one or more sensors,
   wherein the gaze is determined based, at least in part, on one or more neural networks, and
   wherein the one or more neural networks are trained using position data known for a vehicle coordinate system and mapped to at least one virtual coordinate system corresponding to the one or more sensors.

6. The vehicle of claim 5, wherein the position data is obtained, in part, by recognizing fiducial elements positioned in the vehicle and represented in data detected during a training data collection process.

7. The vehicle of claim 5, wherein the vehicle coordinate system is mapped to the at least one virtual coordinate system using a calibration mount positioned at a fixed position of the vehicle coordinate system in the vehicle.

8. The vehicle of claim 5, wherein the one or more processors are further to help determine the gaze by determining an intersection of an occupant gaze vector with a region of the vehicle.

9. A method comprising:
   detecting one or more occupants of a vehicle by one or more sensors; and
   determining a gaze of the one or more occupants independently of a location of the one or more sensors,
   wherein the gaze is determined based, at least in part, on one or more neural networks, and
   wherein the one or more neural networks are trained using position data known for a vehicle coordinate system and mapped to at least one virtual coordinate system corresponding to the one or more sensors.

10. The method of claim 9, wherein the position data is obtained, in part, by recognizing fiducial elements represented in data detected during a training data collection process.

11. The method of claim 9, wherein the vehicle coordinate system is mapped to the at least one virtual coordinate system using a calibration mount positioned at a fixed position of the vehicle coordinate system in the vehicle.

12. The method of claim 9, wherein the gaze is determined in part by identifying an intersection of an occupant gaze vector with a recognized region of the vehicle.

13. A processor comprising:
   one or more circuits to help train one or more neural networks to determine a gaze of one or more people independently of an angle from which the gaze is detected,
   wherein the one or more neural networks are trained using position data known for a reference coordinate system and mapped to at least one virtual coordinate system corresponding to one or more sensors used to detect the one or more people.

14. The processor of claim 13, wherein the position data is obtained, in part, by recognizing fiducial elements represented in data detected during a training data collection process.

15. The processor of claim 13, wherein the reference coordinate system is mapped to the at least one virtual coordinate system using a calibration mount positioned at a fixed position of the reference coordinate system in a physical space.

16. The processor of claim 13, wherein the one or more circuits are further to help determine the gaze by determining an intersection of a gaze vector with a recognized region.

17. A system comprising:
one or more processors to help train one or more neural networks to determine a gaze of one or more people independently of an angle from which the gaze is detected,
wherein the one or more neural networks are trained using position data known for a reference coordinate system and mapped to at least one virtual coordinate system corresponding to one or more sensors used to detect the one or more people.

18. The system of claim 17, wherein the position data is obtained, in part, by recognizing fiducial elements represented in data detected during a training data collection process.

19. The system of claim 17, wherein the reference coordinate system is mapped to the at least one virtual coordinate system using a calibration mount positioned at a fixed position of the reference coordinate system in a physical space.

20. The system of claim 17, wherein the one or more processors are further to help determine the gaze by determining an intersection of a gaze vector with a recognized region.

* * * * *